United States Patent
Orr et al.

(10) Patent No.: US 12,067,990 B2
(45) Date of Patent: *Aug. 20, 2024

(54) INTELLIGENT ASSISTANT FOR HOME AUTOMATION

(71) Applicant: Apple Inc., Cupertino, CA (US)

(72) Inventors: Ryan M. Orr, La Honda, CA (US); Garett R. Nell, Seattle, WA (US); Benjamin L. Brumbaugh, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/200,764

(22) Filed: May 23, 2023

(65) Prior Publication Data

US 2023/0298595 A1 Sep. 21, 2023

Related U.S. Application Data

(63) Continuation of application No. 17/540,942, filed on Dec. 2, 2021, now Pat. No. 11,699,448, which is a
(Continued)

(51) Int. Cl.
*G10L 17/22* (2013.01)
*G05B 15/02* (2006.01)
(Continued)

(52) U.S. Cl.
CPC .............. *G10L 17/22* (2013.01); *G05B 15/02* (2013.01); *G06F 3/167* (2013.01);
(Continued)

(58) Field of Classification Search
CPC ......... G10L 17/22; G10L 15/26; G10L 15/30; G05B 15/02; G05B 2219/23373;
(Continued)

(56) References Cited

U.S. PATENT DOCUMENTS 6,400,996 B1  6/2002  Hoffberg et al.
8,345,665 B2  1/2013  Vieri et al.
(Continued)

FOREIGN PATENT DOCUMENTS

AU   2014100581 B4   9/2014
AU   2015203483 A1   7/2015
(Continued)

OTHER PUBLICATIONS

Machine translation for JP2011-500027, IDS (Year: 2011).*
(Continued)

*Primary Examiner* — Qian Yang
(74) *Attorney, Agent, or Firm* — DLA Piper LLP (US)

(57) ABSTRACT

This relates to systems and processes for using a virtual assistant to control electronic devices. In one example process, a user can speak an input in natural language form to a user device to control one or more electronic devices. The user device can transmit the user speech to a server to be converted into a textual representation. The server can identify the one or more electronic devices and appropriate commands to be performed by the one or more electronic devices based on the textual representation. The identified one or more devices and commands to be performed can be transmitted back to the user device, which can forward the commands to the appropriate one or more electronic devices for execution. In response to receiving the commands, the one or more electronic devices can perform the commands and transmit their current states to the user device.

51 Claims, 15 Drawing Sheets

Related U.S. Application Data continuation of application No. 16/881,625, filed on May 22, 2020, now Pat. No. 11,257,504, which is a continuation of application No. 16/174,046, filed on Oct. 29, 2018, now Pat. No. 10,714,095, which is a continuation of application No. 14/503,105, filed on Sep. 30, 2014, now Pat. No. 10,170,123.

(60) Provisional application No. 62/005,893, filed on May 30, 2014.

(51) Int. Cl.
  *G06F 3/16* (2006.01)
  *H04L 12/28* (2006.01)

(52) U.S. Cl.
  CPC ........ *H04L 12/2816* (2013.01); *H04L 12/282* (2013.01); *G05B 2219/23373* (2013.01); *G05B 2219/23386* (2013.01); *G05B 2219/2642* (2013.01)

(58) Field of Classification Search
  CPC .. G05B 2219/23386; G05B 2219/2642; G05B 19/418; G06F 3/167; H04L 12/2816; H04L 12/282
  See application file for complete search history.

(56) References Cited

U.S. PATENT DOCUMENTS

| | | | |
|---|---|---|---|
| 8,346,563 B1 | 1/2013 | Hjelm et al. |
| 8,346,757 B1 | 1/2013 | Lamping et al. |
| 8,352,183 B2 | 1/2013 | Thota et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B1 | 1/2013 | Vieri |
| 8,370,145 B2 | 2/2013 | Endo et al. |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,380,504 B1 | 2/2013 | Peden et al. |
| 8,380,507 B2 | 2/2013 | Herman et al. |
| 8,381,107 B2 | 2/2013 | Rottler et al. |
| 8,381,135 B2 | 2/2013 | Hotelling et al. |
| 8,386,079 B1 | 2/2013 | Kohler et al. |
| 8,386,485 B2 | 2/2013 | Kerschberg et al. |
| 8,386,926 B1 | 2/2013 | Matsuoka et al. |
| 8,391,844 B2 | 3/2013 | Novick et al. |
| 8,392,717 B2 | 3/2013 | Chai et al. |
| 8,396,295 B2 | 3/2013 | Gao et al. |
| 8,396,714 B2 | 3/2013 | Rogers et al. |
| 8,396,715 B2 | 3/2013 | Odell et al. |
| 8,401,163 B1 | 3/2013 | Kirchhoff et al. |
| 8,406,745 B1 | 3/2013 | Upadhyay et al. |
| 8,407,239 B2 | 3/2013 | Dean et al. |
| 8,418,086 B2 | 4/2013 | Weber et al. |
| 8,423,288 B2 | 4/2013 | Stahl et al. |
| 8,428,758 B2 | 4/2013 | Naik et al. |
| 8,433,572 B2 | 4/2013 | Caskey et al. |
| 8,433,778 B1 | 4/2013 | Shreesha et al. |
| 8,434,133 B2 | 4/2013 | Kulkarni et al. |
| 8,442,821 B1 | 5/2013 | Vanhoucke |
| 8,447,612 B2 | 5/2013 | Gazdzinski |
| 8,452,597 B2 | 5/2013 | Bringert et al. |
| 8,452,602 B1 | 5/2013 | Bringert et al. |
| 8,453,058 B1 | 5/2013 | Coccaro et al. |
| 8,457,959 B2 | 6/2013 | Kaiser |
| 8,458,115 B2 | 6/2013 | Cai et al. |
| 8,458,278 B2 | 6/2013 | Christie et al. |
| 8,463,592 B2 | 6/2013 | Lu et al. |
| 8,464,150 B2 | 6/2013 | Davidson et al. |
| 8,468,502 B2 | 6/2013 | Lui et al. |
| 8,473,289 B2 | 6/2013 | Jitkoff et al. |
| 8,473,485 B2 | 6/2013 | Wong et al. |
| 8,477,323 B2 | 7/2013 | Low et al. |
| 8,478,816 B2 | 7/2013 | Parks et al. |
| 8,479,122 B2 | 7/2013 | Hotelling et al. |
| 8,484,027 B1 | 7/2013 | Murphy |
| 8,489,599 B2 | 7/2013 | Bellotti |
| 8,498,670 B2 | 7/2013 | Cha et al. |
| 8,498,857 B2 | 7/2013 | Kopparapu et al. |
| 8,514,197 B2 | 8/2013 | Shahraray et al. |
| 8,515,736 B1 | 8/2013 | Duta |
| 8,515,750 B1 | 8/2013 | Lei et al. |
| 8,521,513 B2 | 8/2013 | Millett et al. |
| 8,521,526 B1 | 8/2013 | Lloyd et al. |
| 8,521,531 B1 | 8/2013 | Kim |
| 8,521,533 B1 | 8/2013 | Ostermann et al. |
| 8,527,276 B1 | 9/2013 | Senior et al. |
| 8,533,266 B2 | 9/2013 | Koulomzin et al. |
| 8,537,033 B2 | 9/2013 | Gueziec |
| 8,539,342 B1 | 9/2013 | Lewis |
| 8,543,375 B2 | 9/2013 | Hong |
| 8,543,397 B1 | 9/2013 | Nguyen |
| 8,543,398 B1 | 9/2013 | Strope et al. |
| 8,560,229 B1 | 10/2013 | Park et al. |
| 8,560,366 B2 | 10/2013 | Mikurak |
| 8,571,528 B1 | 10/2013 | Channakeshava |
| 8,571,851 B1 | 10/2013 | Tickner et al. |
| 8,577,683 B2 | 11/2013 | Dewitt |
| 8,583,416 B2 | 11/2013 | Huang et al. |
| 8,583,511 B2 | 11/2013 | Hendrickson |
| 8,583,638 B2 | 11/2013 | Donelli |
| 8,589,156 B2 | 11/2013 | Burke et al. |
| 8,589,161 B2 | 11/2013 | Kennewick et al. |
| 8,589,374 B2 | 11/2013 | Chaudhari |
| 8,589,869 B2 | 11/2013 | Wolfram |
| 8,589,911 B1 | 11/2013 | Sharkey et al. |
| 8,595,004 B2 | 11/2013 | Koshinaka |
| 8,595,642 B1 | 11/2013 | Lagassey |
| 8,600,743 B2 | 12/2013 | Lindahl et al. |
| 8,600,746 B1 | 12/2013 | Lei et al. |
| 8,600,930 B2 | 12/2013 | Sata et al. |
| 8,606,090 B2 | 12/2013 | Eyer |
| 8,606,568 B1 | 12/2013 | Tickner et al. |
| 8,606,576 B1 | 12/2013 | Barr et al. |
| 8,606,577 B1 | 12/2013 | Stewart et al. |
| 8,615,221 B1 | 12/2013 | Cosenza et al. |
| 8,620,659 B2 | 12/2013 | Di Cristo et al. |
| 8,620,662 B2 | 12/2013 | Bellegarda |
| 8,626,681 B1 | 1/2014 | Jurca et al. |
| 8,630,841 B2 | 1/2014 | Van Caldwell et al. |
| 8,635,073 B2 | 1/2014 | Chang |
| 8,638,363 B2 | 1/2014 | King et al. |
| 8,639,516 B2 | 1/2014 | Lindahl et al. |
| 8,645,128 B1 | 2/2014 | Agiomyrgiannakis |
| 8,645,137 B2 | 2/2014 | Bellegarda et al. |
| 8,645,138 B1 | 2/2014 | Weinstein et al. |
| 8,654,936 B1 | 2/2014 | Eslambolchi et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,924 B2 | 2/2014 | Hoch et al. |
| 8,660,970 B1 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,273 B1 | 3/2014 | Fujisaki |
| 8,676,583 B2 | 3/2014 | Gupta et al. |
| 8,676,904 B2 | 3/2014 | Lindahl |
| 8,677,377 B2 | 3/2014 | Cheyer et al. |
| 8,681,950 B2 | 3/2014 | Vlack et al. |
| 8,682,667 B2 | 3/2014 | Haughay |
| 8,687,777 B1 | 4/2014 | Lavian et al. |
| 8,688,446 B2 | 4/2014 | Yanagihara |
| 8,688,453 B1 | 4/2014 | Joshi et al. |
| 8,689,135 B2 | 4/2014 | Portele et al. |
| 8,694,322 B2 | 4/2014 | Snitkovskiy et al. |
| 8,695,074 B2 | 4/2014 | Saraf et al. |
| 8,696,364 B2 | 4/2014 | Cohen |

(56) References Cited

U.S. PATENT DOCUMENTS

| | | |
|---|---|---|
| 8,706,472 B2 | 4/2014 | Ramerth et al. |
| 8,706,474 B2 | 4/2014 | Blume et al. |
| 8,706,503 B2 | 4/2014 | Cheyer et al. |
| 8,707,195 B2 | 4/2014 | Fleizach et al. |
| 8,712,778 B1 | 4/2014 | Thenthiruperai |
| 8,713,119 B2 | 4/2014 | Lindahl et al. |
| 8,713,418 B2 | 4/2014 | King et al. |
| 8,719,006 B2 | 5/2014 | Bellegarda |
| 8,719,014 B2 | 5/2014 | Wagner |
| 8,719,039 B1 | 5/2014 | Sharifi |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Davis et al. |
| 8,744,852 B1 | 6/2014 | Seymour et al. |
| 8,751,971 B2 | 6/2014 | Fleizach et al. |
| 8,760,537 B2 | 6/2014 | Johnson et al. |
| 8,762,145 B2 | 6/2014 | Ouchi et al. |
| 8,762,156 B2 | 6/2014 | Chen |
| 8,762,469 B2 | 6/2014 | Lindahl |
| 8,768,693 B2 | 7/2014 | Somekh et al. |
| 8,768,702 B2 | 7/2014 | Mason et al. |
| 8,775,154 B2 | 7/2014 | Clinchant et al. |
| 8,775,177 B1 | 7/2014 | Heigold et al. |
| 8,775,341 B1 | 7/2014 | Commons |
| 8,775,931 B2 | 7/2014 | Fux et al. |
| 8,781,456 B2 | 7/2014 | Prociw |
| 8,781,841 B1 | 7/2014 | Wang |
| 8,793,301 B2 | 7/2014 | Wegenkittl et al. |
| 8,798,255 B2 | 8/2014 | Lubowich et al. |
| 8,798,995 B1 | 8/2014 | Edara |
| 8,799,000 B2 | 8/2014 | Guzzoni et al. |
| 8,805,684 B1 | 8/2014 | Aleksic et al. |
| 8,805,690 B1 | 8/2014 | Lebeau et al. |
| 8,812,299 B1 | 8/2014 | Su |
| 8,812,302 B2 | 8/2014 | Xiao et al. |
| 8,812,321 B2 | 8/2014 | Gilbert et al. |
| 8,823,507 B1 | 9/2014 | Touloumtzis |
| 8,823,793 B2 | 9/2014 | Clayton et al. |
| 8,825,474 B1 | 9/2014 | Zhai et al. |
| 8,831,947 B2 | 9/2014 | Wasserblat et al. |
| 8,831,949 B1 | 9/2014 | Smith et al. |
| 8,838,457 B2 | 9/2014 | Cerra et al. |
| 8,843,369 B1 | 9/2014 | Sharifi |
| 8,855,915 B2 | 10/2014 | Furuhata et al. |
| 8,861,925 B1 | 10/2014 | Ohme |
| 8,862,252 B2 | 10/2014 | Rottler et al. |
| 8,868,111 B1 | 10/2014 | Kahn et al. |
| 8,868,409 B1 | 10/2014 | Mengibar et al. |
| 8,868,431 B2 | 10/2014 | Yamazaki et al. |
| 8,868,469 B2 | 10/2014 | Xu et al. |
| 8,868,529 B2 | 10/2014 | Lerenc |
| 8,880,405 B2 | 11/2014 | Cerra et al. |
| 8,886,534 B2 | 11/2014 | Nakano et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,893,023 B2 | 11/2014 | Perry et al. |
| 8,897,822 B2 | 11/2014 | Martin |
| 8,898,064 B1 | 11/2014 | Thomas et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,918,321 B2 | 12/2014 | Czahor |
| 8,922,485 B1 | 12/2014 | Lloyd |
| 8,930,176 B2 | 1/2015 | Li et al. |
| 8,930,191 B2 | 1/2015 | Gruber et al. |
| 8,938,394 B1 | 1/2015 | Faaborg et al. |
| 8,938,450 B2 | 1/2015 | Spivack et al. |
| 8,938,688 B2 | 1/2015 | Bradford et al. |
| 8,942,986 B2 | 1/2015 | Cheyer et al. |
| 8,943,423 B2 | 1/2015 | Merrill et al. |
| 8,954,440 B1 | 2/2015 | Gattani et al. |
| 8,964,947 B1 | 2/2015 | Noolu et al. |
| 8,965,770 B2 | 2/2015 | Petrushin |
| 8,972,240 B2 | 3/2015 | Brockett et al. |
| 8,972,432 B2 | 3/2015 | Shaw et al. |
| 8,972,878 B2 | 3/2015 | Mohler et al. |
| 8,976,063 B1 | 3/2015 | Hawkins et al. |
| 8,976,108 B2 | 3/2015 | Hawkins et al. |
| 8,977,255 B2 | 3/2015 | Freeman et al. |
| 8,983,383 B1 | 3/2015 | Haskin |
| 8,983,846 B2 | 3/2015 | Di Profio et al. |
| 8,984,098 B1 | 3/2015 | Tomkins et al. |
| 8,989,713 B2 | 3/2015 | Doulton |
| 8,990,235 B2 | 3/2015 | King et al. |
| 8,994,660 B2 | 3/2015 | Neels et al. |
| 8,995,972 B1 | 3/2015 | Cronin |
| 8,996,350 B1 | 3/2015 | Dub et al. |
| 8,996,376 B2 | 3/2015 | Fleizach et al. |
| 8,996,381 B2 | 3/2015 | Mozer et al. |
| 8,996,550 B2 | 3/2015 | Ko et al. |
| 8,996,639 B1 | 3/2015 | Faaborg et al. |
| 9,002,714 B2 | 4/2015 | Kim et al. |
| 9,009,046 B1 | 4/2015 | Stewart |
| 9,013,992 B2 | 4/2015 | Perkins |
| 9,015,036 B2 | 4/2015 | Karov Zangvil et al. |
| 9,020,804 B2 | 4/2015 | Barbaiani et al. |
| 9,026,425 B2 | 5/2015 | Nikoulina et al. |
| 9,026,426 B2 | 5/2015 | Wu et al. |
| 9,031,834 B2 | 5/2015 | Coorman et al. |
| 9,031,970 B1 | 5/2015 | Das et al. |
| 9,037,967 B1 | 5/2015 | Al-jefri et al. |
| 9,043,208 B2 | 5/2015 | Koch et al. |
| 9,043,211 B2 | 5/2015 | Haiut et al. |
| 9,043,319 B1 | 5/2015 | Burns et al. |
| 9,046,932 B2 | 6/2015 | Medlock et al. |
| 9,049,255 B2 | 6/2015 | Macfarlane et al. |
| 9,049,295 B1 | 6/2015 | Cooper et al. |
| 9,053,706 B2 | 6/2015 | Jitkoff et al. |
| 9,058,105 B2 | 6/2015 | Drory et al. |
| 9,058,332 B1 | 6/2015 | Darby et al. |
| 9,058,811 B2 | 6/2015 | Wang et al. |
| 9,063,979 B2 | 6/2015 | Chiu et al. |
| 9,064,495 B1 | 6/2015 | Torok et al. |
| 9,065,660 B2 | 6/2015 | Ellis et al. |
| 9,070,247 B2 | 6/2015 | Kuhn et al. |
| 9,070,366 B1 | 6/2015 | Mathias et al. |
| 9,071,701 B2 | 6/2015 | Donaldson et al. |
| 9,075,435 B1 | 7/2015 | Noble et al. |
| 9,075,824 B2 | 7/2015 | Gordo et al. |
| 9,076,448 B2 | 7/2015 | Bennett et al. |
| 9,076,450 B1 | 7/2015 | Sadek et al. |
| 9,081,411 B2 | 7/2015 | Kalns et al. |
| 9,081,482 B1 | 7/2015 | Zhai et al. |
| 9,082,402 B2 | 7/2015 | Yadgar et al. |
| 9,083,581 B1 | 7/2015 | Addepalli et al. |
| 9,092,433 B2 | 7/2015 | Rodriguez |
| 9,092,789 B2 | 7/2015 | Anshul |
| 9,094,576 B1 | 7/2015 | Karakotsios |
| 9,094,636 B1 | 7/2015 | Sanders et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,212 B2 | 8/2015 | Sheets et al. |
| 9,117,447 B2 | 8/2015 | Gruber et al. |
| 9,123,338 B1 | 9/2015 | Sanders et al. |
| 9,143,907 B1 | 9/2015 | Caldwell et al. |
| 9,159,319 B1 | 10/2015 | Hoffmeister |
| 9,164,983 B2 | 10/2015 | Liu et al. |
| 9,171,541 B2 | 10/2015 | Kennewick et al. |
| 9,171,546 B1 | 10/2015 | Pike |
| 9,172,747 B2 | 10/2015 | Walters et al. |
| 9,183,845 B1 | 11/2015 | Gopalakrishnan et al. |
| 9,190,062 B2 | 11/2015 | Haughay |
| 9,196,245 B2 | 11/2015 | Larcheveque et al. |
| 9,197,848 B2 | 11/2015 | Felkai et al. |
| 9,201,955 B1 | 12/2015 | Quintao et al. |
| 9,202,520 B1 | 12/2015 | Tang |
| 9,208,153 B1 | 12/2015 | Zaveri et al. |
| 9,213,754 B1 | 12/2015 | Zhan et al. |
| 9,214,137 B2 | 12/2015 | Bala et al. |
| 9,218,122 B2 | 12/2015 | Thoma et al. |
| 9,218,809 B2 | 12/2015 | Bellegard et al. |

(56) References Cited

U.S. PATENT DOCUMENTS

| | | |
|---|---|---|
| 9,218,819 B1 | 12/2015 | Stekkelpa et al. |
| 9,223,529 B1 | 12/2015 | Khafizova |
| 9,223,537 B2 | 12/2015 | Brown et al. |
| 9,230,561 B2 | 1/2016 | Ostermann et al. |
| 9,232,293 B1 | 1/2016 | Hanson |
| 9,236,047 B2 | 1/2016 | Rasmussen |
| 9,241,073 B1 | 1/2016 | Rensburg et al. |
| 9,245,151 B2 | 1/2016 | LeBeau et al. |
| 9,245,388 B2 | 1/2016 | Poulos et al. |
| 9,246,984 B2 | 1/2016 | Zises |
| 9,250,703 B2 | 2/2016 | Hernandez-Abrego et al. |
| 9,251,713 B1 | 2/2016 | Giovanniello et al. |
| 9,251,787 B1 | 2/2016 | Hart et al. |
| 9,255,812 B2 | 2/2016 | Maeoka et al. |
| 9,257,120 B1 | 2/2016 | Guevara et al. |
| 9,258,604 B1 | 2/2016 | Bilobrov et al. |
| 9,262,412 B2 | 2/2016 | Yang et al. |
| 9,262,612 B2 | 2/2016 | Cheyer |
| 9,263,058 B2 | 2/2016 | Huang et al. |
| 9,274,598 B2 | 3/2016 | Beymer et al. |
| 9,280,535 B2 | 3/2016 | Varma et al. |
| 9,282,211 B2 | 3/2016 | Osawa |
| 9,286,727 B2 | 3/2016 | Kim et al. |
| 9,286,910 B1 | 3/2016 | Li et al. |
| 9,292,487 B1 | 3/2016 | Weber |
| 9,292,489 B1 | 3/2016 | Sak et al. |
| 9,292,492 B2 | 3/2016 | Sarikaya et al. |
| 9,298,358 B1 | 3/2016 | Wilden et al. |
| 9,299,344 B2 | 3/2016 | Braho et al. |
| 9,300,718 B2 | 3/2016 | Khanna |
| 9,301,256 B2 | 3/2016 | Mohan et al. |
| 9,305,543 B2 | 4/2016 | Fleizach et al. |
| 9,305,548 B2 | 4/2016 | Kennewick et al. |
| 9,311,308 B2 | 4/2016 | Sankarasubramaniam et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,325,809 B1 | 4/2016 | Barros et al. |
| 9,325,842 B1 | 4/2016 | Siddiqi et al. |
| 9,330,659 B2 | 5/2016 | Ju et al. |
| 9,330,668 B2 | 5/2016 | Nanavati et al. |
| 9,330,720 B2 | 5/2016 | Lee |
| 9,335,983 B2 | 5/2016 | Breiner et al. |
| 9,338,493 B2 | 5/2016 | Van Os et al. |
| 9,342,829 B2 | 5/2016 | Zhou et al. |
| 9,342,930 B1 | 5/2016 | Kraft et al. |
| 9,349,368 B1 | 5/2016 | Lebeau et al. |
| 9,355,472 B2 | 5/2016 | Kocienda et al. |
| 9,361,084 B1 | 6/2016 | Costa |
| 9,361,625 B2 | 6/2016 | Parker et al. |
| 9,367,541 B1 | 6/2016 | Servan et al. |
| 9,368,114 B2 | 6/2016 | Larson et al. |
| 9,377,865 B2 | 6/2016 | Berenson et al. |
| 9,377,871 B2 | 6/2016 | Waddell et al. |
| 9,378,456 B2 | 6/2016 | White et al. |
| 9,378,740 B1 | 6/2016 | Rosen et al. |
| 9,380,155 B1 | 6/2016 | Reding et al. |
| 9,383,827 B1 | 7/2016 | Faaborg et al. |
| 9,384,185 B2 | 7/2016 | Medlock et al. |
| 9,390,726 B1 | 7/2016 | Smus et al. |
| 9,396,722 B2 | 7/2016 | Chung et al. |
| 9,400,779 B2 | 7/2016 | Convertino et al. |
| 9,401,140 B1 | 7/2016 | Weber et al. |
| 9,401,147 B2 | 7/2016 | Jitkoff et al. |
| 9,405,741 B1 | 8/2016 | Schaaf et al. |
| 9,406,224 B1 | 8/2016 | Sanders et al. |
| 9,406,299 B2 | 8/2016 | Gollan et al. |
| 9,408,182 B1 | 8/2016 | Hurley et al. |
| 9,412,392 B2 | 8/2016 | Lindahl |
| 9,418,650 B2 | 8/2016 | Bharadwaj et al. |
| 9,423,266 B2 | 8/2016 | Clark et al. |
| 9,424,246 B2 | 8/2016 | Spencer et al. |
| 9,424,840 B1 | 8/2016 | Hart et al. |
| 9,431,021 B1 | 8/2016 | Scalise et al. |
| 9,432,499 B2 | 8/2016 | Hajdu et al. |
| 9,436,918 B2 | 9/2016 | Pantel et al. |
| 9,437,186 B1 | 9/2016 | Liu et al. |
| 9,437,189 B2 | 9/2016 | Epstein et al. |
| 9,442,687 B2 | 9/2016 | Park et al. |
| 9,443,527 B1 | 9/2016 | Watanabe et al. |
| 9,454,599 B2 | 9/2016 | Golden et al. |
| 9,454,957 B1 | 9/2016 | Mathias et al. |
| 9,465,798 B2 | 10/2016 | Lin |
| 9,465,833 B2 | 10/2016 | Aravamudan et al. |
| 9,465,864 B2 | 10/2016 | Hu et al. |
| 9,466,027 B2 | 10/2016 | Byrne et al. |
| 9,466,121 B2 | 10/2016 | Yang et al. |
| 9,466,294 B1 | 10/2016 | Tunstall-pedoe et al. |
| 9,471,566 B1 | 10/2016 | Zhang et al. |
| 9,472,196 B1 | 10/2016 | Wang et al. |
| 9,483,388 B2 | 11/2016 | Sankaranarasimhan et al. |
| 9,483,461 B2 | 11/2016 | Fleizach et al. |
| 9,483,529 B1 | 11/2016 | Pasoi et al. |
| 9,484,021 B1 | 11/2016 | Mairesse et al. |
| 9,485,286 B1 | 11/2016 | Sellier et al. |
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,514,470 B2 | 12/2016 | Topatan et al. |
| 9,516,014 B2 | 12/2016 | Zafiroglu et al. |
| 9,519,453 B2 | 12/2016 | Perkuhn et al. |
| 9,524,355 B2 | 12/2016 | Forbes et al. |
| 9,529,500 B1 | 12/2016 | Gauci et al. |
| 9,531,803 B2 | 12/2016 | Chen et al. |
| 9,531,862 B1 | 12/2016 | Vadodaria |
| 9,535,906 B2 | 1/2017 | Lee et al. |
| 9,536,527 B1 | 1/2017 | Carlson |
| 9,536,544 B2 | 1/2017 | Osterman et al. |
| 9,547,647 B2 | 1/2017 | Badaskar |
| 9,548,050 B2 | 1/2017 | Gruber et al. |
| 9,548,979 B1 | 1/2017 | Johnson et al. |
| 9,569,549 B1 | 2/2017 | Jenkins et al. |
| 9,571,995 B1 | 2/2017 | Scheer et al. |
| 9,575,964 B2 | 2/2017 | Yadgar et al. |
| 9,576,575 B2 | 2/2017 | Heide |
| 9,578,173 B2 | 2/2017 | Sanghavi et al. |
| 9,584,946 B1 | 2/2017 | Lyren et al. |
| 9,586,318 B2 | 3/2017 | Djugash et al. |
| 9,602,946 B2 | 3/2017 | Karkkainen et al. |
| 9,607,612 B2 | 3/2017 | Deleeuw |
| 9,612,999 B2 | 4/2017 | Prakah-asante et al. |
| 9,619,200 B2 | 4/2017 | Chakladar et al. |
| 9,619,459 B2 | 4/2017 | Hebert et al. |
| 9,620,113 B2 | 4/2017 | Kennewick et al. |
| 9,620,126 B2 | 4/2017 | Chiba |
| 9,626,695 B2 | 4/2017 | Balasubramanian et al. |
| 9,626,799 B2 | 4/2017 | McArdle et al. |
| 9,626,955 B2 | 4/2017 | Fleizach et al. |
| 9,633,004 B2 | 4/2017 | Giuli et al. |
| 9,633,191 B2 | 4/2017 | Fleizach et al. |
| 9,633,660 B2 | 4/2017 | Haughay |
| 9,633,674 B2 | 4/2017 | Sinha |
| 9,646,313 B2 | 5/2017 | Kim et al. |
| 9,648,107 B1 | 5/2017 | Penilla et al. |
| 9,652,453 B2 | 5/2017 | Mathur et al. |
| 9,658,746 B2 | 5/2017 | Cohn et al. |
| 9,659,002 B2 | 5/2017 | Medlock et al. |
| 9,659,298 B2 | 5/2017 | Lynch et al. |
| 9,665,567 B2 | 5/2017 | Li et al. |
| 9,665,662 B1 | 5/2017 | Gautam et al. |
| 9,668,121 B2 | 5/2017 | Naik et al. |
| 9,672,725 B2 | 6/2017 | Dotan-Cohen et al. |
| 9,672,822 B2 | 6/2017 | Brown et al. |
| 9,678,664 B2 | 6/2017 | Zhai et al. |
| 9,679,570 B1 | 6/2017 | Edara |
| 9,690,542 B2 | 6/2017 | Reddy et al. |
| 9,691,161 B1 | 6/2017 | Yalniz et al. |
| 9,691,378 B1 | 6/2017 | Meyers et al. |
| 9,691,384 B1 | 6/2017 | Wang et al. |
| 9,696,963 B2 | 7/2017 | Son et al. |
| 9,697,016 B2 | 7/2017 | Jacob |
| 9,697,822 B1 | 7/2017 | Naik et al. |

(56) References Cited

U.S. PATENT DOCUMENTS

| | | |
|---|---|---|
| 9,697,827 B1 | 7/2017 | Lilly et al. |
| 9,697,828 B1 | 7/2017 | Prasad et al. |
| 9,698,999 B2 | 7/2017 | Mutagi |
| 9,711,148 B1 | 7/2017 | Sharifi et al. |
| 9,720,907 B2 | 8/2017 | Bangalore et al. |
| 9,721,566 B2 | 8/2017 | Newendorp et al. |
| 9,721,570 B1 | 8/2017 | Beal et al. |
| 9,723,130 B2 | 8/2017 | Rand |
| 9,734,817 B1 | 8/2017 | Putrycz |
| 9,734,839 B1 | 8/2017 | Adams |
| 9,741,343 B1 | 8/2017 | Miles et al. |
| 9,747,083 B1 | 8/2017 | Roman et al. |
| 9,747,093 B2 | 8/2017 | Latino et al. |
| 9,754,591 B1 | 9/2017 | Kumar et al. |
| 9,755,605 B1 | 9/2017 | Li et al. |
| 9,760,566 B2 | 9/2017 | Heck et al. |
| 9,767,710 B2 | 9/2017 | Lee et al. |
| 9,772,994 B2 | 9/2017 | Karov et al. |
| 9,786,271 B1 | 10/2017 | Combs et al. |
| 9,792,907 B2 | 10/2017 | Bocklet et al. |
| 9,798,719 B2 | 10/2017 | Karov et al. |
| 9,812,128 B2 | 11/2017 | Mixter et al. |
| 9,813,882 B1 | 11/2017 | Masterman |
| 9,818,400 B2 | 11/2017 | Paulik et al. |
| 9,823,811 B2 | 11/2017 | Brown et al. |
| 9,823,828 B2 | 11/2017 | Zambetti et al. |
| 9,824,379 B2 | 11/2017 | Khandelwal et al. |
| 9,824,691 B1 | 11/2017 | Montero et al. |
| 9,824,692 B1 | 11/2017 | Khoury et al. |
| 9,830,044 B2 | 11/2017 | Brown et al. |
| 9,830,449 B1 | 11/2017 | Wagner |
| 9,842,168 B2 | 12/2017 | Heck et al. |
| 9,842,584 B1 | 12/2017 | Hart et al. |
| 9,846,685 B2 | 12/2017 | Li |
| 9,846,836 B2 | 12/2017 | Gao et al. |
| 9,858,925 B2 | 1/2018 | Gruber et al. |
| 9,858,927 B2 | 1/2018 | Williams et al. |
| 9,886,953 B2 | 2/2018 | Lemay et al. |
| 9,887,949 B1 | 2/2018 | Shepherd et al. |
| 9,891,811 B2 | 2/2018 | Federighi et al. |
| 9,911,415 B2 | 3/2018 | Vanblon et al. |
| 9,916,839 B1 | 3/2018 | Scalise et al. |
| 9,922,642 B2 | 3/2018 | Pitschel et al. |
| 9,928,835 B1 | 3/2018 | Tang |
| 9,934,777 B1 | 4/2018 | Joseph et al. |
| 9,934,785 B1 | 4/2018 | Hulaud |
| 9,940,616 B1 | 4/2018 | Morgan et al. |
| 9,946,862 B2 | 4/2018 | Yun et al. |
| 9,948,728 B2 | 4/2018 | Linn et al. |
| 9,959,129 B2 | 5/2018 | Kannan et al. |
| 9,959,506 B1 | 5/2018 | Karppanen |
| 9,966,065 B2 | 5/2018 | Gruber et al. |
| 9,966,068 B2 | 5/2018 | Cash et al. |
| 9,967,381 B1 | 5/2018 | Kashimba et al. |
| 9,971,495 B2 | 5/2018 | Shetty et al. |
| 9,972,304 B2 | 5/2018 | Paulik et al. |
| 9,984,686 B1 | 5/2018 | Mutagi et al. |
| 9,986,419 B2 | 5/2018 | Naik et al. |
| 9,990,129 B2 | 6/2018 | Yang et al. |
| 9,990,176 B1 | 6/2018 | Gray |
| 9,990,921 B2 | 6/2018 | Vanblon et al. |
| 9,990,926 B1 | 6/2018 | Pearce |
| 9,996,626 B1 | 6/2018 | Bailey et al. |
| 9,998,552 B1 | 6/2018 | Ledet |
| 10,001,817 B2 | 6/2018 | Zambetti et al. |
| 10,013,416 B1 | 7/2018 | Bhardwaj et al. |
| 10,013,654 B1 | 7/2018 | Levy et al. |
| 10,013,979 B1 | 7/2018 | Roma et al. |
| 10,019,436 B2 | 7/2018 | Huang |
| 10,025,378 B2 | 7/2018 | Venable et al. |
| 10,026,209 B1 | 7/2018 | Dagley et al. |
| 10,026,401 B1 | 7/2018 | Mutagi et al. |
| 10,027,662 B1 | 7/2018 | Mutagi et al. |
| 10,032,451 B1 | 7/2018 | Mamkina et al. |
| 10,032,455 B2 | 7/2018 | Newman et al. |
| 10,037,758 B2 | 7/2018 | Jing et al. |
| 10,043,516 B2 | 8/2018 | Saddler et al. |
| 10,048,748 B2 | 8/2018 | Sridharan et al. |
| 10,049,161 B2 | 8/2018 | Kaneko |
| 10,049,663 B2 | 8/2018 | Orr et al. |
| 10,049,668 B2 | 8/2018 | Huang et al. |
| 10,055,390 B2 | 8/2018 | Sharifi et al. |
| 10,055,681 B2 | 8/2018 | Brown et al. |
| 10,068,570 B2 | 9/2018 | Dai et al. |
| 10,074,360 B2 | 9/2018 | Kim |
| 10,074,371 B1 | 9/2018 | Wang et al. |
| 10,078,487 B2 | 9/2018 | Gruber et al. |
| 10,083,213 B1 | 9/2018 | Podgorny et al. |
| 10,083,688 B2 | 9/2018 | Piernot et al. |
| 10,083,690 B2 | 9/2018 | Giuli et al. |
| 10,088,972 B2 | 10/2018 | Brown et al. |
| 10,089,072 B2 | 10/2018 | Piersol et al. |
| 10,096,319 B1 | 10/2018 | Jin et al. |
| 10,101,887 B2 | 10/2018 | Bernstein et al. |
| 10,102,359 B2 | 10/2018 | Cheyer |
| 10,115,055 B2 | 10/2018 | Weiss et al. |
| 10,127,901 B2 | 11/2018 | Zhao et al. |
| 10,127,908 B1 | 11/2018 | Deller et al. |
| 10,127,926 B2 | 11/2018 | James |
| 10,134,425 B1 | 11/2018 | Johnson, Jr. |
| 10,135,965 B2 | 11/2018 | Woolsey et al. |
| 10,142,222 B1 | 11/2018 | Zhang |
| 10,146,923 B2 | 12/2018 | Pitkänen et al. |
| 10,147,421 B2 | 12/2018 | Liddell et al. |
| 10,147,441 B1 | 12/2018 | Pogue et al. |
| 10,149,156 B1 | 12/2018 | Tiku et al. |
| 10,162,512 B2 | 12/2018 | Seo et al. |
| 10,162,817 B2 | 12/2018 | Schlesinger et al. |
| 10,169,329 B2 | 1/2019 | Futrell et al. |
| 10,170,123 B2 | 1/2019 | Orr et al. |
| 10,170,135 B1 | 1/2019 | Pearce et al. |
| 10,175,879 B2 | 1/2019 | Missig et al. |
| 10,176,167 B2 | 1/2019 | Evermann |
| 10,176,802 B1 | 1/2019 | Ladhak et al. |
| 10,176,808 B1 | 1/2019 | Lovitt et al. |
| 10,178,301 B1 | 1/2019 | Welbourne et al. |
| 10,185,542 B2 | 1/2019 | Carson et al. |
| 10,186,254 B2 | 1/2019 | Williams et al. |
| 10,186,266 B1 | 1/2019 | Devaraj et al. |
| 10,191,627 B2 | 1/2019 | Cieplinski et al. |
| 10,191,646 B2 | 1/2019 | Zambetti et al. |
| 10,191,718 B2 | 1/2019 | Rhee et al. |
| 10,192,546 B1 | 1/2019 | Piersol et al. |
| 10,192,552 B2 | 1/2019 | Raitio et al. |
| 10,192,557 B2 | 1/2019 | Lee et al. |
| 10,198,877 B1 | 2/2019 | Maltsev et al. |
| 10,199,051 B2 | 2/2019 | Binder et al. |
| 10,200,824 B2 | 2/2019 | Gross et al. |
| 10,204,627 B2 | 2/2019 | Nitz et al. |
| 10,210,860 B1 | 2/2019 | Ward et al. |
| 10,216,351 B2 | 2/2019 | Yang |
| 10,216,832 B2 | 2/2019 | Bangalore et al. |
| 10,223,066 B2 | 3/2019 | Martel et al. |
| 10,225,711 B2 | 3/2019 | Parks et al. |
| 10,228,904 B2 | 3/2019 | Raux |
| 10,229,109 B1 | 3/2019 | Cherepanov et al. |
| 10,229,356 B1 | 3/2019 | Liu et al. |
| 10,229,680 B1 | 3/2019 | Gillespie et al. |
| 10,237,711 B2 | 3/2019 | Linn et al. |
| 10,241,644 B2 | 3/2019 | Gruber et al. |
| 10,242,501 B1 | 3/2019 | Pusch et al. |
| 10,248,308 B2 | 4/2019 | Karunamuni et al. |
| 10,248,771 B1 | 4/2019 | Ziraknejad et al. |
| 10,249,300 B2 | 4/2019 | Booker et al. |
| 10,249,305 B2 | 4/2019 | Yu |
| 10,255,922 B1 | 4/2019 | Sharifi et al. |
| 10,261,672 B1 | 4/2019 | Dolbakian et al. |
| 10,261,830 B2 | 4/2019 | Gupta et al. |
| 10,269,345 B2 | 4/2019 | Castillo Sanchez et al. |
| 10,275,513 B1 | 4/2019 | Cowan et al. |
| 10,282,737 B2 | 5/2019 | Clark et al. |
| 10,289,205 B1 | 5/2019 | Sumter et al. |
| 10,291,066 B1 | 5/2019 | Leabman et al. |
| 10,296,160 B2 | 5/2019 | Shah et al. |

(56) References Cited

U.S. PATENT DOCUMENTS

| | | |
|---|---|---|
| 10,297,253 B2 | 5/2019 | Walker, II et al. |
| 10,303,772 B2 | 5/2019 | Hosn et al. |
| 10,304,463 B2 | 5/2019 | Mixter et al. |
| 10,311,482 B2 | 6/2019 | Baldwin |
| 10,311,871 B2 | 6/2019 | Newendorp et al. |
| 10,325,598 B2 | 6/2019 | Basye et al. |
| 10,331,312 B2 | 6/2019 | Napolitano et al. |
| 10,332,509 B2 | 6/2019 | Catanzaro et al. |
| 10,332,513 B1 | 6/2019 | D'souza et al. |
| 10,332,518 B2 | 6/2019 | Garg et al. |
| 10,339,224 B2 | 7/2019 | Fukuoka |
| 10,339,714 B2 | 7/2019 | Corso et al. |
| 10,339,721 B1 | 7/2019 | Dascola et al. |
| 10,339,925 B1 | 7/2019 | Rastrow et al. |
| 10,346,540 B2 | 7/2019 | Karov et al. |
| 10,346,541 B1 | 7/2019 | Phillips et al. |
| 10,346,753 B2 | 7/2019 | Soon-Shiong et al. |
| 10,346,878 B1 | 7/2019 | Ostermann et al. |
| 10,353,975 B2 | 7/2019 | Oh et al. |
| 10,354,168 B2 | 7/2019 | Bluche |
| 10,354,677 B2 | 7/2019 | Mohamed et al. |
| 10,356,243 B2 | 7/2019 | Sanghavi et al. |
| 10,360,305 B2 | 7/2019 | Larcheveque et al. |
| 10,360,716 B1 | 7/2019 | Van Der Meulen et al. |
| 10,365,887 B1 | 7/2019 | Mulherkar |
| 10,366,160 B2 | 7/2019 | Castelli et al. |
| 10,366,692 B1 | 7/2019 | Adams et al. |
| 10,372,814 B2 | 8/2019 | Gliozzo et al. |
| 10,372,881 B2 | 8/2019 | Ingrassia, Jr. et al. |
| 10,373,381 B2 | 8/2019 | Nuernberger et al. |
| 10,389,876 B2 | 8/2019 | Engelke et al. |
| 10,402,066 B2 | 9/2019 | Kawana |
| 10,403,283 B1 | 9/2019 | Schramm et al. |
| 10,409,454 B2 | 9/2019 | Kagan et al. |
| 10,410,637 B2 | 9/2019 | Paulik et al. |
| 10,416,760 B2 | 9/2019 | Burns et al. |
| 10,417,037 B2 | 9/2019 | Gruber et al. |
| 10,417,344 B2 | 9/2019 | Futrell et al. |
| 10,417,554 B2 | 9/2019 | Scheffler |
| 10,431,210 B1 | 10/2019 | Huang et al. |
| 10,437,928 B2 | 10/2019 | Bhaya et al. |
| 10,446,142 B2 | 10/2019 | Lim et al. |
| 10,453,117 B1 | 10/2019 | Reavely et al. |
| 10,469,665 B1 | 11/2019 | Bell et al. |
| 10,474,961 B2 | 11/2019 | Brigham et al. |
| 10,475,446 B2 | 11/2019 | Gruber et al. |
| 10,482,875 B2 | 11/2019 | Henry |
| 10,490,195 B1 | 11/2019 | Krishnamoorthy et al. |
| 10,496,364 B2 | 12/2019 | Yao |
| 10,496,705 B1 | 12/2019 | Irani et al. |
| 10,497,365 B2 | 12/2019 | Gruber et al. |
| 10,497,366 B2 | 12/2019 | Sapugay et al. |
| 10,504,518 B1 | 12/2019 | Irani et al. |
| 10,512,750 B1 | 12/2019 | Lewin et al. |
| 10,515,133 B1 | 12/2019 | Sharifi |
| 10,515,623 B1 | 12/2019 | Grizzel |
| 10,521,946 B1 | 12/2019 | Roche et al. |
| 10,528,386 B2 | 1/2020 | Yu |
| 10,540,976 B2 | 1/2020 | Van Os et al. |
| 10,558,893 B2 | 2/2020 | Bluche |
| 10,559,225 B1 | 2/2020 | Tao et al. |
| 10,559,299 B1 | 2/2020 | Arel et al. |
| 10,566,007 B2 | 2/2020 | Fawaz et al. |
| 10,568,032 B2 | 2/2020 | Freeman et al. |
| 10,572,885 B1 | 2/2020 | Guo et al. |
| 10,579,401 B2 | 3/2020 | Dawes |
| 10,580,409 B2 | 3/2020 | Walker, II et al. |
| 10,582,355 B1 | 3/2020 | Lebeau et al. |
| 10,585,957 B2 | 3/2020 | Heck et al. |
| 10,586,369 B1 | 3/2020 | Roche et al. |
| 10,599,449 B1 | 3/2020 | Chatzipanagiotis et al. |
| 10,628,483 B1 | 4/2020 | Rao et al. |
| 10,629,186 B1 | 4/2020 | Slifka |
| 10,630,795 B2 | 4/2020 | Aoki et al. |
| 10,642,934 B2 | 5/2020 | Heck et al. |
| 10,649,652 B2 | 5/2020 | Sun |
| 10,659,851 B2 | 5/2020 | Lister et al. |
| 10,671,428 B2 | 6/2020 | Zeitlin |
| 10,679,007 B2 | 6/2020 | Jia et al. |
| 10,679,608 B2 | 6/2020 | Mixter et al. |
| 10,684,099 B2 | 6/2020 | Zaetterqvist |
| 10,684,703 B2 | 6/2020 | Hindi et al. |
| 10,685,187 B2 | 6/2020 | Badr et al. |
| 10,699,697 B2 | 6/2020 | Qian et al. |
| 10,706,841 B2 | 7/2020 | Gruber et al. |
| 10,721,190 B2 | 7/2020 | Zhao et al. |
| 10,732,708 B1 | 8/2020 | Roche et al. |
| 10,743,107 B1 | 8/2020 | Yoshioka et al. |
| 10,748,529 B1 | 8/2020 | Milden |
| 10,748,546 B2 | 8/2020 | Kim et al. |
| 10,754,658 B2 | 8/2020 | Tamiya |
| 10,755,032 B2 | 8/2020 | Douglas et al. |
| 10,757,499 B1 | 8/2020 | Vautrin et al. |
| 10,769,385 B2 | 9/2020 | Evermann |
| 10,776,933 B2 | 9/2020 | Faulkner |
| 10,778,839 B1 | 9/2020 | Newstadt et al. |
| 10,783,151 B1 | 9/2020 | Bushkin et al. |
| 10,783,883 B2 | 9/2020 | Mixter et al. |
| 10,789,945 B2 | 9/2020 | Acero et al. |
| 10,791,176 B2 | 9/2020 | Phipps et al. |
| 10,795,944 B2 | 10/2020 | Brown et al. |
| 10,796,100 B2 | 10/2020 | Bangalore et al. |
| 10,803,255 B2 | 10/2020 | Dubyak et al. |
| 10,811,013 B1 | 10/2020 | Secker-Walker et al. |
| 10,818,288 B2 | 10/2020 | Garcia et al. |
| 10,831,494 B2 | 11/2020 | Grocutt et al. |
| 10,832,031 B2 | 11/2020 | Kienzle et al. |
| 10,842,968 B1 | 11/2020 | Kahn et al. |
| 10,846,618 B2 | 11/2020 | Ravi et al. |
| 10,847,142 B2 | 11/2020 | Newendorp et al. |
| 10,860,629 B1 | 12/2020 | Gangadharaiah et al. |
| 10,861,483 B2 | 12/2020 | Feinauer et al. |
| 10,877,637 B1 | 12/2020 | Antos et al. |
| 10,880,668 B1 | 12/2020 | Robinson et al. |
| 10,885,277 B2 | 1/2021 | Ravi et al. |
| 10,891,968 B2 | 1/2021 | Chung et al. |
| 10,892,996 B2 | 1/2021 | Piersol |
| 10,909,459 B2 | 2/2021 | Tsatsin et al. |
| 10,937,263 B1 | 3/2021 | Tout et al. |
| 10,937,410 B1 | 3/2021 | Rule |
| 10,942,702 B2 | 3/2021 | Piersol et al. |
| 10,942,703 B2 | 3/2021 | Martel et al. |
| 10,944,859 B2 | 3/2021 | Weinstein et al. |
| 10,957,310 B1 | 3/2021 | Mohajer et al. |
| 10,957,311 B2 | 3/2021 | Solomon et al. |
| 10,957,337 B2 | 3/2021 | Chen et al. |
| 10,970,660 B1 | 4/2021 | Harris et al. |
| 10,974,139 B2 | 4/2021 | Feder et al. |
| 10,978,056 B1 | 4/2021 | Challa et al. |
| 10,978,090 B2 | 4/2021 | Binder et al. |
| 10,983,971 B2 | 4/2021 | Carvalho et al. |
| 11,009,970 B2 | 5/2021 | Hindi et al. |
| 11,010,127 B2 | 5/2021 | Orr et al. |
| 11,017,766 B2 | 5/2021 | Chao et al. |
| 11,037,565 B2 | 6/2021 | Kudurshian et al. |
| 11,038,934 B1 | 6/2021 | Hansen et al. |
| 11,043,220 B1 | 6/2021 | Hansen et al. |
| 11,048,473 B2 | 6/2021 | Carson et al. |
| 11,061,543 B1 | 7/2021 | Blatz et al. |
| 11,072,344 B2 | 7/2021 | Provost et al. |
| 11,076,039 B2 | 7/2021 | Weinstein et al. |
| 11,080,336 B2 | 8/2021 | Van Dusen |
| 11,086,858 B1 | 8/2021 | Koukoumidis et al. |
| 11,094,311 B2 | 8/2021 | Candelore et al. |
| 11,113,598 B2 | 9/2021 | Socher et al. |
| 11,126,331 B2 | 9/2021 | Lo et al. |
| 11,132,172 B1 | 9/2021 | Naik et al. |
| 11,133,008 B2 | 9/2021 | Piernot et al. |
| 11,151,899 B2 | 10/2021 | Pitschel et al. |
| 11,169,660 B2 | 11/2021 | Gupta et al. |
| 11,181,988 B1 | 11/2021 | Bellegarda et al. |
| 11,183,193 B1 | 11/2021 | Hansen et al. |
| 11,183,205 B1 | 11/2021 | Ebenezer et al. |
| 11,200,027 B2 | 12/2021 | Aggarwal et al. |

(56) References Cited

U.S. PATENT DOCUMENTS

| | | |
|---|---|---|
| 11,204,787 B2 | 12/2021 | Radebaugh et al. |
| 11,205,192 B1 | 12/2021 | Rivera et al. |
| 11,210,477 B2 | 12/2021 | Srinivasan et al. |
| 11,211,048 B2 | 12/2021 | Kim et al. |
| 11,217,255 B2 | 1/2022 | Kim et al. |
| 11,235,248 B1 | 2/2022 | Orrino et al. |
| 11,269,426 B2 | 3/2022 | Jorasch et al. |
| 11,269,678 B2 | 3/2022 | Gruber et al. |
| 11,283,631 B2 | 3/2022 | Yan et al. |
| 11,289,082 B1 | 3/2022 | Lacy et al. |
| 11,302,310 B1 | 4/2022 | Gandhe et al. |
| 11,418,461 B1 | 8/2022 | Elfardy et al. |
| 11,487,932 B2 | 11/2022 | Kramer |
| 11,507,183 B2 | 11/2022 | Manjunath et al. |
| 11,508,380 B2 | 11/2022 | Hu et al. |
| 2003/0187659 A1 | 10/2003 | Cho et al. |
| 2004/0030560 A1 | 2/2004 | Takami et al. |
| 2006/0218244 A1 | 9/2006 | Rasmussen et al. |
| 2007/0050191 A1 | 3/2007 | Weider et al. |
| 2008/0048908 A1 | 2/2008 | Sato |
| 2008/0071391 A1 | 3/2008 | Busby et al. |
| 2008/0189110 A1 | 8/2008 | Freeman et al. |
| 2009/0043580 A1 | 2/2009 | Mozer et al. |
| 2009/0234655 A1 | 9/2009 | Kwon |
| 2010/0169098 A1 | 7/2010 | Patch |
| 2010/0332235 A1 | 12/2010 | David |
| 2011/0184730 A1 | 7/2011 | LeBeau et al. |
| 2011/0295590 A1 | 12/2011 | Lloyd et al. |
| 2012/0016678 A1 | 1/2012 | Gruber et al. |
| 2012/0035931 A1 | 2/2012 | LeBeau et al. |
| 2012/0162540 A1 | 6/2012 | Ouchi et al. |
| 2012/0232886 A1 | 9/2012 | Capuozzo et al. |
| 2012/0310642 A1 | 12/2012 | Cao et al. |
| 2013/0002716 A1 | 1/2013 | Walker et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0006957 A1 | 1/2013 | Huang et al. |
| 2013/0007240 A1 | 1/2013 | Qiu et al. |
| 2013/0007648 A1 | 1/2013 | Gamon et al. |
| 2013/0009858 A1 | 1/2013 | Lacey |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0014026 A1 | 1/2013 | Beringer et al. |
| 2013/0014143 A1 | 1/2013 | Bhatia et al. |
| 2013/0018659 A1 | 1/2013 | Chi |
| 2013/0018863 A1 | 1/2013 | Regan et al. |
| 2013/0022189 A1 | 1/2013 | Ganong et al. |
| 2013/0024277 A1 | 1/2013 | Tuchman et al. |
| 2013/0024576 A1 | 1/2013 | Dishneau et al. |
| 2013/0027875 A1 | 1/2013 | Zhu et al. |
| 2013/0028404 A1 | 1/2013 | Omalley et al. |
| 2013/0030787 A1 | 1/2013 | Cancedda et al. |
| 2013/0030789 A1 | 1/2013 | Dalce |
| 2013/0030804 A1 | 1/2013 | Zavaliagkos et al. |
| 2013/0030815 A1 | 1/2013 | Madhvanath et al. |
| 2013/0030904 A1 | 1/2013 | Aidasani et al. |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0176208 A1 | 1/2013 | Tanaka et al. |
| 2013/0033643 A1 | 2/2013 | Kim et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0035994 A1 | 2/2013 | Pattan et al. |
| 2013/0036200 A1 | 2/2013 | Roberts et al. |
| 2013/0038437 A1 | 2/2013 | Talati et al. |
| 2013/0038618 A1 | 2/2013 | Urbach |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041665 A1 | 2/2013 | Jang et al. |
| 2013/0041667 A1 | 2/2013 | Longe et al. |
| 2013/0041685 A1 | 2/2013 | Yegnanarayanan |
| 2013/0041968 A1 | 2/2013 | Cohen et al. |
| 2013/0046544 A1 | 2/2013 | Kay et al. |
| 2013/0047178 A1 | 2/2013 | Moon et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054631 A1 | 2/2013 | Govani et al. |
| 2013/0054675 A1 | 2/2013 | Jenkins et al. |
| 2013/0054706 A1 | 2/2013 | Graham et al. |
| 2013/0054945 A1 | 2/2013 | Free et al. |
| 2013/0055099 A1 | 2/2013 | Yao et al. |
| 2013/0055147 A1 | 2/2013 | Vasudev et al. |
| 2013/0055201 A1 | 2/2013 | No et al. |
| 2013/0055402 A1 | 2/2013 | Amit et al. |
| 2013/0060571 A1 | 3/2013 | Soemo et al. |
| 2013/0060807 A1 | 3/2013 | Rambhia et al. |
| 2013/0061139 A1 | 3/2013 | Mahkovec et al. |
| 2013/0063611 A1 | 3/2013 | Papakipos et al. |
| 2013/0064104 A1 | 3/2013 | Bekiares et al. |
| 2013/0066832 A1 | 3/2013 | Sheehan et al. |
| 2013/0067307 A1 | 3/2013 | Tian et al. |
| 2013/0067312 A1 | 3/2013 | Rose |
| 2013/0067421 A1 | 3/2013 | Osman et al. |
| 2013/0069769 A1 | 3/2013 | Pennington et al. |
| 2013/0073286 A1 | 3/2013 | Bastea-Forte et al. |
| 2013/0073293 A1 | 3/2013 | Jang et al. |
| 2013/0073346 A1 | 3/2013 | Chun et al. |
| 2013/0073580 A1 | 3/2013 | Mehanna et al. |
| 2013/0073676 A1 | 3/2013 | Cockcroft |
| 2013/0077772 A1 | 3/2013 | Lichorowic et al. |
| 2013/0078930 A1 | 3/2013 | Chen et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0080178 A1 | 3/2013 | Kang et al. |
| 2013/0080251 A1 | 3/2013 | Dempski |
| 2013/0080890 A1 | 3/2013 | Krishnamurthi |
| 2013/0080972 A1 | 3/2013 | Moshrefi et al. |
| 2013/0082967 A1 | 4/2013 | Hillis et al. |
| 2013/0084882 A1 | 4/2013 | Khorashadi et al. |
| 2013/0085755 A1 | 4/2013 | Bringert et al. |
| 2013/0085757 A1 | 4/2013 | Nakamura et al. |
| 2013/0085761 A1 | 4/2013 | Bringert et al. |
| 2013/0086609 A1 | 4/2013 | Levy et al. |
| 2013/0090921 A1 | 4/2013 | Liu et al. |
| 2013/0091090 A1 | 4/2013 | Spivack et al. |
| 2013/0095805 A1 | 4/2013 | LeBeau et al. |
| 2013/0096909 A1 | 4/2013 | Brun et al. |
| 2013/0096911 A1 | 4/2013 | Beaufort et al. |
| 2013/0096917 A1 | 4/2013 | Edgar et al. |
| 2013/0097566 A1 | 4/2013 | Berglund |
| 2013/0097682 A1 | 4/2013 | Zeljkovic et al. |
| 2013/0100017 A1 | 4/2013 | Papakipos et al. |
| 2013/0100268 A1 | 4/2013 | Mihailidis et al. |
| 2013/0103383 A1 | 4/2013 | Du et al. |
| 2013/0103391 A1 | 4/2013 | Millmore et al. |
| 2013/0103405 A1 | 4/2013 | Namba et al. |
| 2013/0103698 A1 | 4/2013 | Schlipf |
| 2013/0106742 A1 | 5/2013 | Lee et al. |
| 2013/0107053 A1 | 5/2013 | Ozaki |
| 2013/0109412 A1 | 5/2013 | Nguyen et al. |
| 2013/0110505 A1 | 5/2013 | Gruber et al. |
| 2013/0110511 A1 | 5/2013 | Spiegel et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0110943 A1 | 5/2013 | Menon et al. |
| 2013/0111330 A1 | 5/2013 | Staikos et al. |
| 2013/0111348 A1 | 5/2013 | Gruber et al. |
| 2013/0111365 A1 | 5/2013 | Chen et al. |
| 2013/0111487 A1 | 5/2013 | Cheyer et al. |
| 2013/0111581 A1 | 5/2013 | Griffin et al. |
| 2013/0115927 A1 | 5/2013 | Gruber et al. |

(56) References Cited

U.S. PATENT DOCUMENTS

| | | |
|---|---|---|
| 2013/0117022 A1 | 5/2013 | Chen et al. |
| 2013/0124187 A1 | 5/2013 | Qin |
| 2013/0124189 A1 | 5/2013 | Baldwin et al. |
| 2013/0124672 A1 | 5/2013 | Pan |
| 2013/0125168 A1 | 5/2013 | Agnihotri et al. |
| 2013/0130669 A1 | 5/2013 | Xiao et al. |
| 2013/0132081 A1 | 5/2013 | Ryu et al. |
| 2013/0132084 A1 | 5/2013 | Stonehocker et al. |
| 2013/0132089 A1 | 5/2013 | Fanty et al. |
| 2013/0132094 A1 | 5/2013 | Lim |
| 2013/0132871 A1 | 5/2013 | Zeng et al. |
| 2013/0138440 A1 | 5/2013 | Strope et al. |
| 2013/0141551 A1 | 6/2013 | Kim |
| 2013/0142317 A1 | 6/2013 | Reynolds |
| 2013/0142345 A1 | 6/2013 | Waldmann |
| 2013/0144594 A1 | 6/2013 | Bangalore et al. |
| 2013/0144616 A1 | 6/2013 | Bangalore |
| 2013/0151258 A1 | 6/2013 | Chandrasekar et al. |
| 2013/0151339 A1 | 6/2013 | Kim et al. |
| 2013/0152092 A1 | 6/2013 | Yadgar |
| 2013/0154811 A1 | 6/2013 | Ferren et al. |
| 2013/0155948 A1 | 6/2013 | Pinheiro et al. |
| 2013/0156198 A1 | 6/2013 | Kim et al. |
| 2013/0157629 A1 | 6/2013 | Lee et al. |
| 2013/0158977 A1 | 6/2013 | Senior |
| 2013/0159847 A1 | 6/2013 | Banke et al. |
| 2013/0159861 A1 | 6/2013 | Rottler et al. |
| 2013/0165232 A1 | 6/2013 | Nelson et al. |
| 2013/0166278 A1 | 6/2013 | James et al. |
| 2013/0166303 A1 | 6/2013 | Chang et al. |
| 2013/0166332 A1 | 6/2013 | Hammad |
| 2013/0166442 A1 | 6/2013 | Nakajima et al. |
| 2013/0167242 A1 | 6/2013 | Paliwal |
| 2013/0170738 A1 | 7/2013 | Capuozzo et al. |
| 2013/0172022 A1 | 7/2013 | Seymour et al. |
| 2013/0173258 A1 | 7/2013 | Liu et al. |
| 2013/0173268 A1 | 7/2013 | Weng et al. |
| 2013/0173513 A1 | 7/2013 | Chu et al. |
| 2013/0173610 A1 | 7/2013 | Hu et al. |
| 2013/0173614 A1 | 7/2013 | Ismalon |
| 2013/0174034 A1 | 7/2013 | Brown et al. |
| 2013/0176147 A1 | 7/2013 | Anderson et al. |
| 2013/0176244 A1 | 7/2013 | Yamamoto et al. |
| 2013/0176592 A1 | 7/2013 | Sasaki |
| 2013/0177296 A1 | 7/2013 | Geisner et al. |
| 2013/0179168 A1 | 7/2013 | Bae et al. |
| 2013/0179172 A1 | 7/2013 | Nakamura et al. |
| 2013/0179440 A1 | 7/2013 | Gordon |
| 2013/0179806 A1 | 7/2013 | Bastide et al. |
| 2013/0183942 A1 | 7/2013 | Novick et al. |
| 2013/0183944 A1 | 7/2013 | Mozer et al. |
| 2013/0185059 A1 | 7/2013 | Riccardi |
| 2013/0185066 A1 | 7/2013 | Tzirkel-hancock et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0187857 A1 | 7/2013 | Griffin et al. |
| 2013/0190021 A1 | 7/2013 | Vieri et al. |
| 2013/0191117 A1 | 7/2013 | Atti et al. |
| 2013/0191408 A1 | 7/2013 | Volkert |
| 2013/0197911 A1 | 8/2013 | Wei et al. |
| 2013/0197914 A1 | 8/2013 | Yelvington et al. |
| 2013/0198159 A1 | 8/2013 | Hendry |
| 2013/0198841 A1 | 8/2013 | Poulson |
| 2013/0204813 A1 | 8/2013 | Master et al. |
| 2013/0204897 A1 | 8/2013 | McDougall |
| 2013/0204967 A1 | 8/2013 | Seo et al. |
| 2013/0207898 A1 | 8/2013 | Sullivan et al. |
| 2013/0210410 A1 | 8/2013 | Xu |
| 2013/0210492 A1 | 8/2013 | You et al. |
| 2013/0212501 A1 | 8/2013 | Anderson et al. |
| 2013/0218553 A1 | 8/2013 | Fujii et al. |
| 2013/0218560 A1 | 8/2013 | Hsiao et al. |
| 2013/0218574 A1 | 8/2013 | Falcon et al. |
| 2013/0218899 A1 | 8/2013 | Raghavan et al. |
| 2013/0219333 A1 | 8/2013 | Palwe et al. |
| 2013/0222249 A1 | 8/2013 | Pasquero et al. |
| 2013/0223279 A1 | 8/2013 | Tinnakornsrisuphap et al. |
| 2013/0225128 A1 | 8/2013 | Gomar |
| 2013/0226580 A1 | 8/2013 | Witt-Ehsani |
| 2013/0226935 A1 | 8/2013 | Bai et al. |
| 2013/0226996 A1 | 8/2013 | Itagaki et al. |
| 2013/0231917 A1 | 9/2013 | Naik |
| 2013/0234947 A1 | 9/2013 | Kristensson et al. |
| 2013/0235987 A1 | 9/2013 | Arroniz-Escobar |
| 2013/0238312 A1 | 9/2013 | Waibel |
| 2013/0238326 A1 | 9/2013 | Kim et al. |
| 2013/0238334 A1 | 9/2013 | Ma et al. |
| 2013/0238540 A1 | 9/2013 | O'donoghue et al. |
| 2013/0238647 A1 | 9/2013 | Thompson |
| 2013/0238729 A1 | 9/2013 | Holzman et al. |
| 2013/0244615 A1 | 9/2013 | Miller |
| 2013/0244633 A1 | 9/2013 | Jacobs et al. |
| 2013/0246048 A1 | 9/2013 | Nagase et al. |
| 2013/0246050 A1 | 9/2013 | Yu et al. |
| 2013/0246329 A1 | 9/2013 | Pasquero et al. |
| 2013/0246920 A1 | 9/2013 | Fields et al. |
| 2013/0247055 A1 | 9/2013 | Berner et al. |
| 2013/0253911 A1 | 9/2013 | Petri et al. |
| 2013/0253912 A1 | 9/2013 | Medlock et al. |
| 2013/0260739 A1 | 10/2013 | Saino |
| 2013/0262168 A1 | 10/2013 | Makanawala et al. |
| 2013/0268263 A1 | 10/2013 | Park et al. |
| 2013/0268956 A1 | 10/2013 | Recco |
| 2013/0275117 A1 | 10/2013 | Winer |
| 2013/0275136 A1 | 10/2013 | Czahor |
| 2013/0275138 A1 | 10/2013 | Gruber et al. |
| 2013/0275164 A1 | 10/2013 | Gruber et al. |
| 2013/0275199 A1 | 10/2013 | Proctor, Jr. et al. |
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0279724 A1 | 10/2013 | Stafford et al. |
| 2013/0282709 A1 | 10/2013 | Zhu et al. |
| 2013/0283168 A1 | 10/2013 | Brown et al. |
| 2013/0283199 A1 | 10/2013 | Selig et al. |
| 2013/0283283 A1 | 10/2013 | Wang et al. |
| 2013/0285913 A1 | 10/2013 | Griffin et al. |
| 2013/0288722 A1 | 10/2013 | Ramanujam et al. |
| 2013/0289991 A1 | 10/2013 | Eshwar et al. |
| 2013/0289993 A1 | 10/2013 | Rao |
| 2013/0289994 A1 | 10/2013 | Newman et al. |
| 2013/0290001 A1 | 10/2013 | Yun et al. |
| 2013/0290222 A1 | 10/2013 | Gordo et al. |
| 2013/0290905 A1 | 10/2013 | Luvogt et al. |
| 2013/0291015 A1 | 10/2013 | Pan |
| 2013/0297078 A1 | 11/2013 | Kolavennu |
| 2013/0297198 A1 | 11/2013 | Velde et al. |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0298139 A1 | 11/2013 | Resnick et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0304476 A1 | 11/2013 | Kim et al. |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0305119 A1 | 11/2013 | Kern et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311179 A1 | 11/2013 | Wagner |
| 2013/0311184 A1 | 11/2013 | Badavne et al. |
| 2013/0311487 A1 | 11/2013 | Moore et al. |
| 2013/0311997 A1 | 11/2013 | Gruber et al. |
| 2013/0315038 A1 | 11/2013 | Ferren et al. |
| 2013/0316679 A1 | 11/2013 | Miller et al. |
| 2013/0316746 A1 | 11/2013 | Miller et al. |
| 2013/0317921 A1 | 11/2013 | Havas |
| 2013/0318478 A1 | 11/2013 | Ogura |
| 2013/0321267 A1 | 12/2013 | Bhatti et al. |

(56) References Cited

U.S. PATENT DOCUMENTS

| | | |
|---|---|---|
| 2013/0322634 A1 | 12/2013 | Bennett et al. |
| 2013/0322665 A1 | 12/2013 | Bennett et al. |
| 2013/0325340 A1 | 12/2013 | Forstall et al. |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325460 A1 | 12/2013 | Kim et al. |
| 2013/0325473 A1 | 12/2013 | Larcher et al. |
| 2013/0325480 A1 | 12/2013 | Lee et al. |
| 2013/0325481 A1 | 12/2013 | Van Os et al. |
| 2013/0325484 A1 | 12/2013 | Chakladar et al. |
| 2013/0325844 A1 | 12/2013 | Plaisant |
| 2013/0325967 A1 | 12/2013 | Parks et al. |
| 2013/0325970 A1 | 12/2013 | Roberts et al. |
| 2013/0325979 A1 | 12/2013 | Mansfield et al. |
| 2013/0326576 A1 | 12/2013 | Zhang et al. |
| 2013/0328809 A1 | 12/2013 | Smith |
| 2013/0329023 A1 | 12/2013 | Suplee, III et al. |
| 2013/0331127 A1 | 12/2013 | Sabatelli et al. |
| 2013/0332113 A1 | 12/2013 | Piemonte et al. |
| 2013/0332159 A1 | 12/2013 | Federighi et al. |
| 2013/0332162 A1 | 12/2013 | Keen |
| 2013/0332164 A1 | 12/2013 | Nalk |
| 2013/0332168 A1 | 12/2013 | Kim et al. |
| 2013/0332172 A1 | 12/2013 | Prakash et al. |
| 2013/0332400 A1 | 12/2013 | González |
| 2013/0332538 A1 | 12/2013 | Clark et al. |
| 2013/0332721 A1 | 12/2013 | Chaudhri et al. |
| 2013/0332886 A1 | 12/2013 | Cranfill et al. |
| 2013/0337771 A1 | 12/2013 | Klein et al. |
| 2013/0339028 A1 | 12/2013 | Rosner et al. |
| 2013/0339256 A1 | 12/2013 | Shroff |
| 2013/0339454 A1 | 12/2013 | Walker et al. |
| 2013/0339991 A1 | 12/2013 | Ricci |
| 2013/0342487 A1 | 12/2013 | Jeon |
| 2013/0342672 A1 | 12/2013 | Gray et al. |
| 2013/0343584 A1 | 12/2013 | Bennett et al. |
| 2013/0343721 A1 | 12/2013 | Abecassis |
| 2013/0346016 A1 | 12/2013 | Suzuki et al. |
| 2013/0346065 A1 | 12/2013 | Davidson et al. |
| 2013/0346068 A1 | 12/2013 | Solem et al. |
| 2013/0346347 A1 | 12/2013 | Patterson et al. |
| 2013/0346488 A1 | 12/2013 | Lunt et al. |
| 2013/0347018 A1 | 12/2013 | Limp et al. |
| 2013/0347029 A1 | 12/2013 | Tang et al. |
| 2013/0347102 A1 | 12/2013 | Shi |
| 2013/0347117 A1 | 12/2013 | Parks et al. |
| 2014/0001255 A1 | 1/2014 | Anthoine |
| 2014/0002338 A1 | 1/2014 | Raffa et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006028 A1 | 1/2014 | Hu |
| 2014/0006030 A1 | 1/2014 | Fleizach et al. |
| 2014/0006153 A1 | 1/2014 | Thangam et al. |
| 2014/0006191 A1 | 1/2014 | Shankar et al. |
| 2014/0006483 A1 | 1/2014 | Garmark et al. |
| 2014/0006496 A1 | 1/2014 | Dearman et al. |
| 2014/0006562 A1 | 1/2014 | Handa et al. |
| 2014/0006947 A1 | 1/2014 | Garmark et al. |
| 2014/0006951 A1 | 1/2014 | Hunter |
| 2014/0006955 A1 | 1/2014 | Greenzeiger et al. |
| 2014/0008163 A1 | 1/2014 | Mikonaho et al. |
| 2014/0012574 A1 | 1/2014 | Pasupalak et al. |
| 2014/0012575 A1 | 1/2014 | Ganong et al. |
| 2014/0012580 A1 | 1/2014 | Ganong, III et al. |
| 2014/0012586 A1 | 1/2014 | Rubin et al. |
| 2014/0012587 A1 | 1/2014 | Park |
| 2014/0013336 A1 | 1/2014 | Yang |
| 2014/0019116 A1 | 1/2014 | Lundberg et al. |
| 2014/0019133 A1 | 1/2014 | Bao et al. |
| 2014/0019135 A1 | 1/2014 | Talwar et al. |
| 2014/0019460 A1 | 1/2014 | Sambrani et al. |
| 2014/0019873 A1 | 1/2014 | Gupta et al. |
| 2014/0026037 A1 | 1/2014 | Garb et al. |
| 2014/0028029 A1 | 1/2014 | Jochman |
| 2014/0028477 A1 | 1/2014 | Michalske |
| 2014/0028603 A1 | 1/2014 | Xie et al. |
| 2014/0028735 A1 | 1/2014 | Williams et al. |
| 2014/0032453 A1 | 1/2014 | Eustice et al. |
| 2014/0032678 A1 | 1/2014 | Koukoumidis et al. |
| 2014/0033071 A1 | 1/2014 | Gruber et al. |
| 2014/0035823 A1 | 2/2014 | Khoe et al. |
| 2014/0037075 A1 | 2/2014 | Bouzid et al. |
| 2014/0039888 A1 | 2/2014 | Taubman et al. |
| 2014/0039893 A1 | 2/2014 | Weiner et al. |
| 2014/0039894 A1 | 2/2014 | Shostak |
| 2014/0040228 A1 | 2/2014 | Kritt et al. |
| 2014/0040274 A1 | 2/2014 | Aravamudan et al. |
| 2014/0040748 A1 | 2/2014 | Lemay et al. |
| 2014/0040754 A1 | 2/2014 | Donelli |
| 2014/0040801 A1 | 2/2014 | Patel et al. |
| 2014/0040905 A1 | 2/2014 | Tsunoda et al. |
| 2014/0040918 A1 | 2/2014 | Li |
| 2014/0040961 A1 | 2/2014 | Green et al. |
| 2014/0046922 A1 | 2/2014 | Crook et al. |
| 2014/0046934 A1 | 2/2014 | Zhou et al. |
| 2014/0047001 A1 | 2/2014 | Phillips et al. |
| 2014/0051399 A1 | 2/2014 | Walker |
| 2014/0052451 A1 | 2/2014 | Cheong et al. |
| 2014/0052680 A1 | 2/2014 | Nitz et al. |
| 2014/0052791 A1 | 2/2014 | Chakra et al. |
| 2014/0053082 A1 | 2/2014 | Park |
| 2014/0053101 A1 | 2/2014 | Buehler et al. |
| 2014/0053210 A1 | 2/2014 | Cheong et al. |
| 2014/0057610 A1 | 2/2014 | Olincy et al. |
| 2014/0058732 A1 | 2/2014 | Labsky et al. |
| 2014/0059030 A1 | 2/2014 | Hakkani-Tur et al. |
| 2014/0059423 A1 | 2/2014 | Gorga et al. |
| 2014/0067361 A1 | 3/2014 | Nikoulina et al. |
| 2014/0067371 A1 | 3/2014 | Liensberger |
| 2014/0067402 A1 | 3/2014 | Kim |
| 2014/0067738 A1 | 3/2014 | Kingsbury |
| 2014/0067740 A1 | 3/2014 | Solari |
| 2014/0068751 A1 | 3/2014 | Last |
| 2014/0071241 A1 | 3/2014 | Yang et al. |
| 2014/0074454 A1 | 3/2014 | Brown et al. |
| 2014/0074466 A1 | 3/2014 | Sharifi et al. |
| 2014/0074470 A1 | 3/2014 | Jansche et al. |
| 2014/0074472 A1 | 3/2014 | Lin et al. |
| 2014/0074482 A1 | 3/2014 | Ohno |
| 2014/0074483 A1 | 3/2014 | Van Os |
| 2014/0074589 A1 | 3/2014 | Nielsen et al. |
| 2014/0074815 A1 | 3/2014 | Plimton |
| 2014/0074846 A1 | 3/2014 | Moss et al. |
| 2014/0075453 A1 | 3/2014 | Bellessort et al. |
| 2014/0078065 A1 | 3/2014 | Akkok |
| 2014/0079195 A1 | 3/2014 | Srivastava et al. |
| 2014/0080410 A1 | 3/2014 | Jung et al. |
| 2014/0080428 A1 | 3/2014 | Rhoads et al. |
| 2014/0081619 A1 | 3/2014 | Solntseva et al. |
| 2014/0081633 A1 | 3/2014 | Badaskar |
| 2014/0081635 A1 | 3/2014 | Yanagihara |
| 2014/0081829 A1 | 3/2014 | Milne |
| 2014/0081941 A1 | 3/2014 | Bai et al. |
| 2014/0082500 A1 | 3/2014 | Wilensky et al. |
| 2014/0082501 A1 | 3/2014 | Bae et al. |
| 2014/0082545 A1 | 3/2014 | Zhai et al. |
| 2014/0082715 A1 | 3/2014 | Grajek et al. |
| 2014/0086458 A1 | 3/2014 | Rogers |
| 2014/0087711 A1 | 3/2014 | Geyer et al. |
| 2014/0088952 A1 | 3/2014 | Fife et al. |
| 2014/0088961 A1 | 3/2014 | Woodward et al. |
| 2014/0088964 A1 | 3/2014 | Bellegarda |
| 2014/0088970 A1 | 3/2014 | Kang |
| 2014/0088989 A1 | 3/2014 | Krishnapuram et al. |
| 2014/0092007 A1 | 4/2014 | Kim et al. |
| 2014/0095171 A1 | 4/2014 | Lynch et al. |
| 2014/0095172 A1 | 4/2014 | Cabaco et al. |
| 2014/0095173 A1 | 4/2014 | Lynch et al. |
| 2014/0095432 A1 | 4/2014 | Trumbull et al. |
| 2014/0095601 A1 | 4/2014 | Abuelsaad et al. |
| 2014/0095965 A1 | 4/2014 | Li |

(56) References Cited

U.S. PATENT DOCUMENTS

| | | |
|---|---|---|
| 2014/0096077 A1 | 4/2014 | Jacob et al. |
| 2014/0096209 A1 | 4/2014 | Saraf et al. |
| 2014/0098247 A1 | 4/2014 | Rao et al. |
| 2014/0100847 A1 | 4/2014 | Ishii et al. |
| 2014/0101127 A1 | 4/2014 | Simhon et al. |
| 2014/0104175 A1 | 4/2014 | Ouyang et al. |
| 2014/0108017 A1 | 4/2014 | Mason et al. |
| 2014/0108357 A1 | 4/2014 | Procops et al. |
| 2014/0108391 A1 | 4/2014 | Volkert |
| 2014/0108792 A1 | 4/2014 | Borzycki et al. |
| 2014/0112556 A1 | 4/2014 | Kalinli-akbacak |
| 2014/0114554 A1 | 4/2014 | Lagassey |
| 2014/0115062 A1 | 4/2014 | Liu et al. |
| 2014/0115114 A1 | 4/2014 | Garmark et al. |
| 2014/0118155 A1 | 5/2014 | Bowers et al. |
| 2014/0118624 A1 | 5/2014 | Jang et al. |
| 2014/0120961 A1 | 5/2014 | Buck |
| 2014/0122057 A1 | 5/2014 | Chelba et al. |
| 2014/0122059 A1 | 5/2014 | Patel et al. |
| 2014/0122085 A1 | 5/2014 | Piety et al. |
| 2014/0122086 A1 | 5/2014 | Kapur et al. |
| 2014/0122136 A1 | 5/2014 | Jayanthi |
| 2014/0122153 A1 | 5/2014 | Truitt |
| 2014/0122589 A1 | 5/2014 | Fyke et al. |
| 2014/0123022 A1 | 5/2014 | Lee et al. |
| 2014/0128021 A1 | 5/2014 | Walker et al. |
| 2014/0129006 A1 | 5/2014 | Chen et al. |
| 2014/0129226 A1 | 5/2014 | Lee et al. |
| 2014/0132935 A1 | 5/2014 | Kim et al. |
| 2014/0134983 A1 | 5/2014 | Jung et al. |
| 2014/0135036 A1 | 5/2014 | Bonanni et al. |
| 2014/0136013 A1 | 5/2014 | Wolverton et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0136987 A1 | 5/2014 | Rodriguez |
| 2014/0142922 A1 | 5/2014 | Liang et al. |
| 2014/0142923 A1 | 5/2014 | Jones et al. |
| 2014/0142934 A1 | 5/2014 | Kim |
| 2014/0142935 A1 | 5/2014 | Lindahl et al. |
| 2014/0142953 A1 | 5/2014 | Kim et al. |
| 2014/0143550 A1 | 5/2014 | Ganong, III et al. |
| 2014/0143721 A1 | 5/2014 | Suzuki et al. |
| 2014/0143784 A1 | 5/2014 | Mistry et al. |
| 2014/0146200 A1 | 5/2014 | Scott et al. |
| 2014/0148209 A1 | 5/2014 | Weng et al. |
| 2014/0149118 A1 | 5/2014 | Lee et al. |
| 2014/0152577 A1 | 6/2014 | Yuen et al. |
| 2014/0153709 A1 | 6/2014 | Byrd et al. |
| 2014/0155031 A1 | 6/2014 | Lee et al. |
| 2014/0156262 A1 | 6/2014 | Yuen et al. |
| 2014/0156268 A1 | 6/2014 | Arizmendi et al. |
| 2014/0156269 A1 | 6/2014 | Lee et al. |
| 2014/0156279 A1 | 6/2014 | Okamoto et al. |
| 2014/0156564 A1 | 6/2014 | Knight et al. |
| 2014/0157319 A1 | 6/2014 | Kimura et al. |
| 2014/0157422 A1 | 6/2014 | Livshits et al. |
| 2014/0160157 A1 | 6/2014 | Poulos et al. |
| 2014/0163751 A1 | 6/2014 | Davis et al. |
| 2014/0163951 A1 | 6/2014 | Nikoulina et al. |
| 2014/0163953 A1 | 6/2014 | Parikh |
| 2014/0163954 A1 | 6/2014 | Joshi et al. |
| 2014/0163962 A1 | 6/2014 | Castelli et al. |
| 2014/0163976 A1 | 6/2014 | Park et al. |
| 2014/0163977 A1 | 6/2014 | Hoffmeister et al. |
| 2014/0163978 A1 | 6/2014 | Basye et al. |
| 2014/0163981 A1 | 6/2014 | Cook et al. |
| 2014/0163995 A1 | 6/2014 | Burns et al. |
| 2014/0164305 A1 | 6/2014 | Lynch et al. |
| 2014/0164312 A1 | 6/2014 | Lynch et al. |
| 2014/0164476 A1 | 6/2014 | Thomson |
| 2014/0164508 A1 | 6/2014 | Lynch et al. |
| 2014/0164532 A1 | 6/2014 | Lynch et al. |
| 2014/0164533 A1 | 6/2014 | Lynch et al. |
| 2014/0164953 A1 | 6/2014 | Lynch et al. |
| 2014/0165006 A1 | 6/2014 | Chaudhri et al. |
| 2014/0169795 A1 | 6/2014 | Clough |
| 2014/0171064 A1 | 6/2014 | Das |
| 2014/0172412 A1 | 6/2014 | Viegas et al. |
| 2014/0172878 A1 | 6/2014 | Clark et al. |
| 2014/0173445 A1 | 6/2014 | Grassiotto |
| 2014/0173460 A1 | 6/2014 | Kim |
| 2014/0176814 A1 | 6/2014 | Ahn |
| 2014/0179295 A1 | 6/2014 | Luebbers et al. |
| 2014/0180499 A1 | 6/2014 | Cooper et al. |
| 2014/0180689 A1 | 6/2014 | Kim |
| 2014/0180697 A1 | 6/2014 | Torok et al. |
| 2014/0181123 A1 | 6/2014 | Blaise et al. |
| 2014/0181703 A1 | 6/2014 | Sullivan et al. |
| 2014/0181715 A1 | 6/2014 | Axelrod et al. |
| 2014/0181741 A1 | 6/2014 | Apacible et al. |
| 2014/0181865 A1 | 6/2014 | Koganei |
| 2014/0188335 A1 | 7/2014 | Madhok et al. |
| 2014/0188460 A1 | 7/2014 | Ouyang et al. |
| 2014/0188477 A1 | 7/2014 | Zhang |
| 2014/0188478 A1 | 7/2014 | Zhang |
| 2014/0188485 A1 | 7/2014 | Kim et al. |
| 2014/0188835 A1 | 7/2014 | Zhang et al. |
| 2014/0195226 A1 | 7/2014 | Yun et al. |
| 2014/0195230 A1 | 7/2014 | Han et al. |
| 2014/0195233 A1 | 7/2014 | Bapat et al. |
| 2014/0195244 A1 | 7/2014 | Cha et al. |
| 2014/0195251 A1 | 7/2014 | Zeinstra et al. |
| 2014/0195252 A1 | 7/2014 | Gruber et al. |
| 2014/0198048 A1 | 7/2014 | Unruh et al. |
| 2014/0200891 A1 | 7/2014 | Larcheveque et al. |
| 2014/0201655 A1 | 7/2014 | Mahaffey et al. |
| 2014/0203939 A1 | 7/2014 | Harrington et al. |
| 2014/0205076 A1 | 7/2014 | Kumar et al. |
| 2014/0207439 A1 | 7/2014 | Venkatapathy et al. |
| 2014/0207446 A1 | 7/2014 | Klein et al. |
| 2014/0207447 A1 | 7/2014 | Jiang et al. |
| 2014/0207466 A1 | 7/2014 | Smadi |
| 2014/0207468 A1 | 7/2014 | Bartnik |
| 2014/0207582 A1 | 7/2014 | Flinn et al. |
| 2014/0211944 A1 | 7/2014 | Hayward et al. |
| 2014/0214429 A1 | 7/2014 | Pantel |
| 2014/0214537 A1 | 7/2014 | Yoo et al. |
| 2014/0215367 A1 | 7/2014 | Kim et al. |
| 2014/0215513 A1 | 7/2014 | Ramer et al. |
| 2014/0218372 A1 | 8/2014 | Missig et al. |
| 2014/0222422 A1 | 8/2014 | Sarikaya et al. |
| 2014/0222435 A1 | 8/2014 | Li et al. |
| 2014/0222436 A1 | 8/2014 | Binder et al. |
| 2014/0222678 A1 | 8/2014 | Sheets et al. |
| 2014/0222967 A1 | 8/2014 | Harrang et al. |
| 2014/0223377 A1 | 8/2014 | Shaw et al. |
| 2014/0223481 A1 | 8/2014 | Fundament |
| 2014/0226503 A1 | 8/2014 | Cooper et al. |
| 2014/0229158 A1 | 8/2014 | Zweig et al. |
| 2014/0229184 A1 | 8/2014 | Shires |
| 2014/0230055 A1 | 8/2014 | Boehl |
| 2014/0232570 A1 | 8/2014 | Skinder et al. |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0237366 A1 | 8/2014 | Poulos et al. |
| 2014/0244248 A1 | 8/2014 | Arisoy et al. |
| 2014/0244249 A1 | 8/2014 | Mohamed et al. |
| 2014/0244254 A1 | 8/2014 | Ju et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244266 A1 | 8/2014 | Brown et al. |
| 2014/0244268 A1 | 8/2014 | Abdelsamie et al. |
| 2014/0244270 A1 | 8/2014 | Han et al. |
| 2014/0244271 A1 | 8/2014 | Lindahl |
| 2014/0244712 A1 | 8/2014 | Walters et al. |
| 2014/0245140 A1 | 8/2014 | Brown et al. |
| 2014/0247383 A1 | 9/2014 | Dave et al. |
| 2014/0247926 A1 | 9/2014 | Gainsboro et al. |
| 2014/0249812 A1 | 9/2014 | Bou-Ghazale et al. |

(56) References Cited

U.S. PATENT DOCUMENTS

| | | |
|---|---|---|
| 2014/0249816 A1 | 9/2014 | Pickering et al. |
| 2014/0249817 A1 | 9/2014 | Hart et al. |
| 2014/0249820 A1 | 9/2014 | Hsu et al. |
| 2014/0249821 A1 | 9/2014 | Kennewick et al. |
| 2014/0250046 A1 | 9/2014 | Winn et al. |
| 2014/0253455 A1 | 9/2014 | Mauro et al. |
| 2014/0257809 A1 | 9/2014 | Goel et al. |
| 2014/0257815 A1 | 9/2014 | Zhao et al. |
| 2014/0257902 A1 | 9/2014 | Moore et al. |
| 2014/0258324 A1 | 9/2014 | Mauro et al. |
| 2014/0258357 A1 | 9/2014 | Singh et al. |
| 2014/0258857 A1 | 9/2014 | Dykstra-Erickson et al. |
| 2014/0258905 A1 | 9/2014 | Lee et al. |
| 2014/0267022 A1 | 9/2014 | Kim |
| 2014/0267599 A1 | 9/2014 | Drouin et al. |
| 2014/0267933 A1 | 9/2014 | Young |
| 2014/0272821 A1 | 9/2014 | Pitschel et al. |
| 2014/0273979 A1 | 9/2014 | Van Os et al. |
| 2014/0274005 A1 | 9/2014 | Luna et al. |
| 2014/0274203 A1 | 9/2014 | Ganong, III et al. |
| 2014/0274211 A1 | 9/2014 | Sejnoha et al. |
| 2014/0278051 A1 | 9/2014 | Mcgavran et al. |
| 2014/0278343 A1 | 9/2014 | Tran |
| 2014/0278349 A1 | 9/2014 | Grieves et al. |
| 2014/0278379 A1 | 9/2014 | Coccaro et al. |
| 2014/0278390 A1 | 9/2014 | Kingsbury et al. |
| 2014/0278391 A1 | 9/2014 | Braho et al. |
| 2014/0278394 A1 | 9/2014 | Bastyr et al. |
| 2014/0278406 A1 | 9/2014 | Tsumura et al. |
| 2014/0278413 A1 | 9/2014 | Pitschel et al. |
| 2014/0278426 A1 | 9/2014 | Jost et al. |
| 2014/0278429 A1 | 9/2014 | Ganong, III |
| 2014/0278435 A1 | 9/2014 | Ganong, III et al. |
| 2014/0278436 A1 | 9/2014 | Khanna et al. |
| 2014/0278438 A1 | 9/2014 | Hart et al. |
| 2014/0278443 A1 | 9/2014 | Gunn et al. |
| 2014/0278444 A1 | 9/2014 | Larson et al. |
| 2014/0278513 A1 | 9/2014 | Prakash et al. |
| 2014/0279622 A1 | 9/2014 | Lamoureux et al. |
| 2014/0279739 A1 | 9/2014 | Elkington et al. |
| 2014/0279787 A1 | 9/2014 | Cheng et al. |
| 2014/0280072 A1 | 9/2014 | Coleman |
| 2014/0280107 A1 | 9/2014 | Heymans et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0280450 A1 | 9/2014 | Luna |
| 2014/0280757 A1 | 9/2014 | Tran |
| 2014/0281944 A1 | 9/2014 | Winer |
| 2014/0281983 A1 | 9/2014 | Xian et al. |
| 2014/0281997 A1 | 9/2014 | Fleizach et al. |
| 2014/0282003 A1 | 9/2014 | Gruber et al. |
| 2014/0282007 A1 | 9/2014 | Fleizach |
| 2014/0282016 A1 | 9/2014 | Hosier, Jr. |
| 2014/0282045 A1 | 9/2014 | Ayanam et al. |
| 2014/0282178 A1 | 9/2014 | Borzello et al. |
| 2014/0282201 A1 | 9/2014 | Pasquero et al. |
| 2014/0282203 A1 | 9/2014 | Pasquero et al. |
| 2014/0282559 A1 | 9/2014 | Verduzco et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0289508 A1 | 9/2014 | Wang |
| 2014/0297267 A1 | 10/2014 | Spencer et al. |
| 2014/0297281 A1 | 10/2014 | Togawa et al. |
| 2014/0297284 A1 | 10/2014 | Gruber et al. |
| 2014/0297288 A1 | 10/2014 | Yu et al. |
| 2014/0298395 A1 | 10/2014 | Yang et al. |
| 2014/0304086 A1 | 10/2014 | Dasdan et al. |
| 2014/0304605 A1 | 10/2014 | Ohmura et al. |
| 2014/0309990 A1 | 10/2014 | Gandrabur et al. |
| 2014/0309996 A1 | 10/2014 | Zhang |
| 2014/0310001 A1 | 10/2014 | Kalns et al. |
| 2014/0310002 A1 | 10/2014 | Nitz et al. |
| 2014/0310348 A1 | 10/2014 | Keskitalo et al. |
| 2014/0310365 A1 | 10/2014 | Sample et al. |
| 2014/0310595 A1 | 10/2014 | Acharya et al. |
| 2014/0313007 A1 | 10/2014 | Harding |
| 2014/0315492 A1 | 10/2014 | Woods |
| 2014/0316585 A1 | 10/2014 | Boesveld et al. |
| 2014/0317030 A1 | 10/2014 | Shen et al. |
| 2014/0317502 A1 | 10/2014 | Brown et al. |
| 2014/0324429 A1 | 10/2014 | Weilhammer et al. |
| 2014/0324884 A1 | 10/2014 | Lindahl et al. |
| 2014/0330560 A1 | 11/2014 | Venkatesha et al. |
| 2014/0330569 A1 | 11/2014 | Kolavennu et al. |
| 2014/0330951 A1 | 11/2014 | Sukoff et al. |
| 2014/0335823 A1 | 11/2014 | Heredia et al. |
| 2014/0337037 A1 | 11/2014 | Chi |
| 2014/0337048 A1 | 11/2014 | Brown et al. |
| 2014/0337266 A1 | 11/2014 | Wolverton et al. |
| 2014/0337370 A1 | 11/2014 | Aravamudan et al. |
| 2014/0337371 A1 | 11/2014 | Li |
| 2014/0337438 A1 | 11/2014 | Govande et al. |
| 2014/0337621 A1 | 11/2014 | Nakhimov |
| 2014/0337751 A1 | 11/2014 | Lim et al. |
| 2014/0337814 A1 | 11/2014 | Kalns et al. |
| 2014/0341217 A1 | 11/2014 | Eisner et al. |
| 2014/0342762 A1 | 11/2014 | Hajdu et al. |
| 2014/0343834 A1 | 11/2014 | Demerchant et al. |
| 2014/0343943 A1 | 11/2014 | Al-telmissani |
| 2014/0343946 A1 | 11/2014 | Torok et al. |
| 2014/0344205 A1 | 11/2014 | Luna et al. |
| 2014/0344627 A1 | 11/2014 | Schaub et al. |
| 2014/0344687 A1 | 11/2014 | Durham et al. |
| 2014/0347181 A1 | 11/2014 | Luna et al. |
| 2014/0350847 A1 | 11/2014 | Ichinokawa |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |
| 2014/0358521 A1 | 12/2014 | Mikutel et al. |
| 2014/0358523 A1 | 12/2014 | Sheth et al. |
| 2014/0358549 A1 | 12/2014 | O'connor et al. |
| 2014/0359456 A1 | 12/2014 | Thiele et al. |
| 2014/0359637 A1 | 12/2014 | Yan |
| 2014/0359709 A1 | 12/2014 | Nassar et al. |
| 2014/0361973 A1 | 12/2014 | Raux et al. |
| 2014/0363074 A1 | 12/2014 | Dolfing et al. |
| 2014/0364149 A1 | 12/2014 | Marti et al. |
| 2014/0365209 A1 | 12/2014 | Evermann |
| 2014/0365214 A1 | 12/2014 | Bayley |
| 2014/0365216 A1 | 12/2014 | Gruber et al. |
| 2014/0365218 A1 | 12/2014 | Chang et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365505 A1 | 12/2014 | Clark et al. |
| 2014/0365880 A1 | 12/2014 | Bellegarda |
| 2014/0365885 A1 | 12/2014 | Carson et al. |
| 2014/0365895 A1 | 12/2014 | Magahern et al. |
| 2014/0365922 A1 | 12/2014 | Yang |
| 2014/0365945 A1 | 12/2014 | Karunamuni et al. |
| 2014/0370817 A1 | 12/2014 | Luna |
| 2014/0370841 A1 | 12/2014 | Roberts et al. |
| 2014/0372112 A1 | 12/2014 | Xue et al. |
| 2014/0372356 A1 | 12/2014 | Bilal et al. |
| 2014/0372468 A1 | 12/2014 | Collins et al. |
| 2014/0372931 A1 | 12/2014 | Zhai et al. |
| 2014/0379326 A1 | 12/2014 | Sarikaya et al. |
| 2014/0379334 A1 | 12/2014 | Fry |
| 2014/0379338 A1 | 12/2014 | Fry |
| 2014/0379341 A1 | 12/2014 | Seo et al. |
| 2014/0379798 A1 | 12/2014 | Bunner et al. |
| 2014/0380214 A1 | 12/2014 | Huang et al. |
| 2014/0380285 A1 | 12/2014 | Gabel et al. |
| 2015/0003797 A1 | 1/2015 | Schmidt |
| 2015/0004958 A1 | 1/2015 | Wang et al. |
| 2015/0005009 A1 | 1/2015 | Tomkins et al. |
| 2015/0006147 A1 | 1/2015 | Schmidt |
| 2015/0006148 A1 | 1/2015 | Goldszmit et al. |
| 2015/0006157 A1 | 1/2015 | Silva et al. |
| 2015/0006167 A1 | 1/2015 | Kato et al. |

(56) References Cited

U.S. PATENT DOCUMENTS

| | | |
|---|---|---|
| 2015/0006176 A1 | 1/2015 | Pogue et al. |
| 2015/0006178 A1 | 1/2015 | Peng et al. |
| 2015/0006184 A1 | 1/2015 | Marti et al. |
| 2015/0006199 A1 | 1/2015 | Snider et al. |
| 2015/0012271 A1 | 1/2015 | Peng et al. |
| 2015/0012862 A1 | 1/2015 | Ikeda et al. |
| 2015/0019219 A1 | 1/2015 | Tzirkel-Hancock et al. |
| 2015/0019221 A1 | 1/2015 | Lee et al. |
| 2015/0019445 A1 | 1/2015 | Glass et al. |
| 2015/0019944 A1 | 1/2015 | Kalgi |
| 2015/0019954 A1 | 1/2015 | Dalal et al. |
| 2015/0019974 A1 | 1/2015 | Doi et al. |
| 2015/0025405 A1 | 1/2015 | Vairavan et al. |
| 2015/0025890 A1 | 1/2015 | Jagatheesan et al. |
| 2015/0026620 A1 | 1/2015 | Kwon et al. |
| 2015/0027178 A1 | 1/2015 | Scalisi |
| 2015/0031416 A1 | 1/2015 | Labowicz et al. |
| 2015/0032443 A1 | 1/2015 | Karov et al. |
| 2015/0032457 A1 | 1/2015 | Koo et al. |
| 2015/0033130 A1 | 1/2015 | Scheessele |
| 2015/0033219 A1 | 1/2015 | Breiner et al. |
| 2015/0033275 A1 | 1/2015 | Natani et al. |
| 2015/0034855 A1 | 2/2015 | Shen |
| 2015/0038161 A1 | 2/2015 | Jakobson et al. |
| 2015/0039292 A1 | 2/2015 | Suleman et al. |
| 2015/0039295 A1 | 2/2015 | Soschen |
| 2015/0039299 A1 | 2/2015 | Weinstein et al. |
| 2015/0039305 A1 | 2/2015 | Huang |
| 2015/0039606 A1 | 2/2015 | Salaka et al. |
| 2015/0040012 A1 | 2/2015 | Faaborg et al. |
| 2015/0042640 A1 | 2/2015 | Algreatly |
| 2015/0045003 A1 | 2/2015 | Vora et al. |
| 2015/0045007 A1 | 2/2015 | Cash |
| 2015/0045068 A1 | 2/2015 | Soffer et al. |
| 2015/0046375 A1 | 2/2015 | Mandel et al. |
| 2015/0046434 A1 | 2/2015 | Lim et al. |
| 2015/0046537 A1 | 2/2015 | Rakib |
| 2015/0046828 A1 | 2/2015 | Desai et al. |
| 2015/0049884 A1 | 2/2015 | Ye |
| 2015/0050633 A1 | 2/2015 | Christmas et al. |
| 2015/0050923 A1 | 2/2015 | Tu et al. |
| 2015/0051754 A1 | 2/2015 | Kwon et al. |
| 2015/0051901 A1 | 2/2015 | Stonehouse et al. |
| 2015/0052128 A1 | 2/2015 | Sharifi |
| 2015/0053779 A1 | 2/2015 | Adamek et al. |
| 2015/0053781 A1 | 2/2015 | Nelson et al. |
| 2015/0055879 A1 | 2/2015 | Yang |
| 2015/0058013 A1 | 2/2015 | Pakhomov et al. |
| 2015/0058018 A1 | 2/2015 | Georges et al. |
| 2015/0058720 A1 | 2/2015 | Smadja et al. |
| 2015/0058785 A1 | 2/2015 | Ookawara |
| 2015/0065149 A1 | 3/2015 | Russell et al. |
| 2015/0065200 A1 | 3/2015 | Namgung et al. |
| 2015/0066473 A1 | 3/2015 | Jeong et al. |
| 2015/0066479 A1 | 3/2015 | Pasupalak et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0066817 A1 | 3/2015 | Slayton et al. |
| 2015/0067485 A1 | 3/2015 | Kim et al. |
| 2015/0067819 A1 | 3/2015 | Shribman et al. |
| 2015/0067822 A1 | 3/2015 | Randall |
| 2015/0071121 A1 | 3/2015 | Patil et al. |
| 2015/0073788 A1 | 3/2015 | Sak et al. |
| 2015/0073804 A1 | 3/2015 | Senior et al. |
| 2015/0074524 A1 | 3/2015 | Nicholson et al. |
| 2015/0074615 A1 | 3/2015 | Han et al. |
| 2015/0081295 A1 | 3/2015 | Yun et al. |
| 2015/0082180 A1 | 3/2015 | Ames et al. |
| 2015/0082229 A1 | 3/2015 | Ouyang et al. |
| 2015/0086174 A1 | 3/2015 | Abecassis et al. |
| 2015/0088511 A1 | 3/2015 | Bharadwaj et al. |
| 2015/0088514 A1 | 3/2015 | Typrin |
| 2015/0088518 A1 | 3/2015 | Kim et al. |
| 2015/0088522 A1 | 3/2015 | Hendrickson et al. |
| 2015/0088523 A1 | 3/2015 | Schuster |
| 2015/0088998 A1 | 3/2015 | Isensee et al. |
| 2015/0092520 A1 | 4/2015 | Robison et al. |
| 2015/0094834 A1 | 4/2015 | Vega et al. |
| 2015/0095026 A1 | 4/2015 | Bisani et al. |
| 2015/0095031 A1 | 4/2015 | Conkie et al. |
| 2015/0095159 A1 | 4/2015 | Kennewick et al. |
| 2015/0095268 A1 | 4/2015 | Greenzeiger et al. |
| 2015/0095278 A1 | 4/2015 | Flinn et al. |
| 2015/0095310 A1 | 4/2015 | Beaurepaire |
| 2015/0100144 A1 | 4/2015 | Lee et al. |
| 2015/0100313 A1 | 4/2015 | Sharma |
| 2015/0100316 A1 | 4/2015 | Williams et al. |
| 2015/0100537 A1 | 4/2015 | Grieves et al. |
| 2015/0100983 A1 | 4/2015 | Pan |
| 2015/0106061 A1 | 4/2015 | Yang et al. |
| 2015/0106085 A1 | 4/2015 | Lindahl |
| 2015/0106093 A1 | 4/2015 | Weeks et al. |
| 2015/0106737 A1 | 4/2015 | Montoy-Wilson et al. |
| 2015/0112684 A1 | 4/2015 | Scheffer |
| 2015/0113407 A1 | 4/2015 | Hoffert et al. |
| 2015/0113435 A1 | 4/2015 | Phillips |
| 2015/0113454 A1 | 4/2015 | McLaughlin |
| 2015/0120296 A1 | 4/2015 | Stern et al. |
| 2015/0120641 A1 | 4/2015 | Soon-Shiong et al. |
| 2015/0120723 A1 | 4/2015 | Deshmukh et al. |
| 2015/0121216 A1 | 4/2015 | Brown et al. |
| 2015/0121227 A1 | 4/2015 | Peng |
| 2015/0123898 A1 | 5/2015 | Kim et al. |
| 2015/0127336 A1 | 5/2015 | Lei et al. |
| 2015/0127337 A1 | 5/2015 | Heigold et al. |
| 2015/0127348 A1 | 5/2015 | Follis |
| 2015/0127350 A1 | 5/2015 | Agiomyrgiannakis |
| 2015/0128058 A1 | 5/2015 | Anajwala |
| 2015/0130716 A1 | 5/2015 | Sridharan et al. |
| 2015/0133049 A1 | 5/2015 | Lee et al. |
| 2015/0133109 A1 | 5/2015 | Freeman et al. |
| 2015/0134318 A1 | 5/2015 | Cuthbert et al. |
| 2015/0134322 A1 | 5/2015 | Cuthbert et al. |
| 2015/0134323 A1 | 5/2015 | Cuthbert et al. |
| 2015/0134334 A1 | 5/2015 | Sachidanandam et al. |
| 2015/0135085 A1 | 5/2015 | Shoham et al. |
| 2015/0135123 A1 | 5/2015 | Carr et al. |
| 2015/0140934 A1 | 5/2015 | Abdurrahman et al. |
| 2015/0140990 A1 | 5/2015 | Kim et al. |
| 2015/0141150 A1 | 5/2015 | Zha |
| 2015/0142420 A1 | 5/2015 | Sarikaya et al. |
| 2015/0142438 A1 | 5/2015 | Dai et al. |
| 2015/0142440 A1 | 5/2015 | Parkinson et al. |
| 2015/0142447 A1 | 5/2015 | Kennewick et al. |
| 2015/0142851 A1 | 5/2015 | Gupta et al. |
| 2015/0143419 A1 | 5/2015 | Bhagwat et al. |
| 2015/0148013 A1 | 5/2015 | Baldwin et al. |
| 2015/0149146 A1 | 5/2015 | Abramovitz et al. |
| 2015/0149177 A1 | 5/2015 | Kalns et al. |
| 2015/0149182 A1 | 5/2015 | Kalns et al. |
| 2015/0149354 A1 | 5/2015 | McCoy |
| 2015/0149469 A1 | 5/2015 | Xu et al. |
| 2015/0149899 A1 | 5/2015 | Bernstein et al. |
| 2015/0149964 A1 | 5/2015 | Bernstein et al. |
| 2015/0154001 A1 | 6/2015 | Knox et al. |
| 2015/0154185 A1 | 6/2015 | Waibel |
| 2015/0154976 A1 | 6/2015 | Mutagi |
| 2015/0160635 A1 | 6/2015 | Schofield et al. |
| 2015/0160855 A1 | 6/2015 | Bi |
| 2015/0161108 A1 | 6/2015 | Back |
| 2015/0161291 A1 | 6/2015 | Gur et al. |
| 2015/0161370 A1 | 6/2015 | North et al. |
| 2015/0161521 A1 | 6/2015 | Shah et al. |
| 2015/0161989 A1 | 6/2015 | Hsu et al. |
| 2015/0161997 A1 | 6/2015 | Wetsel et al. |
| 2015/0162000 A1 | 6/2015 | Di Censo et al. |
| 2015/0162001 A1 | 6/2015 | Kar et al. |
| 2015/0162006 A1 | 6/2015 | Kummer |
| 2015/0163558 A1 | 6/2015 | Wheatley |
| 2015/0169081 A1 | 6/2015 | Neels et al. |
| 2015/0169195 A1 | 6/2015 | Choi |
| 2015/0169284 A1 | 6/2015 | Quast et al. |

(56) References Cited

U.S. PATENT DOCUMENTS

| | | |
|---|---|---|
| 2015/0169336 A1 | 6/2015 | Harper et al. |
| 2015/0169696 A1 | 6/2015 | Krishnappa et al. |
| 2015/0170073 A1 | 6/2015 | Baker |
| 2015/0170664 A1 | 6/2015 | Doherty et al. |
| 2015/0172262 A1 | 6/2015 | Ortiz, Jr. et al. |
| 2015/0172463 A1 | 6/2015 | Quast et al. |
| 2015/0177945 A1 | 6/2015 | Sengupta et al. |
| 2015/0178388 A1 | 6/2015 | Winnemoeller et al. |
| 2015/0178785 A1 | 6/2015 | Salonen |
| 2015/0179168 A1 | 6/2015 | Hakkani-tur et al. |
| 2015/0179176 A1 | 6/2015 | Ryu et al. |
| 2015/0181285 A1 | 6/2015 | Zhang et al. |
| 2015/0185718 A1 | 7/2015 | Tappan et al. |
| 2015/0185964 A1 | 7/2015 | Stout |
| 2015/0185993 A1 | 7/2015 | Wheatley et al. |
| 2015/0185996 A1 | 7/2015 | Brown et al. |
| 2015/0186012 A1 | 7/2015 | Coleman et al. |
| 2015/0186110 A1 | 7/2015 | Kannan |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0186351 A1 | 7/2015 | Hicks et al. |
| 2015/0186538 A1 | 7/2015 | Yan et al. |
| 2015/0186783 A1 | 7/2015 | Byrne et al. |
| 2015/0186892 A1 | 7/2015 | Zhang et al. |
| 2015/0187355 A1 | 7/2015 | Parkinson et al. |
| 2015/0187369 A1 | 7/2015 | Dadu et al. |
| 2015/0189362 A1 | 7/2015 | Lee et al. |
| 2015/0193379 A1 | 7/2015 | Mehta |
| 2015/0193391 A1 | 7/2015 | Khvostichenko et al. |
| 2015/0193392 A1 | 7/2015 | Greenblatt et al. |
| 2015/0194152 A1 | 7/2015 | Katuri et al. |
| 2015/0194165 A1 | 7/2015 | Faaborg et al. |
| 2015/0194187 A1 | 7/2015 | Cleven et al. |
| 2015/0195379 A1 | 7/2015 | Zhang et al. |
| 2015/0195606 A1 | 7/2015 | McDevitt |
| 2015/0199077 A1 | 7/2015 | Zuger et al. |
| 2015/0199960 A1 | 7/2015 | Huo et al. |
| 2015/0199965 A1 | 7/2015 | Leak et al. |
| 2015/0199967 A1 | 7/2015 | Reddy et al. |
| 2015/0200879 A1 | 7/2015 | Wu et al. |
| 2015/0201064 A1 | 7/2015 | Bells et al. |
| 2015/0201077 A1 | 7/2015 | Konig et al. |
| 2015/0205425 A1 | 7/2015 | Kuscher et al. |
| 2015/0205568 A1 | 7/2015 | Matsuoka |
| 2015/0205632 A1 | 7/2015 | Gaster |
| 2015/0205858 A1 | 7/2015 | Xie et al. |
| 2015/0206529 A1 | 7/2015 | Kwon et al. |
| 2015/0208226 A1 | 7/2015 | Kuusilinna et al. |
| 2015/0212791 A1 | 7/2015 | Kumar et al. |
| 2015/0213140 A1 | 7/2015 | Volkert |
| 2015/0213796 A1 | 7/2015 | Waltermann et al. |
| 2015/0215258 A1 | 7/2015 | Nowakowski et al. |
| 2015/0215350 A1 | 7/2015 | Slayton et al. |
| 2015/0217870 A1 | 8/2015 | Mccullough et al. |
| 2015/0220264 A1 | 8/2015 | Lewis et al. |
| 2015/0220507 A1 | 8/2015 | Mohajer et al. |
| 2015/0220715 A1 | 8/2015 | Kim et al. |
| 2015/0220972 A1 | 8/2015 | Subramanya et al. |
| 2015/0221302 A1 | 8/2015 | Han et al. |
| 2015/0221304 A1 | 8/2015 | Stewart |
| 2015/0221307 A1 | 8/2015 | Shah et al. |
| 2015/0222586 A1 | 8/2015 | Ebersman et al. |
| 2015/0224848 A1 | 8/2015 | Eisenhour |
| 2015/0227505 A1 | 8/2015 | Morimoto |
| 2015/0227633 A1 | 8/2015 | Shapira |
| 2015/0228274 A1 | 8/2015 | Leppanen et al. |
| 2015/0228275 A1 | 8/2015 | Watanabe et al. |
| 2015/0228281 A1 | 8/2015 | Raniere |
| 2015/0228282 A1 | 8/2015 | Evrard |
| 2015/0228283 A1 | 8/2015 | Ehsani et al. |
| 2015/0228292 A1 | 8/2015 | Goldstein et al. |
| 2015/0230095 A1 | 8/2015 | Smith et al. |
| 2015/0234556 A1 | 8/2015 | Shaofeng et al. |
| 2015/0234636 A1 | 8/2015 | Barnes, Jr. |
| 2015/0234800 A1 | 8/2015 | Patrick et al. |
| 2015/0235434 A1 | 8/2015 | Miller et al. |
| 2015/0235540 A1 | 8/2015 | Verna et al. |
| 2015/0237301 A1 | 8/2015 | Shi et al. |
| 2015/0242091 A1 | 8/2015 | Lu et al. |
| 2015/0242385 A1 | 8/2015 | Bao et al. |
| 2015/0243278 A1 | 8/2015 | Kibre et al. |
| 2015/0243279 A1 | 8/2015 | Morse et al. |
| 2015/0243283 A1 | 8/2015 | Halash et al. |
| 2015/0244665 A1 | 8/2015 | Choi et al. |
| 2015/0245154 A1 | 8/2015 | Dadu et al. |
| 2015/0248494 A1 | 9/2015 | Mital |
| 2015/0248651 A1 | 9/2015 | Akutagawa et al. |
| 2015/0248886 A1 | 9/2015 | Sarikaya et al. |
| 2015/0249715 A1 | 9/2015 | Helvik et al. |
| 2015/0253146 A1 | 9/2015 | Annapureddy et al. |
| 2015/0253885 A1 | 9/2015 | Kagan et al. |
| 2015/0254057 A1 | 9/2015 | Klein et al. |
| 2015/0254058 A1 | 9/2015 | Klein et al. |
| 2015/0254333 A1 | 9/2015 | Fife et al. |
| 2015/0255068 A1 | 9/2015 | Kim et al. |
| 2015/0255071 A1 | 9/2015 | Chiba |
| 2015/0256873 A1 | 9/2015 | Klein et al. |
| 2015/0261298 A1 | 9/2015 | Li |
| 2015/0261496 A1 | 9/2015 | Faaborg et al. |
| 2015/0261850 A1 | 9/2015 | Mittal |
| 2015/0261944 A1 | 9/2015 | Hosom et al. |
| 2015/0262443 A1 | 9/2015 | Chong |
| 2015/0262573 A1 | 9/2015 | Brooks et al. |
| 2015/0262583 A1 | 9/2015 | Kanda et al. |
| 2015/0269139 A1 | 9/2015 | McAteer et al. |
| 2015/0269420 A1 | 9/2015 | Kim et al. |
| 2015/0269617 A1 | 9/2015 | Mikurak |
| 2015/0269677 A1 | 9/2015 | Milne |
| 2015/0269943 A1 | 9/2015 | VanBlon et al. |
| 2015/0277574 A1 | 10/2015 | Jain et al. |
| 2015/0278199 A1 | 10/2015 | Hazen et al. |
| 2015/0278348 A1 | 10/2015 | Paruchuri et al. |
| 2015/0278370 A1 | 10/2015 | Stratvert et al. |
| 2015/0278737 A1 | 10/2015 | Chen Huebscher et al. |
| 2015/0279354 A1 | 10/2015 | Gruenstein et al. |
| 2015/0279358 A1 | 10/2015 | Kingsbury et al. |
| 2015/0279360 A1 | 10/2015 | Mengibar et al. |
| 2015/0279366 A1 | 10/2015 | Krestnikov et al. |
| 2015/0281380 A1 | 10/2015 | Wang et al. |
| 2015/0281401 A1 | 10/2015 | Le et al. |
| 2015/0286627 A1 | 10/2015 | Chang et al. |
| 2015/0286716 A1 | 10/2015 | Snibbe et al. |
| 2015/0286937 A1 | 10/2015 | Hildebrand |
| 2015/0287401 A1 | 10/2015 | Lee et al. |
| 2015/0287408 A1 | 10/2015 | Svendsen et al. |
| 2015/0287409 A1 | 10/2015 | Jang |
| 2015/0287411 A1 | 10/2015 | Kojima et al. |
| 2015/0288629 A1 | 10/2015 | Choi et al. |
| 2015/0293602 A1 | 10/2015 | Kay et al. |
| 2015/0294086 A1 | 10/2015 | Kare et al. |
| 2015/0294377 A1 | 10/2015 | Chow |
| 2015/0294516 A1 | 10/2015 | Chiang |
| 2015/0294670 A1 | 10/2015 | Roblek et al. |
| 2015/0295915 A1 | 10/2015 | Xiu |
| 2015/0296065 A1 | 10/2015 | Narita et al. |
| 2015/0301796 A1 | 10/2015 | Visser et al. |
| 2015/0302316 A1 | 10/2015 | Buryak et al. |
| 2015/0302855 A1 | 10/2015 | Kim et al. |
| 2015/0302856 A1 | 10/2015 | Kim et al. |
| 2015/0302857 A1 | 10/2015 | Yamada |
| 2015/0302870 A1 | 10/2015 | Burke et al. |
| 2015/0308470 A1 | 10/2015 | Graham et al. |
| 2015/0309691 A1 | 10/2015 | Seo et al. |
| 2015/0309997 A1 | 10/2015 | Lee et al. |
| 2015/0310114 A1 | 10/2015 | Ryger et al. |
| 2015/0310852 A1 | 10/2015 | Spizzo et al. |
| 2015/0310858 A1 | 10/2015 | Li et al. |
| 2015/0310862 A1 | 10/2015 | Dauphin et al. |
| 2015/0310879 A1 | 10/2015 | Buchanan et al. |
| 2015/0310888 A1 | 10/2015 | Chen |
| 2015/0312182 A1 | 10/2015 | Langholz |
| 2015/0312409 A1 | 10/2015 | Czarnecki et al. |
| 2015/0314454 A1 | 11/2015 | Breazeal et al. |

(56) References Cited

U.S. PATENT DOCUMENTS

| | | |
|---|---|---|
| 2015/0317069 A1 | 11/2015 | Clements et al. |
| 2015/0317310 A1 | 11/2015 | Eiche et al. |
| 2015/0319264 A1 | 11/2015 | Allen et al. |
| 2015/0319411 A1 | 11/2015 | Kasmir et al. |
| 2015/0324041 A1 | 11/2015 | Varley et al. |
| 2015/0324334 A1 | 11/2015 | Lee et al. |
| 2015/0324362 A1 | 11/2015 | Glass et al. |
| 2015/0331664 A1 | 11/2015 | Osawa et al. |
| 2015/0331711 A1 | 11/2015 | Huang et al. |
| 2015/0332667 A1 | 11/2015 | Mason |
| 2015/0334346 A1 | 11/2015 | Cheatham, III et al. |
| 2015/0339049 A1 | 11/2015 | Kasemset et al. |
| 2015/0339391 A1 | 11/2015 | Kang et al. |
| 2015/0340033 A1 | 11/2015 | Di Fabbrizio et al. |
| 2015/0340034 A1 | 11/2015 | Schalkwyk et al. |
| 2015/0340040 A1 | 11/2015 | Mun et al. |
| 2015/0340042 A1 | 11/2015 | Sejnoha et al. |
| 2015/0341717 A1 | 11/2015 | Song et al. |
| 2015/0346845 A1 | 12/2015 | Di Censo et al. |
| 2015/0347086 A1 | 12/2015 | Liedholm et al. |
| 2015/0347381 A1 | 12/2015 | Bellegarda |
| 2015/0347382 A1 | 12/2015 | Dolfing et al. |
| 2015/0347383 A1 | 12/2015 | Willmore et al. |
| 2015/0347385 A1 | 12/2015 | Flor et al. |
| 2015/0347393 A1 | 12/2015 | Futrell et al. |
| 2015/0347552 A1 | 12/2015 | Habouzit et al. |
| 2015/0347733 A1 | 12/2015 | Tsou et al. |
| 2015/0347985 A1 | 12/2015 | Gross et al. |
| 2015/0348533 A1 | 12/2015 | Saddler et al. |
| 2015/0348547 A1 | 12/2015 | Paulik et al. |
| 2015/0348548 A1 | 12/2015 | Piernot et al. |
| 2015/0348549 A1 | 12/2015 | Giuli et al. |
| 2015/0348551 A1 | 12/2015 | Gruber et al. |
| 2015/0348554 A1 | 12/2015 | Orr et al. |
| 2015/0348555 A1 | 12/2015 | Sugita |
| 2015/0348565 A1 | 12/2015 | Rhoten et al. |
| 2015/0349934 A1 | 12/2015 | Pollack et al. |
| 2015/0350031 A1 | 12/2015 | Burks et al. |
| 2015/0350147 A1 | 12/2015 | Shepherd et al. |
| 2015/0350342 A1 | 12/2015 | Thorpe et al. |
| 2015/0350594 A1 | 12/2015 | Mate et al. |
| 2015/0352999 A1 | 12/2015 | Bando et al. |
| 2015/0355879 A1 | 12/2015 | Beckhardt et al. |
| 2015/0356410 A1 | 12/2015 | Faith et al. |
| 2015/0363587 A1 | 12/2015 | Ahn et al. |
| 2015/0364128 A1 | 12/2015 | Zhao et al. |
| 2015/0364140 A1 | 12/2015 | Thörn |
| 2015/0365251 A1 | 12/2015 | Kinoshita et al. |
| 2015/0370455 A1 | 12/2015 | Van Os et al. |
| 2015/0370531 A1 | 12/2015 | Faaborg |
| 2015/0370780 A1 | 12/2015 | Wang et al. |
| 2015/0370787 A1 | 12/2015 | Akbacak et al. |
| 2015/0370884 A1 | 12/2015 | Hurley et al. |
| 2015/0371215 A1 | 12/2015 | Zhou et al. |
| 2015/0371529 A1 | 12/2015 | Dolecki |
| 2015/0371639 A1 | 12/2015 | Foerster et al. |
| 2015/0371663 A1 | 12/2015 | Gustafson et al. |
| 2015/0371664 A1 | 12/2015 | Bar-or et al. |
| 2015/0371665 A1 | 12/2015 | Naik et al. |
| 2015/0373183 A1 | 12/2015 | Woolsey et al. |
| 2015/0373428 A1 | 12/2015 | Trollope et al. |
| 2015/0379118 A1 | 12/2015 | Wickenkamp et al. |
| 2015/0379414 A1 | 12/2015 | Yeh et al. |
| 2015/0379993 A1 | 12/2015 | Subhojit et al. |
| 2015/0381923 A1 | 12/2015 | Wickenkamp et al. |
| 2015/0382047 A1 | 12/2015 | Van Os et al. |
| 2015/0382079 A1 | 12/2015 | Lister et al. |
| 2015/0382147 A1 | 12/2015 | Clark et al. |
| 2015/0382322 A1 | 12/2015 | Migicovsky et al. |
| 2016/0004499 A1 | 1/2016 | Kim et al. |
| 2016/0004690 A1 | 1/2016 | Bangalore et al. |
| 2016/0005320 A1 | 1/2016 | deCharms et al. |
| 2016/0006795 A1 | 1/2016 | Yunten |
| 2016/0012038 A1 | 1/2016 | Edwards et al. |
| 2016/0014476 A1 | 1/2016 | Caliendo, Jr. et al. |
| 2016/0018872 A1 | 1/2016 | Tu et al. |
| 2016/0018899 A1 | 1/2016 | Tu et al. |
| 2016/0018900 A1 | 1/2016 | Tu et al. |
| 2016/0018959 A1 | 1/2016 | Yamashita et al. |
| 2016/0019886 A1 | 1/2016 | Hong |
| 2016/0019896 A1 | 1/2016 | Guevara et al. |
| 2016/0021414 A1 | 1/2016 | Padi et al. |
| 2016/0026242 A1 | 1/2016 | Burns et al. |
| 2016/0026258 A1 | 1/2016 | Ou et al. |
| 2016/0027431 A1 | 1/2016 | Kurzweil et al. |
| 2016/0028666 A1 | 1/2016 | Li |
| 2016/0028802 A1 | 1/2016 | Balasingh et al. |
| 2016/0029316 A1 | 1/2016 | Mohan et al. |
| 2016/0034042 A1 | 2/2016 | Joo |
| 2016/0034447 A1 | 2/2016 | Shin et al. |
| 2016/0034811 A1 | 2/2016 | Paulik et al. |
| 2016/0036750 A1 | 2/2016 | Yuan et al. |
| 2016/0036953 A1 | 2/2016 | Lee et al. |
| 2016/0041733 A1 | 2/2016 | Qian et al. |
| 2016/0041809 A1 | 2/2016 | Clayton et al. |
| 2016/0042735 A1 | 2/2016 | Vibbert et al. |
| 2016/0042748 A1 | 2/2016 | Jain et al. |
| 2016/0043905 A1 | 2/2016 | Fiedler |
| 2016/0048666 A1 | 2/2016 | Dey et al. |
| 2016/0050254 A1 | 2/2016 | Rao et al. |
| 2016/0055422 A1 | 2/2016 | Li |
| 2016/0057203 A1 | 2/2016 | Gardenfors et al. |
| 2016/0057475 A1 | 2/2016 | Liu |
| 2016/0061623 A1 | 3/2016 | Pahwa et al. |
| 2016/0062459 A1 | 3/2016 | Publicover et al. |
| 2016/0062605 A1 | 3/2016 | Agarwal et al. |
| 2016/0063094 A1 | 3/2016 | Udupa et al. |
| 2016/0063095 A1 | 3/2016 | Nassar et al. |
| 2016/0063998 A1 | 3/2016 | Krishnamoorthy et al. |
| 2016/0065155 A1 | 3/2016 | Bharj et al. |
| 2016/0065626 A1 | 3/2016 | Jain et al. |
| 2016/0066020 A1 | 3/2016 | Mountain |
| 2016/0066360 A1 | 3/2016 | Vinegrad et al. |
| 2016/0070581 A1 | 3/2016 | Soon-Shiong |
| 2016/0071516 A1 | 3/2016 | Lee et al. |
| 2016/0071517 A1 | 3/2016 | Beaver et al. |
| 2016/0071520 A1 | 3/2016 | Hayakawa |
| 2016/0071521 A1 | 3/2016 | Haughay |
| 2016/0072940 A1 | 3/2016 | Cronin |
| 2016/0077794 A1 | 3/2016 | Kim et al. |
| 2016/0078359 A1 | 3/2016 | Csurka et al. |
| 2016/0078860 A1 | 3/2016 | Paulik et al. |
| 2016/0080165 A1 | 3/2016 | Ehsani et al. |
| 2016/0080475 A1 | 3/2016 | Singh et al. |
| 2016/0085295 A1 | 3/2016 | Shimy et al. |
| 2016/0085827 A1 | 3/2016 | Chadha et al. |
| 2016/0086116 A1 | 3/2016 | Rao et al. |
| 2016/0086599 A1 | 3/2016 | Kurata et al. |
| 2016/0088335 A1 | 3/2016 | Zucchetta |
| 2016/0091871 A1 | 3/2016 | Marti et al. |
| 2016/0091967 A1 | 3/2016 | Prokofieva et al. |
| 2016/0092046 A1 | 3/2016 | Hong et al. |
| 2016/0092074 A1 | 3/2016 | Raux et al. |
| 2016/0092434 A1 | 3/2016 | Bellegarda |
| 2016/0092447 A1 | 3/2016 | Pathurudeen et al. |
| 2016/0092766 A1 | 3/2016 | Sainath et al. |
| 2016/0093291 A1 | 3/2016 | Kim |
| 2016/0093298 A1 | 3/2016 | Naik et al. |
| 2016/0093301 A1 | 3/2016 | Bellegarda et al. |
| 2016/0093304 A1 | 3/2016 | Kim et al. |
| 2016/0094700 A1 | 3/2016 | Lee et al. |
| 2016/0094889 A1 | 3/2016 | Venkataraman et al. |
| 2016/0094979 A1 | 3/2016 | Naik et al. |
| 2016/0098991 A1 | 4/2016 | Luo et al. |
| 2016/0098992 A1 | 4/2016 | Renard et al. |
| 2016/0099892 A1 | 4/2016 | Palakovich et al. |
| 2016/0099984 A1 | 4/2016 | Karagiannis et al. |
| 2016/0104480 A1 | 4/2016 | Sharifi |
| 2016/0104486 A1 | 4/2016 | Penilla et al. |
| 2016/0105308 A1 | 4/2016 | Dutt |
| 2016/0111091 A1 | 4/2016 | Bakish |
| 2016/0112746 A1 | 4/2016 | Zhang et al. |
| 2016/0112792 A1 | 4/2016 | Lee et al. |
| 2016/0116980 A1 | 4/2016 | George-Svahn et al. |

(56) References Cited

U.S. PATENT DOCUMENTS

| | | |
|---|---|---|
| 2016/0117386 A1 | 4/2016 | Ajmera et al. |
| 2016/0118048 A1 | 4/2016 | Heide |
| 2016/0119338 A1 | 4/2016 | Cheyer |
| 2016/0125048 A1 | 5/2016 | Hamada |
| 2016/0125071 A1 | 5/2016 | Gabbai |
| 2016/0132046 A1 | 5/2016 | Beoughter et al. |
| 2016/0132290 A1 | 5/2016 | Raux |
| 2016/0132484 A1 | 5/2016 | Nauze et al. |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0140951 A1 | 5/2016 | Agiomyrgiannakis et al. |
| 2016/0140962 A1 | 5/2016 | Sharifi |
| 2016/0147725 A1 | 5/2016 | Patten et al. |
| 2016/0147739 A1 | 5/2016 | Lim et al. |
| 2016/0148610 A1 | 5/2016 | Kennewick, Jr. et al. |
| 2016/0148612 A1 | 5/2016 | Guo et al. |
| 2016/0148613 A1 | 5/2016 | Kwon et al. |
| 2016/0149966 A1 | 5/2016 | Remash et al. |
| 2016/0150020 A1 | 5/2016 | Farmer et al. |
| 2016/0151668 A1 | 6/2016 | Barnes et al. |
| 2016/0154624 A1 | 6/2016 | Son et al. |
| 2016/0154792 A1 | 6/2016 | Sarikaya et al. |
| 2016/0154880 A1 | 6/2016 | Hoarty |
| 2016/0155442 A1 | 6/2016 | Kannan et al. |
| 2016/0155443 A1 | 6/2016 | Khan et al. |
| 2016/0156574 A1 | 6/2016 | Hum et al. |
| 2016/0156990 A1 | 6/2016 | Miccoy et al. |
| 2016/0162456 A1 | 6/2016 | Munro et al. |
| 2016/0163311 A1 | 6/2016 | Crook et al. |
| 2016/0163312 A1 | 6/2016 | Naik et al. |
| 2016/0169267 A1 | 6/2016 | Pool |
| 2016/0170710 A1 | 6/2016 | Kim et al. |
| 2016/0170966 A1 | 6/2016 | Kolo |
| 2016/0171980 A1 | 6/2016 | Liddell et al. |
| 2016/0173578 A1 | 6/2016 | Sharma et al. |
| 2016/0173617 A1 | 6/2016 | Allinson |
| 2016/0173929 A1 | 6/2016 | Klappert |
| 2016/0173960 A1 | 6/2016 | Snibbe et al. |
| 2016/0179462 A1 | 6/2016 | Bjorkengren |
| 2016/0179464 A1 | 6/2016 | Reddy et al. |
| 2016/0179787 A1 | 6/2016 | Deleeuw |
| 2016/0180840 A1 | 6/2016 | Siddiq et al. |
| 2016/0180844 A1 | 6/2016 | Vanblon et al. |
| 2016/0182410 A1 | 6/2016 | Janakiraman et al. |
| 2016/0182709 A1 | 6/2016 | Kim et al. |
| 2016/0188181 A1 | 6/2016 | Smith |
| 2016/0188738 A1 | 6/2016 | Gruber et al. |
| 2016/0189198 A1 | 6/2016 | Daniel et al. |
| 2016/0189715 A1 | 6/2016 | Nishikawa |
| 2016/0189717 A1 | 6/2016 | Kannan et al. |
| 2016/0196110 A1 | 7/2016 | Yehoshua et al. |
| 2016/0198319 A1 | 7/2016 | Huang et al. |
| 2016/0202957 A1 | 7/2016 | Siddall et al. |
| 2016/0203002 A1 | 7/2016 | Kannan et al. |
| 2016/0203193 A1 | 7/2016 | Kevin et al. |
| 2016/0210551 A1 | 7/2016 | Lee et al. |
| 2016/0210981 A1 | 7/2016 | Lee |
| 2016/0212206 A1 | 7/2016 | Wu et al. |
| 2016/0212208 A1 | 7/2016 | Kulkarni et al. |
| 2016/0212488 A1 | 7/2016 | Os et al. |
| 2016/0217784 A1 | 7/2016 | Gelfenbeyn et al. |
| 2016/0217794 A1 | 7/2016 | Imoto et al. |
| 2016/0224540 A1 | 8/2016 | Stewart et al. |
| 2016/0224559 A1 | 8/2016 | Hicks et al. |
| 2016/0224774 A1 | 8/2016 | Pender |
| 2016/0225372 A1 | 8/2016 | Cheung et al. |
| 2016/0226956 A1 | 8/2016 | Hong et al. |
| 2016/0227107 A1 | 8/2016 | Beaumont |
| 2016/0227633 A1 | 8/2016 | Sun et al. |
| 2016/0232500 A1 | 8/2016 | Wang et al. |
| 2016/0234206 A1 | 8/2016 | Tunnell et al. |
| 2016/0239480 A1 | 8/2016 | Larcheveque et al. |
| 2016/0239568 A1 | 8/2016 | Packer et al. |
| 2016/0239645 A1 | 8/2016 | Heo et al. |
| 2016/0239848 A1 | 8/2016 | Chang et al. |
| 2016/0240187 A1 | 8/2016 | Fleizach et al. |
| 2016/0240189 A1 | 8/2016 | Lee et al. |
| 2016/0240192 A1 | 8/2016 | Raghuvir |
| 2016/0242148 A1 | 8/2016 | Reed |
| 2016/0247061 A1 | 8/2016 | Trask et al. |
| 2016/0249319 A1 | 8/2016 | Dotan-Cohen et al. |
| 2016/0253312 A1 | 9/2016 | Rhodes |
| 2016/0253528 A1 | 9/2016 | Gao et al. |
| 2016/0259623 A1 | 9/2016 | Sumner et al. |
| 2016/0259656 A1 | 9/2016 | Sumner et al. |
| 2016/0259779 A1 | 9/2016 | Labský et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0262442 A1 | 9/2016 | Davila et al. |
| 2016/0266871 A1 | 9/2016 | Schmid et al. |
| 2016/0267904 A1 | 9/2016 | Biadsy et al. |
| 2016/0269540 A1 | 9/2016 | Butcher et al. |
| 2016/0274938 A1 | 9/2016 | Strinati et al. |
| 2016/0275941 A1 | 9/2016 | Bellegarda et al. |
| 2016/0275947 A1 | 9/2016 | Li et al. |
| 2016/0282824 A1 | 9/2016 | Smallwood et al. |
| 2016/0282956 A1 | 9/2016 | Ouyang et al. |
| 2016/0283055 A1 | 9/2016 | Haghighat et al. |
| 2016/0283185 A1 | 9/2016 | Mclaren et al. |
| 2016/0284005 A1 | 9/2016 | Daniel et al. |
| 2016/0284199 A1 | 9/2016 | Dotan-Cohen et al. |
| 2016/0284340 A1 | 9/2016 | Li et al. |
| 2016/0285808 A1 | 9/2016 | Franklin et al. |
| 2016/0286045 A1 | 9/2016 | Shaltiel et al. |
| 2016/0291831 A1 | 10/2016 | Baek |
| 2016/0292603 A1 | 10/2016 | Prajapati et al. |
| 2016/0293157 A1 | 10/2016 | Chen et al. |
| 2016/0293167 A1 | 10/2016 | Chen et al. |
| 2016/0293168 A1 | 10/2016 | Chen |
| 2016/0294755 A1 | 10/2016 | Prabhu |
| 2016/0294813 A1 | 10/2016 | Zou |
| 2016/0299685 A1 | 10/2016 | Zhai et al. |
| 2016/0299882 A1 | 10/2016 | Hegerty et al. |
| 2016/0299883 A1 | 10/2016 | Zhu et al. |
| 2016/0299977 A1 | 10/2016 | Hreha |
| 2016/0300571 A1 | 10/2016 | Foerster et al. |
| 2016/0301639 A1 | 10/2016 | Liu et al. |
| 2016/0306683 A1 | 10/2016 | Standley et al. |
| 2016/0307566 A1 | 10/2016 | Bellegarda |
| 2016/0308799 A1 | 10/2016 | Schubert et al. |
| 2016/0309035 A1 | 10/2016 | Li |
| 2016/0313906 A1 | 10/2016 | Kilchenko et al. |
| 2016/0314788 A1 | 10/2016 | Jitkoff et al. |
| 2016/0314789 A1 | 10/2016 | Marcheret et al. |
| 2016/0314792 A1 | 10/2016 | Alvarez et al. |
| 2016/0315996 A1 | 10/2016 | Ha et al. |
| 2016/0316349 A1 | 10/2016 | Lee et al. |
| 2016/0317924 A1 | 11/2016 | Tanaka et al. |
| 2016/0320838 A1 | 11/2016 | Teller et al. |
| 2016/0321239 A1 | 11/2016 | Iso-Sipilä et al. |
| 2016/0321243 A1 | 11/2016 | Walia et al. |
| 2016/0321261 A1 | 11/2016 | Spasojevic et al. |
| 2016/0321358 A1 | 11/2016 | Kanani et al. |
| 2016/0322043 A1 | 11/2016 | Bellegarda |
| 2016/0322044 A1 | 11/2016 | Jung et al. |
| 2016/0322045 A1 | 11/2016 | Hatfield et al. |
| 2016/0322048 A1 | 11/2016 | Amano et al. |
| 2016/0322050 A1 | 11/2016 | Wang et al. |
| 2016/0322055 A1 | 11/2016 | Sainath et al. |
| 2016/0328134 A1 | 11/2016 | Xu |
| 2016/0328147 A1 | 11/2016 | Zhang et al. |
| 2016/0328205 A1 | 11/2016 | Agrawal et al. |
| 2016/0328893 A1 | 11/2016 | Cordova et al. |
| 2016/0329060 A1 | 11/2016 | Ito et al. |
| 2016/0334973 A1 | 11/2016 | Reckhow et al. |
| 2016/0335138 A1 | 11/2016 | Surti et al. |
| 2016/0335139 A1 | 11/2016 | Hurley et al. |
| 2016/0335532 A1 | 11/2016 | Sanghavi et al. |
| 2016/0336007 A1 | 11/2016 | Hanazawa et al. |
| 2016/0336010 A1 | 11/2016 | Lindahl |
| 2016/0336011 A1 | 11/2016 | Koll et al. |

(56) References Cited

U.S. PATENT DOCUMENTS

| | | |
|---|---|---|
| 2016/0336024 A1 | 11/2016 | Choi et al. |
| 2016/0337299 A1 | 11/2016 | Lane et al. |
| 2016/0337301 A1 | 11/2016 | Rollins et al. |
| 2016/0342317 A1 | 11/2016 | Lim et al. |
| 2016/0342685 A1 | 11/2016 | Basu et al. |
| 2016/0342781 A1 | 11/2016 | Jeon |
| 2016/0342803 A1 | 11/2016 | Goodridge et al. |
| 2016/0350070 A1 | 12/2016 | Sung et al. |
| 2016/0350650 A1 | 12/2016 | Leeman-Munk et al. |
| 2016/0350812 A1 | 12/2016 | Priness et al. |
| 2016/0351190 A1 | 12/2016 | Piernot et al. |
| 2016/0352567 A1 | 12/2016 | Robbins et al. |
| 2016/0352924 A1 | 12/2016 | Senarath et al. |
| 2016/0357304 A1 | 12/2016 | Hatori et al. |
| 2016/0357728 A1 | 12/2016 | Bellegarda et al. |
| 2016/0357790 A1 | 12/2016 | Elkington et al. |
| 2016/0357861 A1 | 12/2016 | Carlhian et al. |
| 2016/0357870 A1 | 12/2016 | Hentschel et al. |
| 2016/0358598 A1 | 12/2016 | Williams et al. |
| 2016/0358600 A1 | 12/2016 | Nallasamy et al. |
| 2016/0358603 A1 | 12/2016 | Azam et al. |
| 2016/0358609 A1 | 12/2016 | Connell et al. |
| 2016/0358619 A1 | 12/2016 | Ramprashad et al. |
| 2016/0359771 A1 | 12/2016 | Sridhar |
| 2016/0360039 A1 | 12/2016 | Sanghavi et al. |
| 2016/0360336 A1 | 12/2016 | Gross et al. |
| 2016/0360382 A1 | 12/2016 | Gross et al. |
| 2016/0364378 A1 | 12/2016 | Futrell et al. |
| 2016/0364382 A1 | 12/2016 | Sarikaya |
| 2016/0365101 A1 | 12/2016 | Foy et al. |
| 2016/0371054 A1 | 12/2016 | Beaumont et al. |
| 2016/0371250 A1 | 12/2016 | Rhodes |
| 2016/0372112 A1 | 12/2016 | Miller et al. |
| 2016/0372119 A1 | 12/2016 | Sak et al. |
| 2016/0378747 A1 | 12/2016 | Orr et al. |
| 2016/0379091 A1 | 12/2016 | Lin et al. |
| 2016/0379105 A1 | 12/2016 | Moore, Jr. |
| 2016/0379626 A1 | 12/2016 | Deisher et al. |
| 2016/0379632 A1 | 12/2016 | Hoffmeister et al. |
| 2016/0379633 A1 | 12/2016 | Lehman et al. |
| 2016/0379639 A1 | 12/2016 | Weinstein et al. |
| 2016/0379641 A1 | 12/2016 | Liu et al. |
| 2017/0000348 A1 | 1/2017 | Karsten et al. |
| 2017/0003931 A1 | 1/2017 | Dvortsov et al. |
| 2017/0004209 A1 | 1/2017 | Johl et al. |
| 2017/0004409 A1 | 1/2017 | Chu et al. |
| 2017/0004824 A1 | 1/2017 | Yoo et al. |
| 2017/0005818 A1 | 1/2017 | Gould |
| 2017/0006329 A1 | 1/2017 | Jang et al. |
| 2017/0011091 A1 | 1/2017 | Chehreghani |
| 2017/0011279 A1 | 1/2017 | Soldevila et al. |
| 2017/0011303 A1 | 1/2017 | Annapureddy et al. |
| 2017/0011742 A1 | 1/2017 | Jing et al. |
| 2017/0013124 A1 | 1/2017 | Havelka et al. |
| 2017/0013331 A1 | 1/2017 | Watanabe et al. |
| 2017/0018271 A1 | 1/2017 | Khan et al. |
| 2017/0019987 A1 | 1/2017 | Dragone et al. |
| 2017/0023963 A1 | 1/2017 | Davis et al. |
| 2017/0025124 A1 | 1/2017 | Mixter et al. |
| 2017/0026318 A1 | 1/2017 | Daniel et al. |
| 2017/0026509 A1 | 1/2017 | Rand |
| 2017/0027522 A1 | 2/2017 | Van Hasselt et al. |
| 2017/0031576 A1 | 2/2017 | Saoji et al. |
| 2017/0031711 A1 | 2/2017 | Wu et al. |
| 2017/0032440 A1 | 2/2017 | Paton |
| 2017/0032783 A1 | 2/2017 | Lord et al. |
| 2017/0032787 A1 | 2/2017 | Dayal |
| 2017/0032791 A1 | 2/2017 | Elson et al. |
| 2017/0034087 A1 | 2/2017 | Borenstein et al. |
| 2017/0039283 A1 | 2/2017 | Bennett et al. |
| 2017/0039475 A1 | 2/2017 | Cheyer et al. |
| 2017/0040002 A1 | 2/2017 | Basson et al. |
| 2017/0041388 A1 | 2/2017 | Tal et al. |
| 2017/0046025 A1 | 2/2017 | Dascola et al. |
| 2017/0046330 A1 | 2/2017 | Si et al. |
| 2017/0047063 A1 | 2/2017 | Ohmura et al. |
| 2017/0052760 A1 | 2/2017 | Johnson et al. |
| 2017/0053652 A1 | 2/2017 | Choi et al. |
| 2017/0055895 A1 | 3/2017 | Jardins et al. |
| 2017/0060853 A1 | 3/2017 | Lee et al. |
| 2017/0061423 A1 | 3/2017 | Bryant et al. |
| 2017/0068423 A1 | 3/2017 | Napolitano et al. |
| 2017/0068513 A1 | 3/2017 | Stasior et al. |
| 2017/0068550 A1 | 3/2017 | Zeitlin |
| 2017/0068670 A1 | 3/2017 | Orr et al. |
| 2017/0069308 A1 | 3/2017 | Aleksic et al. |
| 2017/0069321 A1 | 3/2017 | Toiyama |
| 2017/0069327 A1 | 3/2017 | Heigold et al. |
| 2017/0075653 A1 | 3/2017 | Dawidowsky et al. |
| 2017/0076518 A1 | 3/2017 | Patterson et al. |
| 2017/0076720 A1 | 3/2017 | Gopalan et al. |
| 2017/0076721 A1 | 3/2017 | Bargetzi et al. |
| 2017/0078490 A1 | 3/2017 | Kaminsky et al. |
| 2017/0083179 A1 | 3/2017 | Gruber et al. |
| 2017/0083285 A1 | 3/2017 | Meyers et al. |
| 2017/0083504 A1 | 3/2017 | Huang |
| 2017/0083506 A1 | 3/2017 | Liu et al. |
| 2017/0084277 A1 | 3/2017 | Sharifi |
| 2017/0085547 A1 | 3/2017 | De Aguiar et al. |
| 2017/0085696 A1 | 3/2017 | Abkairov |
| 2017/0090428 A1 | 3/2017 | Oohara |
| 2017/0090569 A1 | 3/2017 | Levesque |
| 2017/0090864 A1 | 3/2017 | Jorgovanovic |
| 2017/0091168 A1 | 3/2017 | Bellegarda et al. |
| 2017/0091169 A1 | 3/2017 | Bellegarda et al. |
| 2017/0091612 A1 | 3/2017 | Gruber et al. |
| 2017/0092259 A1 | 3/2017 | Jeon |
| 2017/0092270 A1 | 3/2017 | Newendorp et al. |
| 2017/0092278 A1 | 3/2017 | Evermann et al. |
| 2017/0093356 A1 | 3/2017 | Cudak et al. |
| 2017/0097743 A1 | 4/2017 | Hameed et al. |
| 2017/0102837 A1 | 4/2017 | Toumpelis |
| 2017/0102915 A1 | 4/2017 | Kuscher et al. |
| 2017/0103749 A1 | 4/2017 | Zhao et al. |
| 2017/0103752 A1 | 4/2017 | Senior et al. |
| 2017/0105190 A1 | 4/2017 | Logan et al. |
| 2017/0108236 A1 | 4/2017 | Guan et al. |
| 2017/0110117 A1 | 4/2017 | Chakladar et al. |
| 2017/0110125 A1 | 4/2017 | Xu et al. |
| 2017/0116177 A1 | 4/2017 | Walia |
| 2017/0116982 A1 | 4/2017 | Gelfenbeyn et al. |
| 2017/0116987 A1 | 4/2017 | Kang et al. |
| 2017/0116989 A1 | 4/2017 | Yadgar et al. |
| 2017/0124190 A1 | 5/2017 | Wang et al. |
| 2017/0124311 A1 | 5/2017 | Li et al. |
| 2017/0124531 A1 | 5/2017 | McCormack |
| 2017/0125016 A1 | 5/2017 | Wang |
| 2017/0127124 A9 | 5/2017 | Wilson et al. |
| 2017/0131778 A1 | 5/2017 | Iyer |
| 2017/0132019 A1 | 5/2017 | Karashchuk et al. |
| 2017/0132199 A1 | 5/2017 | Vescovi et al. |
| 2017/0133007 A1 | 5/2017 | Drewes |
| 2017/0133009 A1 | 5/2017 | Cho et al. |
| 2017/0134807 A1 | 5/2017 | Shaw et al. |
| 2017/0140041 A1 | 5/2017 | Dotan-Cohen et al. |
| 2017/0140052 A1 | 5/2017 | Bufe, III et al. |
| 2017/0140644 A1 | 5/2017 | Hwang et al. |
| 2017/0140760 A1 | 5/2017 | Sachdev |
| 2017/0147722 A1 | 5/2017 | Greenwood |
| 2017/0147841 A1 | 5/2017 | Stagg et al. |
| 2017/0148044 A1 | 5/2017 | Fukuda et al. |
| 2017/0148307 A1 | 5/2017 | Yeom et al. |
| 2017/0154033 A1 | 6/2017 | Lee |
| 2017/0154055 A1 | 6/2017 | Dimson et al. |
| 2017/0154628 A1 | 6/2017 | Mohajer et al. |
| 2017/0155940 A1 | 6/2017 | Jin et al. |
| 2017/0155965 A1 | 6/2017 | Ward |
| 2017/0161018 A1 | 6/2017 | Lemay et al. |
| 2017/0161268 A1 | 6/2017 | Badaskar |
| 2017/0161293 A1 | 6/2017 | Ionescu et al. |
| 2017/0161393 A1 | 6/2017 | Oh et al. |
| 2017/0161439 A1 | 6/2017 | Raduchel et al. |
| 2017/0161500 A1 | 6/2017 | Yang |
| 2017/0162191 A1 | 6/2017 | Grost et al. |

(56) References Cited

U.S. PATENT DOCUMENTS

| | | |
|---|---|---|
| 2017/0162202 A1 | 6/2017 | Anthony et al. |
| 2017/0162203 A1 | 6/2017 | Huang et al. |
| 2017/0169506 A1 | 6/2017 | Wishne et al. |
| 2017/0169818 A1 | 6/2017 | Vanblon et al. |
| 2017/0169819 A1 | 6/2017 | Mese et al. |
| 2017/0171139 A1 | 6/2017 | Marra et al. |
| 2017/0171387 A1 | 6/2017 | Vendrow |
| 2017/0177080 A1 | 6/2017 | Deleeuw |
| 2017/0177547 A1 | 6/2017 | Ciereszko et al. |
| 2017/0178619 A1 | 6/2017 | Naik et al. |
| 2017/0178620 A1 | 6/2017 | Fleizach et al. |
| 2017/0178626 A1 | 6/2017 | Gruber et al. |
| 2017/0178666 A1 | 6/2017 | Yu |
| 2017/0180499 A1 | 6/2017 | Gelfenbeyn et al. |
| 2017/0185375 A1 | 6/2017 | Martel et al. |
| 2017/0185581 A1 | 6/2017 | Bojja et al. |
| 2017/0186429 A1 | 6/2017 | Giuli et al. |
| 2017/0186446 A1 | 6/2017 | Wosk et al. |
| 2017/0187711 A1 | 6/2017 | Joo et al. |
| 2017/0193083 A1 | 7/2017 | Bhatt et al. |
| 2017/0195493 A1 | 7/2017 | Sudarsan et al. |
| 2017/0195495 A1 | 7/2017 | Deora et al. |
| 2017/0195636 A1 | 7/2017 | Child et al. |
| 2017/0195856 A1 | 7/2017 | Snyder et al. |
| 2017/0199870 A1 | 7/2017 | Zheng et al. |
| 2017/0199874 A1 | 7/2017 | Patel et al. |
| 2017/0200066 A1 | 7/2017 | Wang et al. |
| 2017/0201609 A1 | 7/2017 | Salmenkaita et al. |
| 2017/0201613 A1 | 7/2017 | Engelke et al. |
| 2017/0201846 A1 | 7/2017 | Katayama et al. |
| 2017/0206002 A1 | 7/2017 | Badger et al. |
| 2017/0206899 A1 | 7/2017 | Bryant et al. |
| 2017/0215052 A1 | 7/2017 | Koum et al. |
| 2017/0220212 A1 | 8/2017 | Yang et al. |
| 2017/0221486 A1 | 8/2017 | Kurata et al. |
| 2017/0222961 A1 | 8/2017 | Beach et al. |
| 2017/0223189 A1 | 8/2017 | Meredith et al. |
| 2017/0227935 A1 | 8/2017 | Su et al. |
| 2017/0228367 A1 | 8/2017 | Pasupalak et al. |
| 2017/0228382 A1 | 8/2017 | Haviv et al. |
| 2017/0229121 A1 | 8/2017 | Taki et al. |
| 2017/0230429 A1 | 8/2017 | Garmark et al. |
| 2017/0230497 A1 | 8/2017 | Kim et al. |
| 2017/0230709 A1 | 8/2017 | Van Os et al. |
| 2017/0235361 A1 | 8/2017 | Rigazio et al. |
| 2017/0235618 A1 | 8/2017 | Lin et al. |
| 2017/0235721 A1 | 8/2017 | Almosallam et al. |
| 2017/0236512 A1 | 8/2017 | Williams et al. |
| 2017/0236514 A1 | 8/2017 | Nelson |
| 2017/0236517 A1 | 8/2017 | Yu et al. |
| 2017/0238039 A1 | 8/2017 | Sabattini |
| 2017/0242478 A1 | 8/2017 | Ma |
| 2017/0242653 A1 | 8/2017 | Lang et al. |
| 2017/0242657 A1 | 8/2017 | Jarvis et al. |
| 2017/0242840 A1 | 8/2017 | Lu et al. |
| 2017/0243468 A1 | 8/2017 | Dotan-Cohen et al. |
| 2017/0243576 A1 | 8/2017 | Millington et al. |
| 2017/0243583 A1 | 8/2017 | Raichelgauz et al. |
| 2017/0243586 A1 | 8/2017 | Civelli et al. |
| 2017/0249291 A1 | 8/2017 | Patel |
| 2017/0249309 A1 | 8/2017 | Sarikaya |
| 2017/0256256 A1 | 9/2017 | Wang et al. |
| 2017/0257723 A1 | 9/2017 | Morishita et al. |
| 2017/0262051 A1 | 9/2017 | Tall et al. |
| 2017/0262432 A1 | 9/2017 | Sarikaya et al. |
| 2017/0263247 A1 | 9/2017 | Kang et al. |
| 2017/0263248 A1 | 9/2017 | Gruber et al. |
| 2017/0263249 A1 | 9/2017 | Akbacak et al. |
| 2017/0263254 A1 | 9/2017 | Dewan et al. |
| 2017/0264451 A1 | 9/2017 | Yu et al. |
| 2017/0264711 A1 | 9/2017 | Natarajan et al. |
| 2017/0270092 A1 | 9/2017 | He et al. |
| 2017/0270715 A1 | 9/2017 | Lindsay et al. |
| 2017/0270822 A1 | 9/2017 | Cohen |
| 2017/0270912 A1 | 9/2017 | Levit et al. |
| 2017/0273044 A1 | 9/2017 | Alsina |
| 2017/0277691 A1 | 9/2017 | Agarwal |
| 2017/0278513 A1 | 9/2017 | Li et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0286407 A1 | 10/2017 | Chochowski et al. |
| 2017/0287218 A1 | 10/2017 | Nuernberger et al. |
| 2017/0287472 A1 | 10/2017 | Ogawa et al. |
| 2017/0289305 A1 | 10/2017 | Liensberger et al. |
| 2017/0295446 A1 | 10/2017 | Shivappa |
| 2017/0301348 A1 | 10/2017 | Chen et al. |
| 2017/0308552 A1 | 10/2017 | Soni et al. |
| 2017/0308589 A1 | 10/2017 | Liu et al. |
| 2017/0308609 A1 | 10/2017 | Berkhin et al. |
| 2017/0311005 A1 | 10/2017 | Lin |
| 2017/0316775 A1 | 11/2017 | Le et al. |
| 2017/0316779 A1 | 11/2017 | Mohapatra et al. |
| 2017/0316782 A1 | 11/2017 | Haughay |
| 2017/0319123 A1 | 11/2017 | Voss et al. |
| 2017/0323637 A1 | 11/2017 | Naik |
| 2017/0329466 A1 | 11/2017 | Krenkler et al. |
| 2017/0329490 A1 | 11/2017 | Esinovskaya et al. |
| 2017/0329572 A1 | 11/2017 | Shah et al. |
| 2017/0329630 A1 | 11/2017 | Jann et al. |
| 2017/0330567 A1 | 11/2017 | Van Wissen et al. |
| 2017/0336920 A1 | 11/2017 | Chan et al. |
| 2017/0337035 A1 | 11/2017 | Choudhary et al. |
| 2017/0337478 A1 | 11/2017 | Sarikaya et al. |
| 2017/0337540 A1 | 11/2017 | Buckman et al. |
| 2017/0345411 A1 | 11/2017 | Raitio et al. |
| 2017/0345420 A1 | 11/2017 | Barnett, Jr. |
| 2017/0345429 A1 | 11/2017 | Hardee et al. |
| 2017/0346949 A1 | 11/2017 | Sanghavi et al. |
| 2017/0347180 A1 | 11/2017 | Petrank |
| 2017/0347222 A1 | 11/2017 | Kanter |
| 2017/0351487 A1 | 12/2017 | Avilés-Casco et al. |
| 2017/0352346 A1 | 12/2017 | Paulik et al. |
| 2017/0352350 A1 | 12/2017 | Booker et al. |
| 2017/0357478 A1 | 12/2017 | Piersol et al. |
| 2017/0357529 A1 | 12/2017 | Venkatraman et al. |
| 2017/0357632 A1 | 12/2017 | Pagallo et al. |
| 2017/0357633 A1 | 12/2017 | Wang et al. |
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358302 A1 | 12/2017 | Orr et al. |
| 2017/0358303 A1 | 12/2017 | Walker, II et al. |
| 2017/0358304 A1 | 12/2017 | Castillo et al. |
| 2017/0358305 A1 | 12/2017 | Kudurshian et al. |
| 2017/0358317 A1 | 12/2017 | James |
| 2017/0359680 A1 | 12/2017 | Ledvina et al. |
| 2017/0365251 A1 | 12/2017 | Park et al. |
| 2017/0371509 A1 | 12/2017 | Jung et al. |
| 2017/0371865 A1 | 12/2017 | Eck et al. |
| 2017/0371866 A1 | 12/2017 | Eck |
| 2017/0371885 A1 | 12/2017 | Aggarwal et al. |
| 2017/0372703 A1 | 12/2017 | Sung et al. |
| 2017/0372719 A1 | 12/2017 | Li et al. |
| 2017/0374093 A1 | 12/2017 | Dhar et al. |
| 2017/0374176 A1 | 12/2017 | Agrawal et al. |
| 2018/0004372 A1 | 1/2018 | Zurek et al. |
| 2018/0004396 A1 | 1/2018 | Ying |
| 2018/0005112 A1 | 1/2018 | Iso-Sipila et al. |
| 2018/0007060 A1 | 1/2018 | Leblang et al. |
| 2018/0007096 A1 | 1/2018 | Levin et al. |
| 2018/0007210 A1 | 1/2018 | Todasco |
| 2018/0007538 A1 | 1/2018 | Naik et al. |
| 2018/0012596 A1 | 1/2018 | Piernot et al. |
| 2018/0018248 A1 | 1/2018 | Bhargava et al. |
| 2018/0018590 A1 | 1/2018 | Szeto et al. |
| 2018/0018814 A1 | 1/2018 | Patrik et al. |
| 2018/0018959 A1 | 1/2018 | Jardins et al. |
| 2018/0018973 A1 | 1/2018 | Moreno et al. |
| 2018/0020093 A1 | 1/2018 | Bentitou et al. |
| 2018/0024985 A1 | 1/2018 | Asano |
| 2018/0025124 A1 | 1/2018 | Mohr et al. |

(56) References Cited

U.S. PATENT DOCUMENTS

| | | |
|---|---|---|
| 2018/0025287 A1 | 1/2018 | Mathew et al. |
| 2018/0028918 A1 | 2/2018 | Tang et al. |
| 2018/0033431 A1 | 2/2018 | Newendorp et al. |
| 2018/0033435 A1 | 2/2018 | Jacobs, II |
| 2018/0033436 A1 | 2/2018 | Zhou |
| 2018/0039239 A1 | 2/2018 | Burchard |
| 2018/0041571 A1 | 2/2018 | Rogers et al. |
| 2018/0045963 A1 | 2/2018 | Hoover et al. |
| 2018/0046340 A1 | 2/2018 | Mall |
| 2018/0046851 A1 | 2/2018 | Kienzle et al. |
| 2018/0047201 A1 | 2/2018 | Filev et al. |
| 2018/0047288 A1 | 2/2018 | Cordell et al. |
| 2018/0047391 A1 | 2/2018 | Baik et al. |
| 2018/0047393 A1 | 2/2018 | Tian et al. |
| 2018/0047406 A1 | 2/2018 | Park |
| 2018/0052909 A1 | 2/2018 | Sharifi et al. |
| 2018/0054505 A1 | 2/2018 | Hart et al. |
| 2018/0060032 A1 | 3/2018 | Boesen |
| 2018/0060301 A1 | 3/2018 | Li et al. |
| 2018/0060312 A1 | 3/2018 | Won |
| 2018/0060555 A1 | 3/2018 | Boesen |
| 2018/0061400 A1 | 3/2018 | Carbune et al. |
| 2018/0061401 A1 | 3/2018 | Sarikaya et al. |
| 2018/0062691 A1 | 3/2018 | Barnett, Jr. |
| 2018/0063276 A1 | 3/2018 | Foged |
| 2018/0063308 A1 | 3/2018 | Crystal et al. |
| 2018/0063324 A1 | 3/2018 | Van Meter, II |
| 2018/0063624 A1 | 3/2018 | Boesen |
| 2018/0067904 A1 | 3/2018 | Li |
| 2018/0067914 A1 | 3/2018 | Chen et al. |
| 2018/0067918 A1 | 3/2018 | Bellegarda et al. |
| 2018/0067929 A1 | 3/2018 | Ahn |
| 2018/0068074 A1 | 3/2018 | Shen |
| 2018/0068194 A1 | 3/2018 | Matsuda |
| 2018/0069743 A1 | 3/2018 | Bakken et al. |
| 2018/0075659 A1 | 3/2018 | Browy et al. |
| 2018/0075847 A1 | 3/2018 | Lee et al. |
| 2018/0075849 A1 | 3/2018 | Khoury et al. |
| 2018/0077095 A1 | 3/2018 | Deyle et al. |
| 2018/0077648 A1 | 3/2018 | Nguyen |
| 2018/0081739 A1 | 3/2018 | Gravenites et al. |
| 2018/0082692 A1 | 3/2018 | Khoury et al. |
| 2018/0083898 A1 | 3/2018 | Pham |
| 2018/0088788 A1 | 3/2018 | Cheung et al. |
| 2018/0088902 A1 | 3/2018 | Mese et al. |
| 2018/0088969 A1 | 3/2018 | Vanblon et al. |
| 2018/0089166 A1 | 3/2018 | Meyer et al. |
| 2018/0089588 A1 | 3/2018 | Ravi et al. |
| 2018/0090143 A1 | 3/2018 | Saddler et al. |
| 2018/0091604 A1 | 3/2018 | Yamashita et al. |
| 2018/0091732 A1 | 3/2018 | Wilson et al. |
| 2018/0091847 A1 | 3/2018 | Wu et al. |
| 2018/0096683 A1 | 4/2018 | James et al. |
| 2018/0096690 A1 | 4/2018 | Mixter et al. |
| 2018/0097812 A1 | 4/2018 | Gillett et al. |
| 2018/0101599 A1 | 4/2018 | Kenneth et al. |
| 2018/0101925 A1 | 4/2018 | Brinig et al. |
| 2018/0102914 A1 | 4/2018 | Kawachi et al. |
| 2018/0103209 A1 | 4/2018 | Fischler et al. |
| 2018/0107917 A1 | 4/2018 | Hewavitharana et al. |
| 2018/0107945 A1 | 4/2018 | Gao et al. |
| 2018/0108346 A1 | 4/2018 | Paulik et al. |
| 2018/0108351 A1 | 4/2018 | Beckhardt et al. |
| 2018/0108357 A1 | 4/2018 | Liu |
| 2018/0109920 A1 | 4/2018 | Aggarwal et al. |
| 2018/0113673 A1 | 4/2018 | Sheynblat |
| 2018/0114591 A1 | 4/2018 | Pribanic et al. |
| 2018/0314362 A1 | 4/2018 | Kim et al. |
| 2018/0121430 A1 | 5/2018 | Kagoshima et al. |
| 2018/0121432 A1 | 5/2018 | Parson et al. |
| 2018/0122376 A1 | 5/2018 | Kojima |
| 2018/0122378 A1 | 5/2018 | Mixter et al. |
| 2018/0124458 A1 | 5/2018 | Knox |
| 2018/0126260 A1 | 5/2018 | Chansoriya et al. |
| 2018/0129967 A1 | 5/2018 | Herreshoff |
| 2018/0130470 A1 | 5/2018 | Lemay et al. |
| 2018/0130471 A1 | 5/2018 | Trufinescu et al. |
| 2018/0137097 A1 | 5/2018 | Lim et al. |
| 2018/0137404 A1 | 5/2018 | Fauceglia et al. |
| 2018/0137856 A1 | 5/2018 | Gilbert |
| 2018/0137857 A1 | 5/2018 | Zhou et al. |
| 2018/0137865 A1 | 5/2018 | Ling |
| 2018/0143857 A1 | 5/2018 | Anbazhagan et al. |
| 2018/0143967 A1 | 5/2018 | Anbazhagan et al. |
| 2018/0144465 A1 | 5/2018 | Hsieh et al. |
| 2018/0144615 A1 | 5/2018 | Kinney et al. |
| 2018/0144746 A1 | 5/2018 | Mishra et al. |
| 2018/0144748 A1 | 5/2018 | Leong |
| 2018/0146089 A1 | 5/2018 | Rauenbuehler et al. |
| 2018/0150744 A1 | 5/2018 | Orr et al. |
| 2018/0152557 A1 | 5/2018 | White et al. |
| 2018/0152558 A1 | 5/2018 | Chan et al. |
| 2018/0152803 A1 | 5/2018 | Seefeldt et al. |
| 2018/0157372 A1 | 6/2018 | Kurabayashi |
| 2018/0157398 A1 | 6/2018 | Kaehler et al. |
| 2018/0157408 A1 | 6/2018 | Yu et al. |
| 2018/0157992 A1 | 6/2018 | Susskind et al. |
| 2018/0158548 A1 | 6/2018 | Taheri et al. |
| 2018/0158552 A1 | 6/2018 | Liu et al. |
| 2018/0165278 A1 | 6/2018 | He et al. |
| 2018/0165801 A1 | 6/2018 | Kim et al. |
| 2018/0165857 A1 | 6/2018 | Lee et al. |
| 2018/0166076 A1 | 6/2018 | Higuchi et al. |
| 2018/0167884 A1 | 6/2018 | Dawid et al. |
| 2018/0173403 A1 | 6/2018 | Carbune et al. |
| 2018/0173542 A1 | 6/2018 | Chan et al. |
| 2018/0174406 A1 | 6/2018 | Arashi et al. |
| 2018/0174576 A1 | 6/2018 | Soltau et al. |
| 2018/0174597 A1 | 6/2018 | Lee et al. |
| 2018/0181370 A1 | 6/2018 | Parkinson |
| 2018/0182376 A1 | 6/2018 | Gysel et al. |
| 2018/0188840 A1 | 7/2018 | Tamura et al. |
| 2018/0188948 A1 | 7/2018 | Ouyang et al. |
| 2018/0189267 A1 | 7/2018 | Takiel |
| 2018/0190263 A1 | 7/2018 | Calef, III |
| 2018/0190273 A1 | 7/2018 | Karimli et al. |
| 2018/0190279 A1 | 7/2018 | Anderson et al. |
| 2018/0191670 A1 | 7/2018 | Suyama |
| 2018/0196683 A1 | 7/2018 | Radebaugh et al. |
| 2018/0205983 A1 | 7/2018 | Lee et al. |
| 2018/0210874 A1 | 7/2018 | Fuxman et al. |
| 2018/0213448 A1 | 7/2018 | Segal et al. |
| 2018/0214061 A1 | 8/2018 | Knoth et al. |
| 2018/0217810 A1 | 8/2018 | Agrawal |
| 2018/0218735 A1 | 8/2018 | Hunt et al. |
| 2018/0221783 A1 | 8/2018 | Gamero |
| 2018/0225131 A1 | 8/2018 | Tommy et al. |
| 2018/0225274 A1 | 8/2018 | Tommy et al. |
| 2018/0232203 A1 | 8/2018 | Gelfenbeyn et al. |
| 2018/0232608 A1 | 8/2018 | Pradeep et al. |
| 2018/0232688 A1 | 8/2018 | Pike et al. |
| 2018/0233132 A1 | 8/2018 | Herold et al. |
| 2018/0233140 A1 | 8/2018 | Koishida et al. |
| 2018/0247065 A1 | 8/2018 | Rhee et al. |
| 2018/0253209 A1 | 9/2018 | Jaygarl et al. |
| 2018/0253652 A1 | 9/2018 | Palzer et al. |
| 2018/0260680 A1 | 9/2018 | Finkelstein et al. |
| 2018/0267952 A1 | 9/2018 | Osborne et al. |
| 2018/0268023 A1 | 9/2018 | Korpusik et al. |
| 2018/0268106 A1 | 9/2018 | Velaga |
| 2018/0268337 A1 | 9/2018 | Miller et al. |
| 2018/0270343 A1 | 9/2018 | Rout et al. |
| 2018/0275839 A1 | 9/2018 | Kocienda et al. |
| 2018/0276197 A1 | 9/2018 | Nell et al. |
| 2018/0277113 A1 | 9/2018 | Hartung et al. |
| 2018/0278740 A1 | 9/2018 | Choi et al. |
| 2018/0285056 A1 | 10/2018 | Cutler et al. |
| 2018/0293086 A1 | 10/2018 | Laird-McConnell et al. |
| 2018/0293984 A1 | 10/2018 | Lindahl |
| 2018/0293988 A1 | 10/2018 | Huang et al. |
| 2018/0293989 A1 | 10/2018 | De et al. |
| 2018/0299878 A1 | 10/2018 | Cella et al. |
| 2018/0300317 A1 | 10/2018 | Bradbury |
| 2018/0300400 A1 | 10/2018 | Paulus |

(56) References Cited

U.S. PATENT DOCUMENTS

| | | |
|---|---|---|
| 2018/0300608 A1 | 10/2018 | Sevrens et al. |
| 2018/0300952 A1 | 10/2018 | Evans et al. |
| 2018/0307216 A1 | 10/2018 | Ypma et al. |
| 2018/0307603 A1 | 10/2018 | Che |
| 2018/0308470 A1 | 10/2018 | Park et al. |
| 2018/0308477 A1 | 10/2018 | Nagasaka |
| 2018/0308480 A1 | 10/2018 | Jang et al. |
| 2018/0308485 A1 | 10/2018 | Kudurshian et al. |
| 2018/0308486 A1 | 10/2018 | Saddler et al. |
| 2018/0308491 A1 | 10/2018 | Oktem et al. |
| 2018/0314552 A1 | 11/2018 | Kim et al. |
| 2018/0314689 A1 | 11/2018 | Wang et al. |
| 2018/0314981 A1 | 11/2018 | Chen |
| 2018/0315415 A1 | 11/2018 | Mosley et al. |
| 2018/0315416 A1 | 11/2018 | Berthelsen et al. |
| 2018/0322112 A1 | 11/2018 | Bellegarda et al. |
| 2018/0322881 A1 | 11/2018 | Min et al. |
| 2018/0324518 A1 | 11/2018 | Dusan et al. |
| 2018/0329508 A1 | 11/2018 | Klein et al. |
| 2018/0329512 A1 | 11/2018 | Liao et al. |
| 2018/0329677 A1 | 11/2018 | Gruber et al. |
| 2018/0329957 A1 | 11/2018 | Frazzingaro et al. |
| 2018/0329982 A1 | 11/2018 | Patel et al. |
| 2018/0329998 A1 | 11/2018 | Thomson et al. |
| 2018/0330714 A1 | 11/2018 | Paulik et al. |
| 2018/0330721 A1 | 11/2018 | Thomson et al. |
| 2018/0330722 A1 | 11/2018 | Newendorp et al. |
| 2018/0330723 A1 | 11/2018 | Acero et al. |
| 2018/0330729 A1 | 11/2018 | Golipour et al. |
| 2018/0330730 A1 | 11/2018 | Garg et al. |
| 2018/0330731 A1 | 11/2018 | Zeitlin et al. |
| 2018/0330733 A1 | 11/2018 | Orr et al. |
| 2018/0330737 A1 | 11/2018 | Paulik et al. |
| 2018/0332118 A1 | 11/2018 | Phipps et al. |
| 2018/0332389 A1 | 11/2018 | Ekkizogloy et al. |
| 2018/0335903 A1 | 11/2018 | Coffman et al. |
| 2018/0336006 A1 | 11/2018 | Chakraborty et al. |
| 2018/0336049 A1 | 11/2018 | Mukherjee et al. |
| 2018/0336184 A1 | 11/2018 | Bellegarda et al. |
| 2018/0336197 A1 | 11/2018 | Skilling et al. |
| 2018/0336275 A1 | 11/2018 | Graham et al. |
| 2018/0336439 A1 | 11/2018 | Kliger et al. |
| 2018/0336449 A1 | 11/2018 | Adan et al. |
| 2018/0336880 A1 | 11/2018 | Arik et al. |
| 2018/0336885 A1 | 11/2018 | Mukherjee et al. |
| 2018/0336892 A1 | 11/2018 | Kim et al. |
| 2018/0336893 A1 | 11/2018 | Robinson et al. |
| 2018/0336894 A1 | 11/2018 | Graham et al. |
| 2018/0336904 A1 | 11/2018 | Piercy et al. |
| 2018/0336905 A1 | 11/2018 | Kim et al. |
| 2018/0336911 A1 | 11/2018 | Dahl et al. |
| 2018/0336920 A1 | 11/2018 | Bastian et al. |
| 2018/0338191 A1 | 11/2018 | Van Scheltinga et al. |
| 2018/0341643 A1 | 11/2018 | Alders et al. |
| 2018/0342243 A1 | 11/2018 | Vanblon et al. |
| 2018/0343557 A1 | 11/2018 | Naik et al. |
| 2018/0349084 A1 | 12/2018 | Nagasaka et al. |
| 2018/0349346 A1 | 12/2018 | Hatori et al. |
| 2018/0349349 A1 | 12/2018 | Bellegarda et al. |
| 2018/0349447 A1 | 12/2018 | Maccartney et al. |
| 2018/0349472 A1 | 12/2018 | Kohlschuetter et al. |
| 2018/0349728 A1 | 12/2018 | Wang et al. |
| 2018/0350345 A1 | 12/2018 | Naik |
| 2018/0350353 A1 | 12/2018 | Gruber et al. |
| 2018/0357073 A1 | 12/2018 | Johnson et al. |
| 2018/0357308 A1 | 12/2018 | Cheyer |
| 2018/0358015 A1 | 12/2018 | Cash et al. |
| 2018/0358019 A1 | 12/2018 | Mont-Reynaud |
| 2018/0365091 A1 | 12/2018 | Donaldson et al. |
| 2018/0365653 A1 | 12/2018 | Cleaver et al. |
| 2018/0366105 A1 | 12/2018 | Kim |
| 2018/0366110 A1 | 12/2018 | Hashem et al. |
| 2018/0366116 A1 | 12/2018 | Nicholson et al. |
| 2018/0373487 A1 | 12/2018 | Gruber et al. |
| 2018/0373493 A1 | 12/2018 | Watson et al. |
| 2018/0373796 A1 | 12/2018 | Rathod |
| 2018/0374484 A1 | 12/2018 | Huang et al. |
| 2019/0005024 A1 | 1/2019 | Somech et al. |
| 2019/0012141 A1 | 1/2019 | Piersol et al. |
| 2019/0012445 A1 | 1/2019 | Lesso et al. |
| 2019/0012449 A1 | 1/2019 | Cheyer |
| 2019/0012599 A1 | 1/2019 | El Kaliouby et al. |
| 2019/0013018 A1 | 1/2019 | Rekstad |
| 2019/0013025 A1 | 1/2019 | Alcorn et al. |
| 2019/0014450 A1 | 1/2019 | Gruber et al. |
| 2019/0019077 A1 | 1/2019 | Griffin et al. |
| 2019/0019508 A1 | 1/2019 | Rochford et al. |
| 2019/0020482 A1 | 1/2019 | Gupta et al. |
| 2019/0027152 A1 | 1/2019 | Huang et al. |
| 2019/0034040 A1 | 1/2019 | Shah et al. |
| 2019/0034826 A1 | 1/2019 | Ahmad et al. |
| 2019/0035385 A1 | 1/2019 | Lawson et al. |
| 2019/0035405 A1 | 1/2019 | Haughay |
| 2019/0037258 A1 | 1/2019 | Justin et al. |
| 2019/0042059 A1 | 2/2019 | Baer |
| 2019/0042627 A1 | 2/2019 | Osotio et al. |
| 2019/0043507 A1 | 2/2019 | Huang et al. |
| 2019/0044854 A1 | 2/2019 | Yang et al. |
| 2019/0045040 A1 | 2/2019 | Lee et al. |
| 2019/0051306 A1 | 2/2019 | Torama et al. |
| 2019/0051309 A1 | 2/2019 | Kim et al. |
| 2019/0057697 A1 | 2/2019 | Giuli et al. |
| 2019/0065027 A1 | 2/2019 | Hauenstein et al. |
| 2019/0065144 A1 | 2/2019 | Sumner et al. |
| 2019/0065993 A1 | 2/2019 | Srinivasan et al. |
| 2019/0066674 A1 | 2/2019 | Jaygarl et al. |
| 2019/0068810 A1 | 2/2019 | Okamoto et al. |
| 2019/0173996 A1 | 2/2019 | Butcher et al. |
| 2019/0073607 A1 | 3/2019 | Jia et al. |
| 2019/0073998 A1 | 3/2019 | Leblang et al. |
| 2019/0074009 A1 | 3/2019 | Kim et al. |
| 2019/0074015 A1 | 3/2019 | Orr et al. |
| 2019/0074016 A1 | 3/2019 | Orr et al. |
| 2019/0079476 A1 | 3/2019 | Funes |
| 2019/0079724 A1 | 3/2019 | Feuz et al. |
| 2019/0080685 A1 | 3/2019 | Johnson, Jr. |
| 2019/0080698 A1 | 3/2019 | Miller |
| 2019/0082044 A1 | 3/2019 | Olivia et al. |
| 2019/0087205 A1 | 3/2019 | Guday |
| 2019/0087412 A1 | 3/2019 | Seyed Ibrahim et al. |
| 2019/0087455 A1 | 3/2019 | He et al. |
| 2019/0090812 A1 | 3/2019 | Martin et al. |
| 2019/0095050 A1 | 3/2019 | Gruber et al. |
| 2019/0095069 A1 | 3/2019 | Proctor et al. |
| 2019/0095171 A1 | 3/2019 | Carson et al. |
| 2019/0096134 A1 | 3/2019 | Amacker et al. |
| 2019/0102145 A1 | 4/2019 | Wilberding et al. |
| 2019/0102378 A1 | 4/2019 | Piernot et al. |
| 2019/0102381 A1 | 4/2019 | Futrell et al. |
| 2019/0103103 A1 | 4/2019 | Ni et al. |
| 2019/0103112 A1 | 4/2019 | Walker et al. |
| 2019/0108834 A1 | 4/2019 | Nelson et al. |
| 2019/0114320 A1 | 4/2019 | Patwardhan et al. |
| 2019/0116264 A1 | 4/2019 | Sanghavi et al. |
| 2019/0122666 A1 | 4/2019 | Raitio et al. |
| 2019/0122692 A1 | 4/2019 | Binder et al. |
| 2019/0124019 A1 | 4/2019 | Leon et al. |
| 2019/0129499 A1 | 5/2019 | Li |
| 2019/0129615 A1 | 5/2019 | Sundar et al. |
| 2019/0132694 A1 | 5/2019 | Hanes et al. |
| 2019/0134501 A1 | 5/2019 | Feder et al. |
| 2019/0138704 A1 | 5/2019 | Shrivastava et al. |
| 2019/0139058 A1 | 5/2019 | Clark et al. |
| 2019/0139541 A1 | 5/2019 | Andersen et al. |
| 2019/0139563 A1 | 5/2019 | Chen et al. |
| 2019/0141494 A1 | 5/2019 | Gross et al. |
| 2019/0147052 A1 | 5/2019 | Lu et al. |
| 2019/0147369 A1 | 5/2019 | Gupta et al. |
| 2019/0147880 A1 | 5/2019 | Booker et al. |
| 2019/0147883 A1 | 5/2019 | Mellenthin et al. |
| 2019/0149972 A1 | 5/2019 | Parks et al. |
| 2019/0156830 A1 | 5/2019 | Devaraj et al. |
| 2019/0158994 A1 | 5/2019 | Gross et al. |
| 2019/0163667 A1 | 5/2019 | Feuz et al. |

(56) References Cited

U.S. PATENT DOCUMENTS

| | | |
|---|---|---|
| 2019/0164546 A1 | 5/2019 | Piernot et al. |
| 2019/0172243 A1 | 6/2019 | Mishra et al. |
| 2019/0172458 A1 | 6/2019 | Mishra et al. |
| 2019/0172465 A1 | 6/2019 | Lee et al. |
| 2019/0172467 A1 | 6/2019 | Kim et al. |
| 2019/0179607 A1 | 6/2019 | Thangarathnam et al. |
| 2019/0179890 A1 | 6/2019 | Evermann |
| 2019/0180749 A1 | 6/2019 | Carey et al. |
| 2019/0180750 A1 | 6/2019 | Renard et al. |
| 2019/0180770 A1 | 6/2019 | Kothari et al. |
| 2019/0182176 A1 | 6/2019 | Niewczas |
| 2019/0187787 A1 | 6/2019 | White et al. |
| 2019/0188326 A1 | 6/2019 | Daianu et al. |
| 2019/0188328 A1 | 6/2019 | Oyenan et al. |
| 2019/0189118 A1 | 6/2019 | Piernot et al. |
| 2019/0189125 A1 | 6/2019 | Van Os et al. |
| 2019/0190898 A1 | 6/2019 | Cui |
| 2019/0197053 A1 | 6/2019 | Graham et al. |
| 2019/0197119 A1 | 6/2019 | Zhang et al. |
| 2019/0213498 A1 | 7/2019 | Adjaoute |
| 2019/0213601 A1 | 7/2019 | Hackman et al. |
| 2019/0213774 A1 | 7/2019 | Jiao et al. |
| 2019/0213999 A1 | 7/2019 | Grupen et al. |
| 2019/0214024 A1 | 7/2019 | Gruber et al. |
| 2019/0220245 A1 | 7/2019 | Martel et al. |
| 2019/0220246 A1 | 7/2019 | Orr et al. |
| 2019/0220247 A1 | 7/2019 | Lemay et al. |
| 2019/0220704 A1 | 7/2019 | Schulz-Trieglaff et al. |
| 2019/0220727 A1 | 7/2019 | Dohrmann et al. |
| 2019/0222684 A1 | 7/2019 | Li et al. |
| 2019/0224049 A1 | 7/2019 | Creasy et al. |
| 2019/0228581 A1 | 7/2019 | Dascola et al. |
| 2019/0230215 A1 | 7/2019 | Zhu et al. |
| 2019/0230426 A1 | 7/2019 | Chun |
| 2019/0236130 A1 | 8/2019 | Li et al. |
| 2019/0236459 A1 | 8/2019 | Cheyer et al. |
| 2019/0237061 A1 | 8/2019 | Rusak et al. |
| 2019/0243902 A1 | 8/2019 | Saeki et al. |
| 2019/0244618 A1 | 8/2019 | Newendorp et al. |
| 2019/0251167 A1 | 8/2019 | Krishnapura Subbaraya et al. |
| 2019/0251339 A1 | 8/2019 | Hawker |
| 2019/0251960 A1 | 8/2019 | Maker et al. |
| 2019/0258852 A1 | 8/2019 | Shimauchi et al. |
| 2019/0259386 A1 | 8/2019 | Kudurshian et al. |
| 2019/0265886 A1 | 8/2019 | Moon et al. |
| 2019/0266246 A1 | 8/2019 | Wang et al. |
| 2019/0272318 A1 | 9/2019 | Suzuki et al. |
| 2019/0272818 A1 | 9/2019 | Fernandez et al. |
| 2019/0272825 A1 | 9/2019 | O'Malley et al. |
| 2019/0272831 A1 | 9/2019 | Kajarekar |
| 2019/0273963 A1 | 9/2019 | Jobanputra et al. |
| 2019/0278841 A1 | 9/2019 | Pusateri et al. |
| 2019/0279622 A1 | 9/2019 | Liu et al. |
| 2019/0281387 A1 | 9/2019 | Woo et al. |
| 2019/0287012 A1 | 9/2019 | Asli et al. |
| 2019/0287522 A1 | 9/2019 | Lambourne et al. |
| 2019/0294769 A1 | 9/2019 | Lesso |
| 2019/0294962 A1 | 9/2019 | Vezer et al. |
| 2019/0295529 A1 | 9/2019 | Tomita |
| 2019/0295540 A1 | 9/2019 | Grima |
| 2019/0295544 A1 | 9/2019 | Garcia et al. |
| 2019/0303442 A1 | 10/2019 | Peitz et al. |
| 2019/0303504 A1 | 10/2019 | Pasumarthy |
| 2019/0304438 A1 | 10/2019 | Qian et al. |
| 2019/0310765 A1 | 10/2019 | Napolitano et al. |
| 2019/0311031 A1 | 10/2019 | Powell et al. |
| 2019/0311708 A1 | 10/2019 | Bengio et al. |
| 2019/0311720 A1 | 10/2019 | Pasko |
| 2019/0318722 A1 | 10/2019 | Bromand |
| 2019/0318724 A1 | 10/2019 | Chao et al. |
| 2019/0318725 A1 | 10/2019 | Le Roux et al. |
| 2019/0318732 A1 | 10/2019 | Huang et al. |
| 2019/0318735 A1 | 10/2019 | Chao et al. |
| 2019/0318739 A1 | 10/2019 | Garg et al. |
| 2019/0324780 A1 | 10/2019 | Zhu et al. |
| 2019/0324925 A1 | 10/2019 | Toyoda et al. |
| 2019/0325081 A1 | 10/2019 | Liu et al. |
| 2019/0325866 A1 | 10/2019 | Bromand et al. |
| 2019/0333523 A1 | 10/2019 | Kim et al. |
| 2019/0335567 A1 | 10/2019 | Boudreau et al. |
| 2019/0339784 A1 | 11/2019 | Lemay et al. |
| 2019/0340252 A1 | 11/2019 | Huyghe |
| 2019/0341027 A1 | 11/2019 | Vescovi et al. |
| 2019/0341056 A1 | 11/2019 | Paulik et al. |
| 2019/0347063 A1 | 11/2019 | Liu et al. |
| 2019/0347525 A1 | 11/2019 | Liem et al. |
| 2019/0348022 A1 | 11/2019 | Park et al. |
| 2019/0349333 A1 | 11/2019 | Pickover et al. |
| 2019/0349622 A1 | 11/2019 | Kim et al. |
| 2019/0354256 A1 | 11/2019 | Karunamuni et al. |
| 2019/0354548 A1 | 11/2019 | Orr et al. |
| 2019/0355346 A1 | 11/2019 | Bellegarda |
| 2019/0355384 A1 | 11/2019 | Sereshki et al. |
| 2019/0361729 A1 | 11/2019 | Gruber et al. |
| 2019/0361978 A1 | 11/2019 | Ray et al. |
| 2019/0362252 A1 | 11/2019 | Miller et al. |
| 2019/0362557 A1 | 11/2019 | Lacey et al. |
| 2019/0369748 A1 | 12/2019 | Hindi et al. |
| 2019/0369842 A1 | 12/2019 | Dolbakian et al. |
| 2019/0369868 A1 | 12/2019 | Jin et al. |
| 2019/0370292 A1 | 12/2019 | Irani et al. |
| 2019/0370323 A1 | 12/2019 | Davidson et al. |
| 2019/0370443 A1 | 12/2019 | Lesso |
| 2019/0371315 A1 | 12/2019 | Newendorp et al. |
| 2019/0371316 A1 | 12/2019 | Weinstein et al. |
| 2019/0371317 A1 | 12/2019 | Irani et al. |
| 2019/0371331 A1 | 12/2019 | Schramm et al. |
| 2019/0372902 A1 | 12/2019 | Piersol |
| 2019/0373102 A1 | 12/2019 | Weinstein et al. |
| 2019/0377955 A1 | 12/2019 | Swaminathan et al. |
| 2019/0385043 A1 | 12/2019 | Choudhary et al. |
| 2019/0385418 A1 | 12/2019 | Mixter et al. |
| 2019/0387352 A1 | 12/2019 | Jot et al. |
| 2019/0391726 A1 | 12/2019 | Iskandar et al. |
| 2020/0012718 A1 | 1/2020 | Kung et al. |
| 2020/0019609 A1 | 1/2020 | Yu et al. |
| 2020/0020326 A1 | 1/2020 | Srinivasan et al. |
| 2020/0034421 A1 | 1/2020 | Ferrucci et al. |
| 2020/0035224 A1 | 1/2020 | Ward et al. |
| 2020/0042334 A1 | 2/2020 | Radebaugh et al. |
| 2020/0043467 A1 | 2/2020 | Qian et al. |
| 2020/0043471 A1 | 2/2020 | Ma et al. |
| 2020/0043482 A1 | 2/2020 | Gruber et al. |
| 2020/0043489 A1 | 2/2020 | Bradley et al. |
| 2020/0044485 A1 | 2/2020 | Smith et al. |
| 2020/0045164 A1 | 2/2020 | Kwatra et al. |
| 2020/0051554 A1 | 2/2020 | Kim et al. |
| 2020/0051565 A1 | 2/2020 | Singh |
| 2020/0051583 A1 | 2/2020 | Wu et al. |
| 2020/0053218 A1 | 2/2020 | Gray |
| 2020/0058299 A1 | 2/2020 | Lee et al. |
| 2020/0065601 A1 | 2/2020 | Andreassen |
| 2020/0066236 A1 | 2/2020 | Giusti et al. |
| 2020/0073629 A1 | 3/2020 | Lee et al. |
| 2020/0075018 A1 | 3/2020 | Chen |
| 2020/0075040 A1 | 3/2020 | Provost et al. |
| 2020/0076538 A1 | 3/2020 | Soultan et al. |
| 2020/0081615 A1 | 3/2020 | Yi et al. |
| 2020/0082807 A1 | 3/2020 | Kim et al. |
| 2020/0084572 A1 | 3/2020 | Jadav et al. |
| 2020/0090393 A1 | 3/2020 | Shin et al. |
| 2020/0090658 A1 | 3/2020 | Shin et al. |
| 2020/0091958 A1 | 3/2020 | Curtis et al. |
| 2020/0092625 A1 | 3/2020 | Raffle |
| 2020/0098352 A1 | 3/2020 | Feinstein et al. |
| 2020/0098362 A1 | 3/2020 | Piernot et al. |
| 2020/0098368 A1 | 3/2020 | Lemay et al. |
| 2020/0103963 A1 | 4/2020 | Kelly et al. |
| 2020/0104357 A1 | 4/2020 | Bellegarda et al. |
| 2020/0104362 A1 | 4/2020 | Yang et al. |
| 2020/0104369 A1 | 4/2020 | Bellegarda |
| 2020/0104668 A1 | 4/2020 | Sanghavi et al. |
| 2020/0105260 A1 | 4/2020 | Piernot et al. |
| 2020/0112454 A1 | 4/2020 | Brown et al. |

(56) References Cited

U.S. PATENT DOCUMENTS

| | | |
|---|---|---|
| 2020/0117717 A1 | 4/2020 | Ramamurti et al. |
| 2020/0118566 A1 | 4/2020 | Zhou |
| 2020/0118568 A1 | 4/2020 | Kudurshian et al. |
| 2020/0125820 A1 | 4/2020 | Kim et al. |
| 2020/0127988 A1 | 4/2020 | Bradley et al. |
| 2020/0134316 A1 | 4/2020 | Krishnamurthy et al. |
| 2020/0135180 A1 | 4/2020 | Mukherjee et al. |
| 2020/0135209 A1 | 4/2020 | Delfarah et al. |
| 2020/0135213 A1 | 4/2020 | Kim et al. |
| 2020/0135226 A1 | 4/2020 | Mittal et al. |
| 2020/0137230 A1 | 4/2020 | Spohrer |
| 2020/0142505 A1 | 5/2020 | Choi et al. |
| 2020/0142554 A1 | 5/2020 | Lin et al. |
| 2020/0143812 A1 | 5/2020 | Walker, II et al. |
| 2020/0143819 A1 | 5/2020 | Delcroix et al. |
| 2020/0152186 A1 | 5/2020 | Koh et al. |
| 2020/0152187 A1 | 5/2020 | Kline et al. |
| 2020/0159579 A1 | 5/2020 | Shear et al. |
| 2020/0159651 A1 | 5/2020 | Myers |
| 2020/0159801 A1 | 5/2020 | Sekine |
| 2020/0160179 A1 | 5/2020 | Chien et al. |
| 2020/0160838 A1 | 5/2020 | Lee |
| 2020/0168120 A1 | 5/2020 | Rodriguez Bravo |
| 2020/0169637 A1 | 5/2020 | Sanghavi et al. |
| 2020/0175566 A1 | 6/2020 | Bender et al. |
| 2020/0176004 A1 | 6/2020 | Kleijn et al. |
| 2020/0176018 A1 | 6/2020 | Feinauer et al. |
| 2020/0184057 A1 | 6/2020 | Mukund |
| 2020/0184964 A1 | 6/2020 | Myers et al. |
| 2020/0184966 A1 | 6/2020 | Yavagal |
| 2020/0193997 A1 | 6/2020 | Piernot et al. |
| 2020/0210142 A1 | 7/2020 | Mu et al. |
| 2020/0211566 A1 | 7/2020 | Kang et al. |
| 2020/0218074 A1 | 7/2020 | Hoover et al. |
| 2020/0218780 A1 | 7/2020 | Jun et al. |
| 2020/0218805 A1 | 7/2020 | Liu et al. |
| 2020/0219517 A1 | 7/2020 | Wang et al. |
| 2020/0220914 A1 | 7/2020 | Carrigan et al. |
| 2020/0221155 A1 | 7/2020 | Hansen et al. |
| 2020/0226481 A1 | 7/2020 | Sim et al. |
| 2020/0226823 A1 | 7/2020 | Stachniak et al. |
| 2020/0227034 A1 | 7/2020 | Summa et al. |
| 2020/0227044 A1 | 7/2020 | Lindahl |
| 2020/0228774 A1 | 7/2020 | Kar et al. |
| 2020/0243069 A1 | 7/2020 | Amores et al. |
| 2020/0243094 A1 | 7/2020 | Thomson et al. |
| 2020/0249985 A1 | 8/2020 | Zeitlin |
| 2020/0251111 A1 | 8/2020 | Temkin et al. |
| 2020/0252508 A1 | 8/2020 | Gray |
| 2020/0258508 A1 | 8/2020 | Aggarwal et al. |
| 2020/0258512 A1 | 8/2020 | Smith et al. |
| 2020/0258513 A1 | 8/2020 | Smith et al. |
| 2020/0267222 A1 | 8/2020 | Phipps et al. |
| 2020/0267503 A1 | 8/2020 | Watkins et al. |
| 2020/0272485 A1 | 8/2020 | Karashchuk et al. |
| 2020/0275216 A1 | 8/2020 | Mckinney et al. |
| 2020/0279556 A1 | 9/2020 | Gruber et al. |
| 2020/0279576 A1 | 9/2020 | Binder et al. |
| 2020/0279627 A1 | 9/2020 | Nida et al. |
| 2020/0285327 A1 | 9/2020 | Hindi et al. |
| 2020/0286472 A1 | 9/2020 | Newendorp et al. |
| 2020/0286493 A1 | 9/2020 | Orr et al. |
| 2020/0294487 A1 | 9/2020 | Donohoe et al. |
| 2020/0294494 A1 | 9/2020 | Suyama et al. |
| 2020/0294508 A1 | 9/2020 | Kwasiborski et al. |
| 2020/0298394 A1 | 9/2020 | Han et al. |
| 2020/0301950 A1 | 9/2020 | Theo et al. |
| 2020/0302356 A1 | 9/2020 | Gruber et al. |
| 2020/0302919 A1 | 9/2020 | Greborio et al. |
| 2020/0302925 A1 | 9/2020 | Shah et al. |
| 2020/0302930 A1 | 9/2020 | Chen et al. |
| 2020/0302932 A1 | 9/2020 | Schramm et al. |
| 2020/0304955 A1 | 9/2020 | Gross et al. |
| 2020/0304972 A1 | 9/2020 | Gross et al. |
| 2020/0305084 A1 | 9/2020 | Freeman et al. |
| 2020/0310513 A1 | 10/2020 | Nicholson et al. |
| 2020/0312315 A1 | 10/2020 | Li et al. |
| 2020/0312317 A1 | 10/2020 | Kothari et al. |
| 2020/0314191 A1 | 10/2020 | Madhavan et al. |
| 2020/0319850 A1 | 10/2020 | Stasior et al. |
| 2020/0320592 A1 | 10/2020 | Soule et al. |
| 2020/0320988 A1 | 10/2020 | Rastogi et al. |
| 2020/0322571 A1 | 10/2020 | Awai |
| 2020/0327895 A1 | 10/2020 | Gruber et al. |
| 2020/0333875 A1 | 10/2020 | Bansal et al. |
| 2020/0334068 A1 | 10/2020 | Krishnamurthy et al. |
| 2020/0334492 A1 | 10/2020 | Zheng et al. |
| 2020/0334524 A1 | 10/2020 | Sprague et al. |
| 2020/0335121 A1 | 10/2020 | Mosseri et al. |
| 2020/0335128 A1 | 10/2020 | Sheeder et al. |
| 2020/0342082 A1 | 10/2020 | Sapozhnykov et al. |
| 2020/0342182 A1 | 10/2020 | Premkumar et al. |
| 2020/0342849 A1 | 10/2020 | Yu et al. |
| 2020/0342863 A1 | 10/2020 | Aggarwal et al. |
| 2020/0348813 A1 | 11/2020 | Sharifi et al. |
| 2020/0356243 A1 | 11/2020 | Meyer et al. |
| 2020/0356589 A1 | 11/2020 | Rekik et al. |
| 2020/0356610 A1 | 11/2020 | Coimbra et al. |
| 2020/0356634 A1 | 11/2020 | Srinivasan et al. |
| 2020/0357387 A1 | 11/2020 | Prabhavalkar et al. |
| 2020/0357391 A1 | 11/2020 | Ghoshal et al. |
| 2020/0357406 A1 | 11/2020 | York et al. |
| 2020/0357409 A1 | 11/2020 | Sun et al. |
| 2020/0364411 A1 | 11/2020 | Evermann |
| 2020/0364858 A1 | 11/2020 | Kaethner et al. |
| 2020/0365155 A1 | 11/2020 | Milden |
| 2020/0367006 A1 | 11/2020 | Beckhardt |
| 2020/0372633 A1 | 11/2020 | Lee, II et al. |
| 2020/0372719 A1 | 11/2020 | Andjelic et al. |
| 2020/0372904 A1 | 11/2020 | Vescovi et al. |
| 2020/0372905 A1 | 11/2020 | Wang et al. |
| 2020/0374243 A1 | 11/2020 | Jina et al. |
| 2020/0379610 A1 | 12/2020 | Ford et al. |
| 2020/0379640 A1 | 12/2020 | Bellegarda et al. |
| 2020/0379726 A1 | 12/2020 | Blatz et al. |
| 2020/0379727 A1 | 12/2020 | Blatz et al. |
| 2020/0379728 A1 | 12/2020 | Gada et al. |
| 2020/0380389 A1 | 12/2020 | Eldeeb et al. |
| 2020/0380956 A1 | 12/2020 | Rossi et al. |
| 2020/0380963 A1 | 12/2020 | Chappidi et al. |
| 2020/0380966 A1 | 12/2020 | Acero et al. |
| 2020/0380973 A1 | 12/2020 | Novitchenko et al. |
| 2020/0380980 A1 | 12/2020 | Shum et al. |
| 2020/0380984 A1 | 12/2020 | Venkatraman et al. |
| 2020/0380985 A1 | 12/2020 | Gada et al. |
| 2020/0382616 A1 | 12/2020 | Vaishampayan et al. |
| 2020/0382635 A1 | 12/2020 | Vora et al. |
| 2020/0411002 A1 | 12/2020 | Lee et al. |
| 2021/0006943 A1 | 1/2021 | Gross et al. |
| 2021/0011557 A1 | 1/2021 | Lemay et al. |
| 2021/0012113 A1 | 1/2021 | Petill et al. |
| 2021/0012775 A1 | 1/2021 | Kang et al. |
| 2021/0012776 A1 | 1/2021 | Peterson et al. |
| 2021/0035556 A1 | 2/2021 | Shen et al. |
| 2021/0035567 A1 | 2/2021 | Newendorp et al. |
| 2021/0043190 A1 | 2/2021 | Wang et al. |
| 2021/0065698 A1 | 3/2021 | Topcu et al. |
| 2021/0067631 A1 | 3/2021 | Van Os et al. |
| 2021/0072953 A1 | 3/2021 | Amarilio et al. |
| 2021/0073254 A1 | 3/2021 | Ghafourifar et al. |
| 2021/0073293 A1 | 3/2021 | Fenton et al. |
| 2021/0074264 A1 | 3/2021 | Liang et al. |
| 2021/0074295 A1 | 3/2021 | Moreno et al. |
| 2021/0082400 A1 | 3/2021 | Vishnoi et al. |
| 2021/0082420 A1 | 3/2021 | Kraljic et al. |
| 2021/0089124 A1 | 3/2021 | Manjunath et al. |
| 2021/0090314 A1 | 3/2021 | Hussen et al. |
| 2021/0092128 A1 | 3/2021 | Leblang |
| 2021/0097998 A1 | 4/2021 | Kim et al. |
| 2021/0099317 A1 | 4/2021 | Hilleli et al. |
| 2021/0104232 A1 | 4/2021 | Lee et al. |
| 2021/0104236 A1 | 4/2021 | Doggett et al. |
| 2021/0105528 A1 | 4/2021 | Van Os et al. |
| 2021/0110106 A1 | 4/2021 | Vescovi et al. |

(56) References Cited

U.S. PATENT DOCUMENTS

| | | |
|---|---|---|
| 2021/0110115 A1 | 4/2021 | Moritz et al. |
| 2021/0110254 A1 | 4/2021 | Duy et al. |
| 2021/0117214 A1 | 4/2021 | Presant et al. |
| 2021/0124597 A1 | 4/2021 | Ramakrishnan et al. |
| 2021/0127031 A1 | 4/2021 | Kanemoto |
| 2021/0127220 A1 | 4/2021 | Mathieu et al. |
| 2021/0134318 A1 | 5/2021 | Harvey et al. |
| 2021/0141839 A1 | 5/2021 | Tang et al. |
| 2021/0142782 A1 | 5/2021 | Wolf et al. |
| 2021/0143987 A1 | 5/2021 | Xu et al. |
| 2021/0149629 A1 | 5/2021 | Martel et al. |
| 2021/0149996 A1 | 5/2021 | Bellegarda |
| 2021/0150151 A1 | 5/2021 | Jiaming et al. |
| 2021/0151041 A1 | 5/2021 | Gruber et al. |
| 2021/0151053 A1 | 5/2021 | Takahashi et al. |
| 2021/0151070 A1 | 5/2021 | Binder et al. |
| 2021/0152684 A1 | 5/2021 | Weinstein et al. |
| 2021/0165826 A1 | 6/2021 | Graham et al. |
| 2021/0173555 A1 | 6/2021 | Raja et al. |
| 2021/0174020 A1 | 6/2021 | Sohn et al. |
| 2021/0174022 A1 | 6/2021 | Ishikawa et al. |
| 2021/0174403 A1 | 6/2021 | Bellini et al. |
| 2021/0176521 A1 | 6/2021 | Matthews |
| 2021/0182716 A1 | 6/2021 | Muramoto et al. |
| 2021/0191603 A1 | 6/2021 | Napolitano et al. |
| 2021/0191968 A1 | 6/2021 | Orr et al. |
| 2021/0208752 A1 | 7/2021 | Hwang |
| 2021/0208841 A1 | 7/2021 | Wilberding |
| 2021/0210089 A1 | 7/2021 | Ma et al. |
| 2021/0216134 A1 | 7/2021 | Fukunaga et al. |
| 2021/0216760 A1 | 7/2021 | Dominic et al. |
| 2021/0224032 A1 | 7/2021 | Ryan et al. |
| 2021/0224474 A1 | 7/2021 | Jerome et al. |
| 2021/0233532 A1 | 7/2021 | Aram et al. |
| 2021/0247959 A1 | 8/2021 | Agarwal et al. |
| 2021/0248804 A1 | 8/2021 | Hussen Abdelaziz et al. |
| 2021/0249009 A1 | 8/2021 | Manjunath et al. |
| 2021/0256980 A1 | 8/2021 | George-Svahn et al. |
| 2021/0258554 A1 | 8/2021 | Bruls et al. |
| 2021/0258881 A1 | 8/2021 | Freeman et al. |
| 2021/0264913 A1 | 8/2021 | Schramm et al. |
| 2021/0264916 A1 | 8/2021 | Kim et al. |
| 2021/0271333 A1 | 9/2021 | Hindi et al. |
| 2021/0273894 A1 | 9/2021 | Tian et al. |
| 2021/0278956 A1 | 9/2021 | Dolbakian et al. |
| 2021/0279548 A1 | 9/2021 | Adan et al. |
| 2021/0280180 A1 | 9/2021 | Skobeltsyn et al. |
| 2021/0281965 A1 | 9/2021 | Malik et al. |
| 2021/0287080 A1 | 9/2021 | Moloney |
| 2021/0294569 A1 | 9/2021 | Piersol et al. |
| 2021/0294571 A1 | 9/2021 | Carson et al. |
| 2021/0295602 A1 | 9/2021 | Scapel et al. |
| 2021/0303116 A1 | 9/2021 | Barlow |
| 2021/0303342 A1 | 9/2021 | Dunn et al. |
| 2021/0304075 A1 | 9/2021 | Duong et al. |
| 2021/0306812 A1 | 9/2021 | Gross et al. |
| 2021/0312917 A1 | 10/2021 | Weksler et al. |
| 2021/0312930 A1 | 10/2021 | Sugaya |
| 2021/0312931 A1 | 10/2021 | Paulik et al. |
| 2021/0313019 A1 | 10/2021 | Pribanic et al. |
| 2021/0314440 A1 | 10/2021 | Matias et al. |
| 2021/0318901 A1 | 10/2021 | Gruber et al. |
| 2021/0319178 A1 | 10/2021 | Zhang |
| 2021/0327409 A1 | 10/2021 | Naik |
| 2021/0327410 A1 | 10/2021 | Beaufays et al. |
| 2021/0334528 A1 | 10/2021 | Bray et al. |
| 2021/0335342 A1 | 10/2021 | Yuan et al. |
| 2021/0342050 A1 | 11/2021 | Wang |
| 2021/0342212 A1 | 11/2021 | Neumann |
| 2021/0349605 A1 | 11/2021 | Nonaka et al. |
| 2021/0349608 A1 | 11/2021 | Blatz et al. |
| 2021/0350799 A1 | 11/2021 | Hansen et al. |
| 2021/0350803 A1 | 11/2021 | Hansen et al. |
| 2021/0350810 A1 | 11/2021 | Phipps et al. |
| 2021/0352115 A1 | 11/2021 | Hansen et al. |
| 2021/0357172 A1 | 11/2021 | Sinesio et al. |
| 2021/0358294 A1 | 11/2021 | Parashar et al. |
| 2021/0365161 A1 | 11/2021 | Ellis et al. |
| 2021/0365174 A1 | 11/2021 | Ellis et al. |
| 2021/0365641 A1 | 11/2021 | Zhang et al. |
| 2021/0365863 A1 | 11/2021 | Friske et al. |
| 2021/0366473 A1 | 11/2021 | Maeng |
| 2021/0366475 A1 | 11/2021 | Wilkosz et al. |
| 2021/0366480 A1 | 11/2021 | Lemay et al. |
| 2021/0373851 A1 | 12/2021 | Stasior et al. |
| 2021/0375275 A1 | 12/2021 | Yoon et al. |
| 2021/0375290 A1 | 12/2021 | Hu et al. |
| 2021/0377381 A1 | 12/2021 | Aggarwal et al. |
| 2021/0390259 A1 | 12/2021 | Hildick-Smith et al. |
| 2021/0390955 A1 | 12/2021 | Piernot et al. |
| 2021/0393168 A1 | 12/2021 | Santarelli et al. |
| 2021/0398187 A1 | 12/2021 | Narayanan et al. |
| 2021/0402306 A1 | 12/2021 | Huang |
| 2021/0406260 A1 | 12/2021 | Sharifi et al. |
| 2021/0407318 A1 | 12/2021 | Pitschel et al. |
| 2021/0407502 A1 | 12/2021 | Vescovi et al. |
| 2022/0004825 A1 | 1/2022 | Xie et al. |
| 2022/0013106 A1 | 1/2022 | Deng et al. |
| 2022/0019292 A1 | 1/2022 | Lemay et al. |
| 2022/0020367 A1 | 1/2022 | Orkin et al. |
| 2022/0021631 A1 | 1/2022 | Jina et al. |
| 2022/0021978 A1 | 1/2022 | Gui et al. |
| 2022/0028379 A1 | 1/2022 | Carbune et al. |
| 2022/0028387 A1 | 1/2022 | Walker et al. |
| 2022/0030345 A1 | 1/2022 | Gong et al. |
| 2022/0035999 A1 | 2/2022 | Pawelec |
| 2022/0043986 A1 | 2/2022 | Nell et al. |
| 2022/0050661 A1 | 2/2022 | Lange et al. |
| 2022/0067283 A1 | 3/2022 | Bellegarda et al. |
| 2022/0068278 A1 | 3/2022 | York et al. |
| 2022/0083986 A1 | 3/2022 | Duffy et al. |
| 2022/0084511 A1 | 3/2022 | Nickson et al. |
| 2022/0092262 A1 | 3/2022 | Ni et al. |
| 2022/0093088 A1 | 3/2022 | Sridhar et al. |
| 2022/0093095 A1 | 3/2022 | Dighe et al. |
| 2022/0093098 A1 | 3/2022 | Samal et al. |
| 2022/0093101 A1 | 3/2022 | Krishnan et al. |
| 2022/0093109 A1 | 3/2022 | Orr et al. |
| 2022/0093110 A1 | 3/2022 | Kim et al. |
| 2022/0094765 A1 | 3/2022 | Niewczas |
| 2022/0100789 A1 | 3/2022 | Kumar et al. |
| 2022/0103491 A1 | 3/2022 | Yang et al. |
| 2022/0107780 A1 | 4/2022 | Gruber et al. |
| 2022/0114327 A1 | 4/2022 | Faaborg et al. |
| 2022/0115016 A1 | 4/2022 | Whalin |
| 2022/0122615 A1 | 4/2022 | Chen et al. |
| 2022/0130126 A1 | 4/2022 | Delgado et al. |
| 2022/0139396 A1 | 5/2022 | Gada et al. |
| 2022/0148587 A1 | 5/2022 | Drummie et al. |
| 2022/0155857 A1 | 5/2022 | Lee et al. |
| 2022/0156041 A1 | 5/2022 | Newendorp et al. |
| 2022/0157310 A1 | 5/2022 | Newendorp et al. |
| 2022/0157315 A1 | 5/2022 | Raux et al. |
| 2022/0180868 A1 | 6/2022 | Sharifi et al. |
| 2022/0197491 A1 | 6/2022 | Meyer et al. |
| 2022/0198025 A1 | 6/2022 | Gupta et al. |
| 2022/0206298 A1 | 6/2022 | Goodman |
| 2022/0214775 A1 | 7/2022 | Shah et al. |
| 2022/0215159 A1 | 7/2022 | Qian et al. |
| 2022/0222437 A1 | 7/2022 | Lauber |
| 2022/0229985 A1 | 7/2022 | Bellegarda et al. |
| 2022/0230653 A1 | 7/2022 | Binder et al. |
| 2022/0253969 A1 | 8/2022 | Kamenetskaya et al. |
| 2022/0254338 A1 | 8/2022 | Gruber et al. |
| 2022/0254339 A1 | 8/2022 | Acero et al. |
| 2022/0254347 A1 | 8/2022 | Lindahl |
| 2022/0261468 A1 | 8/2022 | Lin et al. |
| 2022/0262354 A1 | 8/2022 | Greborio et al. |
| 2022/0264262 A1 | 8/2022 | Gruber et al. |
| 2022/0284901 A1 | 9/2022 | Novitchenko et al. |
| 2022/0291816 A1 | 9/2022 | Fan et al. |
| 2022/0292128 A1 | 9/2022 | Sharifi et al. |
| 2022/0293124 A1 | 9/2022 | Weinberg et al. |
| 2022/0293125 A1 | 9/2022 | Maddika et al. |

(56) References Cited

U.S. PATENT DOCUMENTS

| | | |
|---|---|---|
| 2022/0295170 A1 | 9/2022 | Ito et al. |
| 2022/0300094 A1 | 9/2022 | Hindi et al. |
| 2022/0301549 A1 | 9/2022 | Lee et al. |
| 2022/0301566 A1 | 9/2022 | Van Os et al. |
| 2022/0308718 A1 | 9/2022 | Klein et al. |
| 2022/0329691 A1 | 10/2022 | Chinthakunta et al. |
| 2022/0343066 A1 | 10/2022 | Kwong et al. |
| 2022/0366889 A1 | 11/2022 | Yerroju et al. |
| 2022/0374109 A1 | 11/2022 | Kramer et al. |
| 2022/0374110 A1 | 11/2022 | Ramaswamy et al. |
| 2022/0374597 A1 | 11/2022 | Bellegarda et al. |
| 2022/0374727 A1 | 11/2022 | Hansen et al. |
| 2022/0375466 A1 | 11/2022 | Hergenrader et al. |
| 2022/0375553 A1 | 11/2022 | Lasko et al. |
| 2022/0382843 A1 | 12/2022 | Gong et al. |
| 2022/0382994 A1 | 12/2022 | Cox et al. |
| 2022/0383044 A1 | 12/2022 | Bellegarda |
| 2022/0383864 A1 | 12/2022 | Gruber et al. |
| 2022/0383872 A1 | 12/2022 | Li et al. |
| 2022/0391585 A1 | 12/2022 | Bellegarda et al. |
| 2022/0391603 A1 | 12/2022 | Pham et al. |
| 2022/0392446 A1 | 12/2022 | Webber et al. |
| 2022/0405117 A1 | 12/2022 | Gruber et al. |
| 2022/0406301 A1 | 12/2022 | Barros et al. |
| 2022/0406309 A1 | 12/2022 | Piernot et al. |
| 2022/0408173 A1 | 12/2022 | Gong et al. |
| 2023/0013615 A1 | 1/2023 | Sanghavi et al. |
| 2023/0017115 A1 | 1/2023 | Sanghavi et al. |
| 2023/0018457 A1 | 1/2023 | Zeitlin |
| 2023/0026764 A1 | 1/2023 | Karashchuk et al. |
| 2023/0029028 A1 | 1/2023 | Aitken et al. |
| 2023/0035643 A1 | 2/2023 | Binder et al. |
| 2023/0035941 A1 | 2/2023 | Herman et al. |
| 2023/0036059 A1 | 2/2023 | Blatz et al. |
| 2023/0036798 A1 | 2/2023 | Newendorp et al. |
| 2023/0040703 A1 | 2/2023 | Lemay et al. |
| 2023/0042224 A1 | 2/2023 | Patel et al. |
| 2023/0048256 A1 | 2/2023 | Gui et al. |
| 2023/0051062 A1 | 2/2023 | Hu et al. |
| 2023/0057442 A1 | 2/2023 | Stasior et al. |
| 2023/0058929 A1 | 2/2023 | Lasko et al. |
| 2023/0066552 A1 | 3/2023 | Van Os et al. |
| 2023/0072481 A1 | 3/2023 | Acero et al. |
| 2023/0081605 A1 | 3/2023 | O'Mara et al. |
| 2023/0087244 A1 | 3/2023 | Akmal et al. |
| 2023/0098174 A1 | 3/2023 | Simes et al. |
| 2023/0111509 A1 | 4/2023 | Kim et al. |
| 2023/0112859 A1 | 4/2023 | Vilhauer et al. |
| 2023/0134970 A1 | 5/2023 | Rasipuram et al. |
| 2023/0179704 A1 | 6/2023 | Chinthakunta et al. |
| 2023/0186921 A1 | 6/2023 | Paulik et al. |
| 2023/0197063 A1 | 6/2023 | Greborio et al. |

FOREIGN PATENT DOCUMENTS

| | | |
|---|---|---|
| AU | 2015101171 A4 | 10/2015 |
| AU | 2017203668 A1 | 1/2018 |
| AU | 2018100187 A4 | 3/2018 |
| AU | 2017222436 A1 | 10/2018 |
| CA | 2666438 C | 6/2013 |
| CH | 709795 A1 | 12/2015 |
| CN | 1361516 A | 7/2002 |
| CN | 1898721 A | 1/2007 |
| CN | 101138228 A | 3/2008 |
| CN | 101247301 A | 8/2008 |
| CN | 101507179 A | 8/2009 |
| CN | 101833286 A | 9/2010 |
| CN | 101910960 A | 12/2010 |
| CN | 101971250 A | 2/2011 |
| CN | 102137085 A | 7/2011 |
| CN | 102520789 A | 6/2012 |
| CN | 102682769 A | 9/2012 |
| CN | 102693729 B | 9/2012 |
| CN | 102792320 A | 11/2012 |
| CN | 102866828 A | 1/2013 |
| CN | 102870065 A | 1/2013 |
| CN | 102882752 A | 1/2013 |
| CN | 102890936 A | 1/2013 |
| CN | 102893327 A | 1/2013 |
| CN | 102915731 A | 2/2013 |
| CN | 102917004 A | 2/2013 |
| CN | 102917271 A | 2/2013 |
| CN | 102918493 A | 2/2013 |
| CN | 102939515 A | 2/2013 |
| CN | 102955652 A | 3/2013 |
| CN | 103035240 A | 4/2013 |
| CN | 103035251 A | 4/2013 |
| CN | 103038728 A | 4/2013 |
| CN | 103064956 A | 4/2013 |
| CN | 103078995 A | 5/2013 |
| CN | 103093334 A | 5/2013 |
| CN | 103093755 A | 5/2013 |
| CN | 103105995 A | 5/2013 |
| CN | 103109249 A | 5/2013 |
| CN | 103135916 A | 6/2013 |
| CN | 103187053 A | 7/2013 |
| CN | 103197963 A | 7/2013 |
| CN | 103198831 A | 7/2013 |
| CN | 103209369 A | 7/2013 |
| CN | 103217892 A | 7/2013 |
| CN | 103226949 A | 7/2013 |
| CN | 103236260 A | 8/2013 |
| CN | 103246638 A | 8/2013 |
| CN | 103268315 A | 8/2013 |
| CN | 103277974 A | 9/2013 |
| CN | 103280218 A | 9/2013 |
| CN | 103282957 A | 9/2013 |
| CN | 103292437 A | 9/2013 |
| CN | 103324100 A | 9/2013 |
| CN | 103327063 A | 9/2013 |
| CN | 103365279 A | 10/2013 |
| CN | 103366741 A | 10/2013 |
| CN | 203249629 U | 10/2013 |
| CN | 103390016 A | 11/2013 |
| CN | 103412789 A | 11/2013 |
| CN | 103414949 A | 11/2013 |
| CN | 103426428 A | 12/2013 |
| CN | 103455135 A | 12/2013 |
| CN | 103455234 A | 12/2013 |
| CN | 103456303 A | 12/2013 |
| CN | 103456304 A | 12/2013 |
| CN | 103456306 A | 12/2013 |
| CN | 103457837 A | 12/2013 |
| CN | 103475551 A | 12/2013 |
| CN | 103477592 A | 12/2013 |
| CN | 103533143 A | 1/2014 |
| CN | 103533154 A | 1/2014 |
| CN | 103543902 A | 1/2014 |
| CN | 103546453 A | 1/2014 |
| CN | 103562863 A | 2/2014 |
| CN | 103582896 A | 2/2014 |
| CN | 103593054 A | 2/2014 |
| CN | 103595869 A | 2/2014 |
| CN | 103608859 A | 2/2014 |
| CN | 103620605 A | 3/2014 |
| CN | 103645876 A | 3/2014 |
| CN | 103677261 A | 3/2014 |
| CN | 103686723 A | 3/2014 |
| CN | 103686723 A | 4/2014 |
| CN | 103714816 A | 4/2014 |
| CN | 103716454 A | 4/2014 |
| CN | 103727948 A | 4/2014 |
| CN | 103730120 A | 4/2014 |
| CN | 103744761 A | 4/2014 |
| CN | 103748531 A | 4/2014 |
| CN | 103760984 A | 4/2014 |
| CN | 103761104 A | 4/2014 |
| CN | 103765385 A | 4/2014 |
| CN | 103778527 A | 5/2014 |
| CN | 103780758 A | 5/2014 |
| CN | 103792985 A | 5/2014 |
| CN | 103794212 A | 5/2014 |
| CN | 103795850 A | 5/2014 |
| CN | 103809548 A | 5/2014 |

(56) References Cited

FOREIGN PATENT DOCUMENTS

| | | |
|---|---|---|
| CN | 103841268 A | 6/2014 |
| CN | 103885663 A | 6/2014 |
| CN | 103902373 A | 7/2014 |
| CN | 103930945 A | 7/2014 |
| CN | 103942932 A | 7/2014 |
| CN | 103959751 A | 7/2014 |
| CN | 203721183 U | 7/2014 |
| CN | 103971680 A | 8/2014 |
| CN | 104007832 A | 8/2014 |
| CN | 102693729 B | 9/2014 |
| CN | 104036774 A | 9/2014 |
| CN | 104038621 A | 9/2014 |
| CN | 104050153 A | 9/2014 |
| CN | 104090652 A | 10/2014 |
| CN | 104092829 A | 10/2014 |
| CN | 104113471 A | 10/2014 |
| CN | 104125322 A | 10/2014 |
| CN | 104144377 A | 11/2014 |
| CN | 104145304 A | 11/2014 |
| CN | 104169837 A | 11/2014 |
| CN | 104180815 A | 12/2014 |
| CN | 104185868 A | 12/2014 |
| CN | 104219785 A | 12/2014 |
| CN | 104240701 A | 12/2014 |
| CN | 104243699 A | 12/2014 |
| CN | 104281259 A | 1/2015 |
| CN | 104281390 A | 1/2015 |
| CN | 104284257 A | 1/2015 |
| CN | 104284486 A | 1/2015 |
| CN | 104335205 A | 2/2015 |
| CN | 104335207 A | 2/2015 |
| CN | 104335234 A | 2/2015 |
| CN | 104350454 A | 2/2015 |
| CN | 104360990 A | 2/2015 |
| CN | 104374399 A | 2/2015 |
| CN | 104376250 A | 2/2015 |
| CN | 104378723 A | 2/2015 |
| CN | 104423625 A | 3/2015 |
| CN | 104423780 A | 3/2015 |
| CN | 104427104 A | 3/2015 |
| CN | 104463552 A | 3/2015 |
| CN | 104464733 A | 3/2015 |
| CN | 104487929 A | 4/2015 |
| CN | 104516522 A | 4/2015 |
| CN | 104520849 A | 4/2015 |
| CN | 104573472 A | 4/2015 |
| CN | 104575493 A | 4/2015 |
| CN | 104575501 A | 4/2015 |
| CN | 104575504 A | 4/2015 |
| CN | 104584010 A | 4/2015 |
| CN | 104584096 A | 4/2015 |
| CN | 104584601 A | 4/2015 |
| CN | 104604274 A | 5/2015 |
| CN | 104679472 A | 6/2015 |
| CN | 104685898 A | 6/2015 |
| CN | 104699746 A | 6/2015 |
| CN | 104731441 A | 6/2015 |
| CN | 104769584 A | 7/2015 |
| CN | 104769670 A | 7/2015 |
| CN | 104798012 A | 7/2015 |
| CN | 104821167 A | 8/2015 |
| CN | 104821934 A | 8/2015 |
| CN | 104836909 A | 8/2015 |
| CN | 104854583 A | 8/2015 |
| CN | 104867492 A | 8/2015 |
| CN | 104869342 A | 8/2015 |
| CN | 104951077 A | 9/2015 |
| CN | 104967748 A | 10/2015 |
| CN | 104969289 A | 10/2015 |
| CN | 104978963 A | 10/2015 |
| CN | 105025051 A | 11/2015 |
| CN | 105027197 A | 11/2015 |
| CN | 105093526 A | 11/2015 |
| CN | 105100356 A | 11/2015 |
| CN | 105144136 A | 12/2015 |
| CN | 105164678 A | 12/2015 |
| CN | 105164719 A | 12/2015 |
| CN | 105190607 A | 12/2015 |
| CN | 105247511 A | 1/2016 |
| CN | 105247551 A | 1/2016 |
| CN | 105264524 A | 1/2016 |
| CN | 105264903 A | 1/2016 |
| CN | 105265005 A | 1/2016 |
| CN | 105278681 A | 1/2016 |
| CN | 105320251 A | 2/2016 |
| CN | 105320726 A | 2/2016 |
| CN | 105338425 A | 2/2016 |
| CN | 105379234 A | 3/2016 |
| CN | 105427122 A | 3/2016 |
| CN | 105430186 A | 3/2016 |
| CN | 105468137 A | 4/2016 |
| CN | 105471705 A | 4/2016 |
| CN | 105472587 A | 4/2016 |
| CN | 105516441 A | 4/2016 |
| CN | 105554217 A | 5/2016 |
| CN | 105556592 A | 5/2016 |
| CN | 105677765 A | 6/2016 |
| CN | 105791920 A | 7/2016 |
| CN | 105808200 A | 7/2016 |
| CN | 105830048 A | 8/2016 |
| CN | 105869641 A | 8/2016 |
| CN | 105872222 A | 8/2016 |
| CN | 105917311 A | 8/2016 |
| CN | 106030699 A | 10/2016 |
| CN | 106062734 A | 10/2016 |
| CN | 106062790 A | 10/2016 |
| CN | 106164909 A | 11/2016 |
| CN | 106415412 A | 2/2017 |
| CN | 106462383 A | 2/2017 |
| CN | 106462617 A | 2/2017 |
| CN | 106463114 A | 2/2017 |
| CN | 106465074 A | 2/2017 |
| CN | 106471570 A | 3/2017 |
| CN | 106534469 A | 3/2017 |
| CN | 106558310 A | 4/2017 |
| CN | 106575195 A | 4/2017 |
| CN | 106575501 A | 4/2017 |
| CN | 106773742 A | 5/2017 |
| CN | 106776581 A | 5/2017 |
| CN | 107004412 A | 8/2017 |
| CN | 107450800 A | 12/2017 |
| CN | 107480161 A | 12/2017 |
| CN | 107491285 A | 12/2017 |
| CN | 107491468 A | 12/2017 |
| CN | 107491469 A | 12/2017 |
| CN | 107506037 A | 12/2017 |
| CN | 107545262 A | 1/2018 |
| CN | 107608998 A | 1/2018 |
| CN | 107615378 A | 1/2018 |
| CN | 107623616 A | 1/2018 |
| CN | 107786730 A | 3/2018 |
| CN | 107852436 A | 3/2018 |
| CN | 107871500 A | 4/2018 |
| CN | 107919123 A | 4/2018 |
| CN | 107924313 A | 4/2018 |
| CN | 107978313 A | 5/2018 |
| CN | 108268187 A | 7/2018 |
| CN | 108647681 A | 10/2018 |
| CN | 109447234 A | 3/2019 |
| CN | 109657629 A | 4/2019 |
| CN | 110135411 A | 8/2019 |
| CN | 110263144 A | 9/2019 |
| CN | 105164719 B | 11/2019 |
| CN | 110531860 A | 12/2019 |
| CN | 110598671 A | 12/2019 |
| CN | 110647274 A | 1/2020 |
| CN | 110825469 A | 2/2020 |
| CN | 110945840 A | 3/2020 |
| CN | 111124224 A | 5/2020 |
| CN | 107123417 B | 6/2020 |
| CN | 111316203 A | 6/2020 |
| CN | 112204507 A | 1/2021 |
| DE | 202016008226 U1 | 5/2017 |
| DK | 179570 B1 | 2/2019 |

(56) References Cited

FOREIGN PATENT DOCUMENTS

| | | |
|---|---|---|
| DK | 180129 B1 | 6/2020 |
| EP | 2551784 A1 | 1/2013 |
| EP | 2555536 A1 | 2/2013 |
| EP | 2575128 A2 | 4/2013 |
| EP | 2608610 A1 | 6/2013 |
| EP | 2632129 A1 | 8/2013 |
| EP | 2639792 A1 | 9/2013 |
| EP | 2669889 A2 | 12/2013 |
| EP | 2672229 A2 | 12/2013 |
| EP | 2672231 A2 | 12/2013 |
| EP | 2675147 A1 | 12/2013 |
| EP | 2680257 A1 | 1/2014 |
| EP | 2683147 A1 | 1/2014 |
| EP | 2683175 A1 | 1/2014 |
| EP | 2672231 A3 | 4/2014 |
| EP | 2717259 A2 | 4/2014 |
| EP | 2725577 A2 | 4/2014 |
| EP | 2733598 A2 | 5/2014 |
| EP | 2733896 A1 | 5/2014 |
| EP | 2741175 A2 | 6/2014 |
| EP | 2743846 A2 | 6/2014 |
| EP | 2760015 A1 | 7/2014 |
| EP | 2779160 A1 | 9/2014 |
| EP | 2781883 A2 | 9/2014 |
| EP | 2787683 A1 | 10/2014 |
| EP | 2801890 A1 | 11/2014 |
| EP | 2801972 A1 | 11/2014 |
| EP | 2801974 A2 | 11/2014 |
| EP | 2824564 A1 | 1/2015 |
| EP | 2849177 A1 | 3/2015 |
| EP | 2879402 A1 | 6/2015 |
| EP | 2881939 A1 | 6/2015 |
| EP | 2891049 A1 | 7/2015 |
| EP | 2915021 A2 | 9/2015 |
| EP | 2930715 A1 | 10/2015 |
| EP | 2938022 A1 | 10/2015 |
| EP | 2940556 A1 | 11/2015 |
| EP | 2947859 A1 | 11/2015 |
| EP | 2950307 A1 | 12/2015 |
| EP | 2957986 A1 | 12/2015 |
| EP | 2973380 A2 | 1/2016 |
| EP | 2985984 A2 | 2/2016 |
| EP | 2988513 A1 | 2/2016 |
| EP | 2891049 A4 | 3/2016 |
| EP | 3032532 A1 | 6/2016 |
| EP | 3035329 A1 | 6/2016 |
| EP | 3036594 A2 | 6/2016 |
| EP | 3038333 A1 | 6/2016 |
| EP | 3107101 A1 | 12/2016 |
| EP | 3115905 A1 | 1/2017 |
| EP | 3125097 A2 | 2/2017 |
| EP | 3132442 A1 | 2/2017 |
| EP | 2672231 B1 | 5/2017 |
| EP | 3161612 A1 | 5/2017 |
| EP | 3200185 A1 | 8/2017 |
| EP | 3224708 A1 | 10/2017 |
| EP | 3227771 A1 | 10/2017 |
| EP | 3246916 A1 | 11/2017 |
| EP | 3270658 A1 | 1/2018 |
| EP | 3300074 A1 | 3/2018 |
| EP | 3336805 A1 | 6/2018 |
| EP | 2973380 B1 | 8/2018 |
| EP | 2983065 B1 | 8/2018 |
| EP | 3382530 A1 | 10/2018 |
| EP | 3392876 A1 | 10/2018 |
| EP | 3401773 A1 | 11/2018 |
| EP | 2973002 B1 | 6/2019 |
| EP | 3506151 A1 | 7/2019 |
| EP | 3550483 A1 | 10/2019 |
| EP | 3567584 A1 | 11/2019 |
| EP | 3588912 A1 | 1/2020 |
| EP | 3323058 B1 | 2/2020 |
| EP | 3321928 B1 | 4/2020 |
| EP | 4131256 A1 | 2/2023 |
| JP | 63-280559 A | 11/1988 |
| JP | 10-276483 A | 10/1998 |
| JP | 2002-281170 A | 9/2002 |
| JP | 2004-086150 A | 3/2004 |
| JP | 2004-258809 A | 9/2004 |
| JP | 2006-050115 A | 2/2006 |
| JP | 2006-118221 A | 5/2006 |
| JP | 2006-137366 A | 6/2006 |
| JP | 2006-203518 A | 8/2006 |
| JP | 2006-308848 A | 11/2006 |
| JP | 2007-235602 A | 9/2007 |
| JP | 2008-076811 A | 4/2008 |
| JP | 2009-110300 A | 5/2009 |
| JP | 2011-250027 A | 12/2011 |
| JP | 2013-37688 A | 2/2013 |
| JP | 2013-46171 A | 3/2013 |
| JP | 2013-511214 A | 3/2013 |
| JP | 2013-65284 A | 4/2013 |
| JP | 2013-73240 A | 4/2013 |
| JP | 2013-513315 A | 4/2013 |
| JP | 2013-80476 A | 5/2013 |
| JP | 2013-88535 A | 5/2013 |
| JP | 2013-517566 A | 5/2013 |
| JP | 2013-131087 A | 7/2013 |
| JP | 2013-134430 A | 7/2013 |
| JP | 2013-134729 A | 7/2013 |
| JP | 2013-140520 A | 7/2013 |
| JP | 2013-527947 A | 7/2013 |
| JP | 2013-528012 A | 7/2013 |
| JP | 2013-148419 A | 8/2013 |
| JP | 2013-156349 A | 8/2013 |
| JP | 2013-174987 A | 9/2013 |
| JP | 2013-535059 A | 9/2013 |
| JP | 2013-200265 A | 10/2013 |
| JP | 2013-200423 A | 10/2013 |
| JP | 2013-205999 A | 10/2013 |
| JP | 2013-231655 A | 11/2013 |
| JP | 2013-238935 A | 11/2013 |
| JP | 2013-238936 A | 11/2013 |
| JP | 2013-248292 A | 12/2013 |
| JP | 2013-257694 A | 12/2013 |
| JP | 2013-258600 A | 12/2013 |
| JP | 2014-2586 A | 1/2014 |
| JP | 2014-10688 A | 1/2014 |
| JP | 2014-502445 A | 1/2014 |
| JP | 2014-26629 A | 2/2014 |
| JP | 2014-45449 A | 3/2014 |
| JP | 2014-507903 A | 3/2014 |
| JP | 2014-60600 A | 4/2014 |
| JP | 2014-72586 A | 4/2014 |
| JP | 2014-77969 A | 5/2014 |
| JP | 2014-89711 A | 5/2014 |
| JP | 2014-109889 A | 6/2014 |
| JP | 2014-124332 A | 7/2014 |
| JP | 2014-126600 A | 7/2014 |
| JP | 2014-127754 A | 7/2014 |
| JP | 2014-140121 A | 7/2014 |
| JP | 2014-518409 A | 7/2014 |
| JP | 2014-142566 A | 8/2014 |
| JP | 2014-145842 A | 8/2014 |
| JP | 2014-146940 A | 8/2014 |
| JP | 2014-150323 A | 8/2014 |
| JP | 2014-519648 A | 8/2014 |
| JP | 2014-182042 A | 9/2014 |
| JP | 2014-524627 A | 9/2014 |
| JP | 2014-191272 A | 10/2014 |
| JP | 2014-219614 A | 11/2014 |
| JP | 2014-222514 A | 11/2014 |
| JP | 2015-1931 A | 1/2015 |
| JP | 2015-4928 A | 1/2015 |
| JP | 2015-8001 A | 1/2015 |
| JP | 2015-10979 A | 1/2015 |
| JP | 2015-12301 A | 1/2015 |
| JP | 2015-18365 A | 1/2015 |
| JP | 2015-501022 A | 1/2015 |
| JP | 2015-501034 A | 1/2015 |
| JP | 2015-504619 A | 2/2015 |
| JP | 2015-41845 A | 3/2015 |
| JP | 2015-52500 A | 3/2015 |
| JP | 2015-60423 A | 3/2015 |

(56) References Cited

FOREIGN PATENT DOCUMENTS

| | | |
|---|---|---|
| JP | 2015-81971 A | 4/2015 |
| JP | 2015-83938 A | 4/2015 |
| JP | 2015-94848 A | 5/2015 |
| JP | 2015-514254 A | 5/2015 |
| JP | 2015-519675 A | 7/2015 |
| JP | 2015-520409 A | 7/2015 |
| JP | 2015-524974 A | 8/2015 |
| JP | 2015-526776 A | 9/2015 |
| JP | 2015-527683 A | 9/2015 |
| JP | 2015-528140 A | 9/2015 |
| JP | 2015-528918 A | 10/2015 |
| JP | 2015-531909 A | 11/2015 |
| JP | 2016-504651 A | 2/2016 |
| JP | 2016-35614 A | 3/2016 |
| JP | 2016-508007 A | 3/2016 |
| JP | 2016-71247 A | 5/2016 |
| JP | 2016-119615 A | 6/2016 |
| JP | 2016-151928 A | 8/2016 |
| JP | 2016-524193 A | 8/2016 |
| JP | 2016-156845 A | 9/2016 |
| JP | 2016-536648 A | 11/2016 |
| JP | 2017-11608 A | 1/2017 |
| JP | 2017-19331 A | 1/2017 |
| JP | 2017-516153 A | 6/2017 |
| JP | 2017-123187 A | 7/2017 |
| JP | 2017-211608 A | 11/2017 |
| JP | 2017-537361 A | 12/2017 |
| JP | 2018-14086 A | 1/2018 |
| JP | 6291147 B1 | 2/2018 |
| JP | 2018-64297 A | 3/2018 |
| JP | 2018-64297 A | 4/2018 |
| JP | 2018-511095 A | 4/2018 |
| JP | 2018-101242 A | 6/2018 |
| JP | 2018-113035 A | 7/2018 |
| JP | 2018-525653 A | 9/2018 |
| JP | 2018-525950 A | 9/2018 |
| JP | 2018-536889 A | 12/2018 |
| KR | 10-2013-0035983 A | 4/2013 |
| KR | 10-2013-0086750 A | 8/2013 |
| KR | 10-2013-0090947 A | 8/2013 |
| KR | 10-2013-0108563 A | 10/2013 |
| KR | 10-1334342 B1 | 11/2013 |
| KR | 10-2013-0131252 A | 12/2013 |
| KR | 10-2013-0133629 A | 12/2013 |
| KR | 10-2014-0007282 A | 1/2014 |
| KR | 10-2014-0024271 A | 2/2014 |
| KR | 10-2014-0025996 A | 3/2014 |
| KR | 10-2014-0031283 A | 3/2014 |
| KR | 10-2014-0033574 A | 3/2014 |
| KR | 10-2014-0042994 A | 4/2014 |
| KR | 10-2014-0048779 A | 4/2014 |
| KR | 10-2014-0055204 A | 5/2014 |
| KR | 10-2014-0059697 A | 5/2014 |
| KR | 10-2014-0068752 A | 6/2014 |
| KR | 10-2014-0071208 A | 6/2014 |
| KR | 10-2014-0088449 A | 7/2014 |
| KR | 10-2014-0093949 A | 7/2014 |
| KR | 10-2014-0106715 A | 9/2014 |
| KR | 10-2014-0107253 A | 9/2014 |
| KR | 10-2014-0147557 A | 12/2014 |
| KR | 10-2015-0006454 A | 1/2015 |
| KR | 10-2015-0013631 A | 2/2015 |
| KR | 10-2015-0025059 A | 3/2015 |
| KR | 10-1506510 B1 | 3/2015 |
| KR | 10-2015-0038375 A | 4/2015 |
| KR | 10-2015-0039380 A | 4/2015 |
| KR | 10-2015-0041974 A | 4/2015 |
| KR | 10-2015-0043512 A | 4/2015 |
| KR | 10-1510013 B1 | 4/2015 |
| KR | 10-2015-0062811 A | 6/2015 |
| KR | 10-2015-0095624 A | 8/2015 |
| KR | 10-1555742 B1 | 9/2015 |
| KR | 10-2015-0113127 A | 10/2015 |
| KR | 10-2015-0131262 A | 11/2015 |
| KR | 10-2015-0138109 A | 12/2015 |
| KR | 10-2016-0004351 A | 1/2016 |
| KR | 10-2016-0010523 A | 1/2016 |
| KR | 10-2016-0040279 A | 4/2016 |
| KR | 10-2016-0055839 A | 5/2016 |
| KR | 10-2016-0065503 A | 6/2016 |
| KR | 10-2016-0101079 A | 8/2016 |
| KR | 10-2016-0101198 A | 8/2016 |
| KR | 10-2016-0105847 A | 9/2016 |
| KR | 10-2016-0121585 A | 10/2016 |
| KR | 10-2016-0127165 A | 11/2016 |
| KR | 10-2016-0140694 A | 12/2016 |
| KR | 10-2016-0147854 A | 12/2016 |
| KR | 10-2017-0004482 A | 1/2017 |
| KR | 10-2017-0036805 A | 4/2017 |
| KR | 10-2017-0096774 A | 8/2017 |
| KR | 10-2017-0104006 A | 9/2017 |
| KR | 10-2017-0107058 A | 9/2017 |
| KR | 10-1776673 B1 | 9/2017 |
| KR | 10-2018-0032632 A | 3/2018 |
| KR | 10-2018-0034637 A | 4/2018 |
| KR | 10-2018-0122837 A | 11/2018 |
| KR | 10-2018-0133525 A | 12/2018 |
| KR | 10-2018-0135877 A | 12/2018 |
| KR | 10-1959328 B1 | 3/2019 |
| KR | 10-2020-0007926 A | 1/2020 |
| KR | 10-2020-0105519 A | 9/2020 |
| RU | 2012141604 A | 4/2014 |
| TW | 201312548 A | 3/2013 |
| TW | 201407184 A | 2/2014 |
| TW | 201610982 A | 3/2016 |
| TW | 201629750 A | 8/2016 |
| WO | 2000/75903 A2 | 12/2000 |
| WO | 2008/085205 A2 | 7/2008 |
| WO | 2008/130095 A1 | 10/2008 |
| WO | 2011/084156 A2 | 7/2011 |
| WO | 2011/088053 A2 | 7/2011 |
| WO | 2011/116309 A1 | 9/2011 |
| WO | 2012/033312 A1 | 3/2012 |
| WO | 2012/092562 A1 | 7/2012 |
| WO | 2012/145227 A1 | 10/2012 |
| WO | 2012/167168 A2 | 12/2012 |
| WO | 2012/173902 A2 | 12/2012 |
| WO | 2013/009578 A2 | 1/2013 |
| WO | 2013/022135 A1 | 2/2013 |
| WO | 2013/022223 A2 | 2/2013 |
| WO | 2013/048880 A1 | 4/2013 |
| WO | 2013/049358 A1 | 4/2013 |
| WO | 2013/057153 A1 | 4/2013 |
| WO | 2013/101489 A1 | 7/2013 |
| WO | 2013/118988 A1 | 8/2013 |
| WO | 2013/122310 A1 | 8/2013 |
| WO | 2013/128999 A1 | 9/2013 |
| WO | 2013/133533 A1 | 9/2013 |
| WO | 2013/137660 A1 | 9/2013 |
| WO | 2013/163113 A1 | 10/2013 |
| WO | 2013/163857 A1 | 11/2013 |
| WO | 2013/169842 A2 | 11/2013 |
| WO | 2013/173504 A1 | 11/2013 |
| WO | 2013/173511 A2 | 11/2013 |
| WO | 2013/176847 A1 | 11/2013 |
| WO | 2013/184953 A1 | 12/2013 |
| WO | 2013/184990 A1 | 12/2013 |
| WO | 2014/003138 A1 | 1/2014 |
| WO | 2014/004544 A2 | 1/2014 |
| WO | 2014/008461 A1 | 1/2014 |
| WO | 2014/018580 A1 | 1/2014 |
| WO | 2014/021967 A1 | 2/2014 |
| WO | 2014/022148 A1 | 2/2014 |
| WO | 2014/028735 A2 | 2/2014 |
| WO | 2014/028797 A1 | 2/2014 |
| WO | 2014/031505 A1 | 2/2014 |
| WO | 2014/032461 A1 | 3/2014 |
| WO | 2014/040022 A2 | 3/2014 |
| WO | 2014/046475 A1 | 3/2014 |
| WO | 2014/047047 A1 | 3/2014 |
| WO | 2014/048855 A1 | 4/2014 |
| WO | 2014/066352 A1 | 5/2014 |
| WO | 2014/070872 A2 | 5/2014 |
| WO | 2014/073825 A1 | 5/2014 |

(56) References Cited

FOREIGN PATENT DOCUMENTS

| | | |
|---|---|---|
| WO | 2014/078965 A1 | 5/2014 |
| WO | 2014/093339 A1 | 6/2014 |
| WO | 2014/093911 A2 | 6/2014 |
| WO | 2014/096506 A1 | 6/2014 |
| WO | 2014/124332 A2 | 8/2014 |
| WO | 2014/137074 A1 | 9/2014 |
| WO | 2014/138604 A1 | 9/2014 |
| WO | 2014/143959 A2 | 9/2014 |
| WO | 2014/144395 A2 | 9/2014 |
| WO | 2014/144579 A1 | 9/2014 |
| WO | 2014/144949 A2 | 9/2014 |
| WO | 2014/149473 A1 | 9/2014 |
| WO | 2014/151153 A2 | 9/2014 |
| WO | 2014/124332 A3 | 10/2014 |
| WO | 2014/159578 A1 | 10/2014 |
| WO | 2014/159581 A1 | 10/2014 |
| WO | 2014/162570 A1 | 10/2014 |
| WO | 2014/169269 A1 | 10/2014 |
| WO | 2014/173189 A1 | 10/2014 |
| WO | 2013/173504 A8 | 12/2014 |
| WO | 2014/197336 A1 | 12/2014 |
| WO | 2014/197339 A1 | 12/2014 |
| WO | 2014/197635 A2 | 12/2014 |
| WO | 2014/197730 A1 | 12/2014 |
| WO | 2014/200728 A1 | 12/2014 |
| WO | 2014/200731 A1 | 12/2014 |
| WO | 2014/203495 A1 | 12/2014 |
| WO | 2014/204659 A2 | 12/2014 |
| WO | 2014/209264 A1 | 12/2014 |
| WO | 2014/210392 A2 | 12/2014 |
| WO | 2015/018440 A1 | 2/2015 |
| WO | 2015/020942 A1 | 2/2015 |
| WO | 2015/029379 A1 | 3/2015 |
| WO | 2015/030796 A1 | 3/2015 |
| WO | 2015/036817 A1 | 3/2015 |
| WO | 2015/041882 A1 | 3/2015 |
| WO | 2015/041892 A1 | 3/2015 |
| WO | 2015/047932 A1 | 4/2015 |
| WO | 2015/053485 A1 | 4/2015 |
| WO | 2015/054141 A1 | 4/2015 |
| WO | 2015/080530 A1 | 6/2015 |
| WO | 2015/084659 A1 | 6/2015 |
| WO | 2015/092943 A1 | 6/2015 |
| WO | 2015/094169 A1 | 6/2015 |
| WO | 2015/094369 A1 | 6/2015 |
| WO | 2015/098306 A1 | 7/2015 |
| WO | 2015/099939 A1 | 7/2015 |
| WO | 2015/112625 A1 | 7/2015 |
| WO | 2015/116151 A1 | 8/2015 |
| WO | 2015/121449 A1 | 8/2015 |
| WO | 2015/127404 A1 | 8/2015 |
| WO | 2015/151133 A1 | 10/2015 |
| WO | 2015/153310 A1 | 10/2015 |
| WO | 2015/157013 A1 | 10/2015 |
| WO | 2015/183368 A1 | 12/2015 |
| WO | 2015/183401 A1 | 12/2015 |
| WO | 2015/183699 A1 | 12/2015 |
| WO | 2015/184186 A1 | 12/2015 |
| WO | 2015/184387 A1 | 12/2015 |
| WO | 2015/200207 A1 | 12/2015 |
| WO | 2016/004074 A1 | 1/2016 |
| WO | 2016/027933 A1 | 2/2016 |
| WO | 2016/028946 A1 | 2/2016 |
| WO | 2016/033257 A1 | 3/2016 |
| WO | 2016/039992 A1 | 3/2016 |
| WO | 2016/040721 A1 | 3/2016 |
| WO | 2016/045192 A1 | 3/2016 |
| WO | 2016/048789 A1 | 3/2016 |
| WO | 2016/049439 A1 | 3/2016 |
| WO | 2016/051519 A1 | 4/2016 |
| WO | 2016/052164 A1 | 4/2016 |
| WO | 2016/054230 A1 | 4/2016 |
| WO | 2016/057268 A1 | 4/2016 |
| WO | 2016/075081 A1 | 5/2016 |
| WO | 2016/085775 A2 | 6/2016 |
| WO | 2016/085776 A1 | 6/2016 |
| WO | 2016/089029 A1 | 6/2016 |
| WO | 2016/100139 A1 | 6/2016 |
| WO | 2016/111881 A1 | 7/2016 |
| WO | 2016/118344 A1 | 7/2016 |
| WO | 2016/144840 A1 | 9/2016 |
| WO | 2016/144982 A1 | 9/2016 |
| WO | 2016/144983 A1 | 9/2016 |
| WO | 2016/175354 A1 | 11/2016 |
| WO | 2016/187149 A1 | 11/2016 |
| WO | 2016/190950 A1 | 12/2016 |
| WO | 2016/191737 A2 | 12/2016 |
| WO | 2016/209444 A1 | 12/2016 |
| WO | 2016/209924 A1 | 12/2016 |
| WO | 2017/044160 A1 | 3/2017 |
| WO | 2017/044257 A1 | 3/2017 |
| WO | 2017/044260 A1 | 3/2017 |
| WO | 2017/044629 A1 | 3/2017 |
| WO | 2017/053311 A1 | 3/2017 |
| WO | 2017/058293 A1 | 4/2017 |
| WO | 2017/059388 A1 | 4/2017 |
| WO | 2017/071420 A1 | 5/2017 |
| WO | 2017/142116 A1 | 8/2017 |
| WO | 2017/160487 A1 | 9/2017 |
| WO | 2017/200777 A1 | 11/2017 |
| WO | 2017/203484 A1 | 11/2017 |
| WO | 2017/210035 A1 | 12/2017 |
| WO | 2017/213678 A1 | 12/2017 |
| WO | 2017/213682 A1 | 12/2017 |
| WO | 2017/218194 A1 | 12/2017 |
| WO | 2018/009397 A1 | 1/2018 |
| WO | 2018/014788 A1 | 1/2018 |
| WO | 2018/044633 A1 | 3/2018 |
| WO | 2018/057269 A1 | 3/2018 |
| WO | 2018/067528 A1 | 4/2018 |
| WO | 2018/075170 A1 | 4/2018 |
| WO | 2018/081833 A1 | 5/2018 |
| WO | 2018/090060 A1 | 5/2018 |
| WO | 2018/176053 A1 | 9/2018 |
| WO | 2018/208506 A1 | 11/2018 |
| WO | 2018/209152 A1 | 11/2018 |
| WO | 2018/213401 A1 | 11/2018 |
| WO | 2018/213415 A1 | 11/2018 |
| WO | 2018/213481 A1 | 11/2018 |
| WO | 2018/217014 A1 | 11/2018 |
| WO | 2018/231307 A1 | 12/2018 |
| WO | 2019/067930 A1 | 4/2019 |
| WO | 2019/078576 A1 | 4/2019 |
| WO | 2019/079017 A1 | 4/2019 |
| WO | 2019/143397 A1 | 7/2019 |
| WO | 2019/147429 A1 | 8/2019 |
| WO | 2019/190646 A2 | 10/2019 |
| WO | 2019/236217 A1 | 12/2019 |
| WO | 2020/010530 A1 | 1/2020 |
| WO | 2020/022572 A1 | 1/2020 |
| WO | 2020/096706 A1 | 5/2020 |
| WO | 2020/109074 A1 | 6/2020 |
| WO | 2020/208302 A1 | 10/2020 |
| WO | 2020/214006 A1 | 10/2020 |
| WO | 2021/054565 A1 | 3/2021 |
| WO | 2021/061349 A1 | 4/2021 |
| WO | 2021/062148 A1 | 4/2021 |
| WO | 2021/188439 A1 | 9/2021 |
| WO | 2021/252230 A1 | 12/2021 |
| WO | 2022/047214 A2 | 3/2022 |

OTHER PUBLICATIONS

Apple, "Apple previews innovative accessibility features combining the power of hardware, software, and machine learning", Available online at: https://www.apple.com/newsroom/2022/05/apple-previews-innovative-accessibility-features/, May 17, 2022, 10 pages.

Badshah et al., "Deep Features-based Speech Emotion Recognition For Smart Affective Services", Multimedia Tools and Applications, Oct. 31, 2017, pp. 5571-5589.

Bao et al., "Detecting Target Objects by Natural Language Instructions Using an RGB-D Camera", Sensors (Basel, Switzerland) 2016, 16(12), 2117, Dec. 13, 2016, 23 pages.

(56) References Cited

OTHER PUBLICATIONS

Burgbacher et al., "Synthetic Word Gesture Generation for Stroke-Based Virtual Keyboards", IEEE Transactions on Human-Machine Systems, vol. 47, No. 2, Apr. 2017, 14 pages.
"Cake", Online Available at: <https://web.archive.org/web/20170808091948/https://emojipedia.org/search/?q=cake>, Aug. 8, 2017, 5 pages.
Castellini, Rick, "How to enable and use dictation with an iPhone or iPad", Online Available at: <https://www.youtube.com/watch?v=8w133yN6rTU>, Sep. 7, 2017, 3 pages.
"Context-Sensitive User Interface", Online available at: https://web.archive.org/web/20190407003349/https://en.wikipedia.org/wiki/Context-sensitive_user_interface, Apr. 7, 2019, 3 pages.
Creswell et al., "Generative Adversarial Networks", IEEE Signal Processing Magazine, Jan. 2018, pp. 53-65.
Decision on Appeal received for Korean Patent Application No. 10-2021-7038446, mailed on May 31, 2023, 38 pages (3 page of English Translation and 35 pages of Official Copy).
Fitzpatrick, Aidan, "Introducing Camo 1.5: AR modes", Available Online at: "https://reincubate.com/blog/camo-ar-modes-release/", Oct. 28, 2021, 8 pages.
Gomes et al., "Mining Recurring Concepts in a Dynamic Feature Space", IEEE Transactions on Neural Networks and Learning Systems, vol. 25, No. 1, Jul. 31, 2013, pp. 95-110.
Hanqing et al., "Deep Learning of Instruction Intention Understanding Using Stacked Denoising Autoencoder", Journal of Shanghai Jiaotong University, vol. 50, No. 7, Jul. 28, 2016, 6 pages (Official Copy only). {See communication under 37 CFR § 1.98(a) (3)}.
Hook et al., "Automatic speech based emotion recognition using paralinguistics features", Bulletin of the Polish Academy of Sciences, Technical Sciences, vol. 67, No. 3, 2019, pp. 479-488.
"How to adjust the order of control center buttons on iPhone iOS12 version after buying a mobile phone", Available online at: https://jingyan.baidu.com/article/5bbb5albbe5a9713eba1791b.html?, Jun. 14, 2019, 4 pages (Official Copy only). {See communication under 37 CFR § 1.98(a) (3)}.
Li et al., "Deep neural network for short-text sentiment classification", International Conference on Database Systems for Advanced Applications, Springer, Cham, 2016, 8 pages.
Mehri et al., "Multi-Granularity Representations of Dialog", Language Technologies Institute, Carnegie Mellon University, arXiv:1908.09890v1, Aug. 26, 2019, 10 pages.
Michalevsky et al., "Gyrophone: Recognizing Speech from Gyroscope Signals", Proceedings of the 23rd USENIX Security Symposium, Aug. 20-22, 2014, pp. 1053-1067.
Myers, Brad A., "Shortcutter for Palm", Available at: <http://www.cs.cmu.edu/~pebbles/v5/shortcutter/palm/index.html>, retrieved on Jun. 18, 2014, 10 pages.
Myrick et al., "How to Insert Emojis Using Your Voice with Google Assistant", Online available at: <https://web.archive.org/web/20211107160722/https://www.androidcentral.com/how-insert-emojis-using-your-voice-google-assistant>, Nov. 7, 2021, 11 pages.
"Nuance Dragon Naturally Speaking", Version 13 End-User Workbook, Nuance Communications Inc., Sep. 2014, 125 pages.
Products for Pals—Als Tech, "Skyle for iPad Pro eye gaze control real world review", Online Available at: <https://www.youtube.com/watch?v=_3TxZtDJpFo>, Aug. 13, 2020, 4 pages.
"Working with the Dragon Bar", Nuance Communications Inc., Jun. 27, 2016, 2 pages.
Zhao et al., "Transferring Age and Gender Attributes for Dimensional Emotion Prediction from Big Speech Data Using Hierarchical Deep Learning", 2018 4th IEEE International Conference on Big Data Security on Cloud, 2018, pp. 20-24.
Zhang et al., "A Fiber-Optic Sensor for Acoustic Emission Detection in a High Voltage Cable System", Online Available at: https://www.mdpi.com/1424-8220/16/12/2026, Nov. 30, 2016, 11 pages.
Zhang et al., "Compact Acoustic Modeling Based On Acoustic Manifold Using A Mixture Of Factor Analyzers", Workshop on Automatic Speech Recognition and Understanding, 2013, 6 pages.
Zhang et al., "Voicemoji: Emoji Entry Using Voice for Visually Impaired People", CHI '21, May 8-13, 2021, 18 pages.
Hanqing et al., "Deep Learning of Instruction Intention Understanding Using Stacked Denoising Autoencoder", Journal of Shanghai Jiaotong University, vol. 50, No. 7, Jul. 28, 2016, 6 pages.
"How to adjust the order of control center buttons on iPhone iOS12 version after buying a mobile phone", Available online at: https://jingyan.baidu.com/article/5bbb5albbe5a9713eba1791b.html?, Jun. 14, 2019, 4 pages.
Office Action received for European Patent Application No. 21151452.6, mailed on Nov. 9, 2023, 6 pages.
Office Action received for Japanese Patent Application No. 2022-140998, mailed on Oct. 27, 2023, 8 pages (4 pages of English Translation and 4 pages of Official Copy).
Abdelaziz et al., "Speaker-Independent Speech-Driven Visual Speech Synthesis using Domain-Adapted Acoustic Models", May 15, 2019, 9 pages.
Accessibility on iOS, Apple Inc., Online available at: https://developer.apple.com/accessibility/ios/, Retrieved on Jul. 26, 2021, 2 pages.
"Alexa, Turn Up the Heat!, Smartthings Samsung [online]", Online available at:—<https://web.archive.org/web/20160329142041/https://blog.smartthings.com/news/smartthingsupdates/alexa-turn-up-the-heat/>, Mar. 3, 2016, 3 pages.
Alsharif et al., "Long Short-Term Memory Neural Network for Keyboard Gesture Decoding", IEEE International Conference on Acoustics, Speech and Signal Processing (ICASSP), Brisbane, Australia, Sep. 2015, 5 pages.
Anania Peter, "Amazon Echo with Home Automation (Smartthings)", Online available at:—<https://www.youtube.com/watch?v=LMW6aXmsWNE>, Dec. 20, 2015, 1 page.
Android Authority, "How to use Tasker: A Beginner's Guide", Online available at:—<https://youtube.com/watch?v=rDpdS_YWzFc>, May 1, 2013, 1 page.
Apple Differential Privacy Team, "Learning with Privacy at Scale", Apple Machine Learning Blog, vol. 1, No. 8, Online available at: <https://machinelearning.apple.com/2017/12/06/learning-with-privacy-at-scale.html>, Dec. 2017, 9 pages.
Apple, "VoiceOver for OS X", Online available at:—<http://www.apple.com/accessibility/voiceover/>, May 19, 2014, pp. 1-3.
Applicant-Initiated Interview Summary received for U.S. Appl. No. 16/174,046, mailed on Feb. 4, 2020, 5 pages.
Applicant-Initiated Interview Summary received for U.S. Appl. No. 16/175,208, mailed on Feb. 4, 2020, 5 pages.
Asakura et al., "What LG thinks; How the TV should be in the Living Room", HiVi, vol. 31, No. 7, Stereo Sound Publishing, Inc., Jun. 17, 2013, pp. 68-71.
Ashingtondctech & Gaming, "SwipeStatusBar—Reveal the Status Bar in a Fullscreen App", Online Available at: <https://www.youtube.com/watch?v=wA_tT9lAreQ>, Jul. 1, 2013, 3 pages.
"Ask Alexa—Things That Are Smart Wiki", Online available at:—<http://thingsthataresmart.wiki/index.php?title=Ask_Alexa&oldid=4283>, Jun. 8, 2016, pp. 1-31.
Automate Your Life, "How to Setup Google Home Routines—A Google Home Routines Walkthrough", Online Available at: <https://www.youtube.com/watch?v=pXokZHP9kZg>, Aug. 12, 2018, 1 page.
Bell, Jason, "Machine Learning Hands-On for Developers and Technical Professionals", Wiley, 2014, 82 pages.
Bellegarda, Jeromer, "Chapter 1: Spoken Language Understanding for Natural Interaction: The Siri Experience", Natural Interaction with Robots, Knowbots and Smartphones, 2014, pp. 3-14.
beointegration.com, "BeoLink Gateway—Programming Example", Online Available at: <https:/ /www.youtube.com/watch?v=TXDaJFm5UH4>, Mar. 4, 2015, 3 pages.
Bodapati et al., "Neural Word Decomposition Models for Abusive Language Detection", Proceedings of the Third Workshop on Abusive Language Online, Aug. 1, 2019, pp. 135-145.
Burgess, Brian, "Amazon Echo Tip: Enable the Wake Up Sound", Online available at:—<https://www.groovypost.com/howto/amazon-echo-tip-enable-wake-up-sound/>, Jun. 30, 2015, 4 pages.
Büttner et al., "The Design Space of Augmented and Virtual Reality Applications for Assistive Environments in Manufacturing: A Visual

(56) References Cited

OTHER PUBLICATIONS

Approach", In Proceedings of the 10th International Conference on PErvasive Technologies Related to Assistive Environments (PETRA '17), Island of Rhodes, Greece, Online available at: https://dl.acm.org/doi/pdf/10.1145/3056540.3076193, Jun. 21-23, 2017, pp. 433-440.
Cambria et al., "Jumping NLP curves: A Review of Natural Language Processing Research.", IEEE Computational Intelligence magazine, 2014, vol. 9, May 2014, pp. 48-57.
Chang et al., "Monaural Multi-Talker Speech Recognition with Attention Mechanism and Gated Convolutional Networks", Interspeech 2018, Sep. 2-6, 2018, pp. 1586-1590.
Chen et al., "A Convolutional Neural Network with Dynamic Correlation Pooling", 13th International Conference on Computational Intelligence and Security, IEEE, 2017, pp. 496-499.
Chen et al., "Progressive Joint Modeling in Unsupervised Single-Channel Overlapped Speech Recognition", IEEE/ACM Transactions On Audio, Speech, And Language Processing, vol. 26, No. 1, Jan. 2018, pp. 184-196.
Chen, Angela, "Amazon's Alexa now handles patient health information", Available online at: <https://www.theverge.com/2019/4/4/18295260/amazon-hipaa-alexa-echo-patient-health-information-privacy-voice-assistant>, Apr. 4, 2019, 2 pages.
Chenghao, Yuan, "MacroDroid", Online available at: https://www.ifanr.com/weizhizao/612531, Jan. 25, 2016, 7 pages.
Colt, Sam, "Here's One Way Apple's Smartwatch Could Be Better Than Anything Else", Business Insider, Aug. 21, 2014, pp. 1-4.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
Corrected Notice of Allowance received for U.S. Appl. No. 14/503,105, mailed on Aug. 28, 2018, 2 pages.
Corrected Notice of Allowance received for U.S. Appl. No. 14/503,105, mailed on Sep. 6, 2018, 2 pages.
Corrected Notice of Allowance received for U.S. Appl. No. 16/174,046, mailed on Mar. 23, 2020, 2 pages.
Corrected Notice of Allowance received for U.S. Appl. No. 17/540,942, mailed on Apr. 19, 2023, 2 pages.
Czech Lucas, "A System for Recognizing Natural Spelling of English Words", Diploma Thesis, Karlsruhe Institute of Technology, May 7, 2014, 107 pages.
Dai, et al., "Transformer-XL: Attentive Language Models Beyond a Fixed-Length Context", Online available at: arXiv:1901.02860v3, Jun. 2, 2019, 20 pages.
Decision on Appeal received for Korean Patent Application No. 10-2021-7001610, mailed on Feb. 22, 2022, 30 pages.
Decision to Grant received for European Patent Application No. 15718294.0, mailed on Jan. 21, 2021, 2 pages.
Decision to Refuse received for Japanese Patent Application No. 2021-067225, mailed on Jul. 8, 2022, 4 pages.
Deedeevuu, "Amazon Echo Alarm Feature", Online available at:—<https://www.youtube.com/watch?v=fdjU8eRLk7c>, Feb. 16, 2015, 1 page.
Delcroix et al., "Context Adaptive Deep Neural Networks For Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
Derrick, Amanda, "How to Set Up Google Home for Multiple Users", Lifewire, Online available at:—<https://www.lifewire.com/set-up-google-home-multiple-users-4685691>, Jun. 8, 2020, 9 pages.
Dighe et al., "Lattice-Based Improvements for Voice Triggering Using Graph Neural Networks", in 2020 IEEE International Conference on Acoustics, Speech and Signal Processing (ICASSP), Jan. 25, 2020, 5 pages.
Dihelson, "How Can I Use Voice or Phrases as Triggers to Macrodroid?", Macrodroid Forums, Online Available At:—<https://www.tapatalk.com/groups/macrodroid/how-can-i-use-voice-or-phrases-as-triggers-to-macr-t4845.html>, May 9, 2018, 5 pages.

"DirecTV™ Voice", Now Part of the DirectTV Mobile App for Phones, Sep. 18, 2013, 5 pages.
Dwork et al., "The Algorithmic Foundations of Differential Privacy", Foundations and Trends in Theoretical Computer Science: vol. 9: No. 3-4, 211-407, 2014, 281 pages.
Earthling 1984, "Samsung Galaxy Smart Stay Feature Explained", Online available at:—<https://www.youtube.com/watch?v=RpjBNtSjupI>, May 29, 2013, 1 page.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Edim, et al., "A Multi-Agent Based Virtual Personal Assistant for E-Health Service", Journal of Information Engineering and Applications, vol. 3, No. 11, 2013, 9 pages.
Examiner's Pre-Review Report received for Japanese Patent Application No. 2019-007866, mailed on Jun. 29, 2021, 4 pages.
Extended European Search Report received for European Patent Application No. 21151452.6, mailed on Apr. 29, 2021, 10 pages.
Filipowicz, Luke, "How to use the QuickType keyboard in iOS 8", Online available at:—<https://www.imore.com/comment/568232>, Oct. 11, 2014, pp. 1-17.
Final Office Action received for U.S. Appl. No. 14/503,105, mailed on May 20, 2016, 45 pages.
Gadget Hacks, "Tasker Too Complicated? Give MacroDroid a Try [How-To]", Online available at: <https://www.youtube.com/watch?v=8YL9cWCykKc>, May 27, 2016, 1 page.
"Galaxy S7: How to Adjust Screen Timeout & Lock Screen Timeout", Online available at:—<https://www.youtube.com/watch?v=n6e1WKUS2ww>, Jun. 9, 2016, 1 page.
Ganin et al., "Unsupervised Domain Adaptation by Backpropagation", in Proceedings of the 32nd International Conference on Machine Learning, vol. 37, Jul. 2015, 10 pages.
Gatys et al., "Image Style Transfer Using Convolutional Neural Networks", Proceedings of IEEE International Conference on Acoustics, Speech and Signal Processing (ICASSP), 2016, pp. 2414-2423.
Geyer et al., "Differentially Private Federated Learning: A Client Level Perspective", arXiv:1712.07557v2, Mar. 2018, 7 pages.
Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Goodfellow et al., "Generative Adversarial Networks", Proceedings of the Neural Information Processing Systems, Dec. 2014, 9 pages.
Google Developers, "Voice search in your app", Online available at:—<https://www.youtube.com/watch?v=PS1FbB5qWEI>, Nov. 12, 2014, 1 page.
Gu et al., "BadNets: Evaluating Backdooring Attacks on Deep Neural Networks", IEEE Access, vol. 7, Mar. 21, 2019, pp. 47230-47244.
Guim, Mark, "How to Set a Person-Based Reminder with Cortana", Online available at:—<http://www.wpcentral.com/how-to-person-based-reminder-cortana>, Apr. 26, 2014, 15 pages.
Guo et al., "StateLens: A Reverse Engineering Solution for Making Existing Dynamic Touchscreens Accessible", In Proceedings of the 32nd Annual Symposium on User Interface Software and Technology (UIST '19), New Orleans, LA, USA, Online available at: https://dl.acm.org/doi/pdf/10.1145/3332165.3347873, Oct. 20-23, 2019, pp. 371-385.
Guo et al., "Time-Delayed Bottleneck Highway Networks Using a DFT Feature for Keyword Spotting", IEEE International Conference on Acoustics, Speech and Signal Processing (ICASSP). IEEE, 2018, 5 pages.
Guo et al., "VizLens: A Robust and Interactive Screen Reader for Interfaces in the Real World", In Proceedings of the 29th Annual Symposium on User Interface Software and Technology (UIST '16), Tokyo, Japan, Online available at: https://dl.acm.org/doi/pdf/10.1145/2984511.2984518, Oct. 16-19, 2016, pp. 651-664.
Gupta et al., "I-vector-based Speaker Adaptation Of Deep Neural Networks For French Broadcast Audio Transcription", ICASSP, 2014, 2014, pp. 6334-6338.

(56) References Cited

OTHER PUBLICATIONS

Gupta, Naresh, "Inside Bluetooth Low Energy", Artech House, 2013, 274 pages.
Haung et al., "A Study for Improving Device-Directed Speech Detection Toward Frictionless Human-Machine Interaction", in Proc. Interspeech, 2019, 5 pages.
Hawkeye, "Hawkeye—A better user testing platform", Online Available at: https://www.youtube.com/watch?v=el0TW0g_76o, Oct. 16, 2019, 3 pages.
Hawkeye, "Learn where people look in your products", Online Available at: https://www.usehawkeye.com, 2019, 6 pages.
"Headset Button Controller v7.3 APK Full APP Download for Andriod, Blackberry, iPhone", Online available at:—<http://fullappdownload.com/headset-button-controller-v7-3-apk/>, Jan. 27, 2014, 11 pages.
Heller et al., "AudioScope: Smartphones as Directional Microphones in Mobile Audio Augmented Reality Systems", In Proceedings of the 33rd Annual ACM Conference on Human Factors in Computing Systems (CHI '15), Crossings, Seoul, Korea, Online available at: https://dl.acm.org/doi/pdf/10.1145/2702123.2702159, Apr. 18-23, 2015, pp. 949-952.
Henderson et al., "Efficient Natural Language Response Suggestion for Smart Reply", Available Online at: https://static.googleusercontent.com/media/research.google.com/en//pubs/archive/1846e8a466c079eae7e90727e27caf5f98f10e0c.pdf, 2017, 15 pages.
Hershey et al., "Deep Clustering: Discriminative Embeddings For Segmentation And Separation", Proc. ICASSP, Mar. 2016, 6 pages.
"Hey Google: How to Create a Shopping List with Your Google Assistant", Online available at:—<https://www.youtube.com/watch?v=w9NCsElax1Y>, May 25, 2018, 1 page.
Hinton et al., "Distilling the Knowledge in A Neural Network", arXiv preprintarXiv:1503.02531, Mar. 2, 2015, 9 pages.
"How To Enable Google Assistant on Galaxy S7 and Other Android Phones (No Root)", Online available at:—<https://www.youtube.com/watch?v=HekIQbWyksE>, Mar. 20, 2017, 1 page.
"How to Use Ok Google Assistant Even Phone is Locked", Online available at:—<https://www.youtube.com/watch?v=9B_gP4j_SP8>, Mar. 12, 2018, 1 page.
Hutsko et al., "iPhone All-in-One For Dummies", 3rd Edition, 2013, 98 pages.
id3.org, "id3v2.4.0—Frames", Online available at:—<http://id3.org/id3v2.4.0-frames?action=print>, retrieved on Jan. 22, 2015, pp. 1-41.
Idasallinen, "What's The 'Like' Meter Based on?", Online Available at:—<https://community.spotify.com/t5/Content-Questions/What-s-the-like-meter-based-on/td-p/1209974>, Sep. 22, 2015, 6 pages.
Ikeda, Masaru, "beGLOBAL Seoul 2015 Startup Battle: Talkey", YouTube Publisher, Online Available at:—<https://www.youtube.com/watch?v=4Wkp7sAAldg>, May 14, 2015, 1 page.
Inews and Tech, "How To Use The QuickType Keyboard In IOS 8", Online available at:—<http://www.inewsandtech.com/how-to-use-the-quicktype-keyboard-in-ios-8/>, Sep. 17, 2014, 6 pages.
"iPhone 6 Smart Guide Full Version for SoftBank", Gijutsu-Hyohron Co., Ltd., vol. 1, Dec. 1, 2014, 4 pages.
"Interactive Voice", Online available at:—<http://www.helloivee.com/company/>, retrieved on Feb. 10, 2014, 2 pages.
Intention to Grant received for European Patent Application No. 15718294.0, mailed on Sep. 4, 2020, 6 pages.
International Preliminary Report on Patentability received for PCT Patent Application No. PCT/US2015/023593, mailed on Dec. 15, 2016, 12 pages.
International Search Report and Written Opinion received for PCT Patent Application No. PCT/US2015/023593, mailed on Aug. 14, 2015, 16 pages.
Internet Services and Social Net, "How to Search for Similar Websites", Online available at:—<https://www.youtube.com/watch?v=nLf2uirpt5s>, see from 0:17 to 1:06, Jul. 4, 2013, 1 page.
Isik et al., "Single-Channel Multi-Speaker Separation using Deep Clustering", Interspeech 2016, Sep. 8-12, 2016, pp. 545-549.
Jeon et al., "Voice Trigger Detection from LVCSR Hypothesis Lattices Using Bidirectional Lattice Recurrent Neural Networks", International Conference on Acoustics, Speech and Signal Processing (ICASSP). IEEE, Feb. 29, 2020, 5 pages.
Jonsson et al., "Proximity-based Reminders Using Bluetooth", 2014 IEEE International Conference on Pervasive Computing and Communications Demonstrations, 2014, pp. 151-153.
Kannan et al., "Smart Reply: Automated Response Suggestion for Email", Available Online at: https://arxiv.org/pdf/1606.04870.pdf, Jun. 15, 2016, 10 pages.
Karn, Ujjwal, "An Intuitive Explanation of Convolutional Neural Networks", The Data Science Blog, Aug. 11, 2016, 23 pages.
Kastrenakes, Jacob, "Siri's creators will unveil their new AI bot on Monday", The Verge, Online available at:—<https://web.archive.org/web/20160505090418/https://www.theverge.com/2016/5/4/11593564/viv-labs-unveiling-monday-new-ai-from-siri-creators>, May 4, 2016, 3 pages.
Kickstarter, "Ivee Sleek: Wi-Fi Voice-Activated Assistant", Online available at:—<https://www.kickstarter.com/projects/ivee/ivee-sleek-wi-fi-voice-activated-assistant>, retrieved on Feb. 10, 2014, pp. 1-13.
King et al., "Robust Speech Recognition Via Anchor Word Representations", Interspeech 2017, Aug. 20-24, 2017, pp. 2471-2475.
Kondrat, Tomek, "Automation for Everyone with MacroDroid", Online available at: https://www.xda-developers.com/automation-for-everyone-with-macrodroid/, Nov. 17, 2013, 6 pages.
Kruger et al., "Virtual World Accessibility with the Perspective Viewer", Proceedings of ICEAPVI, Athens, Greece, Feb. 12-14, 2015, 6 pages.
Kumar, Shiu, "Ubiquitous Smart Home System Using Android Application", International Journal of Computer Networks & Communications (IJCNC) vol. 6, No. 1, Jan. 2014, pp. 33-43.
Kumatani et al., "Direct Modeling of Raw Audio with DNNS For Wake Word Detection", in 2017 IEEE Automatic Speech Recognition and Understanding Workshop (ASRU), 2017, 6 pages.
Lee, Sungjin, "Structured Discriminative Model For Dialog State Tracking", Proceedings of the SIGDIAL 2013 Conference, Aug. 22-24, 2013, pp. 442-451.
Lin, Luyuan, "An Assistive Handwashing System with Emotional Intelligence", Using Emotional Intelligence in Cognitive Intelligent Assistant Systems, 2014, 101 pages.
"Link Your Voice to Your Devices with Voice Match, Google Assistant Help", Online available at: <https://support.google.com/assistant/answer/9071681?co=GENIE.Platform%3DAndroid&hl=en>, Retrieved on Jul. 1, 2020, 2 pages.
Liou et al., "Autoencoder for Words", Neurocomputing, vol. 139, Sep. 2014, pp. 84-96.
Liu et al., "Accurate Endpointing with Expected Pause Duration", Sep. 6-10, 2015, pp. 2912-2916.
Loukides et al., "What Is the Internet of Things?", O'Reilly Media, Inc., Online Available at: <https://www.oreilly.com/library/view/what-is-the/9781491975633/>, 2015, 31 pages.
Luo et al., "Speaker-Independent Speech Separation With Deep Attractor Network", IEEE/ACM Transactions On Audio, Speech, And Language Processing, vol. 26, No. 4, Apr. 2018, pp. 787-796.
Maas et al., "Combining Acoustic Embeddings And Decoding Features for End-Of-Utterance Detection in Real-Time Far-Field Speech Recognition Systems", in 2018 IEEE International Conference on Acoustics, Speech and Signal Processing (ICASSP). IEEE,, 2018, 5 pages.
Mallidi et al., "Device-Directed Utterance Detection", Proc. Interspeech, Aug. 7, 2018, 4 pages.
Marketing Land,"Amazon Echo: Play music", Online Available at:—<https://www.youtube.com/watch?v=A7V5NPbsXi4>, Apr. 27, 2015, 3 pages.
"Meet Ivee, Your Wi-Fi Voice Activated Assistant", Availale Online at:—<http://www.helloivee.com/>, retrieved on Feb. 10, 2014, 8 pages.
"Method to Provide Remote Voice Navigation Capability on the Device", ip.com, Jul. 21, 2016, 4 pages.
Mhatre et al., "Donna Interactive Chat-bot acting as a Personal Assistant", International Journal of Computer Applications (0975-8887), vol. 140, No. 10, Apr. 2016, 6 pages.

(56) References Cited

OTHER PUBLICATIONS

Microsoft Soundscape—A map delivered in 3D sound, Microsoft Research, Online available at: https://www.microsoft.com/en-us/research/product/soundscape/, Retrieved on Jul. 26, 2021, 5 pages.
Mikolov et al., "Linguistic Regularities in Continuous Space Word Representations", Proceedings of NAACL-HLT, Jun. 9-14, 2013, pp. 746-751.
Miller Chance, "Google Keyboard Updated with New Personalized Suggestions Feature", Online available at:—<http://9to5google.com/2014/03/19/google-keyboard-updated-with-new-personalized-suggestions-feature/>, Mar. 19, 2014, 4 pages.
Mnih et al., "Human-Level Control Through Deep Reinforcement Learning", Nature, vol. 518, Feb. 26, 2015, pp. 529-533.
Modern Techies, "Braina-Artificial Personal Assistant for PC(like Cortana, Siri)!!!!", Online available at: <https://www.youtube.com/watch?v=_Coo2P8ilqQ>, Feb. 24, 2017, 3 pages.
Müller et al., "A Taxonomy for Information Linking in Augmented Reality", AVR 2016, Part I, LNCS 9768, 2016, pp. 368-387.
Muller et al., "Control Theoretic Models of Pointing", ACM Transactions on Computer—Human Interaction, Aug. 2017, 36 pages.
Nakamura et al., "Study of Methods to Diminish Spoilers of Sports Match: Potential of a Novel Concept "Information Clouding"", vol. 54, No. 4, ISSN: 1882-7764. Online available at: <https://ipsj.ixsq.nii.ac.jp/ej/index.php?active_action=repository_view_main_item_detail&page_id=13&block_id=8&item_id=91589&item_no=1>, Apr. 2013, pp. 1402-1412.
"Natural Language Interface Using Constrained Intermediate Dictionary of Results", List of Publications Manually reviewed for the Search of U.S. Pat. No. 7,177,798, Mar. 22, 2013, 1 page.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Non-Final Office Action received for U.S. Appl. No. 14/503,105, mailed on Dec. 8, 2015., 31 pages.
Non-Final Office Action received for U.S. Appl. No. 16/174,046, mailed on Jan. 2, 2020, 9 pages.
Non-Final Office Action received for U.S. Appl. No. 16/175,208, mailed on Nov. 27, 2019., 13 pages.
Norouzian et al., "Exploring Attention Mechanism for Acoustic based Classification of Speech Utterances into System-Directed and Non-System-Directed", International Conference on Acoustics, Speech and Signal Processing (ICASSP). IEEE, Feb. 1, 2019, 5 pages.
Notice of Acceptance received for Australian Patent Application No. 2015267612, mailed on Jan. 3, 2018, 3 pages.
Notice of Acceptance received for Australian Patent Application No. 2018201834, mailed on Sep. 30, 2019, 3 pages.
Notice of Acceptance received for Australian Patent Application No. 2020200103, mailed on May 6, 2021, 3 pages.
Notice of Acceptance received for Australian Patent Application No. 2021218051, mailed on Sep. 8, 2022, 3 pages.
Notice of Allowance received for Chinese Patent Application No. 201580028666.0, mailed on Jun. 4, 2020, 5 pages.
Notice of Allowance received for Chinese Patent Application No. 202010735884.0, mailed on Aug. 1, 2022, 2 pages.
Notice of Allowance received for Chinese Patent Application No. 202010736257.9, mailed on Aug. 30, 2021, 5 pages.
Notice of Allowance received for Japanese Patent Application No. 2016-564974, mailed on Dec. 21, 2018, 4 pages.
Notice of Allowance received for Japanese Patent Application No. 2019-007866, mailed on Nov. 7, 2022, 3 pages.
Notice of Allowance received for Japanese Patent Application No. 2021-067225, mailed on Nov. 28, 2022, 4 pages.
Notice of Allowance received for Korean Patent Application No. 10-2016-7032258, mailed on Jul. 30, 2018, 3 pages.
Notice of Allowance received for Korean Patent Application No. 10-2018-7031452, mailed on Dec. 27, 2019, 4 pages.
Notice of Allowance received for U.S. Appl. No. 14/503,105, mailed on Aug. 14, 2018, 8 pages.
Notice of Allowance received for U.S. Appl. No. 16/174,046, mailed on Feb. 27, 2020, 14 pages.
Notice of Allowance received for U.S. Appl. No. 16/175,208, mailed on Feb. 26, 2020, 8 pages.
Notice of Allowance received for U.S. Appl. No. 16/881,625, mailed on Sep. 1, 2021, 11 pages.
Notice of Allowance received for U.S. Appl. No. 17/540,942, mailed on Feb. 24, 2023, 10 pages.
Office Action received for Australian Patent Application No. 2015267612, mailed on Jun. 13, 2017, 4 pages.
Office Action received for Australian Patent Application No. 2018201834, mailed on Mar. 22, 2019, 6 pages.
Office Action received for Australian Patent Application No. 2020200103, mailed on Aug. 31, 2020, 4 pages.
Office Action received for Australian Patent Application No. 2021218051, mailed on Jun. 3, 2022, 2 pages.
Office Action received for Chinese Patent Application No. 201580028666.0, mailed on Feb. 3, 2020, 6 pages.
Office Action received for Chinese Patent Application No. 201580028666.0, mailed on Jun. 20, 2019, 18 pages.
Office Action received for Chinese Patent Application No. 201580028666.0, mailed on Nov. 5, 2018, 19 pages.
Office Action received for Chinese Patent Application No. 202010735884.0, mailed on Aug. 9, 2021, 10 pages.
Office Action received for Chinese Patent Application No. 202010735884.0, mailed on Feb. 16, 2022, 10 pages.
Office Action received for Chinese Patent Application No. 202010735884.0, mailed on Mar. 10, 2021, 15 pages.
Office Action received for Chinese Patent Application No. 202010736257.9, mailed on Mar. 19, 2021, 16 pages.
Office Action received for European Patent Application No. 15718294.0, mailed on Nov. 6, 2018, 7 pages.
Office Action received for European Patent Application No. 15718294.0, mailed on Nov. 13, 2019, 8 pages.
Office Action received for European Patent Application No. 21151452.6, mailed on Sep. 9, 2022, 7 pages.
Office Action received for Japanese Patent Application No. 2016-564974, mailed on Jan. 4, 2018., 9 pages.
Office Action received for Japanese Patent Application No. 2019-007866, mailed on Apr. 24, 2020, 14 pages.
Office Action received for Japanese Patent Application No. 2019-007866, mailed on Dec. 14, 2020, 4 pages.
Office Action received for Japanese Patent Application No. 2019-007866, mailed on May 6, 2022, 28 pages.
Office Action received for Japanese Patent Application No. 2021-067225, mailed on Feb. 7, 2022, 6 pages.
Office Action received for Japanese Patent Application No. 2021-067225, mailed on Sep. 6, 2021, 7 pages.
Office Action received for Korean Patent Application No. 10-2016-7032258, mailed on Mar. 29, 2018, 6 pages.
Office Action received for Korean Patent Application No. 10-2016-7032258, mailed on Sep. 13, 2017, 15 pages.
Office Action received for Korean Patent Application No. 10-2018-7031452, mailed on Feb. 14, 2019, 11 pages.
Office Action received for Korean Patent Application No. 10-2018-7031455, mailed on Dec. 16, 2020, 7 pages.
Office Action received for Korean Patent Application No. 10-2018-7031455, mailed on Oct. 20, 2020, 6 pages.
Office Action received for Korean Patent Application No. 10-2018-7031455, mailed on Oct. 29, 2019, 9 pages.
Office Action received for Korean Patent Application No. 10-2021-7001610, mailed on Apr. 23, 2021, 12 pages.
Office Action received for Korean Patent Application No. 10-2021-7001610, mailed on Jan. 7, 2022, 2 pages.
Office Action received for Korean Patent Application No. 10-2021-7001610, mailed on Oct. 25, 2021, 6 pages.
Office Action received for Korean Patent Application No. 10-2021-7038446, mailed on Aug. 26, 2022, 7 pages.
Office Action received for Korean Patent Application No. 10-2021-7038446, mailed on Dec. 14, 2022, 7 pages.
Office Action received for Korean Patent Application No. 10-2021-7038446, mailed on Feb. 23, 2022, 12 pages.
Office Action received for Korean Patent Application No. 10-2022-7013616, mailed on Dec. 18, 2022, 12 pages.

(56) References Cited

OTHER PUBLICATIONS

Office Action received for Korean Patent Application No. 10-2018-7031455, mailed on Feb. 3, 2019, 16 pages.
Office Action received for Taiwanese Patent Application No. 104112907, mailed on Jun. 12, 2020, 10 pages.
Office Action received for Taiwanese Patent Application No. 104112907, mailed on Nov. 26, 2015, 5 pages.
OSXDaily, "Get a List of Siri Commands Directly from Siri", Online available at:—<http://osxdaily.com/2013/02/05/list-siri-commands/>, Feb. 5, 2013, 15 pages.
Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.
Pathak et al., "Privacy-preserving Speech Processing: Cryptographic and String-matching Frameworks Show Promise", In: IEEE signal processing magazine, Online available at:—<http://www.merl.com/publications/docs/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
Pavlopoulos et al., "ConvAI at SemEval-2019 Task 6: Offensive Language Identification and Categorization with Perspective and BERT", Proceedings of the 13th International Workshop on Semantic Evaluation (SemEval-2019), Jun. 6-7, 2019, pp. 571-576.
PC Mag, "How to Voice Train Your Google Home Smart Speaker", Online available at: <https://in.pcmag.com/google-home/126520/how-to-voice-train-your-google-home-smart-speaker>, Oct. 25, 2018, 12 pages.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Perlow, Jason, "Alexa Loop Mode with Playlist for Sleep Noise", Online Available at: <https://www.youtube.com/watch?v=nSkSuXziJSg>, Apr. 11, 2016, 3 pages.
Philips, Chris, "Thumbprint Radio: A Uniquely Personal Station Inspired By All of Your Thumbs Up", Pandora News, Online Available at:—<https://blog.pandora.com/author/chris-phillips/>, Dec. 14, 2015, 7 pages.
Ping, et al., "Deep Voice 3: Scaling Text to Speech with Convolutional Sequence Learning", Available online at: https://arxiv.org/abs/1710.07654, Feb. 22, 2018, 16 pages.
pocketables.com, "AutoRemote example profile", Online available at: https://www.youtube.com/watch?v=kC_zhUnNZj8, Jun. 25, 2013, 1 page.
"Pose, Cambridge Dictionary Definition of Pose", Available online at: <https://dictionary.cambridge.org/dictionary/english/pose>, 4 pages.
"Quick Type Keyboard on iOS 8 Makes Typing Easier", Online available at:—<https://www.youtube.com/watch?v=0CldLR4fhVU>, Jun. 3, 2014, 3 pages.
"Radio Stations Tailored to You Based on the Music You Listen to on iTunes", Apple Announces iTunes Radio, Press Release, Jun. 10, 2013, 3 pages.
Qian et al., "Single-channel Multi-talker Speech Recognition With Permutation Invariant Training", Speech Communication, Issue 104, 2018, pp. 1-11.
Rasch, Katharina, "Smart Assistants for Smart Homes", Doctoral Thesis in Electronic and Computer Systems, 2013, 150 pages.
Raux, Antoine, "High-Density Dialog Management The Topic Stack", Adventures in High Density, Online available at: https://medium.com/adventures-in-high-density/high-density-dialog-management-23efcf91db1e, Aug. 1, 2018, 10 pages.
Ravi, Sujith, "Google AI Blog: On-device Machine Intelligence", Available Online at: https://ai.googleblog.com/2017/02/on-device-machine-intelligence.html, Feb. 9, 2017, 4 pages.
Rios Mafe, "New Bar Search for Facebook", YouTube, available at:—<https://www.youtube.com/watch?v=vwgN1WbvCas>, Jul. 19, 2013, 2 pages.

Ritchie, Rene, "QuickType keyboard in iOS 8: Explained", Online Available at:—<https://www.imore.com/quicktype-keyboards-ios-8-explained>, Jun. 21, 2014, pp. 1-19.
Robbins, F Mike, "Automatically place an Android Phone on Vibrate at Work", Available online at: https://mikefrobbins.com/2016/07/21/automatically-place-an-android-phone-on-vibrate-at-work/, Jul. 21, 2016, pp. 1-11.
Rodrigues et al., "Exploring Mixed Reality in Specialized Surgical Environments", In Proceedings of the 2017 CHI Conference Extended Abstracts on Human Factors in Computing Systems (CHI EA '17), Denver, CO, USA, Online available at: https://dl.acm.org/doi/pdf/10.1145/3027063.3053273, May 6-11, 2017, pp. 2591-2598.
Ross et al., "Epidemiology as a Framework for Large-Scale Mobile Application Accessibility Assessment", In Proceedings of the 19th International ACM SIGACCESS Conference on Computers and Accessibility (ASSETS '17), Baltimore, MD, USA, Online available at: https://dl.acm.org/doi/pdf/10.1145/3132525.3132547, Oct. 29-Nov. 1, 2017, pp. 2-11.
Routines, "SmartThings Support", Online available at:—<https://web.archive.org/web/20151207165701/https://support.smartthings.com/hc/en-us/articles/205380034-Routines>, 2015, 3 pages.
Rowland et al., "Designing Connected Products: UX for the Consumer Internet of Things", O'Reilly, May 2015, 452 pages.
Samsung Support, "Create a Quick Command in Bixby to Launch Custom Settings by at Your Command", Online Available at:—<https://www.facebook.com/samsungsupport/videos/10154746303151213>, Nov. 13, 2017, 1 page.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Schenk et al., "GazeEverywhere: Enabling Gaze-only User Interaction on an Unmodified Desktop PC in Everyday Scenarios", In Proceedings of the 2017 CHI Conference on Human Factors in Computing Systems (CHI'17). ACM, New York, NY, 30343044. Online Available at: https://doi.org/10.1145/3025453.3025455, May 6-11, 2017, 11 pages.
Seehafer Brent, "Activate Google Assistant on Galaxy S7 with Screen off", Online available at:—<https://productforums.google.com/forum/#!topic/websearch/lp3qlGBHLVI>, Mar. 8, 2017, 4 pages.
Selfridge et al., "Interact: Tightly-coupling Multimodal Dialog with an Interactive Virtual Assistant", International Conference on Multimodal Interaction, ACM, Nov. 9, 2015, pp. 381-382.
Senior et al., "Improving DNN Speaker Independence With I-Vector Inputs", ICASSP, 2014, pp. 225-229.
Seroter et al., "SOA Patterns with BizTalk Server 2013 and Microsoft Azure", Packt Publishing, Jun. 2015, 454 pages.
Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Sigtia et al., "Efficient Voice Trigger Detection for Low Resource Hardware", in Proc. Interspeech 2018, Sep. 2-6, 2018, pp. 2092-2096.
Sigtia et al., "Multi-Task Learning for Voice Trigger Detection", in IEEE International Conference on Acoustics, Speech and Signal Processing (ICASSP), 2020, Apr. 20, 2020, 5 pages.
Simonite, Tom, "Confronting Siri: Microsoft Launches Digital Assistant Cortana", 2014, 2 pages.
Siou, Serge, "How To Control Apple TV 3rd Generation Using Remote app", Online available at: <https://www.youtube.com/watch?v=PhyKftZ0S9M>, May 12, 2014, 3 pages.
"Skilled at Playing my iPhone 5", Beijing Hope Electronic Press, Jan. 2013, 6 pages.
"SmartThings +Amazon Echo", Smartthings Samsung [online], Online available at:—<https://web.archive.org/web/20160509231428/https://blog.smartthings.com/featured/alexa-turn-on-my-smartthings/>, Aug. 21, 2015, 3 pages.
Smith, Jake, "Amazon Alexa Calling: How to Set it up and Use it on Your Echo", iGeneration, May 30, 2017, 5 pages.
Speicher et al., "What is Mixed Reality?", In Proceedings of the 2019 CHI Conference on Human Factors in Computing Systems

(56) References Cited

OTHER PUBLICATIONS (CHI '19). ACM, Article 537, Glasgow, Scotland, UK, Online available at: https://dl.acm.org/doi/pdf/10.1145/3290605.3300767, May 4-9, 2019, 15 pages.
Sperber et al., "Self-Attentional Models for Lattice Inputs", in Proceedings of the 57th Annual Meeting of the Association for Computational Linguistics, Florence, Italy,Association for Computational Linguistics, Jun. 4, 2019, 13 pages.
SRI, "SRI Speech: Products: Software Development Kits: EduSpeak", Online available at:—<http://web.archive.org/web/20090828084033/http://www.speechatsri.com/products/eduspeak>shtml, retrieved on Jun. 20, 2013, pp. 1-2.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Supplemental Notice of Allowance received for U.S. Appl. No. 16/175,208, mailed on Mar. 24, 2020, 2 pages.
Supplemental Notice of Allowance received for U.S. Appl. No. 16/881,625, mailed on Dec. 23, 2021, 2 pages.
Notice of Allowance received for U.S. Appl. No. 16/881,625, mailed on Nov. 4, 2021, 2 pages.
Notice of Allowance received for U.S. Appl. No. 16/881,625, mailed on Nov. 26, 2021, 3 pages.
Notice of Allowance received for U.S. Appl. No. 16/881,625, mailed on Oct. 29, 2021, 2 pages.
Supplemental Notice of Allowance received for U.S. Appl. No. 16/881,625, mailed on Sep. 15, 2021, 2 pages.
Sutskever et al., "Sequence to Sequence Learning with Neural Networks", Proceedings of the 27th International Conference on Neural Information Processing Systems, 2014, 9 pages.
Tamar et al., "Value Iteration Networks", Advances in Neural Information Processing Systems, vol. 29, 2016, 16 pages.
Tan et al., "Knowledge Transfer In Permutation Invariant Training For Single-channel Multi-talker Speech Recognition", ICASSP 2018, 2018, pp. 5714-5718.
Tech Target Contributor, "AI Accelerator", Available online at: https://searchenterpriseai.techtarget.com/definition/AI-accelerator, Apr. 2018, 3 pages.
Tech With Brett, "Everything the Google Nest Hub Can Do", Available online at: https://www.youtube.com/watch?v=x3vdytgru2E, Nov. 12, 2018, 13 pages.
Tech With Brett, "Google Home Multiple Users Setup", Available online at: https://www.youtube.com/watch?v=BQOAbRUeFRo&t=257s, Jun. 29, 2017, 4 pages.
Tkachenko, Sergey, "Chrome will automatically create Tab Groups", Available online at : https://winaero.com/chrome-will-automatically-create-tab-groups/, Sep. 18, 2020, 5 pages.
Tkachenko, Sergey, "Enable Tab Groups Auto Create in Google Chrome", Available online at : https://winaero.com/enable-tab-groups-auto-create-in-google-chrome/, Nov. 30, 2020, 5 pages.
"Use Macrodroid skillfully to automatically clock in with Ding Talk", Online available at: https://blog.csdn.net/qq_26614295/article/details/84304541, Nov. 20, 2018, 11 pages.
Vaswani et al., "Attention Is All You Need", 31st Conference on Neural Information Processing Systems (NIPS 2017), 2017, pp. 1-11.
Vazquez et al., "An Assisted Photography Framework to Help Visually Impaired Users Properly Aim a Camera", ACM Transactions on Computer-Human Interaction, vol. 21, No. 5, Article 25, Online available at: https://dl.acm.org/doi/pdf/10.1145/2651380, Nov. 2014, 29 pages.
Velian Speaks Tech, "10 Google Assistant Tips!", Available online at: https://www.youtube.com/watch?v=3RNWA3NK9fs, Feb. 24, 2020, 3 pages.
Villemure et al., "The Dragon Drive Innovation Showcase: Advancing the State-of-the-art in Automotive Assistants", 2018, 7 pages.
Walker, Amy, "NHS Gives Amazon Free Use of Health Data Under Alexa Advice Deal", Available online at: <https://www.theguardian.com/society/2019/dec/08/nhs-gives-amazon-free-use-of-health-data-under-alexa-advice-deal>, 3 pages.
Wang et al., "End-to-end Anchored Speech Recognition", Proc. ICASSP2019, May 12-17, 2019, 5 pages.
Wang, et al., "Tacotron: Towards End to End Speech Synthesis", Available online at: https://arxiv.org/abs/1703.10135, Apr. 6, 2017, 10 pages.
Wang, et al., "Training Deep Neural Networks with 8-bit Floating Point Numbers", 32nd Conference on Neural Information Processing Systems (NeurlPS 2018), 2018, 10 pages.
Wei et al., "Design and Implement On Smart Home System", 2013 Fourth International Conference on Intelligent Systems Design and Engineering Applications, Available online at: https://ieeexplore.ieee.org/document/6843433, 2013, pp. 229-231.
Weng et al., "Deep Neural Networks for Single-Channel Multi-Talker Speech Recognition", IEEE/ACM Transactions On Audio, Speech, And Language Processing, vol. 23, No. 10, Oct. 2015, pp. 1670-1679.
"What's on Spotify?", Music for everyone, Online Available at:—<https://web.archive.org/web/20160428115328/https://www.spotify.com/us/>, Apr. 28, 2016, 6 pages.
Wikipedia, "Home Automation", Online Available at:—<https://en.wikipedia.org/w/index.php?title=Home_automation&oldid=686569068>, Oct. 19, 2015, 9 pages.
Wikipedia, "Siri", Online Available at:—<https://en.wikipedia.org/w/index.php?title=Siri&oldid=689697795>, Nov. 8, 2015, 13 Pages.
Wikipedia, "Virtual Assistant", Wikipedia, Online Available at:—<https://en.wikipedia.org/w/index.php?title=Virtual_assistant&oldid=679330666>, Sep. 3, 2015, 4 pages.
Win, et al., "Myanmar Text to Speech System based on Tacotron-2", International Conference on Information and Communication Tehcnology Convergence (ICTC), Oct. 21-23, 2020, pp. 578-583.
Wu et al., "Monophone-Based Background Modeling for Two-Stage On-device Wake Word Detection", in 2018 IEEE International Conference on Acoustics, Speech and Signal Processing (ICASSP), Apr. 2018, 5 pages.
X.AI, "How it Works", Online available at:—<https://web.archive.org/web/20160531201426/https://x.ai/how-it-works/>, May 31, 2016, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Policy Optimization of Dialogue Management in Spoken Dialogue System For Out-of-Domain Utterances", 2016 International Conference On Asian Language Processing (IALP), IEEE, Nov. 21, 2016, pp. 10-13.
Xu et al., "Show, Attend and Tell: Neural Image Caption Generation with Visual Attention", Proceedings of the 32nd International Conference on Machine Learning, Lille, France, 2015, 10 pages.
Yan et al., "A Scalable Approach to Using DNN-derived Features in GMM-HMM Based Acoustic Modeling for LVCSR", 14th Annual Conference of the International Speech Communication Association, InterSpeech 2013, Aug. 2013, pp. 104-108.
Yang Astor, "Control Android TV via Mobile Phone APP RKRemoteControl", Online Available at : <https://www.youtube.com/watch?v=zpmUeOX_xro>, Mar. 31, 2015, 4 pages.
Yates MichaelC., "How Can I Exit Google Assistant After I'm Finished with it", Online available at:—<https://productforums.google.com/forum/#!msg/phone-by-google/faECnR2RJwA/gKNtOkQgAQAJ>, Jan. 11, 2016, 2 pages.
Yeh Jui-Feng, "Speech Act Identification Using Semantic Dependency Graphs With Probabilistic Context-free Grammars", ACM Transactions on Asian and Low-Resource Language Information Processing, vol. 15, No. 1, Dec. 2015, pp. 5.1-5.28.
Young et al., "POMDP-Based Statistical Spoken Dialog Systems: A Review", Proceedings of the IEEE, vol. 101, No. 5, 2013, 18 pages.
Yousef, Zulfikara., "Braina (A.I) Artificial Intelligence Virtual Personal Assistant", Online available at:—<https://www.youtube.com/watch?v=2h6xpB8bPSA>, Feb. 7, 2017, 3 pages.
Yu et al., "Permutation Invariant Training Of Deep Models For Speaker-Independent Multi-talker Speech Separation", Proc. ICASSP, 2017, 5 pages.

(56) References Cited

OTHER PUBLICATIONS

Yu et al., "Recognizing Multi-talker Speech with Permutation Invariant Training", Interspeech 2017, Aug. 20-24, 2017, pp. 2456-2460.

Zhang et al., "IEHouse: A Non-Intrusive Household Appliance State Recognition System", IEEE Smart World, Ubiquitous Intelligence & Computing, Advanced & Trusted Computed, 2017, 8 pages.

Zhang et al., "Interaction Proxies for Runtime Repair and Enhancement of Mobile Application Accessibility", In Proceedings of the 2017 CHI Conference on Human Factors in Computing Systems (CHI '17). ACM, Denver, CO, USA, Online available at: https://dl.acm.org/doi/pdf/10.1145/3025453.3025846, May 6-11, 2017, pp. 6024-6037.

Zhang et al., "Very Deep Convolutional Networks for End-To-End Speech Recognition", IEEE International Conference on Acoustics, Speech and Signal Processing (ICASSP), 2017, 5 pages.

Zhao et al., "Big Data Analysis and Application", Aviation Industry Press, Dec. 2015, pp. 236-241.

Zhao et al., "CueSee: Exploring Visual Cues for People with Low Vision to Facilitate a Visual Search Task", In Proceedings of the 2016 ACM International Joint Conference on Pervasive and Ubiquitous Computing. ACM, UbiComp '16, Heidelberg, Germany, Online available at: https://dl.acm.org/doi/pdf/10.1145/2971648.2971730, Sep. 12-16, 2016, pp. 73-84.

Zhao et al., "Enabling People with Visual Impairments to Navigate Virtual Reality with a Haptic and Auditory Cane Simulation", In Proceedings of the 2018 CHI Conference on Human Factors in Computing Systems (CHI '18). ACM, Article 116, Montréal, QC, Canada, Online available at: https://dl.acm.org/doi/pdf/10.1145/3173574.3173690, Apr. 21-26, 2018, 14 pages.

Zhao et al., "SeeingVR: A Set of Tools to Make Virtual Reality More Accessible to People with Low Vision", In Proceedings of the 2019 CHI Conference on Human Factors in Computing Systems (CHI '19). ACM, Article 111, Glasgow, Scotland, UK, Online available at: https://dl.acm.org/doi/pdf/10.1145/3290605.3300341, May 4-9, 2019, 14 pages.

Zheng, et al., "Intent Detection and Semantic Parsing for Navigation Dialogue Language Processing", 2017 IEEE 20th International Conference on Intelligent Transportation Systems (ITSC), 2017, 6 pages.

Zhong et al., "JustSpeak: Enabling Universal Voice Control on Android", W4A'14, Proceedings of the 11th Web for All Conference, No. 36, Apr. 7-9, 2014, 8 pages.

Zhou et al., "Learning Dense Correspondence via 3D-guided Cycle Consistency", Proceedings of the IEEE Conference on Computer Vision and Pattern Recognition (CVPR), 2016, 10 pages.

Zmolikova et al., "Speaker-Aware Neural Network Based Beamformer For Speaker Extraction In Speech Mixtures", Interspeech 2017, Aug. 20-24, 2017, pp. 2655-2659.

Office Action received for Korean Patent Application No. 10-2022-7013616, mailed on Jul. 28, 2023, 7 pages (3 pages of English Translation and 4 pages of Official Copy).

Decision to Refuse received for Japanese Patent Application No. 2022-140998, mailed on Apr. 19, 2024, 5 pages (2 pages of English Translation and 3 pages of Official Copy).

\* cited by examiner

INTELLIGENT ASSISTANT FOR HOME AUTOMATION

CROSS-REFERENCE TO RELATED APPLICATIONS

This application is a continuation application of U.S. patent application Ser. No. 17/540,942, filed Dec. 2, 2021, entitled "INTELLIGENT ASSISTANT FOR HOME AUTOMATION," which is a continuation application of U.S. patent application Ser. No. 16/881,625, filed May 22, 2020, now U.S. Pat. No. 11,257,504 entitled "INTELLIGENT ASSISTANT FOR HOME AUTOMATION," which is a continuation application of U.S. patent application Ser. No. 16/174,046, filed Oct. 29, 2018, now U.S. Pat. No. 10,714,095, entitled "INTELLIGENT ASSISTANT FOR HOME AUTOMATION," which is a continuation of U.S. patent application Ser. No. 14/503,105, filed Sep. 30, 2014, now U.S. Pat. No. 10,170,123, entitled "INTELLIGENT ASSISTANT FOR HOME AUTOMATION," which claims priority to U.S. Patent Application Ser. No. 62/005,893, filed May 30, 2014, entitled "INTELLIGENT ASSISTANT FOR HOME AUTOMATION." The contents of these applications are hereby incorporated by reference in their entirety for all purposes.

This application is related to U.S. patent application Ser. No. 16/175,208, filed Oct. 30, 2018, entitled "INTELLIGENT ASSISTANT FOR HOME AUTOMATION," which is a continuation of U.S. patent application Ser. No. 14/503,105, filed Sep. 30, 2014, now U.S. Pat. No. 10,170,123, entitled "INTELLIGENT ASSISTANT FOR HOME AUTOMATION," which claims priority to U.S. Patent Application Ser. No. 62/005,893, filed May 30, 2014, entitled "INTELLIGENT ASSISTANT FOR HOME AUTOMATION." The contents of these applications are hereby incorporated by reference in their entirety for all purposes.

FIELD

This relates generally to natural language processing and, more specifically, to the use of a virtual assistant with natural language processing to control electronic devices.

BACKGROUND

Home electronic devices that can be controlled remotely using software applications running on a computing device, such as a mobile phone, tablet computer, laptop computer, desktop computer, or the like, have become increasingly popular. For example, numerous manufacturers create light bulbs that can be controlled by a software application running on a mobile phone to adjust the brightness and/or color of the bulb. Other devices, such as door locks, thermostats, and the like, having similar controls are also available.

While these devices can provide users with a greater level of control and convenience, it can become exceedingly difficult to manage these devices as the number of remotely controlled devices and the number of types of remotely controlled devices in the home increase. For example, a typical home can include 40-50 light bulbs placed throughout the various rooms of the home. Using conventional software applications, each light bulb is given a unique identifier, and a user attempting to control one of these devices must select the appropriate identifier from a list of available devices within a graphical user interface. Remembering the correct identifier for a particular light bulb and finding that identifier from a list of 40-50 identifiers can be a difficult and time-consuming process. To add to the difficulty of managing and controlling a large number of remotely controlled devices, different manufactures typically provide different software applications that must be used to control their respective devices. As a result, a user must locate and open one software application to turn on/off their light bulbs, and must then locate and open another software application to set the temperature of their thermostat.

SUMMARY

Systems and processes for using a virtual assistant to control electronic devices are provided. In one example process, a user can speak an input in natural language form to a user device to control one or more electronic devices. The user device can transmit the user speech to a server to be converted into a textual representation. The server can identify the one or more electronic devices and appropriate commands to be performed by the one or more electronic devices based on the textual representation. The identified one or more devices and commands to be performed can be transmitted back to the user device, which can forward the commands to the appropriate one or more electronic devices for execution. In response to receiving the commands, the one or more electronic devices can perform the commands and transmit their current states to the user device.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

Intelligent automated assistants (or virtual assistants) provide an intuitive interface between users and electronic devices. These assistants can allow users to interact with devices or systems using natural language in spoken and/or text forms. For example, a user can access the services of an electronic device by providing a spoken user input in natural language form to a virtual assistant associated with the electronic device. The virtual assistant can perform natural language processing on the spoken user input to infer the user's intent and operationalize the user's intent into tasks. The tasks can then be performed by executing one or more functions of the electronic device and a relevant output can be returned to the user in natural language form.

This relates to systems and processes for using a virtual assistant to control electronic devices. In one example process, a user can speak an input in natural language form to a user device to control one or more electronic devices. The user device can transmit the user speech to a server to be converted into a textual representation. The server can identify the one or more electronic devices and appropriate commands to be performed by the one or more electronic devices based on the textual representation. The identified one or more devices and commands to be performed can be transmitted back to the user device, which can forward the commands to the appropriate one or more electronic devices for execution. In response to receiving the commands, the one or more electronic devices can perform the commands and transmit their current states to the user device.

System Overview

Figure 1:
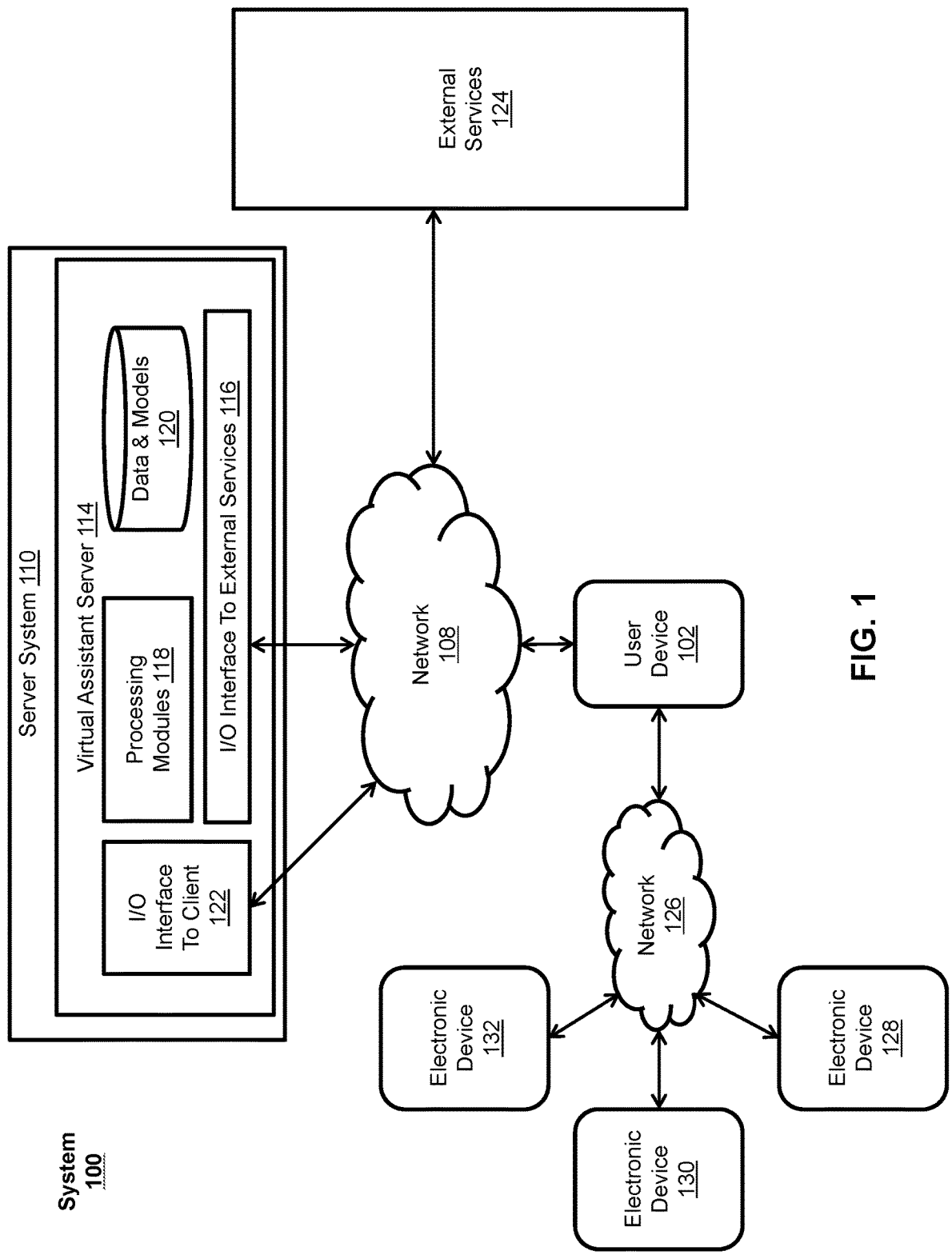
FIG. 1 illustrates an exemplary environment in which a virtual assistant can be used to control electronic devices according to various examples.

FIG. 1 illustrates exemplary system 100 for implementing a virtual assistant to control electronic devices according to various examples. The terms "virtual assistant," "digital assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent; inputting specific requirements from the inferred user intent into the task flow; executing the task flow by invoking programs, methods, services, APIs, or the like; and generating output responses to the user in an audible (e.g., speech) and/or visual form.

A virtual assistant can be capable of accepting a user request at least partially in the form of a natural language command, request, statement, narrative, and/or inquiry. Typically, the user request seeks either an informational answer or performance of a task by the virtual assistant. A satisfactory response to the user request can include provision of the requested informational answer, performance of the requested task, or a combination of the two. For example, a user can ask the virtual assistant a question, such as "Where am I right now?" Based on the user's current location, the virtual assistant can answer, "You are in Central Park." The user can also request the performance of a task, for example, "Please remind me to call Mom at 4 p.m. today." In response, the virtual assistant can acknowledge the request and then create an appropriate reminder item in the user's electronic schedule. During the performance of a requested task, the virtual assistant can sometimes interact with the user in a continuous dialogue involving multiple exchanges of information over an extended period of time. There are numerous other ways of interacting with a virtual assistant to request information or performance of various tasks. In addition to providing verbal responses and taking programmed actions, the virtual assistant can also provide responses in other visual or audio forms (e.g., as text, alerts, music, videos, animations, etc.).

An example of a virtual assistant is described in Applicants' U.S. Utility application Ser. No. 12/987,982 for "Intelligent Automated Assistant," filed Jan. 10, 2011, the entire disclosure of which is incorporated herein by reference.

As shown in FIG. 1, in some examples, a virtual assistant can be implemented according to a client-server model. The virtual assistant can include a client-side portion executed on a user device 102, and a server-side portion executed on a server system 110. User device 102 can include any electronic device, such as a mobile phone, tablet computer, portable media player, desktop computer, laptop computer, PDA, television, television set-top box, wearable electronic device, or the like, and can communicate with server system 110 through one or more networks 108, which can include the Internet, an intranet, or any other wired or wireless public or private network. The client-side portion executed on user device 102 can provide client-side functionalities, such as user-facing input and output processing and communications with server system 110. Server system 110 can provide server-side functionalities for any number of clients residing on a respective user device 102.

Server system 110 can include one or more virtual assistant servers 114 that can include a client-facing I/O interface 122, one or more processing modules 118, data and model storage 120, and an I/O interface to external services 116. The client-facing I/O interface 122 can facilitate the client-facing input and output processing for virtual assistant server 114. The one or more processing modules 118 can utilize data and model storage 120 to determine the user's intent based on natural language input, and perform task execution based on inferred user intent. Additionally, data and model storage 120 can store a unique identifier, a state, a type, a location, and any other relevant information associated with one or more of electronic devices (e.g., electronic devices 128, 130, and 132) capable of being controlled by user device 102 and/or server system 110. In some examples, virtual assistant server 114 can communicate with external services 124, such as telephony services, calendar services, information services, messaging services, navigation services, and the like, through network(s) 108 for task completion or information acquisition. The I/O interface to external services 116 can facilitate such communications.

Server system 110 can be implemented on one or more standalone data processing devices or a distributed network of computers. In some examples, server system 110 can employ various virtual devices and/or services of third party service providers (e.g., third-party cloud service providers) to provide the underlying computing resources and/or infrastructure resources of server system 110.

User device 102 can be further coupled to electronic devices 128, 130, and 132 via one or more networks 126. Electronic devices 128, 130, and 132 can include any type of remotely controlled electronic device, such as a light bulb (e.g., having a binary ON/OFF state, numerical dimmable state, color state, etc.), garage door (e.g., having a binary OPEN/CLOSED state), door lock (e.g., having binary LOCKED/UNLOCKED state), thermostat (e.g., having one or more numerical temperature states, such as a high temperature, low temperature, time-based temperatures, etc.), electrical outlet (e.g., having a binary ON/OFF state), switch (e.g., having a binary ON/OFF state), or the like. Network(s) 126 can include a WiFi network or any other wired or wireless public or private local network. Additionally or alternatively, user device 102 can be coupled to communicate directly with electronic devices 128, 130, or 132 using, for example, Bluetooth, BTLE, line of sight, peer-to-peer, or another radio-based or other wireless communication. Thus, in the illustrated example, user device 102 can be located near electronic devices 128, 130, and 132, such that it can communicate with them directly or over the same local network. For example, user device 102 and electronic devices 128, 130, and 132 can be located within the same home or building, and network(s) 126 can include the home or building's WiFi network. As discussed in greater detail below with respect to FIGS. 5, 8, and 9, user device 102 can issue commands to control any of electronic devices 128, 130, and 132 in response to a natural language spoken input provided by a user to user device 102.

While only three electronic devices 128, 130, and 132 are shown, it should be appreciated that system 100 can include any number of electronic devices. Additionally, although the functionality of the virtual assistant is shown in FIG. 1 as including both a client-side portion and a server-side portion, in some examples, the functions of the assistant can be implemented as a standalone application installed on a user device. Moreover, the division of functionalities between the client and server portions of the virtual assistant can vary in different examples. For instance, in some examples, the client executed on user device 102 can be a thin-client that provides only user-facing input and output processing functions, and delegates all other functionalities of the virtual assistant to a backend server.

Figure 2:
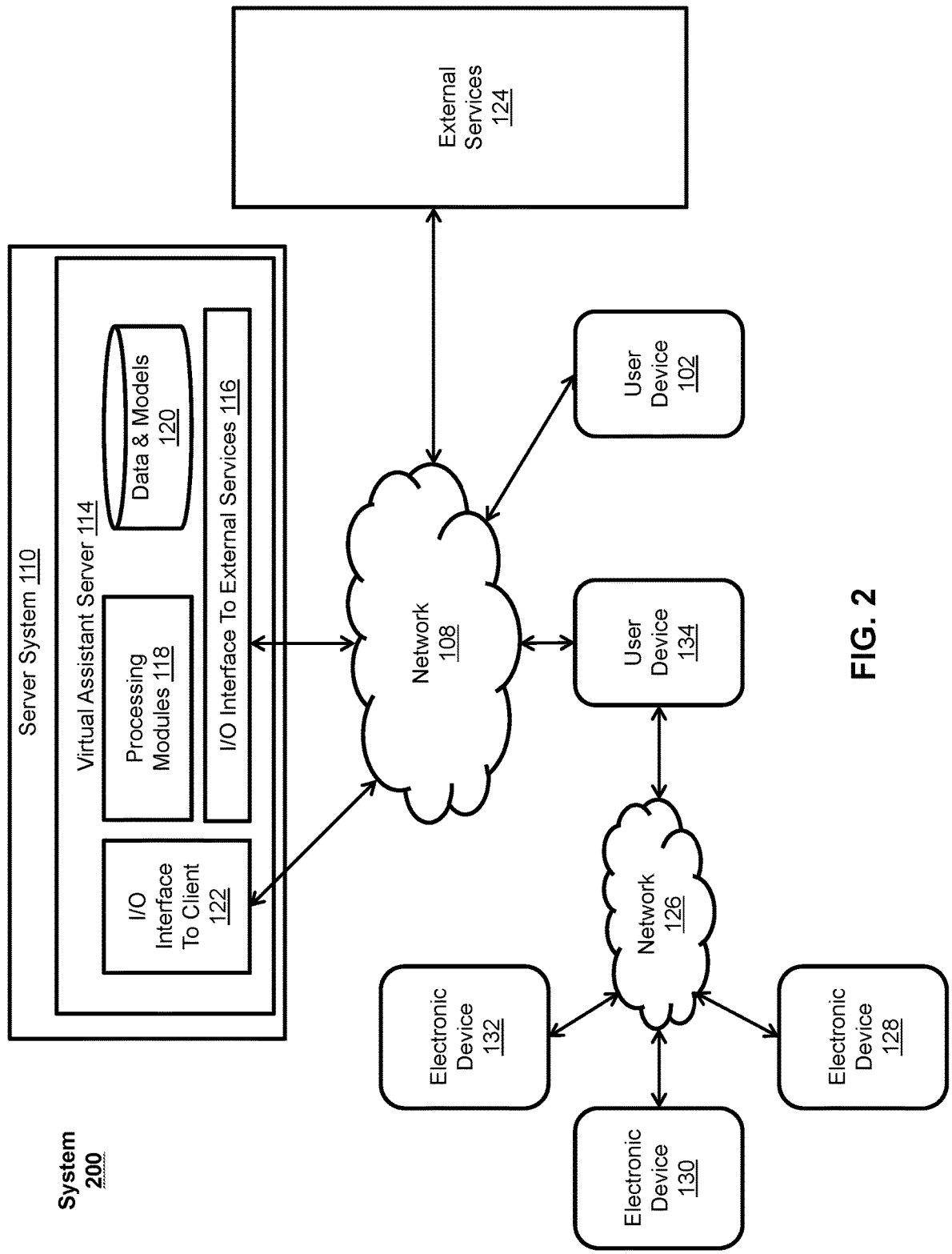
FIG. 2 illustrates an exemplary environment in which a virtual assistant can be used to remotely control electronic devices according to various examples.

FIG. 2 illustrates another exemplary system 200 for implementing a virtual assistant to remotely control electronic devices according to various examples. Similar to system 100, system 200 can include user device 102, server system 110, and external services 124 communicatively coupled together by network(s) 108. However, in contrast to system 100, user device 102 may not be coupled to electronic devices 128, 130, and 132. Instead, system 200 can include a second user device 134 coupled to communicate with user device 102 and/or server system 110 via network(s) 108 and coupled to communicate with electronic devices 128, 130, and 132 via network(s) 126. This configuration can represent a situation in which the user and user device 102 are located remotely from electronic devices 128, 130, and 132 (e.g., the user and user device 102 are at the user's office, while electronic devices 128, 130, and 132 are at the user's home).

Second user device 134 can include any type of electronic device, such as a mobile phone, tablet computer, portable media player, desktop computer, laptop computer, PDA, television, television set-top box, wearable electronic device, or the like, and can be configured to receive commands from user device 102 and/or server system 110 and to issue commands to electronic devices 128, 130, and 132. As discussed in greater detail below with respect to FIG. 6, second user device 134 can issue commands to control any of electronic devices 128, 130, and 132 in response to a natural language spoken input provided by a user to user device 102.

User Device

Figure 3:
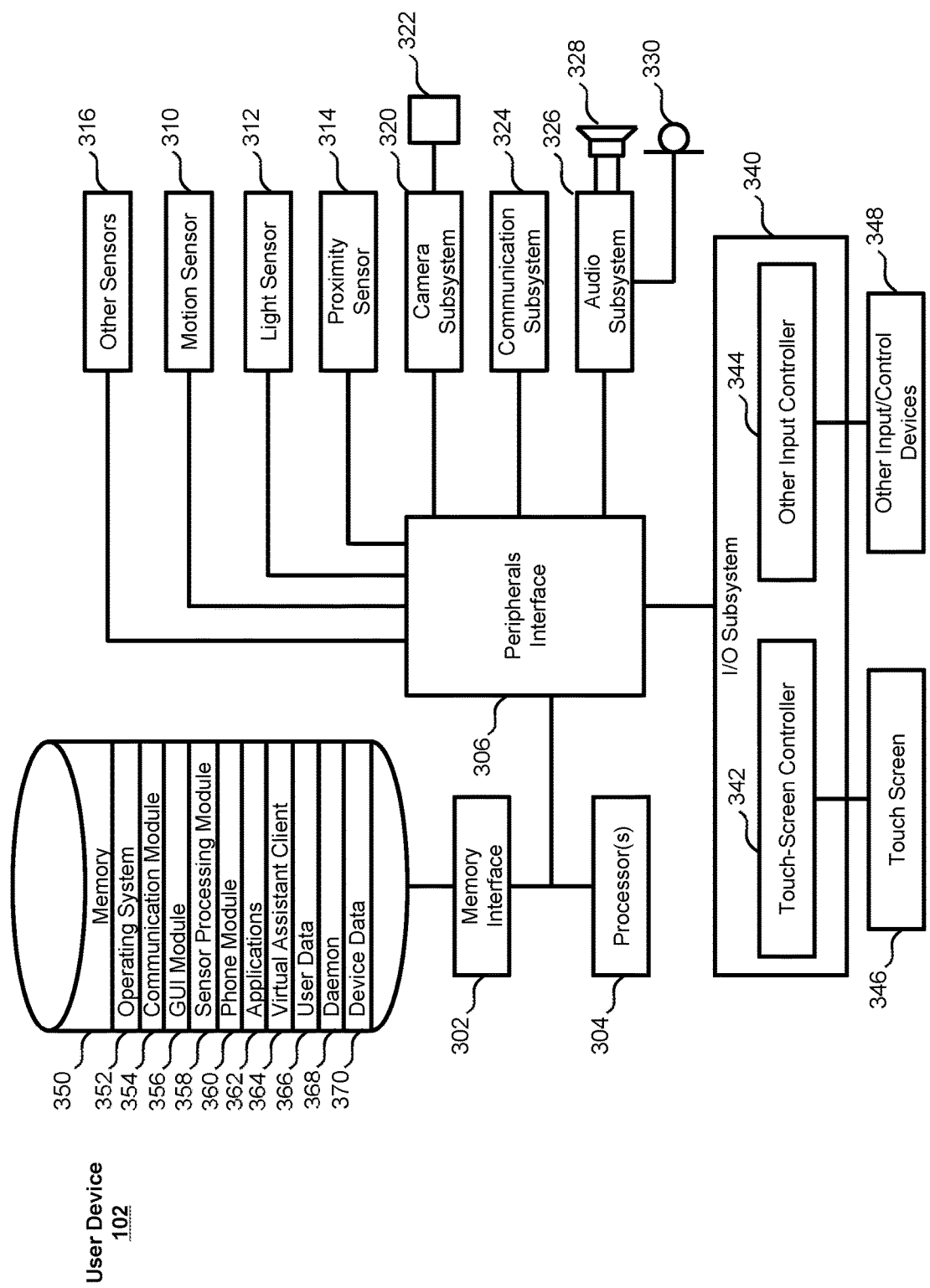
FIG. 3 illustrates an exemplary user device according to various examples.

FIG. 3 is a block diagram of a user-device 102 (or second user device 134) according to various examples. As shown, user device 102 can include a memory interface 302, one or more processors 304, and a peripherals interface 306. The various components in user device 102 can be coupled together by one or more communication buses or signal lines. User device 102 can further include various sensors, subsystems, and peripheral devices that are coupled to the peripherals interface 306. The sensors, subsystems, and peripheral devices gather information and/or facilitate various functionalities of user device 102.

For example, user device 102 can include a motion sensor 310, a light sensor 312, and a proximity sensor 314 coupled to peripherals interface 306 to facilitate orientation, light, and proximity sensing functions. One or more other sensors 316, such as a positioning system (e.g., a GPS receiver), a temperature sensor, a biometric sensor, a gyroscope, a compass, an accelerometer, and the like, are also connected to peripherals interface 306, to facilitate related functionalities.

In some examples, a camera subsystem 320 and an optical sensor 322 can be utilized to facilitate camera functions, such as taking photographs and recording video clips. Communication functions can be facilitated through one or more wired and/or wireless communication subsystems 324, which can include various communication ports, radio frequency receivers and transmitters, and/or optical (e.g., infrared) receivers and transmitters. An audio subsystem 326 can be coupled to speakers 328 and a microphone 330 to facilitate voice-enabled functions, such as voice recognition, voice replication, digital recording, and telephony functions.

In some examples, user device 102 can further include an I/O subsystem 340 coupled to peripherals interface 306. I/O subsystem 340 can include a touch screen controller 342 and/or other input controller(s) 344. Touch-screen controller 342 can be coupled to a touch screen 346. Touch screen 346 and the touch screen controller 342 can, for example, detect contact and movement or break thereof using any of a plurality of touch sensitivity technologies, such as capacitive, resistive, infrared, and surface acoustic wave technologies, proximity sensor arrays, and the like. Other input controller(s) 344 can be coupled to other input/control devices 348, such as one or more buttons, rocker switches, a thumb-wheel, an infrared port, a USB port, and/or a pointer device such as a stylus.

In some examples, user device 102 can further include a memory interface 302 coupled to memory 350. Memory 350 can include any electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as CD, CD-R, CD-RW, DVD, DVD-R, or DVD-RW, or flash memory such as compact flash cards, secured digital cards, USB memory devices, memory sticks, and the like. In some examples, a non-transitory computer-readable storage medium of memory 350 can be used to store instructions (e.g., for performing some or all of processes 500, 600, 700, 800, or 900, described below) for use by or in connection with an instruction execution system, apparatus, or device, such as a computer-based system, processor-containing system, or other system that can fetch the instructions from the instruction execution system, apparatus, or device, and execute the instructions. In other examples, the instructions (e.g., for performing processes 500, 600, 700, 800, or 900, described below) can be stored on a non-transitory computer-readable storage medium of server system 110, or can be divided between the non-transitory computer-readable storage medium of memory 350 and the non-transitory computer-readable storage medium of server system 110. In the context of this document, a "non-transitory computer readable storage medium" can be any medium that can contain or store the program for use by or in connection with the instruction execution system, apparatus, or device.

In some examples, the memory 350 can store an operating system 352, a communication module 354, a graphical user interface module 356, a sensor processing module 358, a phone module 360, and applications 362. Operating system 352 can include instructions for handling basic system services and for performing hardware dependent tasks. Communication module 354 can facilitate communicating with one or more additional devices, one or more computers, and/or one or more servers. Graphical user interface module 356 can facilitate graphic user interface processing. Sensor processing module 358 can facilitate sensor related processing and functions. Phone module 360 can facilitate phone-related processes and functions. Application module 362 can facilitate various functionalities of user applications, such as electronic-messaging, web browsing, media processing, navigation, imaging, and/or other processes and functions.

Memory 350 can also store client-side virtual assistant instructions (e.g., in a virtual assistant client module 364) and various user data 366 (e.g., user-specific vocabulary data, preference data, and/or other data, such as the user's electronic address book, to-do lists, shopping lists, etc.) to provide the client-side functionalities of the virtual assistant.

In various examples, virtual assistant client module 364 can be capable of accepting voice input (e.g., speech input), text input, touch input, and/or gestural input through various user interfaces (e.g., I/O subsystem 340, audio subsystem 326, or the like) of user device 102. Virtual assistant client module 364 can also be capable of providing output in audio (e.g., speech output), visual, and/or tactile forms. For example, output can be provided as voice, sound, alerts, text messages, menus, graphics, videos, animations, vibrations, and/or combinations of two or more of the above. During operation, virtual assistant client module 364 can communicate with the virtual assistant server using communication subsystem 324.

In some examples, virtual assistant client module 364 can utilize the various sensors, subsystems, and peripheral devices to gather additional information from the surrounding environment of user device 102 to establish a context associated with a user, the current user interaction, and/or the current user input. In some examples, virtual assistant client module 364 can provide the contextual information or a subset thereof with the user input to the virtual assistant server to help infer the user's intent. The virtual assistant can also use the contextual information to determine how to prepare and deliver outputs to the user.

In some examples, the contextual information that accompanies the user input can include sensor information, such as lighting, ambient noise, ambient temperature, images or videos of the surrounding environment, distance to another object, and the like. The contextual information can further include information associated with the physical state of user device 102 (e.g., device orientation, device location, device temperature, power level, speed, acceleration, motion patterns, cellular signal strength, etc.) or the software state of user device 102 (e.g., running processes, installed programs, past and present network activities, background services, error logs, resources usage, etc.). Any of these types of contextual information can be provided to the virtual assistant server 114 as contextual information associated with a user input.

In some examples, virtual assistant client module 364 can selectively provide information (e.g., user data 366) stored on user device 102 in response to requests from the virtual assistant server 114. Virtual assistant client module 364 can also elicit additional input from the user via a natural language dialogue or other user interfaces upon request by virtual assistant server 114. Virtual assistant client module 364 can pass the additional input to virtual assistant server 114 to help virtual assistant server 114 in intent inference and/or fulfillment of the user's intent expressed in the user request.

Figure 4:
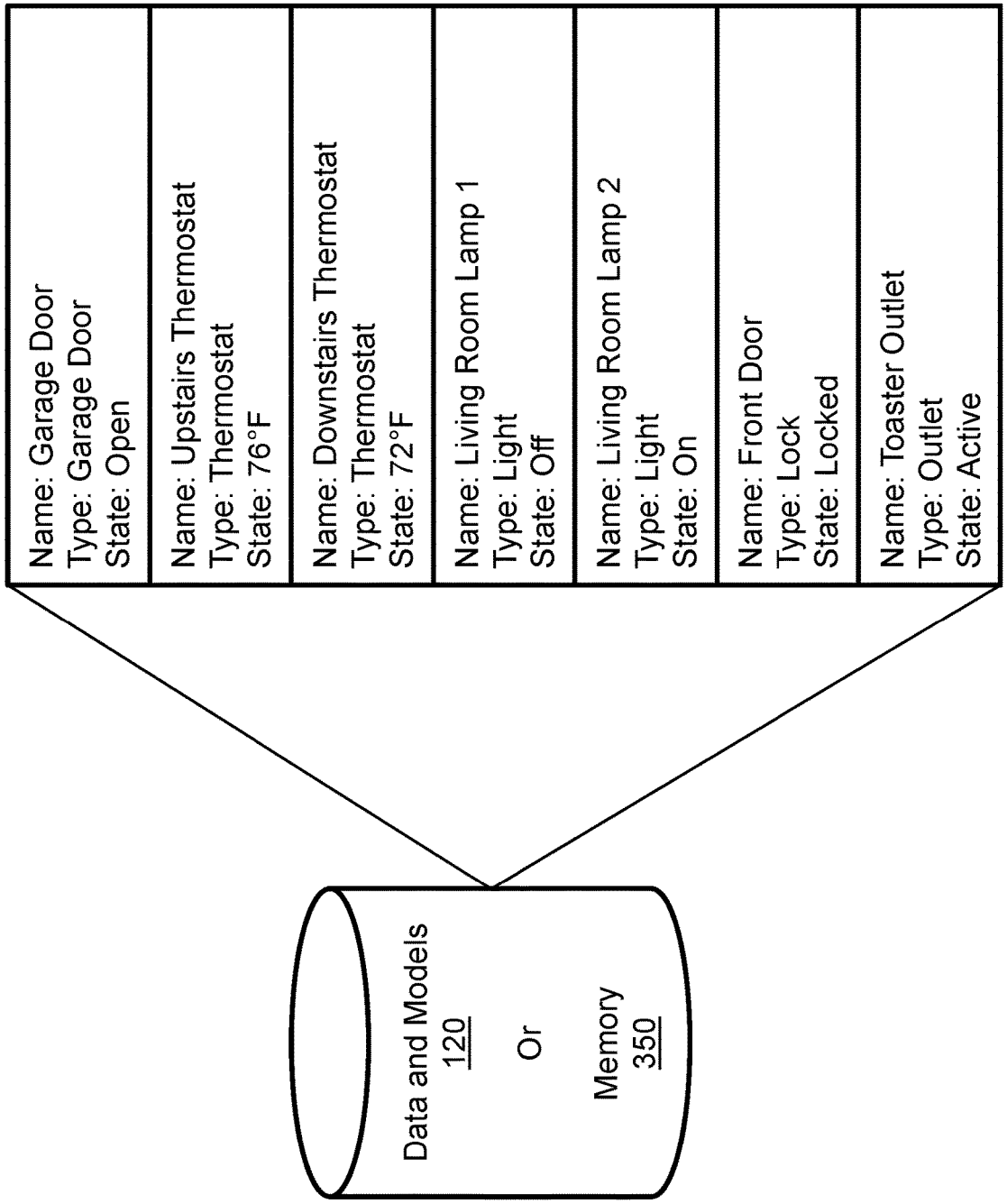
FIG. 4 shows a visual representation of multiple entries used to store information associated with electronic devices according to various examples.

Memory 350 can further store electronic device data 370 that can include a unique identifier, a state, a type, a location, and any other relevant information associated with one or more of the electronic devices capable of being controlled by user device 102 and/or server system 110 (e.g., electronic devices 128, 130, and 132). FIG. 4 shows a visual representation of entries that can be stored in electronic device data 370 for seven different electronic devices. As shown, each entry includes a unique name, type, and state of the electronic device. Data and model storage 120 of virtual assistant server 114 can include similar or identical entries for the electronic devices that can be maintained separately from that of electronic device data 370 of memory 350.

Referring back to FIG. 3, memory 350 can further include instructions (e.g., in daemon module 368) for creating and updating entries for electronic devices in electronic device data 370, communicating with the electronic devices of system 100, and for communicating with server system 110. For example, to add an electronic device to system 100, a software application associated with the electronic device can communicate with processor(s) 304 executing daemon module 368 to provide user device 102 with a unique name, type, state, location, and the like, of the electronic device. The software application can allow the user to enter the unique name in any desired manner. For example, a drop-down box with common names and/or a freeform text field can be provided in the application to allow a user to name a particular device. The type, state, and/or location of the electronic device can be predetermined or determined by the software application through communication with the electronic device. Processor(s) 304 executing daemon module 368 can store this information as an entry in electronic device data 370 and can also transmit this information to server system 110 to be stored in data and models storage 120. Additionally, when executed by processor(s) 304, daemon module 368 can receive commands that are to be provided to electronic devices 128, 130, and 132 from server system 110 via network(s), and can transmit those commands to the appropriate electronic devices. Processor(s) 304 executing daemon module 368 can further receive state updates from electronic devices 128, 130, and 132, update the corresponding entries in electronic device data 370 to reflect the updated states of the devices, and transmit the state updates to server system 110 to allow server system 110 to update the corresponding entries in data and models storage 120 to reflect the updated states of the devices.

Additionally, daemon module 368 can include instructions to manage access to electronic device data 370 by other devices and software applications. For example, when executed by processor(s) 304, daemon module 368 can grant access to all of electronic device data 370 by server system 110, but can restrict access to only a portion of electronic device data 370 by other devices or software applications. This can be useful when user device 102 is used to control electronic devices made by different manufacturers. In these situations, devices or software applications from each manufacturer can communicate with daemon module 368 using an API, and daemon module 368 can limit their access to only the portions of electronic device data 370 that correspond to their respective electronic devices. For example, company X can manufacture a light bulb capable of being controlled by user device 102, and company Y can manufacture a thermostat capable of being controlled by user device 102. Daemon module 368 can facilitate communication between user device 102 and each of the light bulb and the thermostat to allow user device 102 to issue commands to the electronic devices and to receive state information associated with the electronic devices for updating electronic device data 370. However, daemon module 368 can limit the access that the light bulb (and an associated software application running on user device 102) has to information in electronic device data 370 to only the information associated with the light bulb (and possibly any other electronic devices manufactured by company X). Similarly, daemon module 368 can limit the access that the thermostat (and an associated software application running on user device 102) has to information in electronic device data 370 to only the information associated with the thermostat (and possibly any other electronic devices manufactured by company Y). However, daemon module 368 can grant access to all of the information in electronic device data 370 to server system 110.

In various examples, memory 350 can include additional instructions or fewer instructions. Furthermore, various functions of user device 102 can be implemented in hardware and/or in firmware, including in one or more signal processing and/or application specific integrated circuits.

Local Control of Electronic Devices

Figure 5:
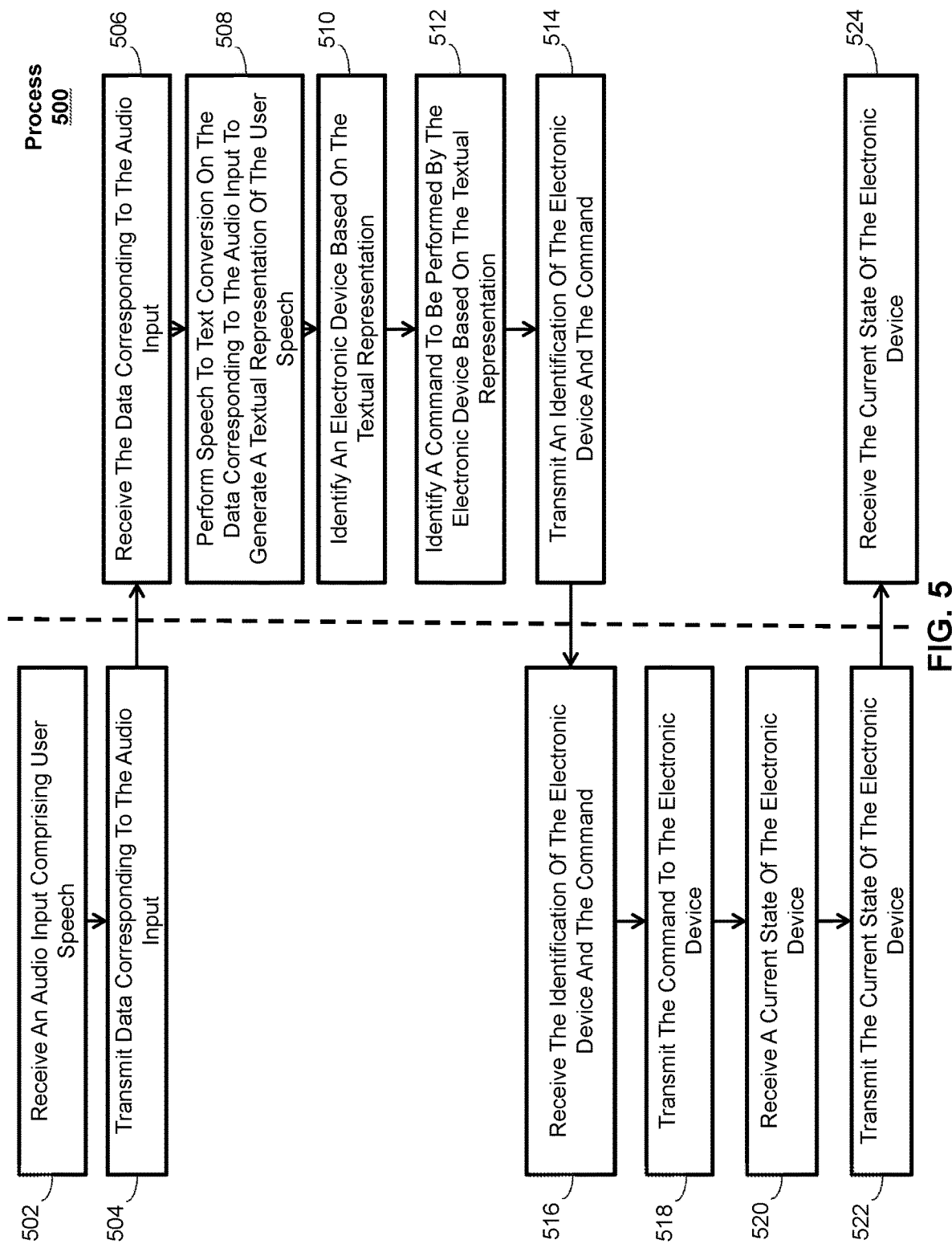
FIG. 5 illustrates an exemplary process for controlling electronic devices using a virtual assistant implemented using a client-server model according to various examples.

FIG. 5 illustrates an exemplary process 500 for controlling electronic devices using a virtual assistant. In some examples, process 500 can be performed using a system similar or identical to system 100, shown in FIG. 1. In these examples, the blocks of process 500 can be performed by both user device 102 and server system 110. Specifically, the blocks on the left side of FIG. 5 can be performed by user device 102, while the blocks on the right side of FIG. 5 can be performed by server system 110.

At block 502, an audio input including user speech can be received at a user device. In some examples, a user device (e.g., user device 102) can receive audio input that includes a user's speech via a microphone (e.g., microphone 330). The microphone can convert the audio input into an analog or digital representation, and provide the audio data to one or more processors (e.g., processor(s) 304).

At block 504, data corresponding to the audio input received at block 502 can be transmitted to one or more servers for processing. For example, user device 102 can transmit data corresponding to the audio input to virtual assistant server 114 of server system 110 via network(s) 108.

At block 506, data corresponding to the audio input transmitted by the user device at block 504 can be received by one or more servers. For example, virtual assistant server 114 of server system 110 can receive the data corresponding to the audio input transmitted by user device 102 via network(s) 108.

At block 508, speech-to-text conversion can be performed on the data corresponding to the audio input to convert the user speech into a textual representation of the user speech. The user speech can be converted using any known speech-to-text conversion process.

At block 510, one or more electronic devices can be identified based at least in part on the textual representation generated at block 508. In some examples, block 510 can include processing the textual representation of the user input to determine a user intent to issue a command to one or more electronic devices. As discussed above, server system 110 can include one or more data and model storages 120 that can store a unique identifier, a state, a type, a location, and any other relevant information associated with the electronic devices that can be controlled using system 100. Thus, block 510 can include identifying one or more of the electronic devices having associated information stored in data models and storages 120.

The one or more electronic devices can be identified in any number of ways. In some examples, the one or more electronic devices can be identified by parsing the textual representation to identify any of a set of nouns that correspond to the electronic devices supported by system 100. For example, the set of nouns can include the unique names of the electronic devices stored in electronic device data 370 and data and models storage 120, the possible types of electronic devices and their synonyms (e.g., garage door, thermostat, light, dimmable light, switch, color changeable light, bulb, lamp, lock, outlet, socket, etc.), categories of possible device states (e.g., volume, temperature, brightness, color, etc.), and the like.

To illustrate, using the example electronic device entries of FIG. 4, the set of nouns can include the unique names of the seven electronic devices (e.g., "Garage Door," "Upstairs Thermostat," "Downstairs Thermostat," "Living Room Lamp 1," "Living Room Lamp 2," "Front Door," and "Toaster Outlet"), the possible types of electronic devices and their synonyms (e.g., "Garage Door," "Thermostat," "Light," "Bulb," "Lamp," "Lock," "Outlet," "Socket," etc.), and categories of possible device states (e.g., temperature). Thus, if the textual representation of user speech generated at block 508 includes "Lock the front door," the textual representation can be processed using processing modules 118 and data and models storage 120 to search for any of the set of nouns. As a result of the search, it can be determined that the textual representation includes the unique name "Front Door," and the electronic device identified at block 510 can include this device. It should be appreciated that more than one electronic device can be identified at block 510 depending on the textual representation of user speech. For example, if the textual representation of user speech generated at block 508 instead includes "Turn off all the bulbs," the textual representation can be processed using processing modules 118 and data and models storage 120 to search for any of the set of nouns. As a result of the search, it can be determined that the textual representation includes the synonym "bulb" of the possible device type "light," and that the instruction from the user was to turn off all of those types of devices. As a result, the electronic devices identified at block 510 can include both "Living Room Lamp 1" and "Living Room Lamp 2."

In some examples, it can be difficult to identify the appropriate electronic device using only the set of nouns described above. For example, a textual representation that includes "Turn on the light" can produce a type match with both "Living Room Lamp 1" and "Living Room Lamp 2." In these examples, block 510 can further include the use of contextual information received from user device 102 (e.g., received as part of the data corresponding to the audio input at block 506) to disambiguate between potential matching electronic devices. Any type of contextual information can be used, such as sensor information (e.g., lighting, ambient noise, ambient temperature, images or videos of the surrounding environment, distance to another object, and the like), information associated with the physical state of user device 102 (e.g., device orientation, device location, device temperature, power level, speed, acceleration, motion patterns, cellular signal strength, etc.), the software state of user device 102 (e.g., running processes, installed programs, past and present network activities, background services, error logs, resources usage, etc.), or the like. For example, continuing with the "Turn on the light" example provided above, the location and orientation of user device 102 when user device 102 received the audio input at block 502 can be provided to server system 110 at blocks 504 and 506. This contextual information can be used to determine a location of user device 102 and/or a direction at which user device 102 was pointed when receiving the user speech. When compared with the known locations of "Living Room Lamp 1" and "Living Room Lamp 2" stored in data and models storage 120, the closest light or the light at which user device 102 was pointing can be selected as the electronic device at block 510. Other types of contextual information can be used in similar ways to disambiguate between potential matching electronic devices at block 510 by identifying contextual information that makes one or more of the potential matching electronic devices more or less likely to have been referenced by the textual representation of user speech.

In yet other examples, words associated with a state in the textual representation of user input can additionally or alternatively be used to disambiguate between potential matching electronic devices or to identify the appropriate electronic device. For example, a textual representation that includes "Turn it to 68" may not produce any matches using the set of nouns described above. Thus, in these examples, block 510 can further include parsing the textual representation to identify any of a set of words associated with a state that corresponds to the electronic devices supported by system 100. For example, the set of words associated with a state can include the possible states of the electronic devices and their synonyms (e.g., open, closed, close, shut, on, off, active, inactive, lock, locked, a color, etc.), the types of values of the states (e.g., binary, float, etc.), a query for the state of the device, adjectives associated with a specific type of state (e.g., warmer, cooler, brighter, dimmer, a color, etc.), or the like. When used to parse "Turn it to 68," it can be determined that the textual representation includes the float value "68." When compared to the entries shown in FIG. 4, it can be determined that only "Upstairs Thermostat" and "Downstairs Thermostat" accept state float values. To disambiguate between the two thermostats, contextual information, such as a location of user device 102 can be used to select the thermostat that is closer to user device 102 as the electronic device identified at block 510. Similarly, if the textual representation instead included "Make it brighter," the set of words associated with a state can be used to determine that the textual representation includes the word "brighter," which is an adjective that describes the state of devices having the type "light." To disambiguate between the two lights, contextual information, such as a location of user device 102 can be used to select the light that is closer to user device 102 as the electronic device identified at block 510.

At block 512, a command to be performed by each of the one or more electronic devices identified at block 510 can be identified. The command(s) to be performed can be identified in any number of ways. In some examples, the command(s) to be performed can be identified by parsing the textual representation of user speech to identify any of the set of words associated with a state (e.g., the possible states of the electronic devices and their synonyms, the types of values of the states, a query for the state of the device, adjectives associated with a specific type of state). The identified state or operation can then be used to identify a command to be performed by each of the one or more electronic devices identified at block 510. For example, if the textual representation of user speech includes "Lock the front door," it can be determined that the textual representation includes the state "lock" from the set of states. Thus, a command to transition to the "lock" state can be generated and identified at block 512 as being the command to be performed by the electronic device "Front Door" that was identified at block 510. While a single command for a single electronic device is identified in the example above, it should be appreciated that multiple commands can be identified if multiple electronic devices were identified at block 510. For example, the textual representation "Turn on all of the lights" can result in the identification a command to transition to the "on" state for each of "Living Room Lamp 1" and "Living Room Lamp 2" at block 512.

In some examples, when the textual representation of user speech includes one of the adjectives associated with a specific type of state (e.g., warmer, cooler, brighter, dimmer, etc.), block 512 can include identifying a command to set a state of the electronic device identified at block 510 to a value relative to its current value. For example, if the textual representation includes "make it warmer," the command identified at block 514 can be a command to increase the temperature of the thermostat identified at block 510 by a predetermined amount. The command can be a command to change the state value by an amount relative to the electronic device's current value rather than a command to transition the state value to a specific value (e.g., determined using the state of the thermostat stored in data and models storage 120) since the actual state of the electronic device may differ from the state stored in data and models storage 120.

In some examples, when the textual representation of user speech includes a query for the state of the device, block 512 can include identifying an instruction to cause user device 102 to query the identified electronic device(s). For example, if the textual representation includes "Is the garage door closed?", the command identified at block 514 can be a command to query the state of electronic device "Garage Door."

At block 514, an identification of each of the one or more electronic devices identified at block 510 and the command(s) to be performed by the one or more electronic devices identified at block 512 can be transmitted to the user device. For example, server system 110 can transmit the unique identifier associated with each of the electronic devices identified at block 510 and the command(s) to be performed by the one or more electronic devices to user device 102 via network(s) 108.

In some examples, the textual representation of the user speech generated at block 508 can also be transmitted to the user device at block 514. In these examples, blocks 510 and 514 can also be performed on the user device. The transmitted textual representation can be used by the user device to identify one or more electronic devices and/or identify a command or commands to be performed by the one or more electronic devices in electronic device data 370. This can be desirable, for example, when the electronic device data 370 in the user device is more up-to-date than the data on the one or more servers. In such instances, the user device can identify an electronic devices and/or a command that is not included in the data of the one or more servers.

In other examples, the textual representation can be parsed at blocks 510 and/or 512 at the one or more servers to determine key words or terms that can be suitable for identifying one or more of electronic devices and/or identifying a command or commands to be performed by the one or more electronic devices. In these examples, the parsed key words or terms can also be transmitted to the user device at block 514. The transmitted key words or terms can be used by the user device to identify one or more electronic devices and/or identify a command or commands to be performed by the one or more electronic devices in electronic device data 370. This can be desirable, for example, when the electronic device data 370 in the user device is more up-to-date than the data on the one or more servers. In such instances, the user device can identify an electronic devices and/or a command that is not included in the data of the one or more servers.

At block 516, the identification of each of the one or more the electronic devices and command(s) transmitted by the one or more servers can be received by the user device. For example, user device 102 can receive the unique identifier(s) and the command(s) transmitted by server system 110 at block 514 via network(s) 108.

At block 518, the user device can transmit the command(s) received at block 516 to the electronic device(s) associated with the identifier(s) received at block 516. For example, if user device 102 received an identifier associated with electronic device 128 (e.g., "Front Door") and a command to transition the electronic device to a "locked" state at block 516, user device 102 can transmit the command to electronic device 128 to transition to the "locked" state via network(s) 126. If user device 102 received additional identifiers and commands at block 516, user device 102 can further transmit those commands to the identified electronic devices at block 518.

In some examples, the actual state of an electronic device may not be the same as the state of the electronic device as stored in user device 102 (e.g., in memory 350) and/or server system 110 (e.g., in data and models storage 120). For example, a door lock could have been manually opened or closed without using the virtual assistant of system 100. Thus, in some examples, block 518 can be performed regardless of the state of the electronic device as stored in user device 102 and/or server system 110. For example, a command to set a door lock's state to "locked" can be transmitted to the door lock even if the corresponding entry in user device 102 and/or server system 110 indicates that they door is already locked. Moreover, block 518 can be performed without first querying the electronic device (e.g., between blocks 516 and 518) to determine its actual state in order to reduce the amount of time required to issue a command to the electronic device. For example, the command to set the door lock's state to "locked" can be transmitted to the door lock without first querying its state, thereby reducing the time required to transmit the command to the door lock by an amount corresponding to the time required to send a query to the door lock and to receive the state from the door lock.

At block 520, the user device can receive a current state of each electronic device (that was sent a command at block 518) after each electronic device executes their respective command. For example, user device 102 can receive an updated status of electronic device 128 after it performed the command to set its state to "locked." In this example, the current state returned to user device 102 can be the state "locked." If commands were sent to more than one electronic device at block 518, block 520 can further include receiving current states from those electronic devices. In some examples, block 520 can further include updating the state of the electronic device in electronic device data 370 based on the received current state. For example, user device 102 can update the state of electronic device 128 in electronic device data 370 to "locked." In some examples, block 520 can further include outputting an audio or visual indication of a result of the command(s) transmitted to the electronic device(s) at block 518 based on the transmitted command(s) and the received current state(s) of the electronic device(s). For example, if the command transmitted to electronic device 128 was a command to transition the device's state to "locked" and the current state of electronic device 128 received at block 520 was "locked," an indication of the result can be that electronic device 128 was successfully transitioned to the "locked" state. Alternatively, if the received current state of the electronic device (e.g., "unlocked") differs from the desired state indicated in the command (e.g., "locked"), an indication of a failure to transition to the "locked" state can be presented to the user. The current state can further include an error state, such as an undetermined or unavailable state of the device.

At block 522, the user device can transmit the current state(s) of the electronic device(s) received at block 520 to the one or more servers. For example, user device 102 can transmit the current state of the electronic device received at block 520 to server system 110. If the current state of more than one electronic device was received at block 520, block 522 can further include transmitting those current states to server system 110.

At block 524, the one or more servers can receive the current state(s) of the electronic device(s) transmitted by the user device at block 522. For example, server system 110 can receive the current state of the electronic device transmitted by user device 102 at block 522. If user device 102 transmitted more than one current state, block 524 can further include receiving those current states as well. In some examples, block 524 can further include updating the state(s) of the electronic device(s) in data and models storage 120 based on the received current state(s). For example, server system 110 can update the state of electronic device 128 in data and models storage 120 to "locked."

In some examples, process 500 can further include generating a notification associated with the current state of one or more of the electronic devices in response to determining that a predetermined condition has been satisfied. For example, in response to the location of user device 102 exiting a predetermined area (e.g., an area corresponding to the user's home) while one or more of the electronic devices are in a predetermined state (e.g., the "Front Door" is unlocked), a notification can be presented to the user via user device 102 indicating that the user forgot to lock their door. Other similar notifications can be generated in response to other predetermined conditions.

Using process 500, a virtual assistant implemented by a user device can receive natural language commands to set the state or query any number of electronic devices. The natural language commands can refer to the electronic devices in any desired manner and need not include unique identifiers of the electronic devices or a type of the electronic device.

Remote Control of Electronic Devices

Figure 6:
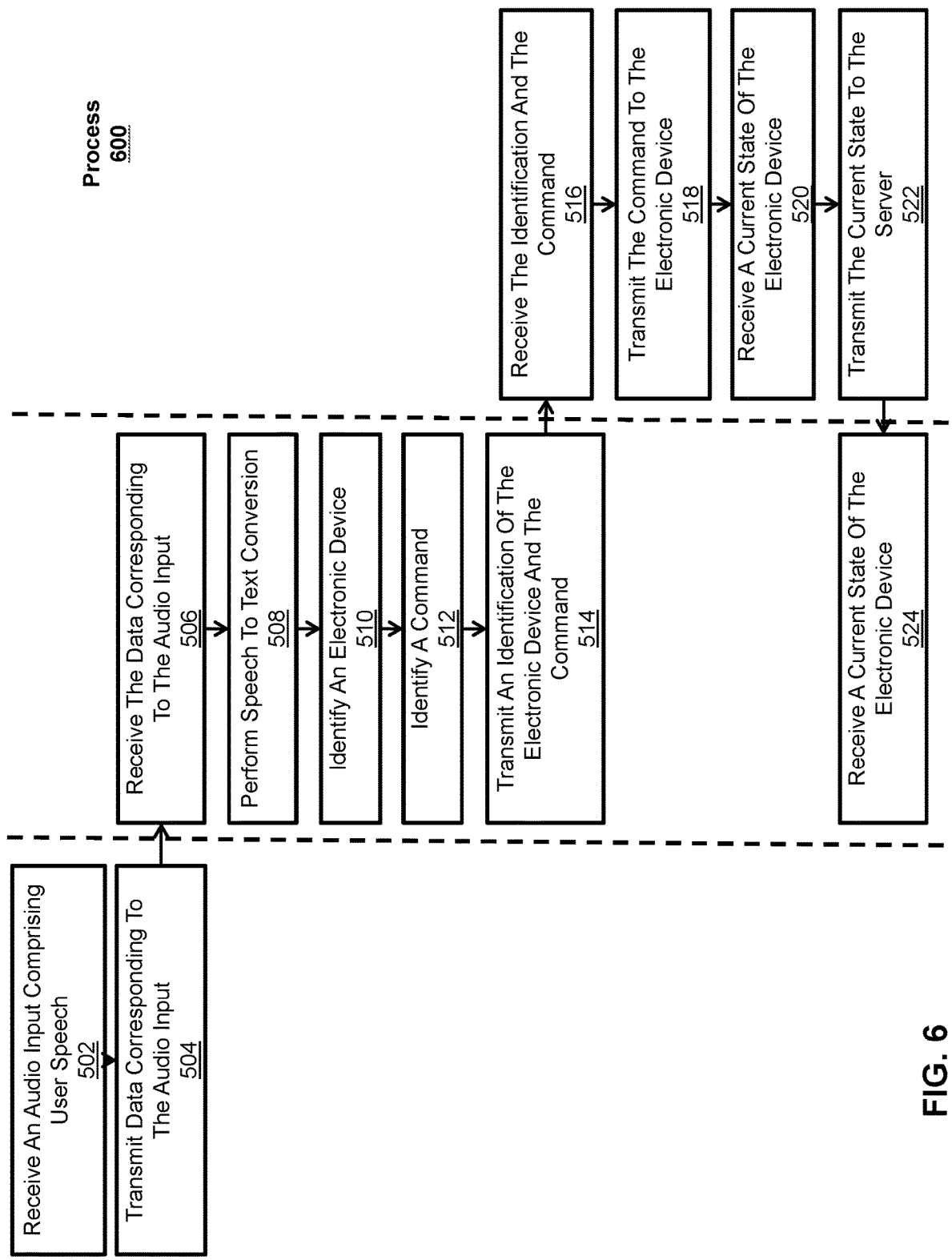
FIG. 6 illustrates an exemplary process for remotely controlling electronic devices using a virtual assistant implemented using a client-server model according to various examples.

FIG. 6 illustrates an exemplary process 600 for remotely controlling electronic devices using a virtual assistant. In some examples, process 600 can be similar to process 500, except that process 600 can be performed using a system similar or identical to system 200, shown in FIG. 2. For example, process 600 can be performed by a user device (e.g., user device 102) that is located remotely from the electronic devices being controlled (e.g., electronic devices 128, 130, and 132), and a second user device (e.g., second user device 134) can instead be used to control the electronic devices. Thus, portions of process 600 can be performed by each of user device 102, server system 110, and second user device 134. Specifically, the blocks on the left side of FIG. 6 can be performed by user device 102, the blocks in the middle of FIG. 6 can be performed by server system 110, and the blocks on the right side of FIG. 6 can be performed by second user device 134.

The blocks of process 600 can be similar or identical to the identically numbered blocks of process 500, except that blocks 516, 518, 520, and 522 of process 600 can instead be performed by a second user device (e.g., second user device 134). Additionally, as a result, the identification of each of the one or more electronic devices and command(s) to be performed by the electronic device(s) can instead be transmitted to the second user device at block 514, and the current state(s) of the electronic device(s) can instead be received from the second user device at block 524.

In some examples, process 600 can further include transmitting, by the one or more servers, the current state(s) of the electronic device(s) received at block 524 to the user device that received the audio input at block 502. Additionally or alternatively, the process can include transmitting an indication of success of the command transmitted to the electronic device at block 518. For example, a visual or audio output can be generated that notifies the user of the success, partial success, or failure to execute the command by the electronic device. The success determination can depend on the command transmitted to the electronic device and the current state of the device received at block 524.

Standalone Control of Electronic Devices

Figure 7:
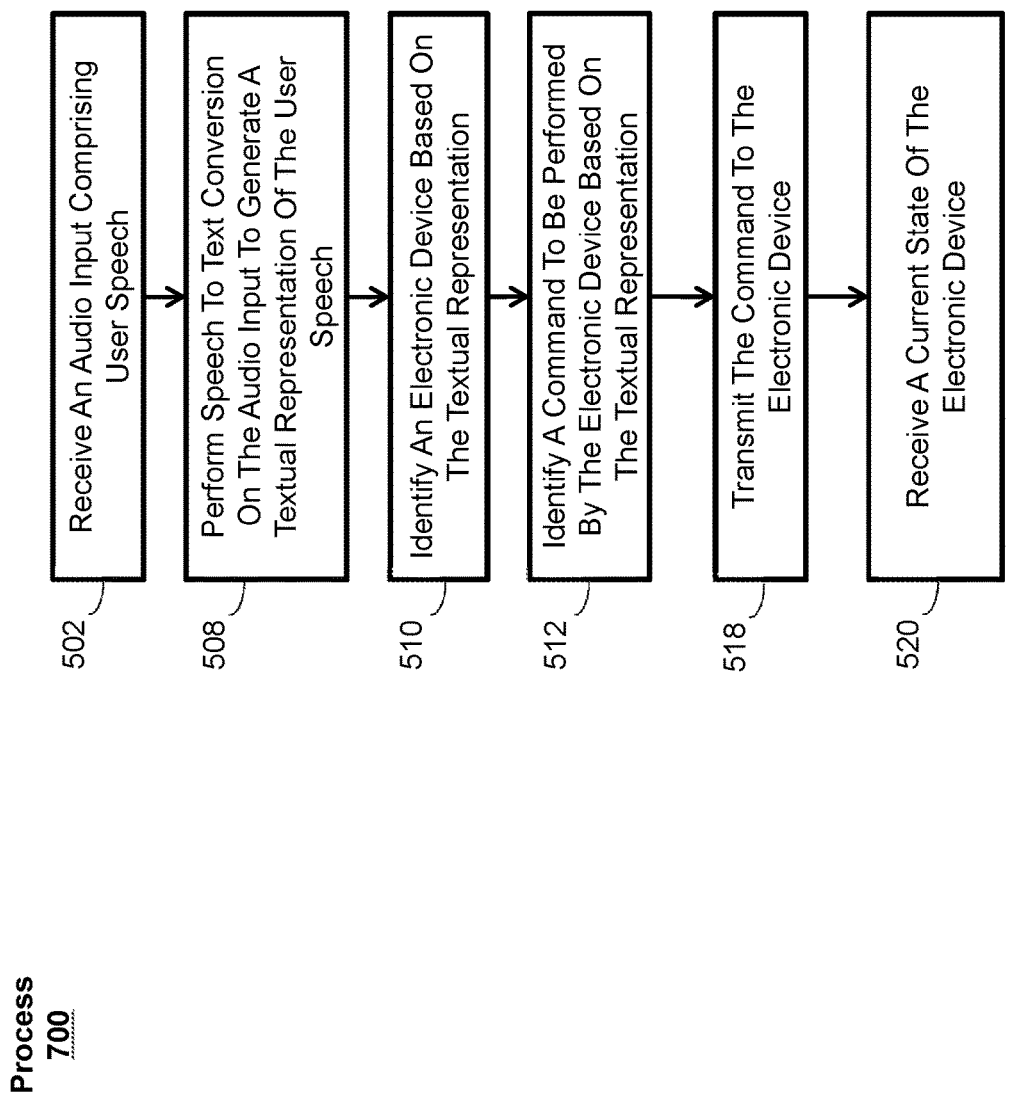
FIG. 7 illustrates an exemplary process for controlling electronic devices using a virtual assistant on a standalone user device according to various examples.

FIG. 7 illustrates an exemplary process 700 for controlling electronic devices using a virtual assistant. In some examples, process 700 can be similar to process 500, except that process 700 can be performed using a standalone user device that can perform the functions of both user device 102 and server system 110. As a result, all blocks of process 700 can be performed by the user device (e.g., user device 102).

The blocks of process 700 can be similar or identical to the identically numbered blocks of process 500, except that blocks 508, 510, and 512 can instead be performed by the user device (e.g., user device 102). Additionally, as a result, the blocks corresponding to functions for communicating between user device 102 and server system 110 (e.g., blocks 504, 506, 514, 516, 522, and 524) need not be performed.

Storing a Configuration of Electronic Devices

Figure 8:
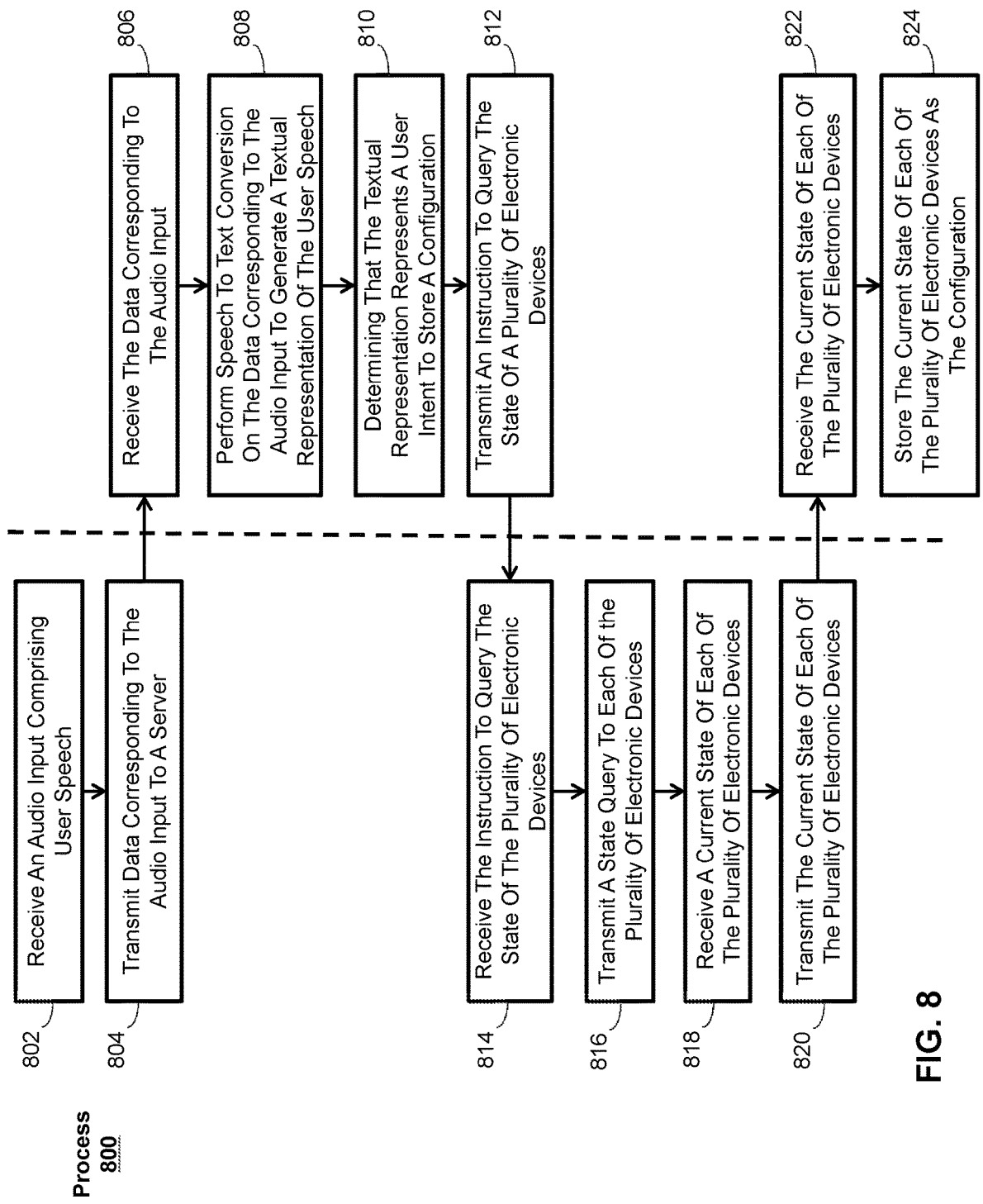
FIG. 8 illustrates an exemplary process for storing the states of electronic devices as a configuration according to various examples.

FIG. 8 illustrates an exemplary process 800 for storing the states of multiple electronic devices as a configuration using a virtual assistant. The configuration can represent a stored set of states of the multiple electronic devices that can be referenced in a spoken user input to cause the multiple electronic devices to transition to the states defined in the configuration. For example, a user may create a "sleep" configuration in which the states of all lights are set to off, the states of the thermostats are set to 72° F., the state of all doors are set to locked, and the state of the garage door is set to closed. Thus, when the user is about to go to sleep, the user can provide user device 102 with a command that references the stored configuration, such as "I'm going to sleep," and system 100 can set the states of the electronic devices based on the stored states in the sleep configuration. In some examples, process 800 can be performed using a system similar or identical to system 100, shown in FIG. 1. In these examples, the blocks of process 800 can be performed by both user device 102 and server system 110. Specifically, the blocks on the left side of FIG. 8 can be performed by user device 102, while the blocks on the right can be performed by server system 110.

At block 802, an audio input including user speech can be received at a user device in a manner similar or identical to block 502 of process 500. At block 804, data corresponding to the audio input received at block 802 can be transmitted to one or more servers for processing in a manner similar or identical to block 504 of process 500.

At block 806, the data corresponding to the audio input transmitted by the user device at block 804 can be received by one or more servers in a manner similar or identical to block 506 of process 500. At block 808, speech to text conversion can be performed on the data corresponding to the audio input to convert the user speech into a textual representation of the user speech in a manner similar or identical to block 508 of process 500.

At block 810, it can be determined that the textual representation of the user speech represents a user intent to store the states of the electronic devices of system 100 as a configuration. For example, one or more processing modules 118 of server system 110 can utilize data and model storage 120 to determine the user's intent based on natural language input. In some examples, this can include parsing the textual representation for words likely to be related to storing a configuration, such as "save," "store," "name," "keep," "configuration," "scene," their synonyms, and the like. For example, if the textual representation includes "Store this configuration as sleep," it can be determined at block 810 that the user intends to store the state of the electronic devices as a configuration named "sleep." Other textual representations, such as "Save this scene as work," can similarly result in a determination at block 810 that the user intends to store the state of the electronic devices as a configuration named "work."

At block 812, in response to determining that the textual representation of the user speech represents a user intent to store the state of the electronic devices of system 100 as a configuration, the one or more servers can transmit an instruction to the user device to query the state of the electronic devices. For example, server system 110 can transmit an instruction to user device 102 to query the state of electronic devices 128, 130, and 132 via network(s) 108.

At block 814, the instruction to query the state of the electronic devices transmitted by the one or more servers can be received by the user device. For example, user device 102 can receive the instruction to query the state of electronic devices 128, 130, and 132 from server system 110 via network(s) 108.

At block 816, the user device can transmit a query to each of the electronic devices for their current state. For example, user device 102 can transmit a command to each of electronic devices 128, 130, and 132 instructing them to return their current state via network(s) 126.

At block 818, the user device can receive a current state of each of the electronic device(s) in response to the query transmitted at block 516 (or a current state of all electronic devices capable of transmitting their current state). For example, user device 102 can receive a current state of electronic devices 128, 130, and 132 via network(s) 126 in response to the query sent to each of the devices at block 816. In some examples, block 818 can further include updating the state of the electronic device in electronic device data 370 based on the received current state. The current state can further include an error state, such as an undetermined or unavailable state of the device.

At block 820, the user device can transmit the current states of the electronic devices received at block 818 to the one or more servers. For example, user device 102 can transmit the current states of the electronic devices received at block 818 to server system 110.

At block 822, the one or more servers can receive the current states of the electronic devices transmitted by the user device at block 820. For example, server system 110 can receive the current state of electronic devices 128, 130, and 132 from user device 102 via network(s) 126.

At block 824, the one or more servers can store the current states of the electronic devices received at block 822 as a configuration. In some examples, the configuration can be assigned a unique identifier, such as "sleep," "morning," "work," or the like, based on the name provided in the textual representation and identified at block 810. For example, server system 110 can store the current states of electronic devices 128, 130, and 132 as a "sleep" configuration in model and data storage 120 in response to a user speech received at block 802 that included "name this configuration sleep."

Controlling Electronic Devices Using a Stored Configuration

Figure 9:
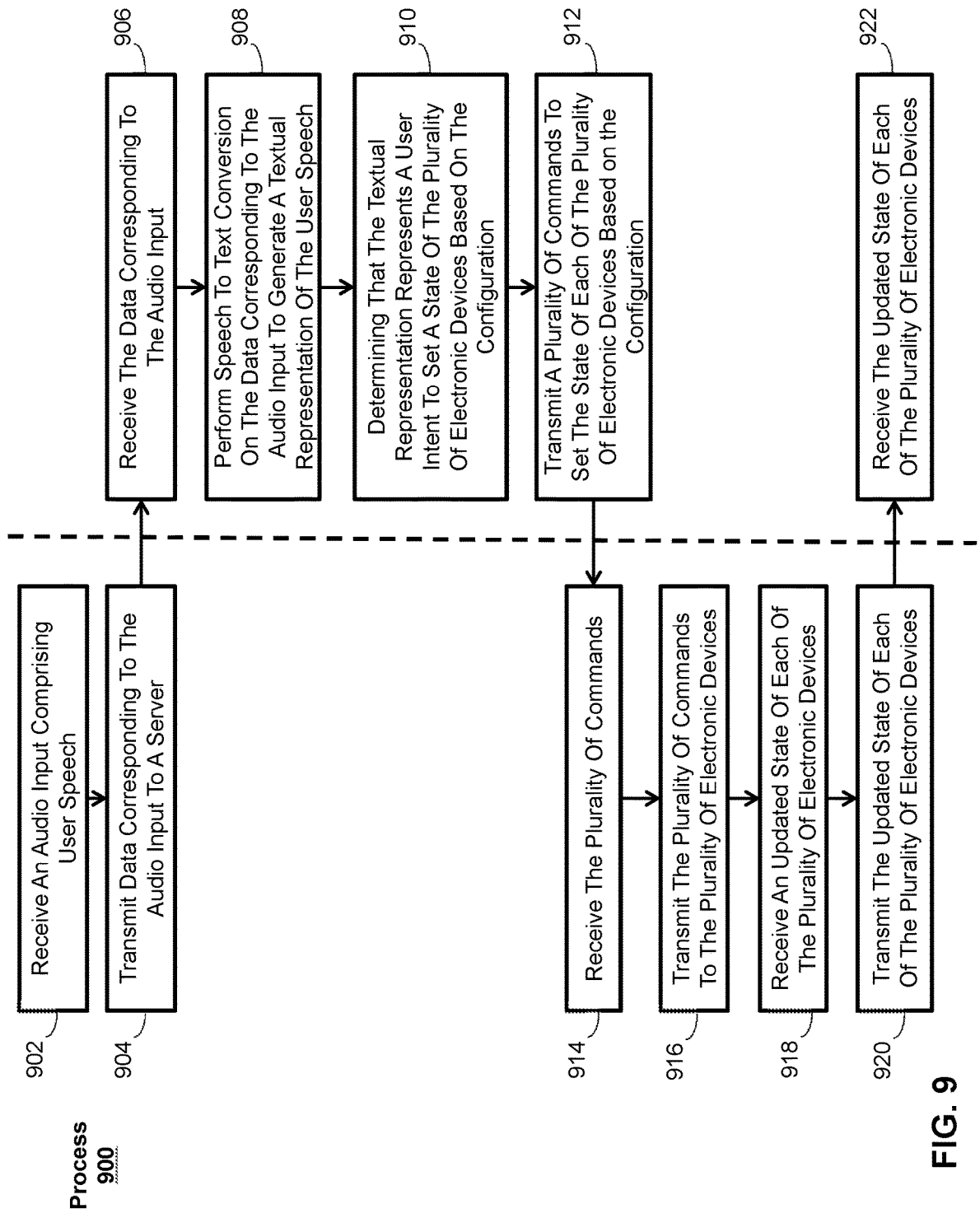
FIG. 9 illustrates an exemplary process for setting the states of electronic devices using a previously stored configuration according to various examples.

FIG. 9 illustrates an exemplary process 900 for setting the states of multiple electronic devices using a previously stored configuration (e.g., created using process 800) using a virtual assistant. In some examples, process 900 can be performed using a system similar or identical to system 100, shown in FIG. 1. In these examples, the blocks of process 900 can be performed by both user device 102 and server system 110. Specifically, the blocks on the left side of FIG. 9 can be performed by user device 102, while the blocks on the right can be performed by server system 110.

At block 902, an audio input including user speech can be received at a user device in a manner similar or identical to block 502 of process 500. At block 904, data corresponding to the audio input received at block 902 can be transmitted to one or more servers for processing in a manner similar or identical to block 504 of process 500.

At block 906, data corresponding to the audio input transmitted by the user device at block 904 can be received by one or more servers in a manner similar or identical to block 506 of process 500. At block 908, speech to text conversion can be performed on the user speech of the audio input to convert the user speech into a textual representation of the user speech in a manner similar or identical to block 508 of process 500.

At block 910, it can be determined that the textual representation of the user speech represents a user intent to set the states of the electronic devices of system 100 based on a stored configuration. For example, one or more processing modules 118 of server system 110 can utilize data and model storage 120 to determine the user's intent based on natural language input. In some examples, this can include parsing the textual representation for words likely to be related to using a stored configuration, such as the unique identifiers associated with the stored configurations, "set," "configuration," "scene," their synonyms, or the like. For example, if the textual representation includes "I'm going to sleep," it can be determined at block 910 that the user intends to set the state of the electronic devices based on the "sleep" configuration. Other textual representations, such as "night mode," "set to sleep," or the like, can similarly result in a determination at block 910 that the user intends set the state of the electronic devices based on the "sleep" configuration.

At block 912, commands to set the states of the electronic devices of system 100 based on the configuration identified at block 910 can be transmitted by the one or more servers to the user device. Identifications associated with the commands can also be transmitted to identify which devices are to perform each command. For example, server system 110 can transmit the unique identifiers associated with the electronic devices and the commands that are to be performed by those electronic devices to cause the electronic devices to be in the states specified by the stored configuration.

At block 914, commands to set the states of the electronic devices of system 100 transmitted by the server(s) can be received by the user device. For example, user device 102 can receive the commands transmitted by server system 110 at block 912 via network(s) 108.

At block 916, the user device can transmit the commands received at block 914 to the electronic devices associated with the commands. For example, user device 102 can transmit commands to electronic devices 128, 130, and 132 via network(s) 126 to cause the electronic devices to be in the states specified by the stored configuration.

In some examples, the actual state of an electronic device may not be the same as the state of the electronic device as stored in user device 102 (e.g., in memory 350) and/or server system 110 (e.g., in data and models storage 120). Thus, in some examples and similar to process 500, block 916 can be performed regardless of the state of the electronic device as stored in user device 102 and/or server system 110, and without first querying the electronic devices (e.g., between blocks 914 and 916) to determine their actual states in order to reduce the amount of time required to issue a command to the electronic devices.

At block 918, the user device can receive an updated state of the electronic devices after the electronic devices perform the commands transmitted by the user device at block 916. For example, user device 102 can receive updated statuses of electronic devices 128, 130, and 132 after they performed the commands to set their states to the states specified by the stored configuration. In some examples, block 920 can further include updating the state of the electronic device in electronic device data 370 based on the received current state. For example, user device 102 can update the state of electronic device 128 in electronic device data 370 to "locked." In some examples, similar to block 520, block 918 can further include outputting an audio or visual indication of a result of the command(s) transmitted to the electronic device(s) at block 916 based on the transmitted command(s) and the received current state(s) of the electronic device(s). The updated state can further include an error state, such as an undetermined or unavailable state of the device.

At block 920, the user device can transmit the updated states of the electronic device received at block 918 to the one or more servers. For example, user device 102 can transmit the updated states of the electronic devices received at block 918 to server system 110.

At block 922, the one or more servers can receive the updated states of the electronic devices transmitted by the user device at block 920. For example, server system 110 can receive the updated states of the electronic devices transmitted by user device 102 at block 920. In some examples, block 922 can further include updating the states of the electronic devices in data and models storage 120 based on the received updated states.

In some examples, additionally or alternatively, the states of the electronic devices can be configured using a stored configuration in response to determining that a predetermined condition has been satisfied. For example, in response to the location of user device 102 entering a predetermined area (e.g., an area corresponding to the user's home), commands can be sent to the electronic devices to transition to states specified by a stored configuration (e.g., a "home" configuration). Similarly, commands can be sent to the electronic devices to transition to states specified by another stored configuration (e.g., a "work" configuration) in response to the location of user device 102 exiting a predetermined area (e.g., an area corresponding to the user's home) during a predetermined window of time (e.g., between 8-9 a.m. on a weekday). Other similar predetermined conditions can be created to cause system 100 to configure the electronic devices based on stored configurations.

Electronic Device

Figure 10:
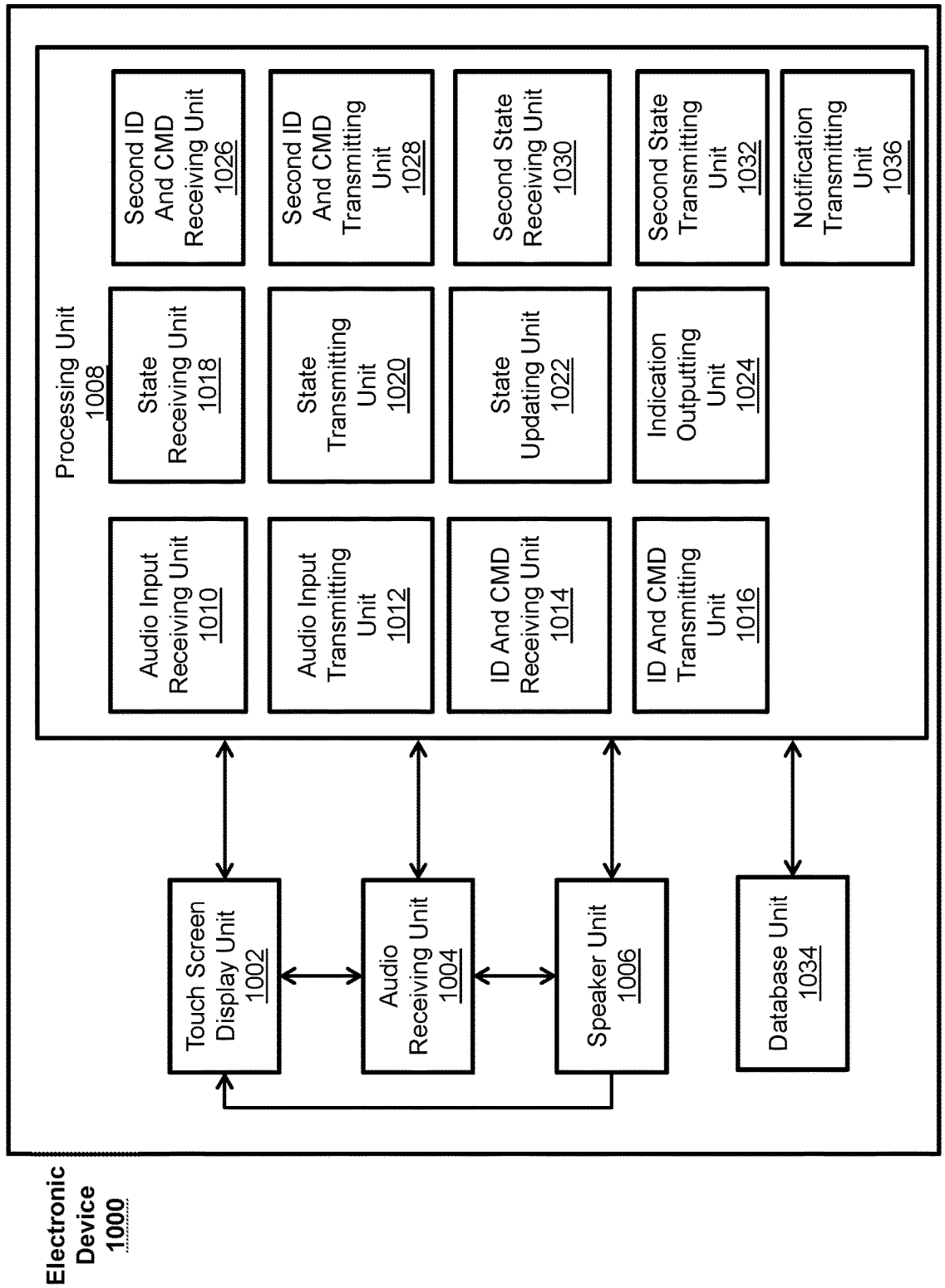
FIG. 10 illustrates a functional block diagram of an electronic device configured to control electronic devices according to various examples.

In accordance with some examples, FIG. 10 shows a functional block diagram of an electronic device 1000 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 10 can be combined or separated into sub-blocks to implement the principles of the various described examples. Therefore, the description herein optionally supports any possible combination or separation or further definition of the functional blocks described herein.

As shown in FIG. 10, electronic device 1000 can include a touch screen display unit 1002 configured to display a user interface and to receive touch input, and a sound receiving unit 1004 configured to receive sound input. In some examples, electronic device 1000 can include a speaker unit 1006 configured to generate sound. Electronic device 1000 can further include a processing unit 1008 coupled to touch screen display unit 1002 and sound receiving unit 1004 (and, optionally, coupled to speaker unit 1006). In some examples, processing unit 1008 can include an audio input receiving unit 1010, an audio input transmitting unit 1012, an identification and command receiving unit 1014, an identification and command transmitting unit 1016, a state receiving unit 1018, a state transmitting unit 1020, a state updating unit 1022, an indication outputting unit 1024, a second identification and command receiving unit 1026, a second identification and command transmitting unit 1028, and a second state receiving unit 1030, a second state transmitting unit 1032, and a notification transmitting unit 1036.

Processing unit 1008 can be configured to receive an audio input (e.g., using audio input receiving unit 1010) containing user speech. Processing unit 1008 can be further configured to transmit (e.g., using audio input transmitting unit 1012) data corresponding to the audio input to one or more servers. Processing unit 1008 can be further configured to receive (e.g., using identification and command receiving unit 1014), from the one or more servers, an identification of a first electronic device determined by the one or more servers based on the data corresponding to the audio input and a first command to be performed by the first electronic device determined by the one or more servers based on the data corresponding to the audio input. The first command can be transmitted to the first electronic device (e.g., using identification and command transmitting unit 1016). A current state of the first electronic device can be received (e.g., using state receiving unit 1018) from the first electronic device after transmitting the first command to the first electronic device. The current state of the first electronic device can be transmitted (e.g., using state transmitting unit 1020) to the one or more servers.

In some examples, first electronic device includes a light bulb. In other examples, the first command includes a command to set an ON/OFF state, dimmable state, or color state of the light. In yet other examples, the current state of the first electronic device includes the ON/OFF state, dimmable state, or color state of the light bulb after transmitting the first command to set the ON/OFF state, dimmable state, or color state of the light bulb.

In some examples, first electronic device includes a switch. In other examples, the first command includes a command to set an ON/OFF state of the switch. In yet other examples, the current state of the first electronic device includes the ON/OFF state of the switch after transmitting the first command to set the ON/OFF state of the switch.

In some examples, the first electronic device includes an electrical outlet. In other examples, the first command includes a command to set an ACTIVE/INACTIVE state of the electrical outlet. In yet other examples, the current state of the first electronic device includes the ACTIVE/INACTIVE state of the electrical outlet after transmitting the command to set the ACTIVE/INACTIVE state of the electrical outlet.

In some examples, the first electronic device includes a door lock. In other examples, the first command includes a command to set a LOCKED/UNLOCKED state of the door lock. In yet other examples, the current state of the first electronic device includes the LOCKED/UNLOCKED state of the door lock after transmitting the command to set the LOCKED/UNLOCKED state of the door lock.

In some examples, the first electronic device includes a garage door. In other examples, the first command includes a command to set an OPEN/CLOSED state of the garage door. In yet other examples, the current state of the first electronic device includes the OPEN/CLOSED state of the garage door after transmitting the command to set the OPEN/CLOSED state of the garage door.

In some examples, the first electronic device includes a thermostat. In other examples, the first command includes a command to set a numerical value of a temperature setting of the thermostat. In yet other examples, the current state of the first electronic device includes the numerical value of the temperature setting of the thermostat after transmitting the first command to set the numerical value of the temperature setting of the thermostat.

In some examples, the first command includes a query for the current state of the first electronic device.

In some examples, the first command can be transmitted (e.g., using identification and command transmitting unit 1016) to first electronic device over a local wireless network.

In some examples, the first command can be transmitted to the first electronic device directly through Bluetooth, line of sight, peer-to-peer, or WiFi communication.

In some examples, processing unit 1008 can be configured to exclude querying the first electronic device for the state of the first electronic device between receiving the first command from the one or more servers and transmitting the first command to the first electronic device.

In some examples, electronic device 1000 can further include a database unit 1034 for storing a state of each of a plurality of electronic devices, the plurality of electronic devices including the first electronic device. In other examples, processing unit 1008 can be further configured to update (e.g., using state updating unit 1022) a state of the first electronic device stored in database unit 1034 based at least in part on the current state of the first electronic device received from the first electronic device.

In some examples, processing unit 1008 can be further configured to output (e.g., using indication outputting unit 1024) an indication of a result of the first command based on the first command and the current state of the first electronic device received from the first electronic device.

In some examples, electronic device 1000 can include a mobile phone, desktop computer, laptop computer, tablet computer, portable media player, television, television set-top box, or wearable electronic device.

In some examples, processing unit 1008 can be further configured to receive (e.g., using second identification and command receiving unit 1026), from the one or more servers, an identification of a second electronic device determined by the one or more servers based on the data corresponding to the audio input and a second command to be performed by the second electronic device determined by the one or more servers based on the data corresponding to the audio input. Processing unit 1008 can be further configured to transmit (e.g., using second identification and command transmitting unit 1028) the second command to the second electronic device and to receive (e.g., using second state receiving unit 1030), after transmitting the second command to the second electronic device, a current state of the second electronic device from the second electronic device. Processing unit 1008 can be further configured to transmit (e.g., using second state transmitting unit 1032) the current state of the second electronic device to the one or more servers.

In some examples, processing unit 1008 can be further configured to transmit (e.g., using notification transmitting unit 1036) a notification associated with the current state of the first electronic device in response to determining that a predetermined condition has been satisfied.

Figure 11:
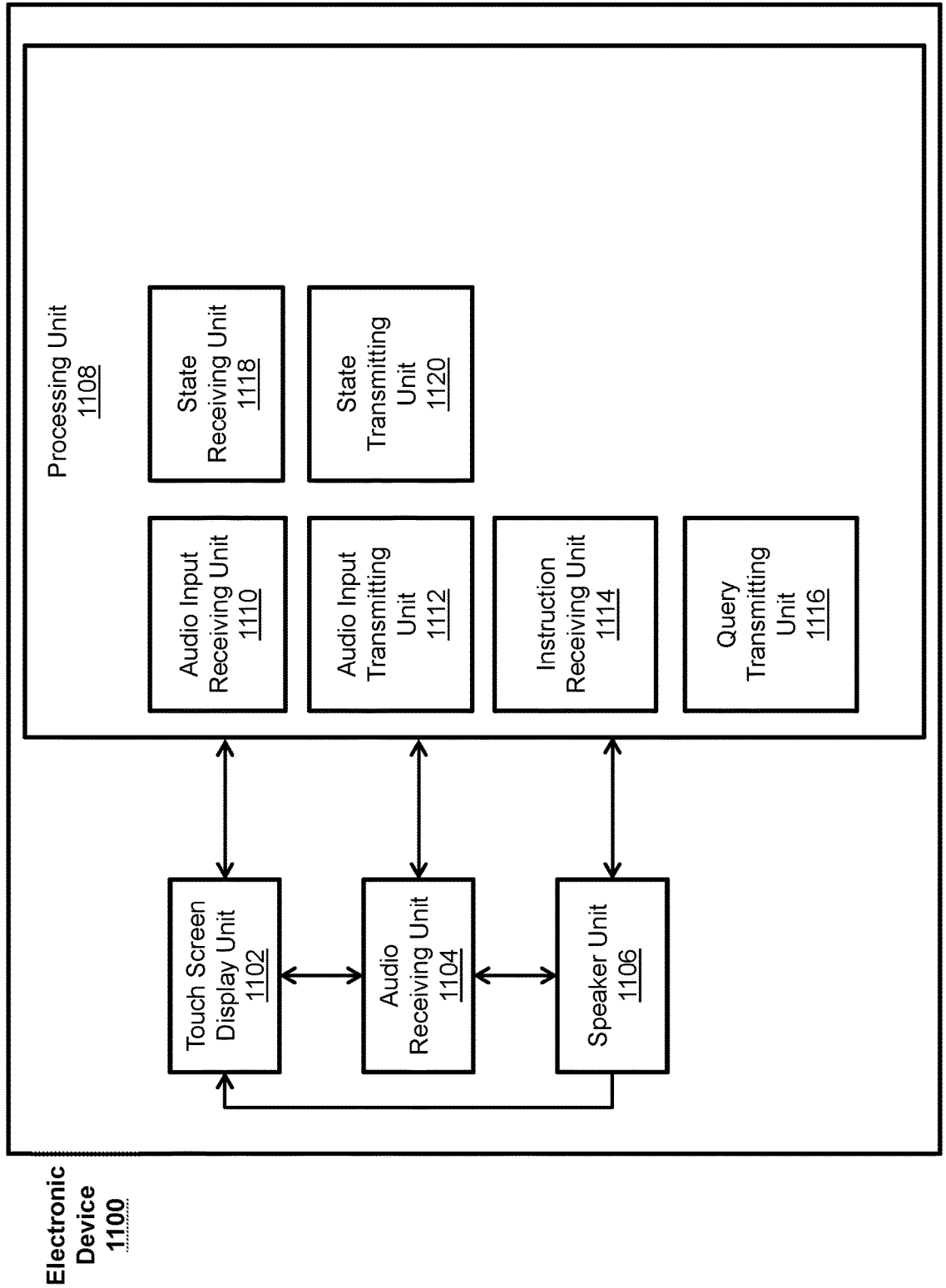
FIG. 11 illustrates a functional block diagram of an electronic device configured to store the states of electronic devices as a configuration according to various examples.

In accordance with some examples, FIG. 11 shows a functional block diagram of an electronic device 1100 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 11 can be combined or separated into sub-blocks to implement the principles of the various described examples. Therefore, the description herein optionally supports any possible combination or separation or further definition of the functional blocks described herein.

As shown in FIG. 11, electronic device 1100 can include a touch screen display unit 1102 configured to display a user interface and to receive touch input, and a sound receiving unit 1104 configured to receive sound input. In some examples, electronic device 1100 can include a speaker unit 1106 configured to generate sound. Electronic device 1100 can further include a processing unit 1108 coupled to touch screen display unit 1102 and sound receiving unit 1104 (and, optionally, coupled to speaker unit 1106). In some examples, processing unit 1108 can include an audio input receiving unit 1110, an audio input transmitting unit 1112, an instruction receiving unit 1114, a query transmitting unit 1116, a state receiving unit 1118, and a state transmitting unit 1120.

Processing unit 1108 can be configured to receive an audio input (e.g., using audio input receiving unit 1110) containing user speech. Processing unit 1108 can be further configured to transmit (e.g., using audio input transmitting unit 1112) data corresponding to the audio input to one or more servers. Processing unit 1108 can be further configured to receive (e.g., using instruction receiving unit 1114), from the one or more servers, an instruction to query a state of each of a plurality of electronic devices determined by the one or more servers based on the data corresponding to the audio input. A state query can be transmitted (e.g., using query transmitting unit 1116) to each of the plurality of electronic devices, and a current state of each of the plurality of electronic devices can be received (e.g., using state receiving unit 1118) from the plurality of electronic devices. The current state of each of the plurality of electronic devices can be transmitted (e.g., using state transmitting unit 1120) to the one or more servers to be stored as a configuration.

Figure 12:
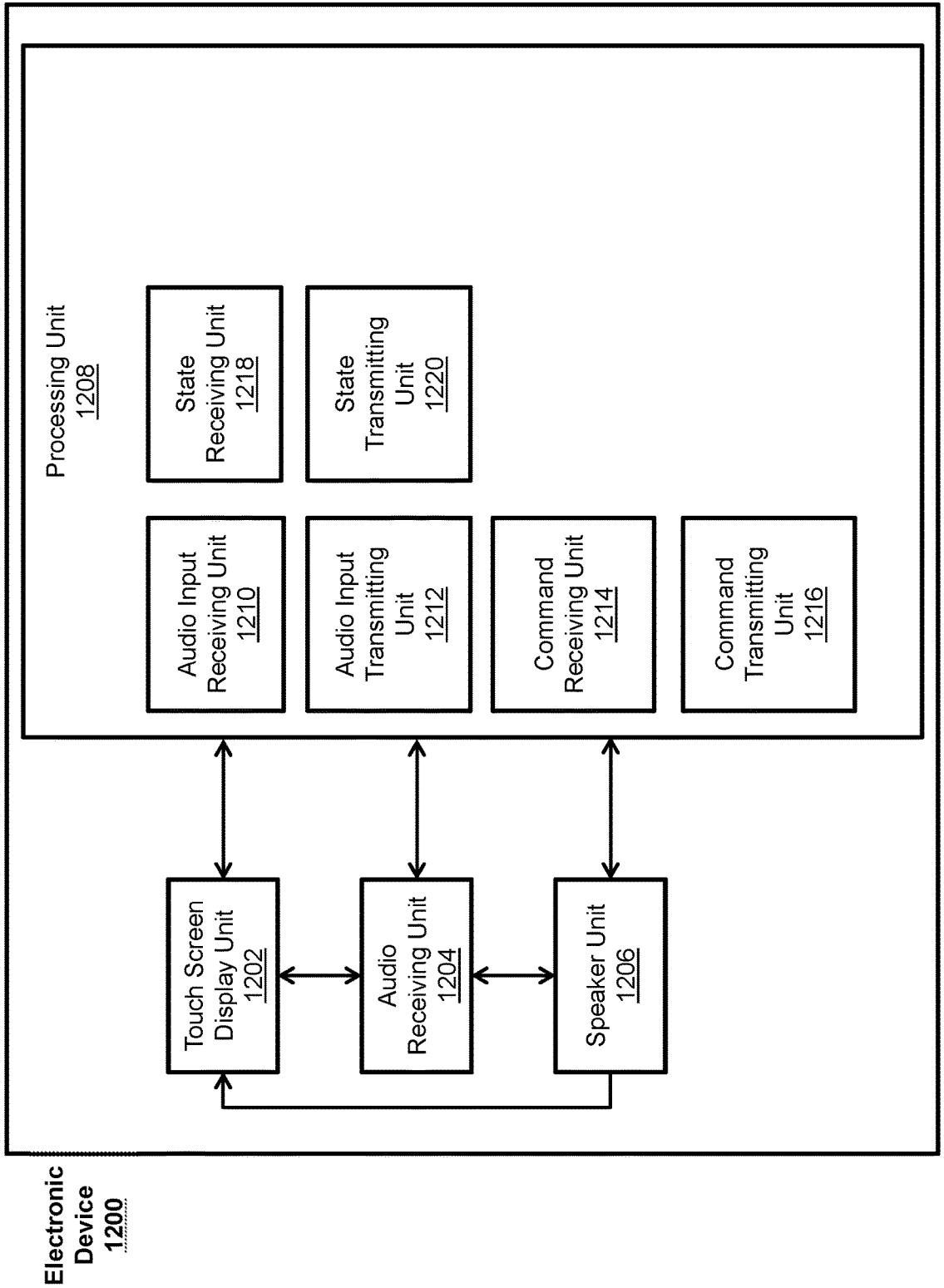
FIG. 12 illustrates a functional block diagram of an electronic device configured to set the states of electronic devices based on a stored configuration according to various examples.

In accordance with some examples, FIG. 12 shows a functional block diagram of an electronic device 1200 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 12 can be combined or separated into sub-blocks to implement the principles of the various described examples. Therefore, the description herein optionally supports any possible combination or separation or further definition of the functional blocks described herein.

As shown in FIG. 12, electronic device 1200 can include a touch screen display unit 1202 configured to display a user interface and to receive touch input, and a sound receiving unit 1204 configured to receive sound input. In some examples, electronic device 1200 can include a speaker unit 1206 configured to generate sound. Electronic device 1200 can further include a processing unit 1208 coupled to touch screen display unit 1202 and sound receiving unit 1204 (and, optionally, coupled to speaker unit 1206). In some examples, processing unit 1208 can include an audio input receiving unit 1210, an audio input transmitting unit 1212, an instruction receiving unit 1214, a query transmitting unit 1216, a state receiving unit 1218, and a state transmitting unit 1220.

In some examples, processing unit 1208 can be further configured to receive (e.g., using audio input receiving unit 1210) an audio input including a user speech, transmit (e.g., using audio input transmitting unit 1212) data corresponding to the audio input to the one or more servers, and receive (e.g., using command receiving unit 1214), from the one or more servers, a plurality of commands to set the state of each of the plurality of electronic devices determined by the one or more servers based on a stored configuration. Processing unit 1208 can be further configured to transmit (e.g., using command transmitting unit 1216) the plurality of commands to the plurality of electronic devices. Processing unit 1208 can be further configured to receive (e.g., using state receiving unit 1218) an updated state of each of the plurality of electronic devices from the plurality of electronic devices and to transmit (e.g., using state transmitting unit 1220) the updated state of each of the plurality of electronic devices to the one or more servers.

Figure 13:
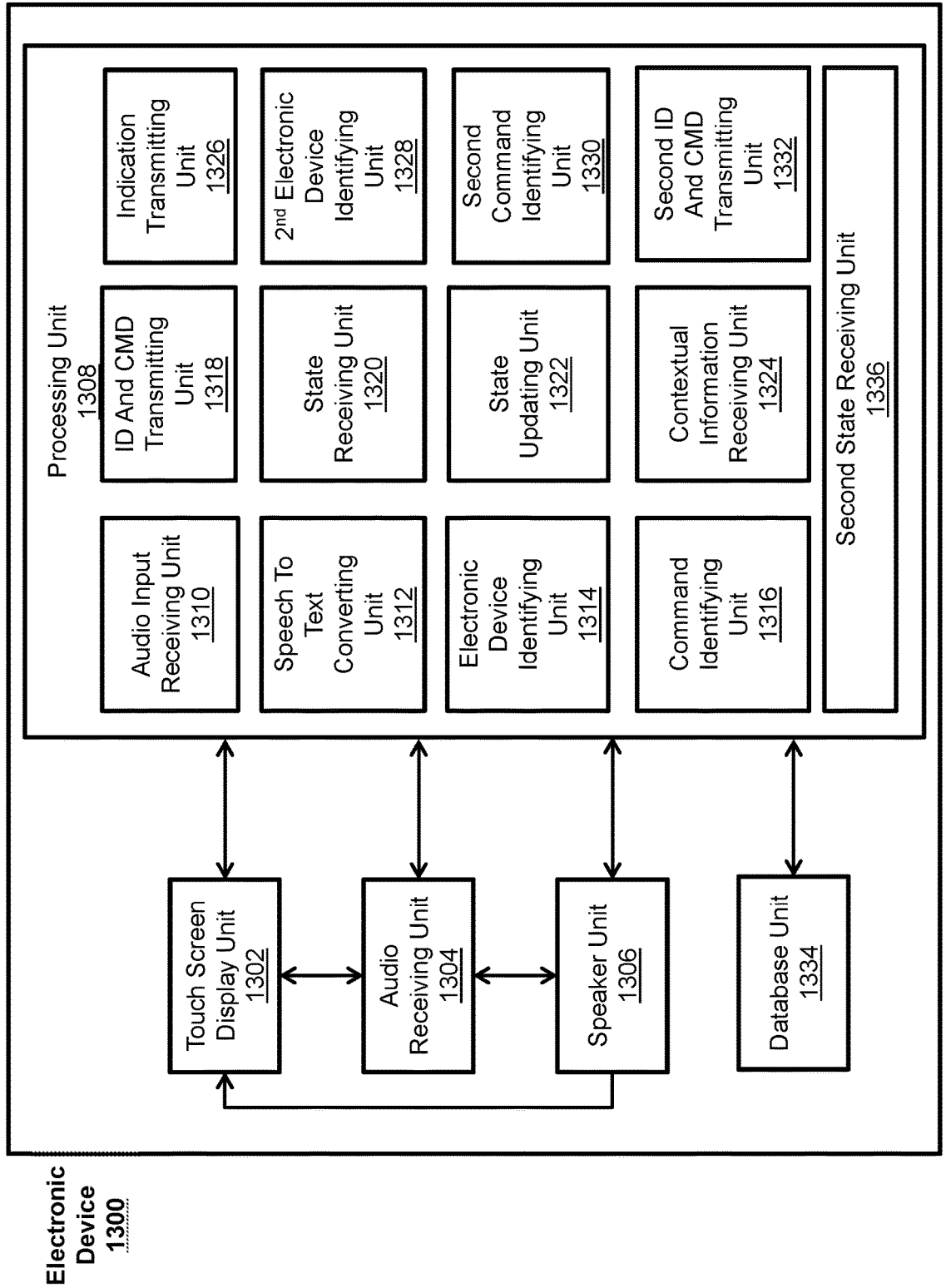
FIG. 13 illustrates a functional block diagram of an electronic device configured to control electronic devices according to various examples.

As shown in FIG. 13, electronic device 1300 can include a touch screen display unit 1302 configured to display a user interface and to receive touch input, and a sound receiving unit 1304 configured to receive sound input. In some examples, electronic device 1300 can include a speaker unit 1306 configured to generate sound. Electronic device 1300 can further include a processing unit 1308 coupled to touch screen display unit 1302 and sound receiving unit 1304 (and, optionally, coupled to speaker unit 1306). In some examples, processing unit 1308 can include an audio input receiving unit 1310, speech-to-text converting unit 1312, an electronic device identifying unit 1314, a command identifying unit 1316, an identification and command transmitting unit 1318, a state receiving unit 1320, a state updating unit 1322, a contextual information receiving unit 1324, an indication transmitting unit 1326, a second electronic device identifying unit 1328, a second command identifying unit 1330, a second identification and command transmitting unit 1332, and a second state receiving unit 1336.

Processing unit 1308 can be configured to receive data corresponding to an audio input (e.g., using audio input receiving unit 1310) containing user speech. Processing unit 1308 can be further configured perform (e.g., using speech to text converting unit 1312) speech-to-text conversion on the data corresponding to the audio input to generate a textual representation of the user speech. Processing unit 1308 can be further configured to identify (e.g., using electronic device identifying unit 1314) a first electronic device based on the textual representation of the user speech. Processing unit 1308 can be further configured to identify (e.g., using command identifying unit 1316) a first command to be performed by the first electronic device based on the textual representation of user speech. Processing unit 1308 can be further configured to transmit (e.g., using identification and command transmitting unit 1318) an identification of the first electronic device and the first command to the user device. Processing unit 1308 can be further configured to receive (e.g., using state receiving unit 1320) a current state of the first electronic device.

In some examples, first electronic device includes a light bulb. In other examples, the first command includes a command to set an ON/OFF state, dimmable state, or color state of the light. In yet other examples, the current state of the first electronic device includes the ON/OFF state, dimmable state, or color state of the light bulb after transmitting the first command to set the ON/OFF state, dimmable state, or color state of the light bulb.

In some examples, the first electronic device includes an electrical outlet. In other examples, the first command includes a command to set an ACTIVE/INACTIVE state of the electrical outlet. In yet other examples, the current state of the first electronic device includes the ACTIVE/INACTIVE state of the electrical outlet after transmitting the command to set the ACTIVE/INACTIVE state of the electrical outlet.

In some examples, the first electronic device includes a switch. In other examples, the first command includes a command to set an ON/OFF state of the switch. In yet other examples, the current state of the first electronic device includes the ON/OFF state of the electrical outlet after transmitting the command to set the ON/OFF state of the switch.

In some examples, the first electronic device includes a door lock. In other examples, the first command includes a command to set a LOCKED/UNLOCKED state of the door lock. In yet other examples, the current state of the first electronic device includes the LOCKED/UNLOCKED state of the door lock after transmitting the command to set the LOCKED/UNLOCKED state of the door lock.

In some examples, the first electronic device includes a garage door. In other examples, the first command includes a command to set an OPEN/CLOSED state of the garage door. In yet other examples, the current state of the first electronic device includes the OPEN/CLOSED state of the garage door after transmitting the command to set the OPEN/CLOSED state of the garage door.

In some examples, the first electronic device includes a thermostat. In other examples, the first command includes a command to set a numerical value of a temperature setting of the thermostat. In yet other examples, the current state of the first electronic device includes the numerical value of the temperature setting of the thermostat after transmitting the first command to set the numerical value of the temperature setting of the thermostat.

In some examples, the first command includes a query for the current state of the first electronic device.

In some examples, electronic device 1300 further includes a database unit 1334 for storing a name, a type, and a state of each of a plurality of electronic devices, the plurality of electronic devices comprising the first electronic device. In other examples, processing unit 1308 can be further configured to update (e.g., using state updating unit 1322) the state of the first electronic device stored in database unit 1334 based on the current state of the first electronic device.

In some examples, processing unit 1308 can be further configured to receive (e.g., using contextual information receiving unit 1324) contextual information within the data corresponding to the audio input from the user device. In other examples, processing unit 1308 can be further configured to identify (e.g., using electronic device identifying unit 1314) the first electronic device based on the contextual information. In yet other examples, processing unit 1308 can be further configured to identify (e.g., using command identifying unit 1316) the first command based on the contextual information. In some examples, the contextual information includes an orientation of the user device when the user device received the audio input or a location of the user device when the user device received the audio input.

In some examples, the textual representation of the user speech excludes the name of the first electronic device. In other examples, the textual representation of the user speech excludes the type of the first electronic device.

In some examples, electronic device 1300 includes a mobile phone, desktop computer, laptop computer, tablet computer, portable media player, television, television set-top box, or wearable electronic device.

In some examples, processing unit 1308 can be further configured to transmit (e.g., using identification and command transmitting unit 1318) the identification of the first electronic device and the first command to the user device, and to receive (e.g., using state receiving unit 1320) the current state of the first electronic device from the user device.

In other examples, processing unit 1308 can be further configured to transmit (e.g., using identification and command transmitting unit 1318) the identification of the first electronic device and the first command to a second user device, and to receive (e.g., using state receiving unit 1320) the current state of the first electronic device from the second user device.

In other examples, processing unit 1308 can be further configured to transmit (e.g., using indication transmitting unit 1326) an indication to the second user device of a result of the first command based on the first command and the current state of the first electronic device.

In other examples, processing unit 1308 can be further configured to identify (e.g., using second electronic device identifying unit 1328) a second electronic device based on the textual representation of the user speech, identify (e.g., using second command identifying unit 1330) a second command to be performed by the second electronic device based on the textual representation of the user speech, transmit (e.g., using second identification and command transmitting unit 1332) an identification of the second electronic device and the second command, and receive (e.g., using second state receiving unit 1336) a current state of the second electronic device.

Figure 14:
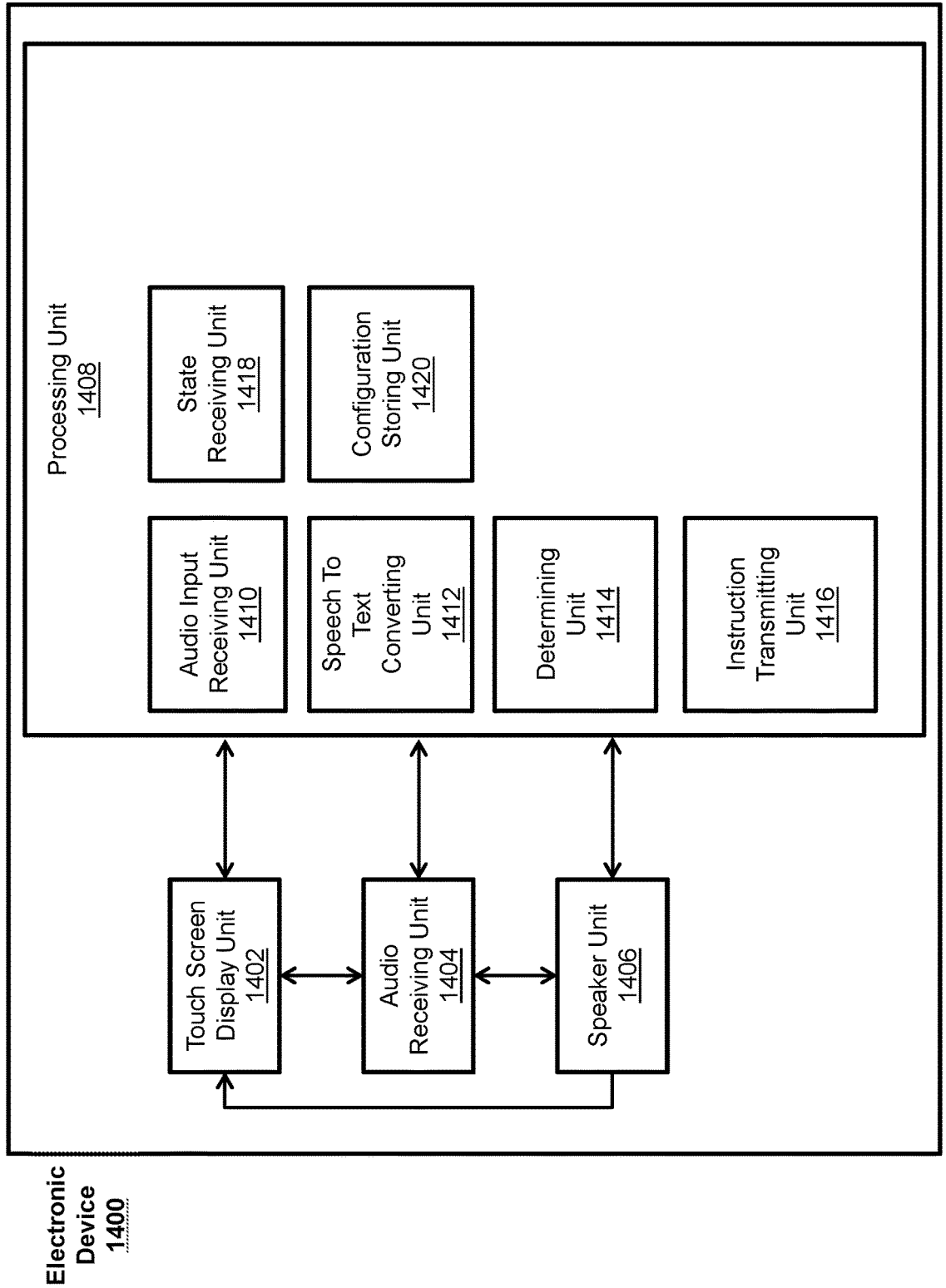
FIG. 14 illustrates a functional block diagram of an electronic device configured to store the states of electronic devices as a configuration according to various examples.

As shown in FIG. 14, electronic device 1400 can include a touch screen display unit 1402 configured to display a user interface and to receive touch input, and a sound receiving unit 1404 configured to receive sound input. In some examples, electronic device 1400 can include a speaker unit 1406 configured to generate sound. Electronic device 1400 can further include a processing unit 1408 coupled to touch screen display unit 1402 and sound receiving unit 1404 (and, optionally, coupled to speaker unit 1406). In some examples, processing unit 1408 can include an audio input receiving unit 1410, speech-to-text converting unit 1412, a determining unit 1414, an instruction transmitting unit 1416, a state receiving unit 1416, a configuration storing unit 1420, a second audio input receiving unit 1422, a second speech to text converting unit 1424, a second determining unit 1426, a command transmitting unit 1428, and a second state receiving unit 1430.

Processing unit 1408 can be configured to receive (e.g., using audio input receiving unit 1410) data corresponding to an audio input comprising a user speech from a user device. Processing unit 1408 can be further configured perform (e.g., using speech to text converting unit 1412) speech-to-text conversion on the data corresponding to the audio input to generate a textual representation of the user speech. Processing unit 1408 can be further configured to determine (e.g., using determining unit 1414) that the textual representation of the user speech represents a user intent to store a state of each of a plurality of electronic devices as a configuration. Processing unit 1408 can be further configured to transmit (e.g., using instruction transmitting unit 1416) an instruction to query the state of each of the plurality of electronic devices. Processing unit 1408 can be further configured to receive (e.g., using state receiving unit 1418) a current state of each of the plurality of electronic devices. Processing unit 1408 can be further configured to store (e.g., using configuration storing unit 1420) the received current state of each of the plurality of electronic devices as the configuration.

Figure 15:
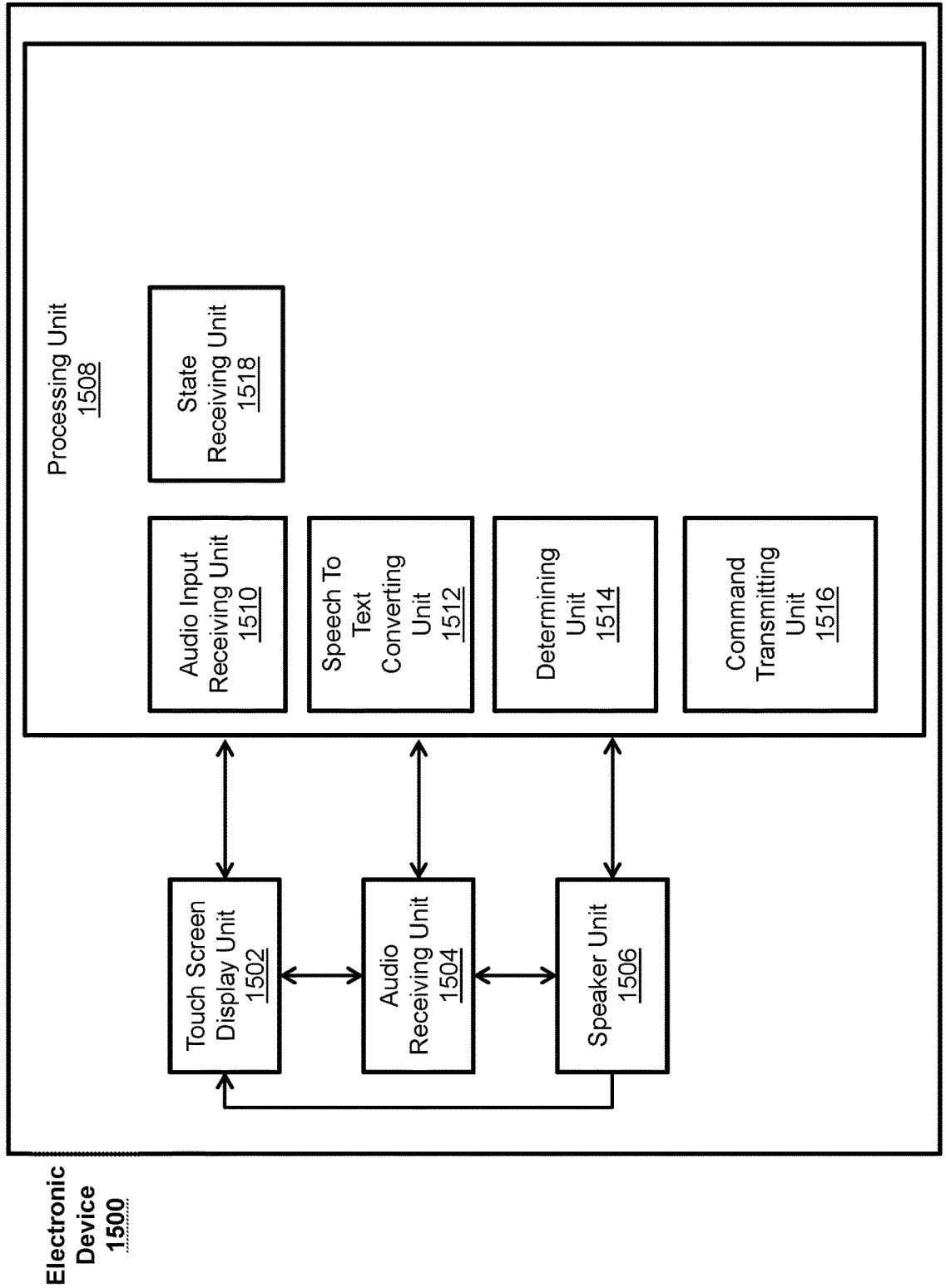
FIG. 15 illustrates a functional block diagram of an electronic device configured to set the states of electronic devices based on a stored configuration according to various examples.

As shown in FIG. 15, electronic device 1500 can include a touch screen display unit 1502 configured to display a user interface and to receive touch input, and a sound receiving unit 1504 configured to receive sound input. In some examples, electronic device 1500 can include a speaker unit 1506 configured to generate sound. Electronic device 1500 can further include a processing unit 1508 coupled to touch screen display unit 1502 and sound receiving unit 1504 (and, optionally, coupled to speaker unit 1506). In some examples, processing unit 1408 can include an audio input receiving unit 1510, speech-to-text converting unit 1512, a determining unit 1514, an instruction transmitting unit 1516, a state receiving unit 1516, a configuration storing unit 1520, a second audio input receiving unit 1522, a second speech to text converting unit 1524, a second determining unit 1526, a command transmitting unit 1528, and a second state receiving unit 1530.

In some examples, processing unit 1508 can be further configured to receive (e.g., using audio input receiving unit 1510) data corresponding to an audio input comprising a user speech, perform (e.g., using speech to text converting unit 1512) speech-to-text conversion on the data corresponding to the audio input to generate a textual representation of the user speech, determine (e.g., using determining unit 1514) that the textual representation of the user speech represents a user intent to change the state of each of the plurality of electronic devices based on the configuration, transmit (e.g., using command transmitting unit 1516) a plurality of commands to set the state of each of the plurality of electronic devices based on the configuration, and receive (e.g., using state receiving unit 1518) an updated state of each of the plurality of electronic devices.

As described above, one aspect of the present technology is the gathering and use of data available from various sources to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A non-transitory computer-readable storage medium storing one or more programs configured to be executed by one or more processors of a user device, the one or more programs including instructions for:
   receiving an audio input comprising user speech;
   determining an identification of a first electronic device based on data corresponding to the audio input;
   determining a first command to be performed by the first electronic device based on data corresponding to the audio input;
   transmitting the first command to the first electronic device;
   receiving, after transmitting the first command to the first electronic device, a second audio input;
   transmitting a state query to the first electronic device in accordance with the second audio input;
   receiving, from the first electronic device, a current state of the first electronic device; and
   storing the current state of the first electronic device as at least a portion of a configuration, wherein the configuration defines a plurality of states of a plurality of corresponding electronic devices to use in response to a command that references the configuration.

2. The non-transitory computer-readable storage medium of claim 1, the one or more programs further including instructions for:
   receiving, after transmitting the first command to the first electronic device and prior to receiving the second audio input, a current state of the first electronic device from the first electronic device; and
   transmitting the current state of the first electronic device to one or more servers.

3. The non-transitory computer-readable storage medium of claim 1, wherein the first command comprises a command to set an ON/OFF state, dimmable state, or color state of a light bulb.

4. The non-transitory computer-readable storage medium of claim 3, wherein the current state of the first electronic device comprises the ON/OFF state, dimmable state, or color state of the light bulb after transmitting the first command to set the ON/OFF state, dimmable state, or color state of the light bulb.

5. The non-transitory computer-readable storage medium of claim 1, wherein the first command comprises a command to set an ON/OFF state of a switch.

6. The non-transitory computer-readable storage medium of claim 5, wherein the current state of the first electronic device comprises the ON/OFF state of the switch after transmitting the command to set the ON/OFF state of the switch.

7. The non-transitory computer-readable storage medium of claim 1, wherein the first command comprises a command to set a LOCKED/UNLOCKED state of a door lock.

8. The non-transitory computer-readable storage medium of claim 7, wherein the current state of the first electronic device comprises the LOCKED/UNLOCKED state of the door lock after transmitting the command to set the LOCKED/UNLOCKED state of the door lock.

9. The non-transitory computer-readable storage medium of claim 1, wherein the first command comprises a command to set an OPEN/CLOSED state of a garage door.

10. The non-transitory computer-readable storage medium of claim 9, wherein the current state of the first electronic device comprises the OPEN/CLOSED state of the garage door after transmitting the command to set the OPEN/CLOSED state of the garage door.

11. The non-transitory computer-readable storage medium of claim 1, wherein the first command comprises a command to set a numerical value of a temperature setting of a thermostat.

12. The non-transitory computer-readable storage medium of claim 11, wherein the current state of the first electronic device comprises the numerical value of the temperature setting of the thermostat after transmitting the first command to set the numerical value of the temperature setting of the thermostat.

13. The non-transitory computer-readable storage medium of claim 1, the one or more programs further including instructions for:
   outputting a notification associated with the current state of the first electronic device in response to determining that a predetermined condition has been satisfied.

14. The non-transitory computer-readable storage medium of claim 1, wherein the user device comprises a database for storing a state of each of the plurality of electronic devices, and wherein the one or more programs further including instructions for:
   updating a state of the plurality of electronic devices stored in the database based at least in part on a current state of the plurality of electronic devices received from the plurality of electronic devices.

15. The non-transitory computer-readable storage medium of claim 1, the one or more programs further including instructions for:

outputting an indication of a result of the first command based on the first command and the current state of the first electronic device received from the first electronic device, wherein the indication of the result is an audio, visual, or both an audio and visual indication.

16. The non-transitory computer-readable storage medium of claim 1, wherein the user device comprises a mobile phone, desktop computer, laptop computer, tablet computer, portable media player, television, television set-top box, or wearable electronic device.

17. The non-transitory computer-readable storage medium of claim 1, the one or more programs further including instructions for:
   determining, prior to receiving the second audio input, an identification of a second electronic device based on data corresponding to the audio input; and
   determining, a second command to be performed by the second electronic device based on data corresponding to the audio input;
   transmitting the second command to the second electronic device;
   receiving, after transmitting the second command to the second electronic device, a current state of the second electronic device from the second electronic device; and
   storing the current state of the second electronic device.

18. A method for controlling electronic devices using a virtual assistant on a user device having a memory and at least one processor, the method comprising:
   at the user device:
      receiving an audio input comprising user speech;
      determining an identification of a first electronic device based on data corresponding to the audio input;
      determining a first command to be performed by the first electronic device based on data corresponding to the audio input;
      transmitting the first command to the first electronic device;
      receiving, after transmitting the first command to the first electronic device, a second audio input;
      transmitting a state query to the first electronic device in accordance with the second audio input;
      receiving, from the first electronic device, a current state of the first electronic device; and
      storing the current state of the first electronic device as at least a portion of a configuration, wherein the configuration defines a plurality of states of a plurality of corresponding electronic devices to use in response to a command that references the configuration.

19. The method of claim 18, further comprising:
   receiving, after transmitting the first command to the first electronic device and prior to receiving the second audio input, a current state of the first electronic device from the first electronic device; and
   transmitting the current state of the first electronic device to the one or more servers.

20. The method of claim 18, wherein the first command comprises a command to set an ON/OFF state, dimmable state, or color state of a light bulb.

21. The method of claim 20, wherein the current state of the first electronic device comprises the ON/OFF state, dimmable state, or color state of the light bulb after transmitting the first command to set the ON/OFF state, dimmable state, or color state of the light bulb.

22. The method of claim 18, wherein the first command comprises a command to set an ON/OFF state of a switch.

23. The method of claim 22, wherein the current state of the first electronic device comprises the ON/OFF state of the switch after transmitting the command to set the ON/OFF state of the switch.

24. The method of claim 18, wherein the first command comprises a command to set a LOCKED/UNLOCKED state of a door lock.

25. The method of claim 24, wherein the current state of the first electronic device comprises the LOCKED/UNLOCKED state of the door lock after transmitting the command to set the LOCKED/UNLOCKED state of the door lock.

26. The method of claim 18, wherein the first command comprises a command to set an OPEN/CLOSED state of a garage door.

27. The method of claim 26, wherein the current state of the first electronic device comprises the OPEN/CLOSED state of the garage door after transmitting the command to set the OPEN/CLOSED state of the garage door.

28. The method of claim 18, wherein the first command comprises a command to set a numerical value of a temperature setting of a thermostat.

29. The method of claim 28, wherein the current state of the first electronic device comprises the numerical value of the temperature setting of the thermostat after transmitting the first command to set the numerical value of the temperature setting of the thermostat.

30. The method of claim 18, further comprising:
   outputting a notification associated with the current state of the first electronic device in response to determining that a predetermined condition has been satisfied.

31. The method of claim 18, wherein the user device comprises a database for storing a state of each of the plurality of electronic devices, and wherein the method further comprises:
   updating a state of the plurality of electronic devices stored in the database based at least in part on a current state of the plurality of electronic devices received from the plurality of electronic devices.

32. The method of claim 18, further comprising:
   outputting an indication of a result of the first command based on the first command and the current state of the first electronic device received from the first electronic device, wherein the indication of the result is an audio, visual, or both an audio and visual indication.

33. The method of claim 18, wherein the user device comprises a mobile phone, desktop computer, laptop computer, tablet computer, portable media player, television, television set-top box, or wearable electronic device.

34. The method of claim 18, further comprising:
   determining, prior to receiving the second audio input, an identification of a second electronic device based on data corresponding to the audio input; and
   determining, a second command to be performed by the second electronic device based on data corresponding to the audio input;
   transmitting the second command to the second electronic device;
   receiving, after transmitting the second command to the second electronic device, a current state of the second electronic device from the second electronic device; and
   storing the current state of the second electronic device.

35. A user device comprising:
one or more processors;
a memory; and
one or more programs, wherein the one or more programs are stored in the memory and configured to be executed by the one or more processors, the one or more programs including instructions for:
receiving an audio input comprising user speech;
determining an identification of a first electronic device based on data corresponding to the audio input;
determining a first command to be performed by the first electronic device based on data corresponding to the audio input;
transmitting the first command to the first electronic device;
receiving, after transmitting the first command to the first electronic device, a second audio input;
transmitting a state query to the first electronic device in accordance with the second audio input;
receiving, from the first electronic device, a current state of the first electronic device; and
storing the current state of the first electronic device as at least a portion of a configuration, wherein the configuration defines a plurality of states of a plurality of corresponding electronic devices to use in response to a command that references the configuration.

36. The user device of claim 35, the one or more programs further including instructions for:
receiving, after transmitting the first command to the first electronic device and prior to receiving the second audio input, a current state of the first electronic device from the first electronic device; and
transmitting the current state of the first electronic device to the one or more servers.

37. The user device of claim 35, wherein the first command comprises a command to set an ON/OFF state, dimmable state, or color state of a light bulb.

38. The user device of claim 37, wherein the current state of the first electronic device comprises the ON/OFF state, dimmable state, or color state of the light bulb after transmitting the first command to set the ON/OFF state, dimmable state, or color state of the light bulb.

39. The user device of claim 35, wherein the first command comprises a command to set an ON/OFF state of a switch.

40. The user device of claim 39, wherein the current state of the first electronic device comprises the ON/OFF state of the switch after transmitting the command to set the ON/OFF state of the switch.

41. The user device of claim 35, wherein the first command comprises a command to set a LOCKED/UNLOCKED state of a door lock.

42. The user device of claim 41, wherein the current state of the first electronic device comprises the LOCKED/UNLOCKED state of the door lock after transmitting the command to set the LOCKED/UNLOCKED state of the door lock.

43. The user device of claim 35, wherein the first command comprises a command to set an OPEN/CLOSED state of a garage door.

44. The user device of claim 43, wherein the current state of the first electronic device comprises the OPEN/CLOSED state of the garage door after transmitting the command to set the OPEN/CLOSED state of the garage door.

45. The user device of claim 35, wherein the first command comprises a command to set a numerical value of a temperature setting of a thermostat.

46. The user device of claim 45, wherein the current state of the first electronic device comprises the numerical value of the temperature setting of the thermostat after transmitting the first command to set the numerical value of the temperature setting of the thermostat.

47. The user device of claim 35, the one or more programs further including instructions for:
outputting a notification associated with the current state of the first electronic device in response to determining that a predetermined condition has been satisfied.

48. The user device of claim 35, wherein the user device comprises a database for storing a state of each of the plurality of electronic devices, and wherein the one or more programs further including instructions for:
updating a state of the plurality of electronic devices stored in the database based at least in part on a current state of the plurality of electronic devices received from the plurality of electronic devices.

49. The user device of claim 35, the one or more programs further including instructions for:
outputting an indication of a result of the first command based on the first command and the current state of the first electronic device received from the first electronic device, wherein the indication of the result is an audio, visual, or both an audio and visual indication.

50. The user device of claim 35, wherein the user device comprises a mobile phone, desktop computer, laptop computer, tablet computer, portable media player, television, television set-top box, or wearable electronic device.

51. The user device of claim 35, the one or more programs further including instructions for:
determining, prior to receiving the second audio input, an identification of a second electronic device based on data corresponding to the audio input; and
determining, a second command to be performed by the second electronic device based on data corresponding to the audio input;
transmitting the second command to the second electronic device;
receiving, after transmitting the second command to the second electronic device, a current state of the second electronic device from the second electronic device; and
storing the current state of the second electronic device.

* * * * *